US012135442B2

(12) United States Patent
Singh et al.

(10) Patent No.: US 12,135,442 B2
(45) Date of Patent: Nov. 5, 2024

(54) DISPLAY DEVICE WITH DIFFRACTION GRATING HAVING REDUCED POLARIZATION SENSITIVITY

(71) Applicant: Magic Leap, Inc., Plantation, FL (US)

(72) Inventors: Vikramjit Singh, Pflugerville, TX (US); Kang Luo, Austin, TX (US); Xiaopei Deng, Cedar Park, TX (US); Shuqiang Yang, Austin, TX (US); Frank Y. Xu, Austin, TX (US); Kevin Messer, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/181,389

(22) Filed: Mar. 9, 2023

(65) Prior Publication Data

US 2023/0213692 A1 Jul. 6, 2023

Related U.S. Application Data

(63) Continuation of application No. 17/019,065, filed on Sep. 11, 2020, now Pat. No. 11,614,573.
(Continued)

(51) Int. Cl.
*G02B 5/18* (2006.01)
*F21V 8/00* (2006.01)
*G02B 27/01* (2006.01)

(52) U.S. Cl.
CPC ......... *G02B 5/1842* (2013.01); *G02B 6/0026* (2013.01); *G02B 27/0172* (2013.01); *G02B 6/0076* (2013.01); *G02B 2027/0178* (2013.01)

(58) Field of Classification Search
CPC .............. G02B 5/1842; G02B 6/0026; G02B 27/0172; G02B 6/0076; G02B 2027/0178;
(Continued)

(56) References Cited

U.S. PATENT DOCUMENTS

| 4,846,552 A | 7/1989 | Veldkamp et al. |
| 6,324,004 B1 * | 11/2001 | Staub ................ B42D 25/29 359/566 |

(Continued)

FOREIGN PATENT DOCUMENTS

| CN | 109239842 A | 1/2019 |
| CN | 110133780 A | 8/2019 |

(Continued)

OTHER PUBLICATIONS

EP20863273.7 Extended European Search Report dated Oct. 24, 2023.
(Continued)

*Primary Examiner* — Collin X Beatty
(74) *Attorney, Agent, or Firm* — Tobias Intellectual Property Law, PLLC

(57) ABSTRACT

Diffraction gratings provide optical elements in head-mounted display systems to, e.g., incouple light into or outcouple light out of a waveguide. These diffraction gratings may be configured to have reduced polarization sensitivity. Such gratings may, for example, incouple or outcouple light of different polarizations, or polarized and unpolarized light, with a similar level of efficiency. The diffraction gratings and waveguides may include a transmissive layer and a metal layer. The diffraction grating may comprise a blazed grating.

20 Claims, 36 Drawing Sheets

Related U.S. Application Data

(60) Provisional application No. 62/902,295, filed on Sep. 18, 2019, provisional application No. 62/899,673, filed on Sep. 12, 2019, provisional application No. 62/899,063, filed on Sep. 11, 2019.

(58) Field of Classification Search
CPC .......... G02B 6/0011; G02B 2027/0127; G02B 27/4272; G02B 2027/0185
See application file for complete search history.

(56) References Cited

U.S. PATENT DOCUMENTS

| | | |
|---|---|---|
| 6,400,509 B1 | 6/2002 | Sappey et al. |
| 6,839,173 B2 | 1/2005 | Shimmo et al. |
| 6,850,221 B1 | 2/2005 | Tickle |
| 9,081,426 B2 | 7/2015 | Armstrong |
| 11,435,501 B1* | 9/2022 | Ouderkirk .......... G02B 27/0179 |
| 11,614,573 B2 | 3/2023 | Singh et al. |
| 2006/0028436 A1 | 2/2006 | Armstrong |
| 2007/0081123 A1 | 4/2007 | Lewis |
| 2011/0090389 A1* | 4/2011 | Saito .................. G02B 27/0172 348/333.01 |
| 2012/0044572 A1 | 2/2012 | Simmonds et al. |
| 2012/0120493 A1 | 5/2012 | Simmonds et al. |
| 2012/0127062 A1 | 5/2012 | Bar-Zeev et al. |
| 2012/0162549 A1 | 6/2012 | Gao et al. |
| 2013/0082922 A1 | 4/2013 | Miller |
| 2013/0100362 A1 | 4/2013 | Saeedi et al. |
| 2013/0117377 A1 | 5/2013 | Miller |
| 2013/0125027 A1 | 5/2013 | Abovitz |
| 2013/0208234 A1 | 8/2013 | Lewis |
| 2013/0242262 A1 | 9/2013 | Lewis |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0309263 A2 | 10/2015 | Abovitz et al. |
| 2015/0326570 A1 | 11/2015 | Publicover et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2017/0131460 A1 | 5/2017 | Lin et al. |
| 2017/0307886 A1 | 10/2017 | Stenberg et al. |
| 2017/0322418 A1 | 11/2017 | Lin et al. |
| 2017/0363811 A1 | 12/2017 | Ayres et al. |
| 2018/0052320 A1 | 2/2018 | Curtis et al. |
| 2018/0081176 A1 | 3/2018 | Olkkonen et al. |
| 2018/0231702 A1 | 8/2018 | Lin et al. |
| 2018/0348548 A1* | 12/2018 | Visser .................. H10K 59/353 |
| 2019/0088904 A1* | 3/2019 | Cho ...................... G09G 3/3208 |
| 2020/0041791 A1* | 2/2020 | Shipton .............. G02B 27/0172 |
| 2020/0257034 A1 | 8/2020 | Masuda |
| 2021/0072437 A1 | 3/2021 | Singh et al. |

FOREIGN PATENT DOCUMENTS

| | | |
|---|---|---|
| FR | 2942549 A1 | 8/2010 |
| JP | 2003315518 A | 11/2003 |
| JP | 2005121938 A | 5/2005 |
| WO | 2018194987 A1 | 10/2018 |
| WO | 2019054756 A1 | 3/2019 |
| WO | 2021050924 A1 | 3/2021 |

OTHER PUBLICATIONS

JP2022-515698 Office Action dated Sep. 15, 2023.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
PCTUS2020050467 International Preliminary Report on Patentability dated Mar. 15, 2022.
PCTUS2020050467 International Search Report and Written Opinion dated Dec. 10, 2020.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

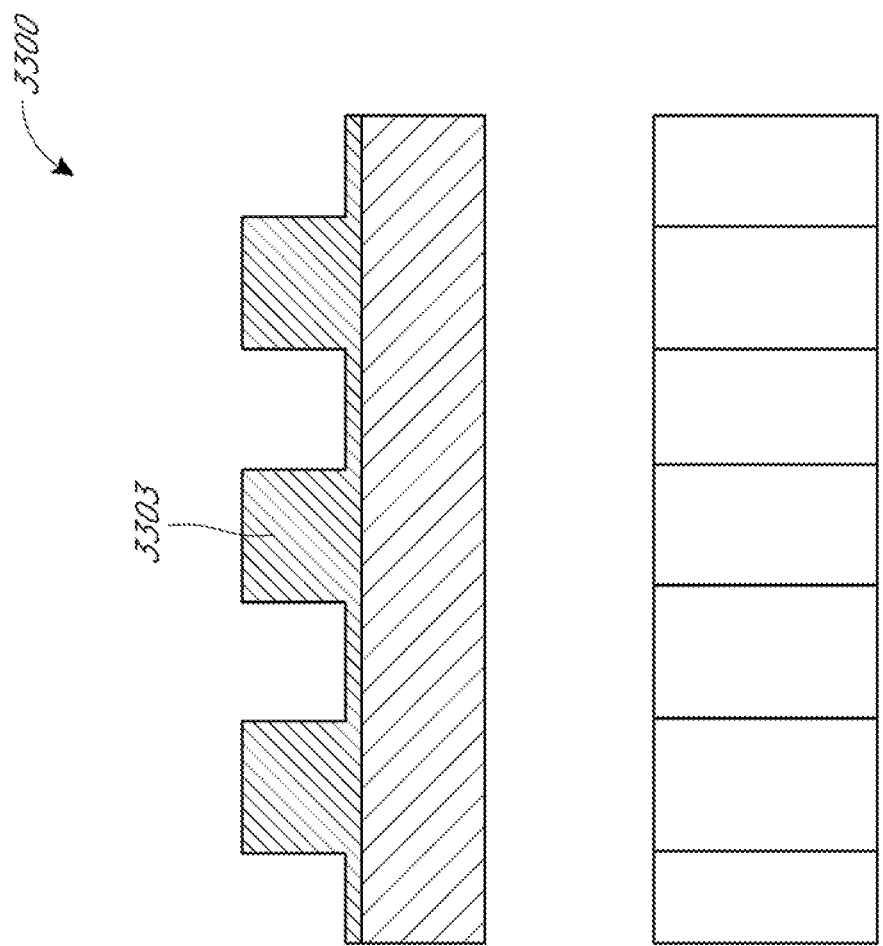

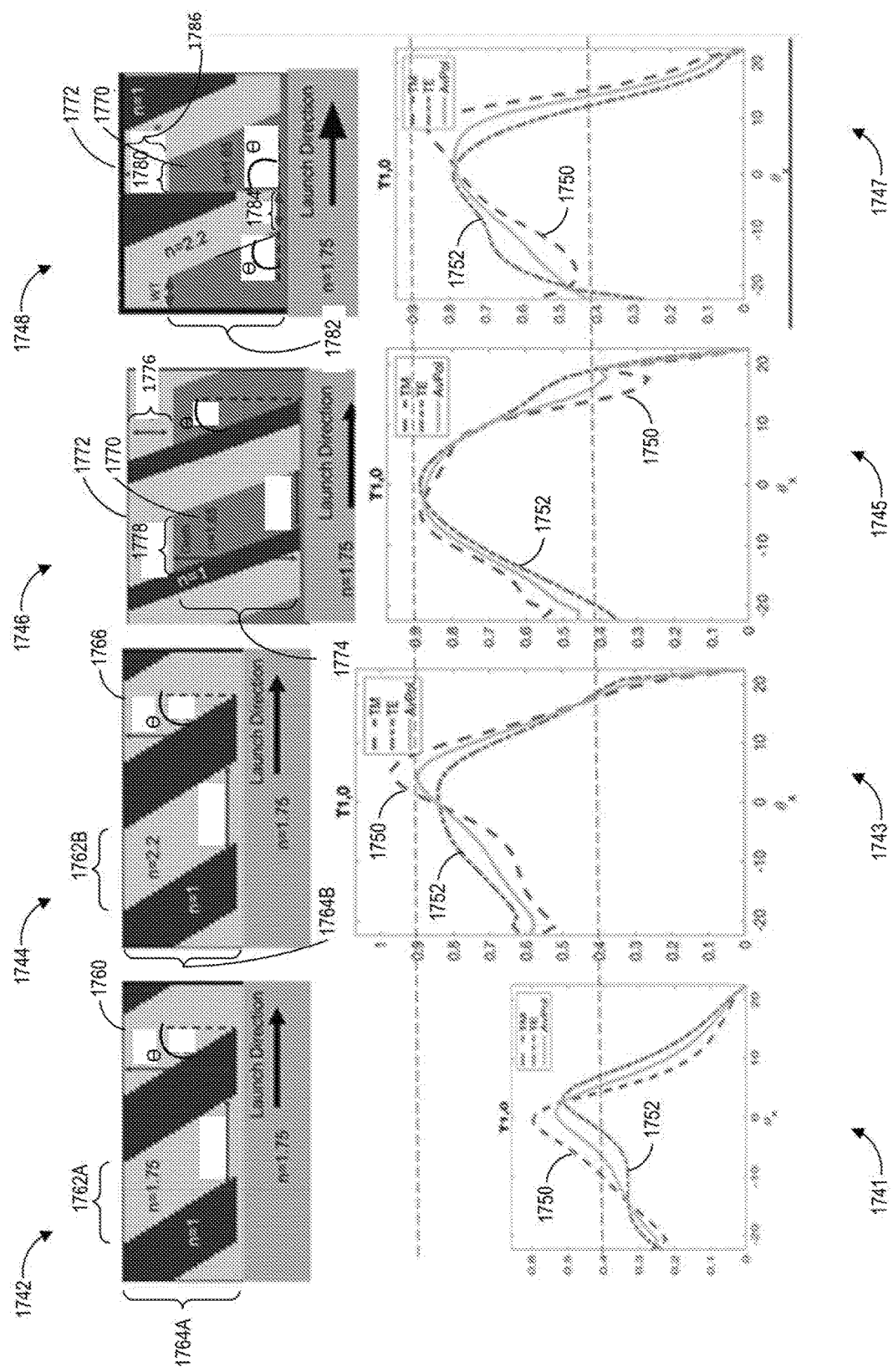

DISPLAY DEVICE WITH DIFFRACTION GRATING HAVING REDUCED POLARIZATION SENSITIVITY

CROSS REFERENCE TO RELATED APPLICATIONS

This application is a continuation of U.S. application Ser. No. 17/019,065 filed Sep. 11, 2020, titled "DISPLAY DEVICE WITH DIFFRACTION GRATING HAVING REDUCED POLARIZATION SENSITIVITY," which claims benefit of priority to U.S. Provisional Application No. 62/899,063 filed Sep. 11, 2019, titled "DISPLAY DEVICE WITH DIFFRACTION GRATING HAVING REDUCED POLARIZATION SENSITIVITY," U.S. Provisional Application No. 62/899,673 filed Sep. 12, 2019, titled "DISPLAY DEVICE WITH DIFFRACTION GRATING HAVING REDUCED POLARIZATION SENSITIVITY," and U.S. Provisional Application No. 62/902,295 filed Sep. 18, 2019, titled "DISPLAY DEVICE WITH DIFFRACTION GRATING HAVING REDUCED POLARIZATION SENSITIVITY," the entire disclosures of each of which are incorporated by reference herein.

FIELD

The present disclosure relates to display systems and, more particularly, to augmented and virtual reality display systems.

BACKGROUND

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario. AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

For purposes of summarizing the disclosure, certain aspects, advantages, and novel features have been described herein. It can be to be understood that not necessarily all such advantages can be achieved in accordance with any particular embodiment disclosed herein. Thus, the embodiments disclosed herein can be embodied or carried out in a manner that achieves or optimizes one advantage or group of advantages as taught or suggested herein without necessarily achieving others.

Disclosed herein is a head-mounted display system. In one configuration, the head-mounted display system can include a head-mountable frame, a light projection system, a waveguide supported by the frame, a diffraction grating, a first layer over said diffraction grating, and a second layer that includes a metal disposed over the first layer. The light projection system can be configured to output light to provide image content. The waveguide can include a substrate configured to guide at least a portion of the light from said light projection system coupled into the waveguide. The diffraction grating can include material different than said substrate over said substrate. The diffraction grating can have a first diffraction efficiency for a first polarization over a range of angles of light incident thereon and can have a second diffraction efficiency for a second polarization over the range of angles of light incident thereon, the first diffraction efficiency being from 1 to 2 times the second diffraction efficiency.

In another configuration, the head-mounted display system can include a head-mountable frame, a light projection system, a waveguide supported by the frame, a diffraction grating formed in a substrate, a first layer disposed over said diffraction grating formed in said substrate, and a second layer comprising metal disposed over said diffraction grating formed in said substrate. The light projection system can be configured to output light to provide image content. The waveguide can include the substrate. The substrate can include optically transparent material. The substrate can be configured to guide at least a portion of the light from said light projection system coupled into said waveguide via said diffraction grating. The diffraction grating can have a first diffraction efficiency for a first polarization over a range of angles of light incident thereon and can have a second diffraction efficiency for a second polarization over the range of angles of light incident thereon, the first diffraction efficiency being from 1 to 2 times the second diffraction efficiency.

In some configurations, a head-mounted display system can include: a head-mountable frame; a light projection system configured to output light to provide image content; a waveguide supported by the frame, the waveguide that may include a substrate configured to guide at least a portion of the light from said light projection system coupled into said waveguide; a first diffraction grating that may include material different than said substrate over said substrate; a first layer disposed over said first diffraction grating; and a second layer that may include metal disposed over said first diffraction grating such that said diffraction grating has a first diffraction efficiency for a first polarization over a range of angles of light incident thereon and a second diffraction efficiency for a second polarization over the range of angles of light incident thereon, the first diffraction efficiency being from 1 to 2 times the second diffraction efficiency.

In some configurations, a head-mounted display system can include: a head-mountable frame; a light projection system configured to output light to provide image content; a waveguide supported by the frame, the waveguide can include a substrate that may include optically transparent material and a first diffraction grating formed in said substrate, said substrate configured to guide at least a portion of the light from said light projection system coupled into said waveguide via, a first layer disposed over said first diffraction grating formed in said substrate; a second layer that may include metal disposed over said first diffraction grating formed in said substrate such that the first diffraction grating has a first diffraction efficiency for a first polarization over a range of angles of light incident thereon and a second diffraction efficiency for a second polarization over the range of angles of light incident thereon, the first diffraction efficiency being from 1 to 2 times the second diffraction efficiency.

In some configurations, a head-mounted display system can include: a head-mountable frame; a light projection system configured to output light to provide image content; a waveguide supported by the frame, the waveguide can include a substrate configured to guide at least a portion of the light from said light projection system coupled into said waveguide; a first diffraction grating that may include material different than said substrate; a first layer disposed over said first diffraction grating such that the first diffraction grating has a first diffraction efficiency for a first polarization over a range of angles of light incident thereon that is greater than a second diffraction efficiency for a second polarization over a range of angles of light incident thereon; and a second layer disposed over said first diffraction grating such that the first diffraction grating has a third diffraction efficiency for said second polarization over said range of angles of light incident thereon that is greater than a fourth diffraction efficiency for the first polarization over a range of angles of light incident thereon, wherein a diffraction efficiency of the combination of the first diffraction grating together with the first and second layers is configured to provide a fifth diffraction efficiency for the first polarization over the range of angles of light incident thereon and has a sixth diffraction efficiency for a second polarization over the range of angles of light incident thereon, the fifth diffraction efficiency being from 1 to 2 times the sixth diffraction efficiency.

In some configurations, a head-mounted display system can include: a head-mountable frame; a light projection system configured to output light to provide image content; and a waveguide supported by the frame, the waveguide can include a substrate that may include optically transparent material and a first diffraction grating formed in said substrate, said substrate configured to guide at least a portion of the light from said light projection system coupled into said waveguide, a first layer disposed over said first diffraction grating formed in said substrate, the first layer together with said first diffraction grating configured to provide a first diffraction efficiency for a first polarization over a range of angles of light incident thereon that is greater than a second diffraction efficiency for a second polarization over a range of angles of light incident thereon; and a second layer disposed over said first diffraction grating formed in said substrate, the second layer together with said first diffraction grating configured to provide a third diffraction efficiency for said second polarization over said range of angles of light incident thereon that is greater than a fourth diffraction efficiency for the first polarization over a range of angles of light incident thereon, wherein the first diffraction grating together with the first and second layers is configured to provide a fifth diffraction efficiency for a first polarization over a range of angles of light incident thereon and a sixth diffraction efficiency for a second polarization over the range of angles of light incident thereon, the fifth diffraction efficiency being from 1 to 2 times the sixth diffraction efficiency.

In some configurations, a head-mounted display system can include: a head-mountable frame; a light projection system configured to output light to provide image content; a waveguide supported by the frame, the waveguide can include a substrate configured to guide at least a portion of the light from said light projection system coupled into said waveguide; a first diffraction grating that may include material different than said substrate over said substrate; and a first layer that may include multilayer coating disposed over said first diffraction grating, the first diffraction grating together with the first layer configured to have a first diffraction efficiency for a first polarization over a range of angles of light incident thereon that is greater than a second diffraction efficiency for a second polarization over a range of angles of light incident thereon.

In some configurations, a head-mounted display system can include: a head-mountable frame; a light projection system configured to output light to provide image content; a waveguide supported by the frame, the waveguide that may include a substrate configured to guide at least a portion of the light from said light projection system coupled into said waveguide; a first diffraction grating configured to have a first diffraction efficiency for a first polarization over a range of angles of light incident thereon that is greater than a second diffraction efficiency for a second polarization over a range of angles of light incident thereon.

In some configurations, a head-mounted display system can include: a head-mountable frame; a light projection system configured to output light to provide image content; and a waveguide supported by the frame, the waveguide can include a substrate configured to guide at least a portion of the light from said light projection system coupled into said waveguide; a first diffraction grating that may include material different than said substrate over said substrate, wherein the substrate can include a material having a first index of refraction; a first layer disposed over said first diffraction grating, wherein the first layer can include a material having a second index of refraction; a material disposed over said first layer having a third index of refraction between the second index of refraction and an index of refraction of air, wherein said first diffraction grating together with the first layer and the material over the first layer is configured to have a first diffraction efficiency for a first polarization over a range of angles of light incident thereon that is greater than a second diffraction efficiency for a second polarization over a range of angles of light incident thereon.

In some configurations, a head-mounted display system can include: a head-mountable frame; a light projection system configured to output light to provide image content; a waveguide supported by the frame, the waveguide that may include a substrate configured to guide at least a portion of the light from said light projection system coupled into said waveguide; a first diffraction grating; and a first layer disposed over said first diffraction grating such that said diffraction grating has a first diffraction efficiency for a first polarization over a range of angles of light incident thereon that is from 1 to 2 times a second diffraction efficiency for a second polarization over a range of angles of light incident thereon.

A method of fabricating a diffraction grating with reduced polarization sensitivity, the method can include: forming one or more diffractive features in or on a substrate configured to guide at least a portion of light from a light projection system coupled into the substrate; depositing a first layer over said one or more diffractive features; and depositing a second layer over said one or more diffractive features such that the one or more diffractive features has a first diffraction efficiency for a first polarization over a range of angles of light incident thereon and a second diffraction efficiency for a second polarization over the range of angles of light incident thereon, the first diffraction efficiency being from 1 to 2 times the second diffraction efficiency.

In some configurations, a head-mounted display system can include: a head-mountable frame; a light projection system configured to output light to provide image content; a waveguide supported by the frame, the waveguide that may include a substrate configured to guide at least a portion of the light from said light projection system coupled into said waveguide; a first diffraction grating configured such that said diffraction grating has a first diffraction efficiency for a first polarization over a range of angles of light incident thereon that is from 1 to 2 times a second diffraction efficiency for a second polarization over a range of angles of light incident thereon.

In some configurations. a head-mounted display system can include: a head-mountable frame; a light projection system configured to output light to provide image content; a waveguide supported by the frame, the waveguide that may include a substrate configured to guide at least a portion of the light from said light projection system coupled into said waveguide, said substrate having a refractive index of less than 1.9; a first diffraction grating configured such that said diffraction grating has a first diffraction efficiency for a first polarization over a range of angles of light incident thereon that is from 1 to 2 times a second diffraction efficiency for a second polarization over a range of angles of light incident thereon.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

FIGS. 13B-1 and 13B-2 illustrate views of a one dimensional (1D) grating.

FIGS. 13D-1 and 13D-2 show respectively a cross-sectional side-view and a top-view of an example 2D array of symmetric diffractive features.

FIGS. 13F-1 and 13F-2 show respectively a cross-sectional side-view and a top-view of an example array of asymmetric diffractive features.

FIG. 13G-1 shows an example device having a 2D array of diffractive features formed in or on a substrate and blazed in two directions.

FIG. 13G-2 shows an example diffractive feature directing more light in two particular directions.

FIGS. 17D-1 to 17D-4 illustrate different diffractive optical element designs and TM and TE efficiency profiles for the respective different diffractive optical elements that may be used, for example, as an in-coupling optical element such as illustrated in FIG. 17C.

DETAILED DESCRIPTION

Figure 1:
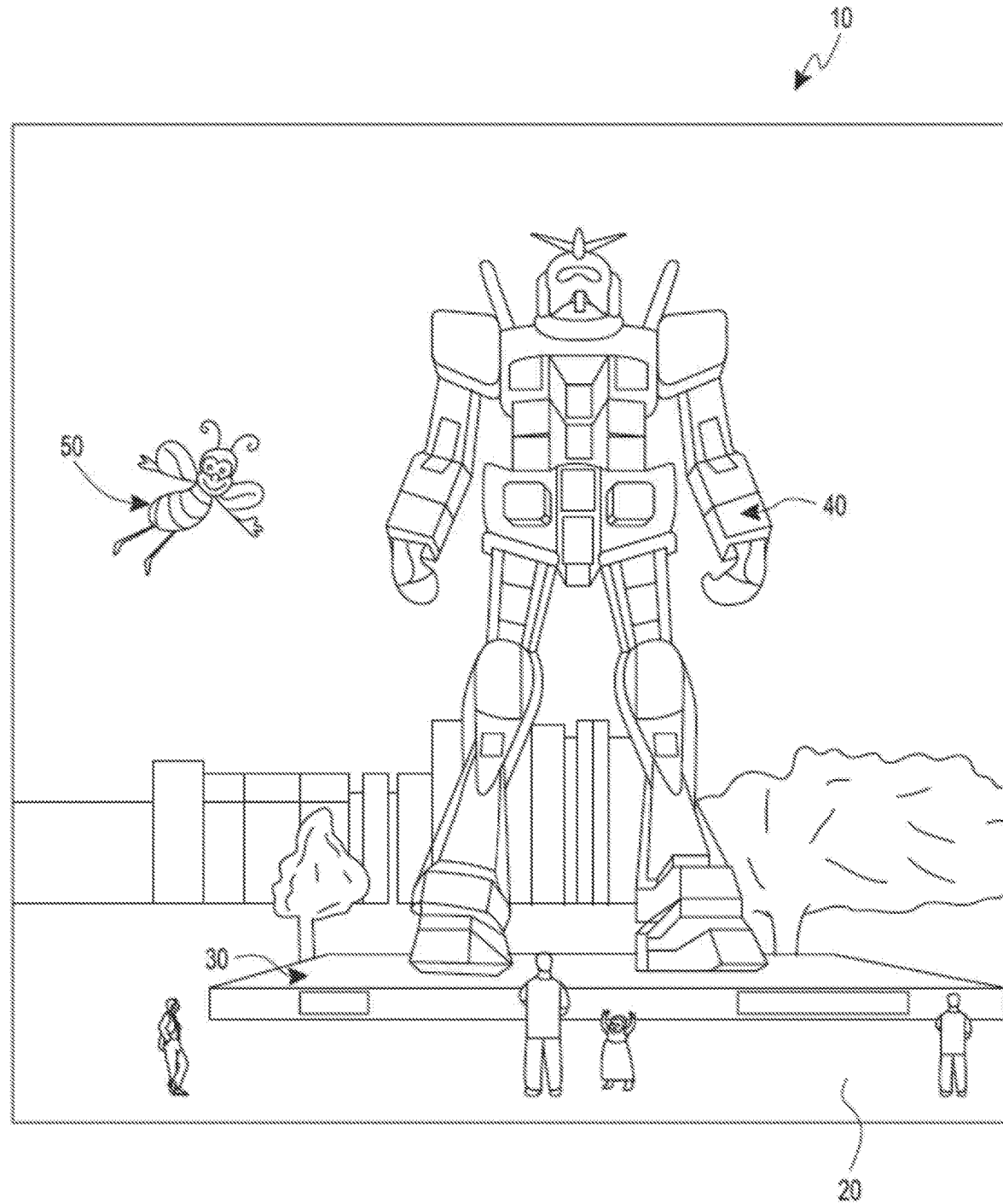
FIG. 1 illustrates a user's view of augmented reality (AR) through an AR device.

Although certain preferred embodiments and examples are disclosed below, inventive subject matter extends beyond the specifically disclosed embodiments to other alternative embodiments and/or uses of the invention, and to modifications and equivalents thereof. Thus, the scope of the inventions herein disclosed is not limited by any of the particular embodiments described below. For example, in any method or process disclosed herein, the acts or operations of the method or process may be performed in any suitable sequence and are not necessarily limited to any particular disclosed sequence. For purposes of contrasting various embodiments with the prior art, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

AR systems may display virtual content to a user, or viewer, while still allowing the user to see the world around them. Preferably, this content is displayed on a head-mounted display, e.g., as part of eyewear, that projects image information to the user's eyes. In addition, the display may also transmit light from the surrounding environment to the user's eyes, to allow a view of that surrounding environment. As used herein, it will be appreciated that a "head-mounted" or "head mountable" display is a display that may be mounted on the head of a viewer or user.

In some AR systems, virtual/augmented/mixed display having a relatively high field of view (FOV) can enhance the viewing experience. The FOV of the display depends on the angle of light output by waveguides of the eyepiece, through which the viewer sees images projected into his or her eye. A waveguide having a relatively high refractive index, e.g., 2.0 or greater, can provide a relatively high FOV. However, to efficiently couple light into the high refractive index waveguide, the diffractive optical coupling elements should also have a correspondingly high refractive index. To achieve this goal, among other advantages, some displays for AR systems according to embodiments described herein include a waveguide comprising a relatively high index (e.g., greater than or equal to 2.0) material, having formed thereon respective diffraction gratings with correspondingly high refractive index, such a Li-based oxide. For example, a diffraction grating may be formed directly on a Li-based oxide waveguide by patterning a surface portion of the waveguide formed of a Li-based oxide.

Some high refractive index diffractive optical coupling elements such as in-coupling or out-coupling optical elements have strong polarization dependence. For example, in-coupling gratings (ICGs) for in-coupling light into a waveguide wherein the diffractive optical coupling element comprises high refractive index material may admit light of a given polarization significantly more than light of another polarization. Such elements may, for example, in-couple light with TM polarization into the waveguide at a rate approximately 3 times that of light with TE polarization. Diffractive optical coupling elements with this kind of polarization dependence may have reduced efficiency (due to the poor efficiency and general rejection of one polarization) and may also create coherent artifacts and reduce the uniformity of a far field image formed by light coupled out of the waveguide. To obtain diffractive optical coupling elements that are polarization-insensitive or at least that have reduced polarization sensitivity (e.g., that couple light with an efficiency that is relatively independent of polarization), some displays for AR systems according to various implementations described herein include a waveguide with diffraction gratings formed with blazed geometries. The diffraction grating may also be formed directly in the waveguide, which may comprise high index material (e.g. having an index of refraction of at least 1.9, 2.0, 2.1, 2.2, 2.3, 2.4, 2.5, 2.6, or up to 2.7 or any range between any of these values). A diffractive grating may, for example, be formed in high index materials such as such as Li-based oxide like lithium niobate ($LiNbO_3$) or lithium tantalate ($LiTaO_3$) or such as zirconium oxide ($ZrO_2$), titanium dioxide ($TiO_2$) or silicon carbide (SiC), for example, by patterning the high index material with a blazed geometry.

Reference will now be made to the drawings, in which like reference numerals refer to like parts throughout. Unless indicated otherwise, the drawings are schematic not necessarily drawn to scale.

Figure 2:
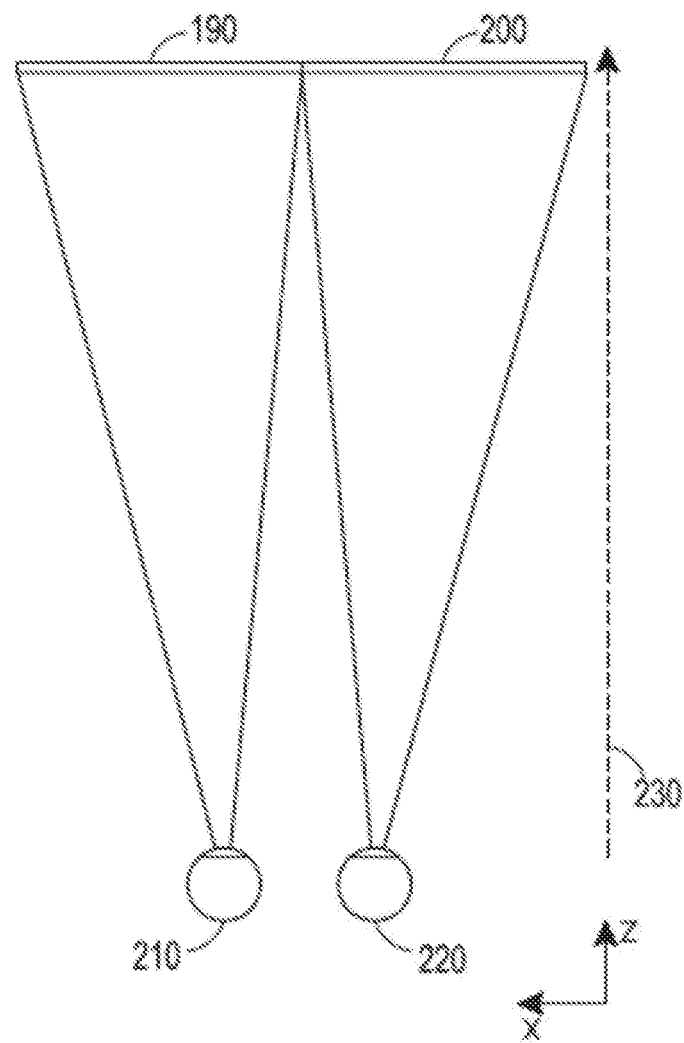
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
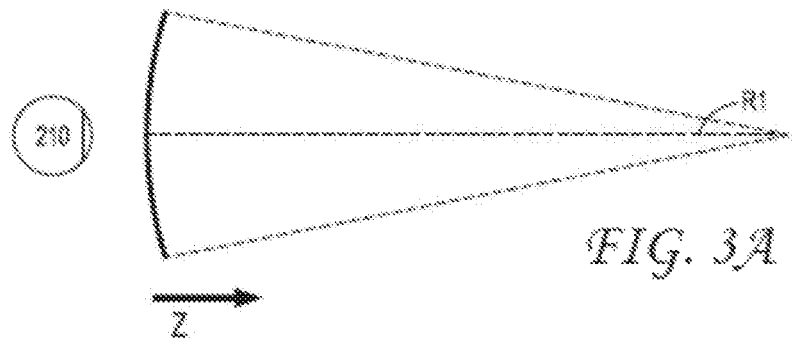
FIGS. 3A-3C illustrate relationships between radius of curvature and focal radius.
Figure 3B:
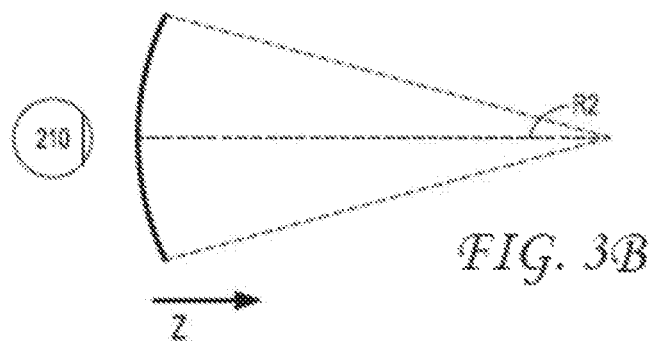
Figure 3C:
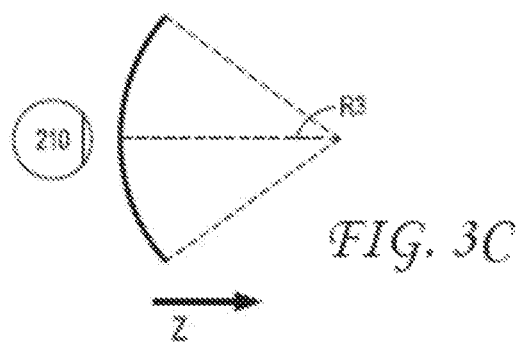

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
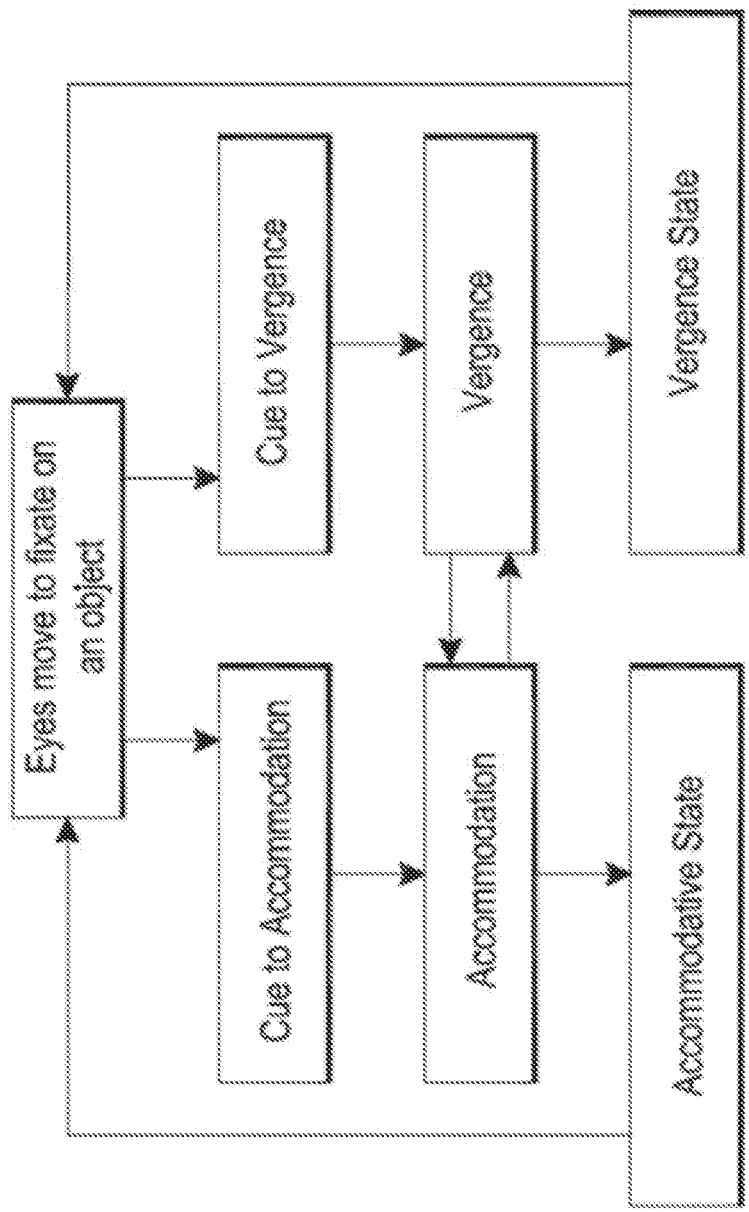
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
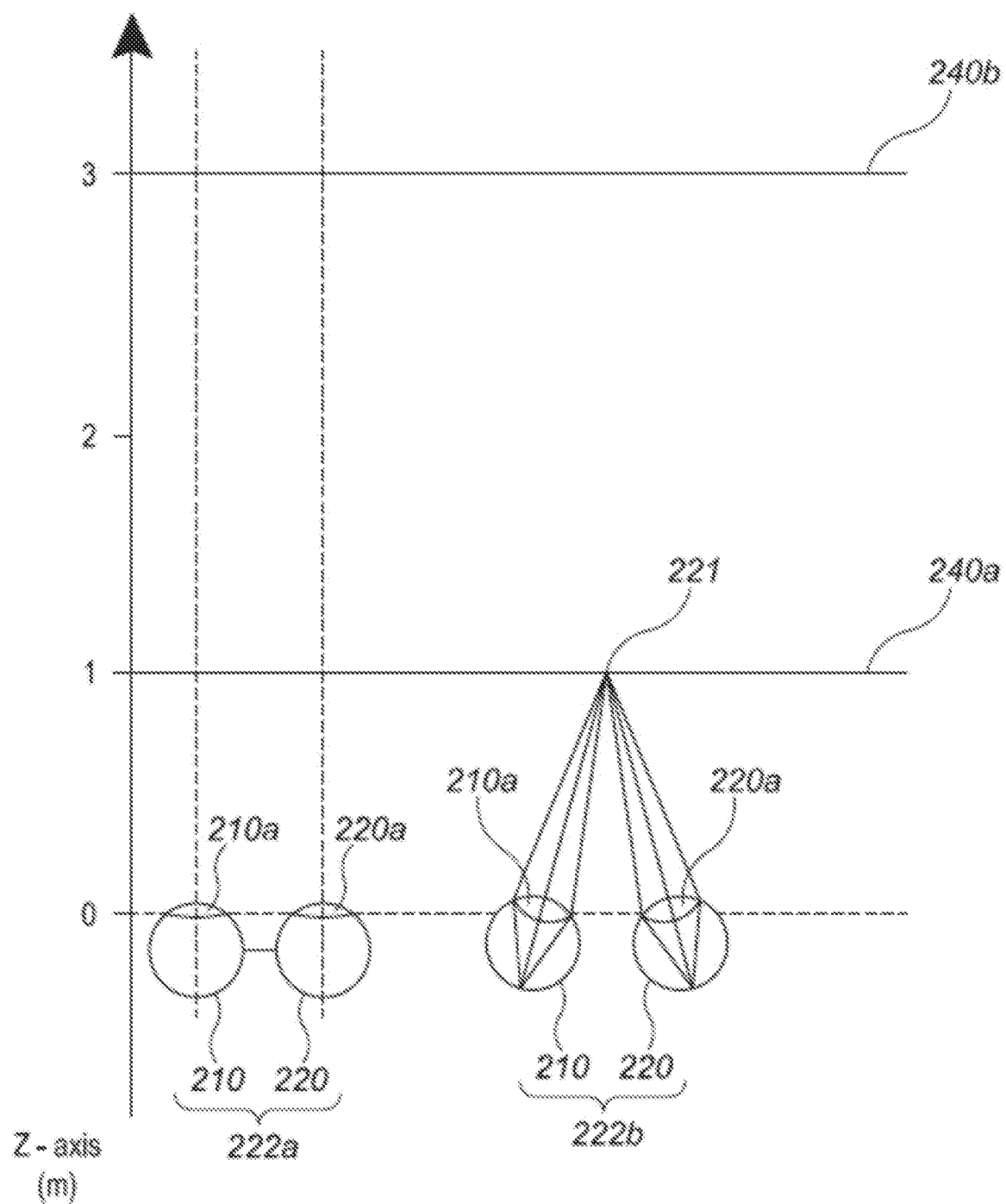
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 212A, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
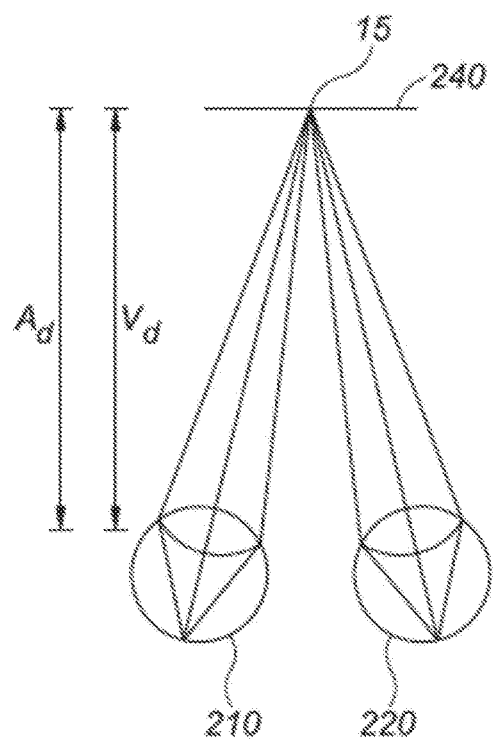
FIG. 4C illustrates an example of a representation of a top-down view of a user viewing content via a display system.
Figure 4D:
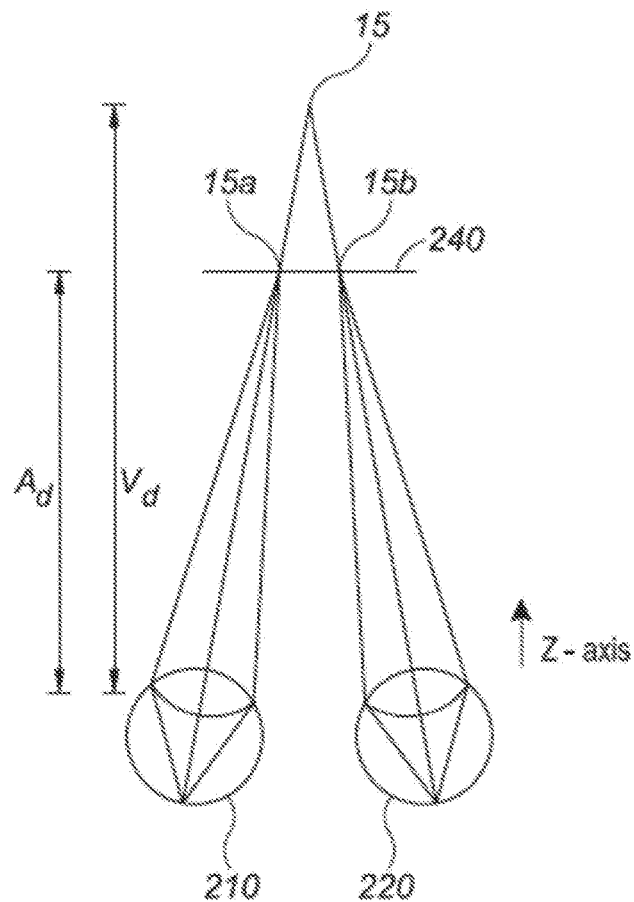
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, Ad. Similarly, there are particular vergence distances, Vd, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., Vd-Ad) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
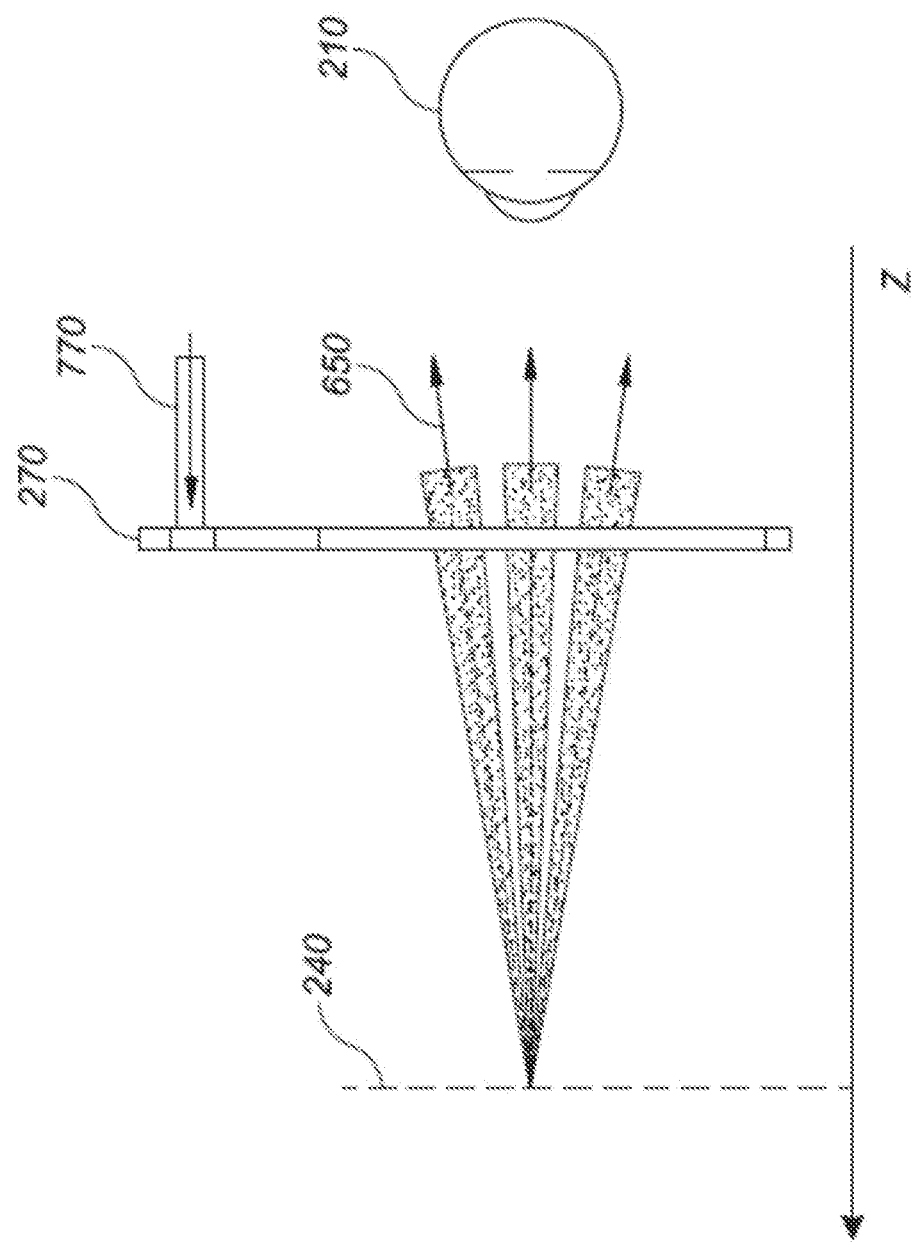
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
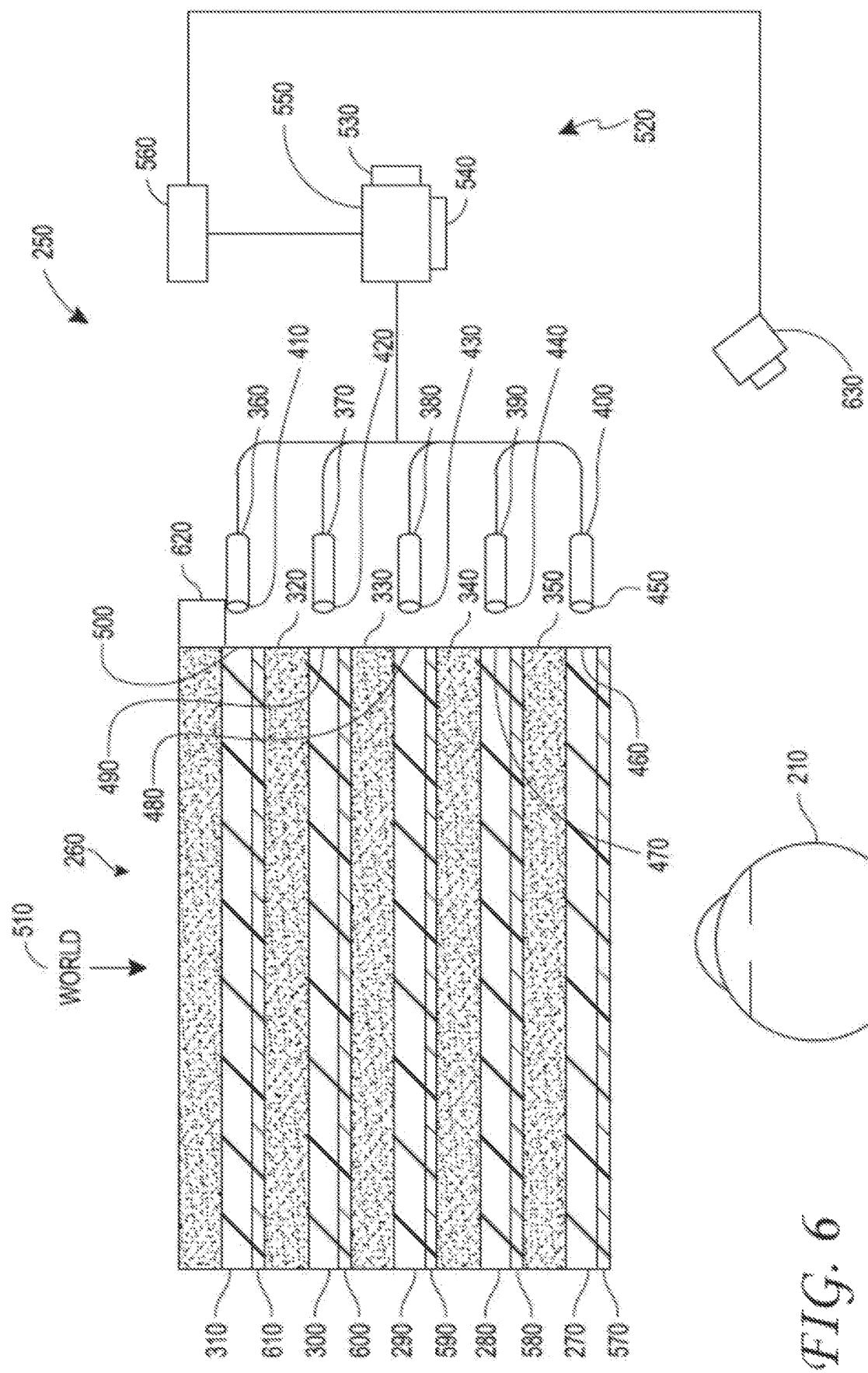
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic, or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
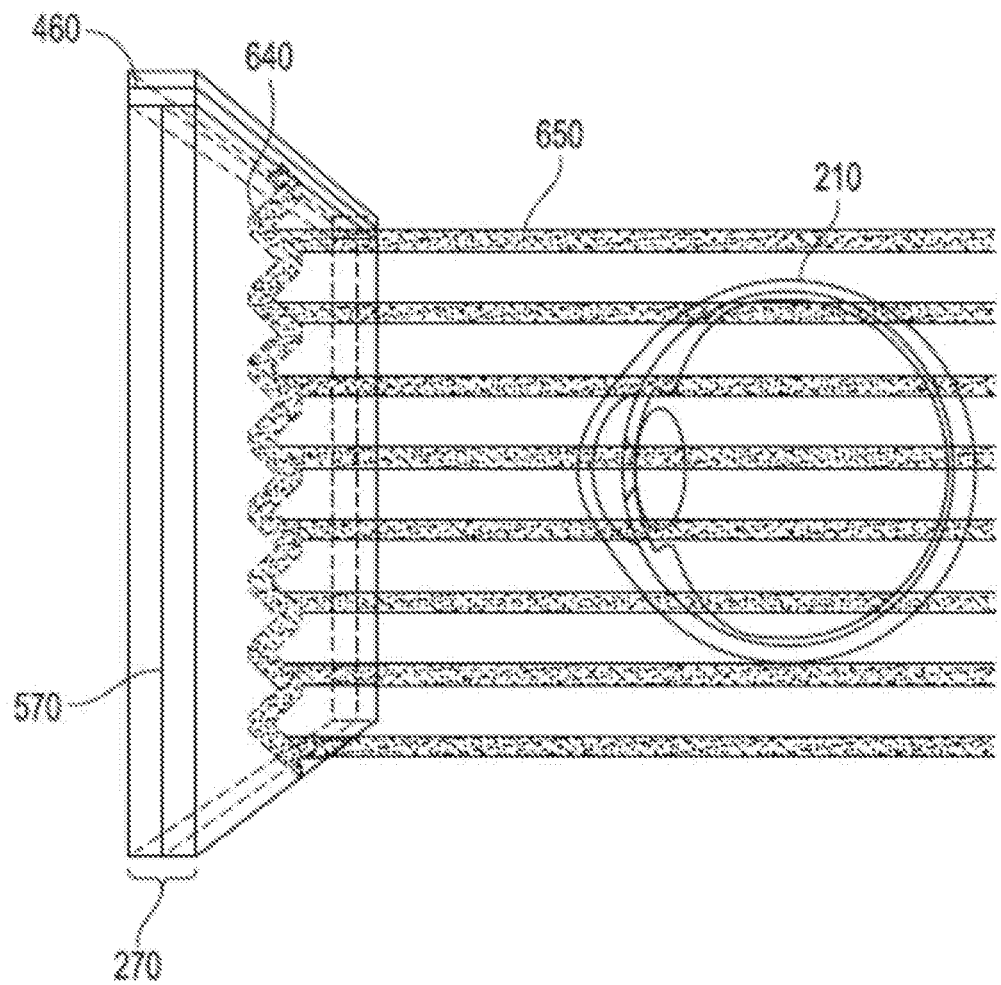
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
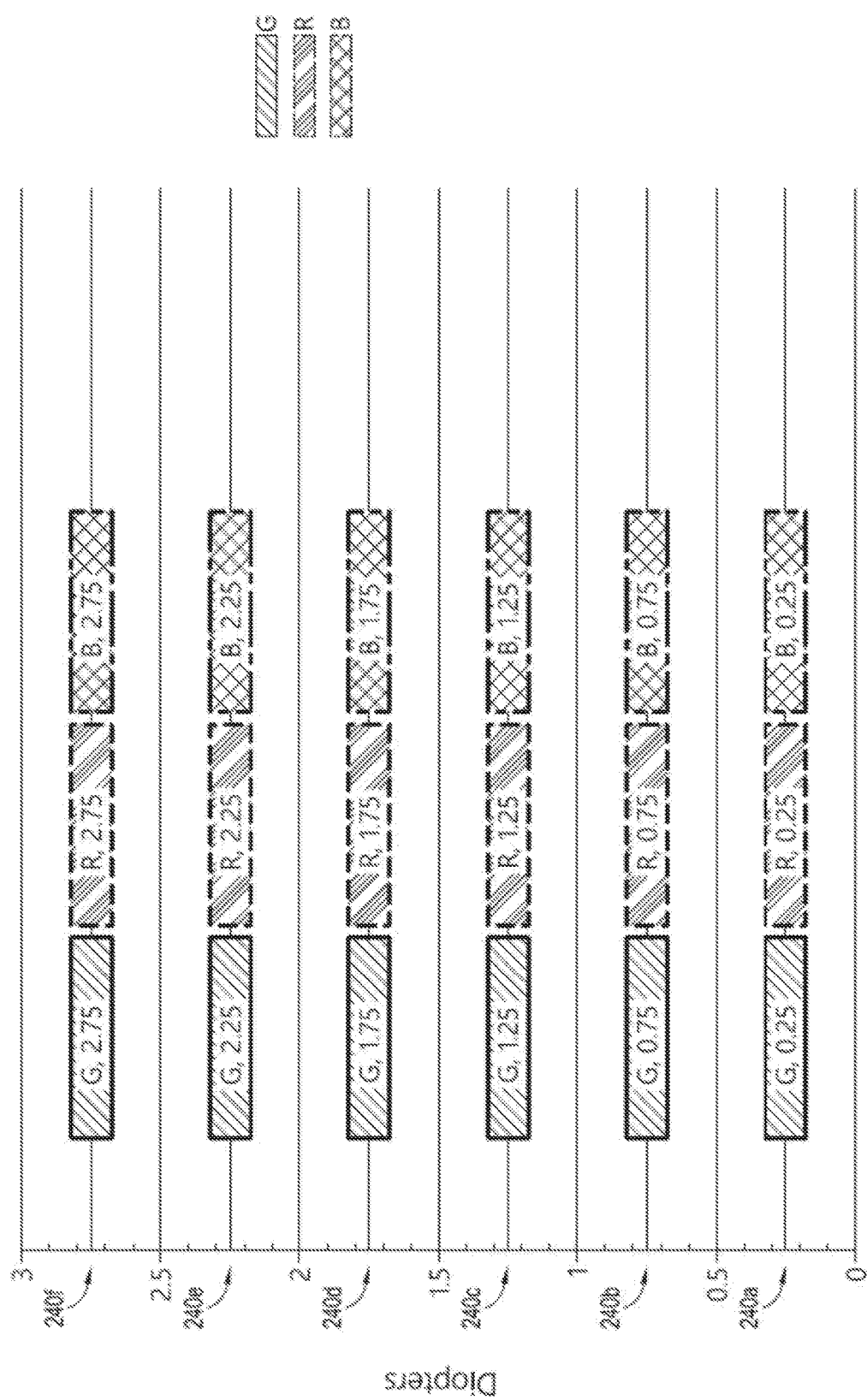
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
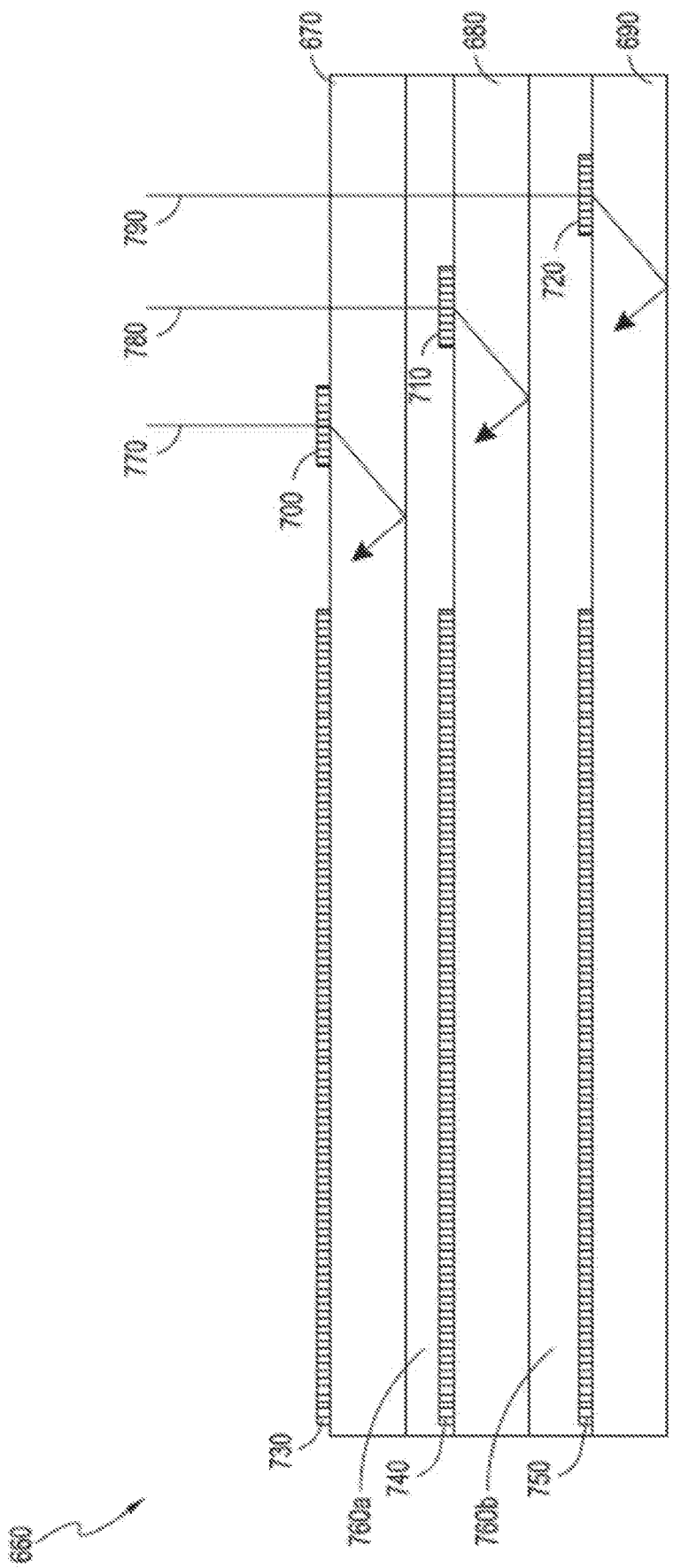
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
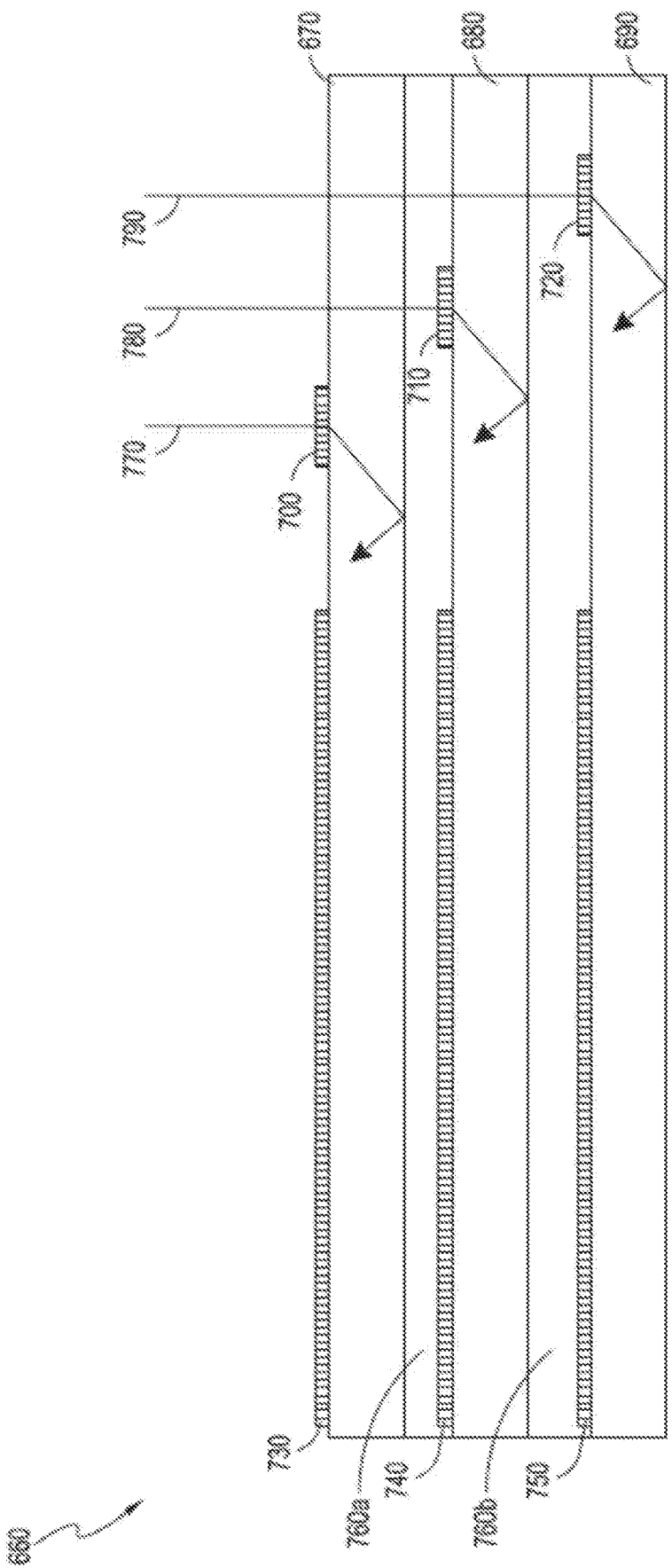
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the incoupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green, and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
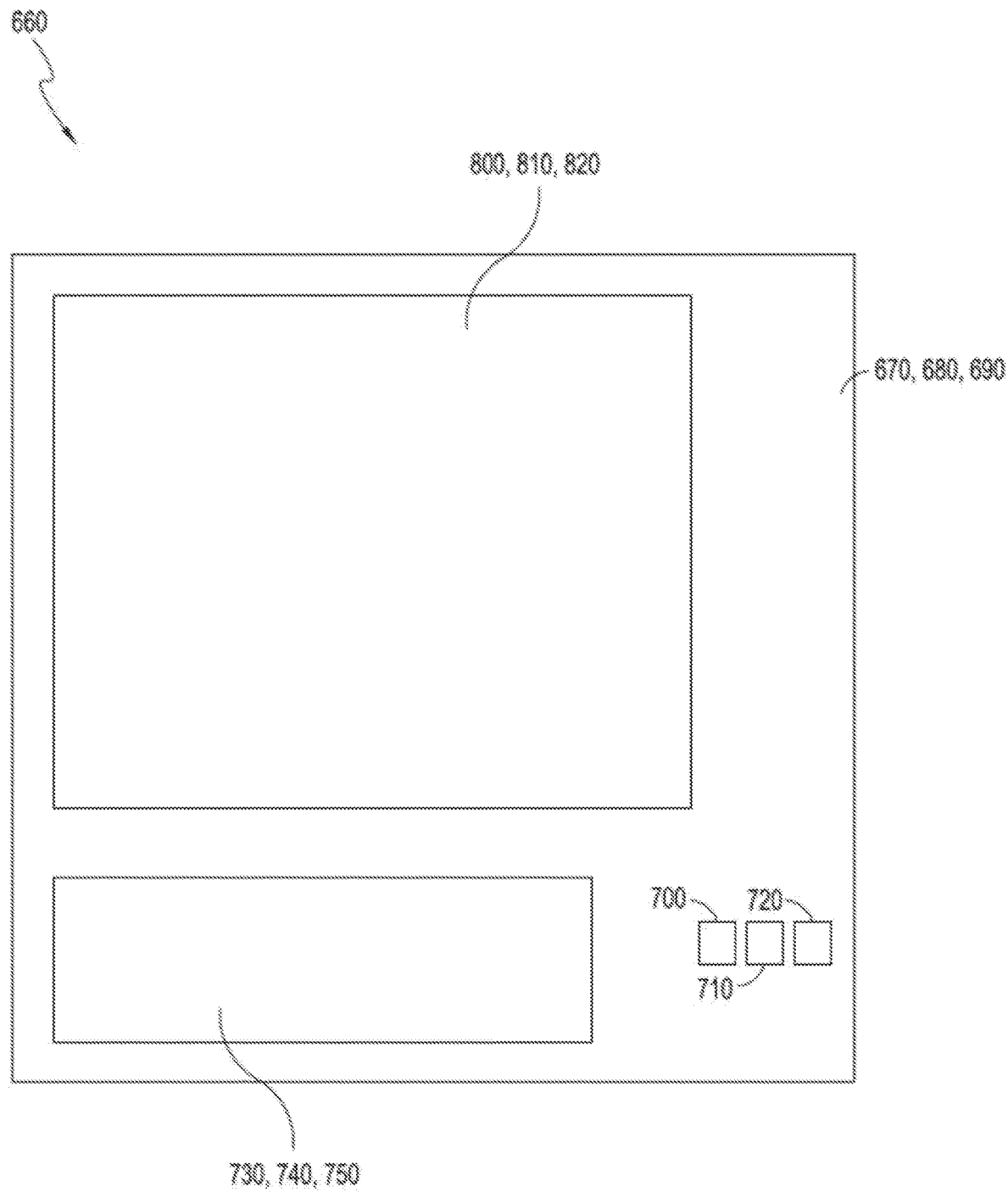
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
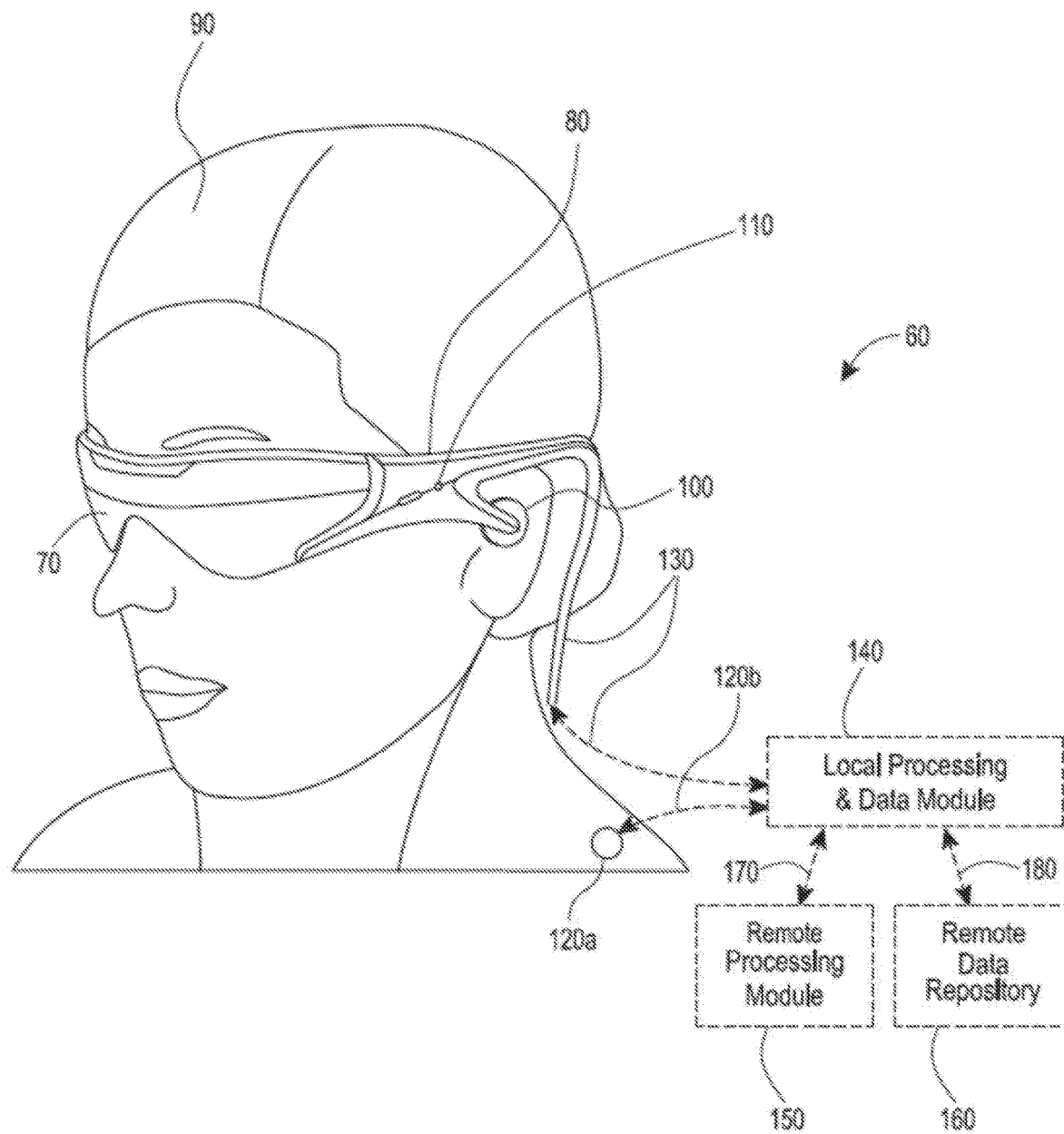
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing, and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

A. DIFFRACTION GRATINGS HAVING REDUCED POLARIZATION SENSITIVITY

Providing a high quality immersive experience to a user of waveguide-based display systems such as various display systems configured for virtual/augmented/mixed display applications described supra, can depend on, among other things, various characteristics of the light coupling into and/or out of the waveguides in the eyepiece of the display systems. For example, a virtual/augmented/mixed display having high light incoupling and outcoupling efficiencies can enhance the viewing experience by increasing brightness of the light directed to the user's eye. As discussed above, in-coupling optical elements such as in-coupling diffraction gratings may be employed to couple light into the waveguides to be guided therein by total internal reflection. Similarly, out-coupling optical elements such as out-coupling diffraction gratings may be employed to couple light guided within the waveguides by total internal reflection out of the waveguides.

As described supra, e.g., in reference to FIGS. 6 and 7, display systems according to various implementations described herein may include optical elements, e.g., in-coupling optical elements, out-coupling optical elements, and light distributing elements, that may include diffraction gratings. For example, as described above in reference to FIG. 7, light 640 that is injected into the waveguide 270 at the input surface 460 of the waveguide 270 propagates and is guided within the waveguide 270 by total internal reflection (TIR). In various implementation, at points where the light 640 impinges on the out-coupling optical element 570, a portion of the light guided within the waveguide may exit the waveguide as beamlets 650. In some implementations, any of the optical elements 570, 580, 590, 600, 610, for example, in FIG. 6, can be configured as a diffraction grating.

To achieve desirable characteristics of in-coupling of light into (or out-coupling of light from) the waveguides 270, 280, 290, 300, 310, the optical elements 570, 580, 590, 600, 610 configured as diffraction gratings can be formed of a suitable material and have a suitable structure for controlling various optical properties, including diffraction properties such as diffraction efficiency as a function of polarization. Possible desirable diffraction properties may include, among other properties, any one or more of the following: spectral selectivity, angular selectivity, polarization selectivity (or non-selectivity), high spectral bandwidth, high diffraction efficiencies or a wide field of view (FOV).

Some diffraction gratings have strong polarization dependence and thus may have relatively diminished overall efficiency (due to the rejection of one polarization). In some cases, such diffraction gratings may also create coherent artifacts and reduce the uniformity of a far field image. For example, a diffraction grating may be formed by imprinted a layer of patternable material and metallizing the patterned layer (e.g., of resist) to form a plurality of diffractive features. Some grating designs formed in this manner may diffract more light into a given diffractive order. Such a diffraction grating may be highly efficient in one polarization (for example, TM or P-Pol), but may be inefficient for non-polarized light.

Figures 10A, 10B:
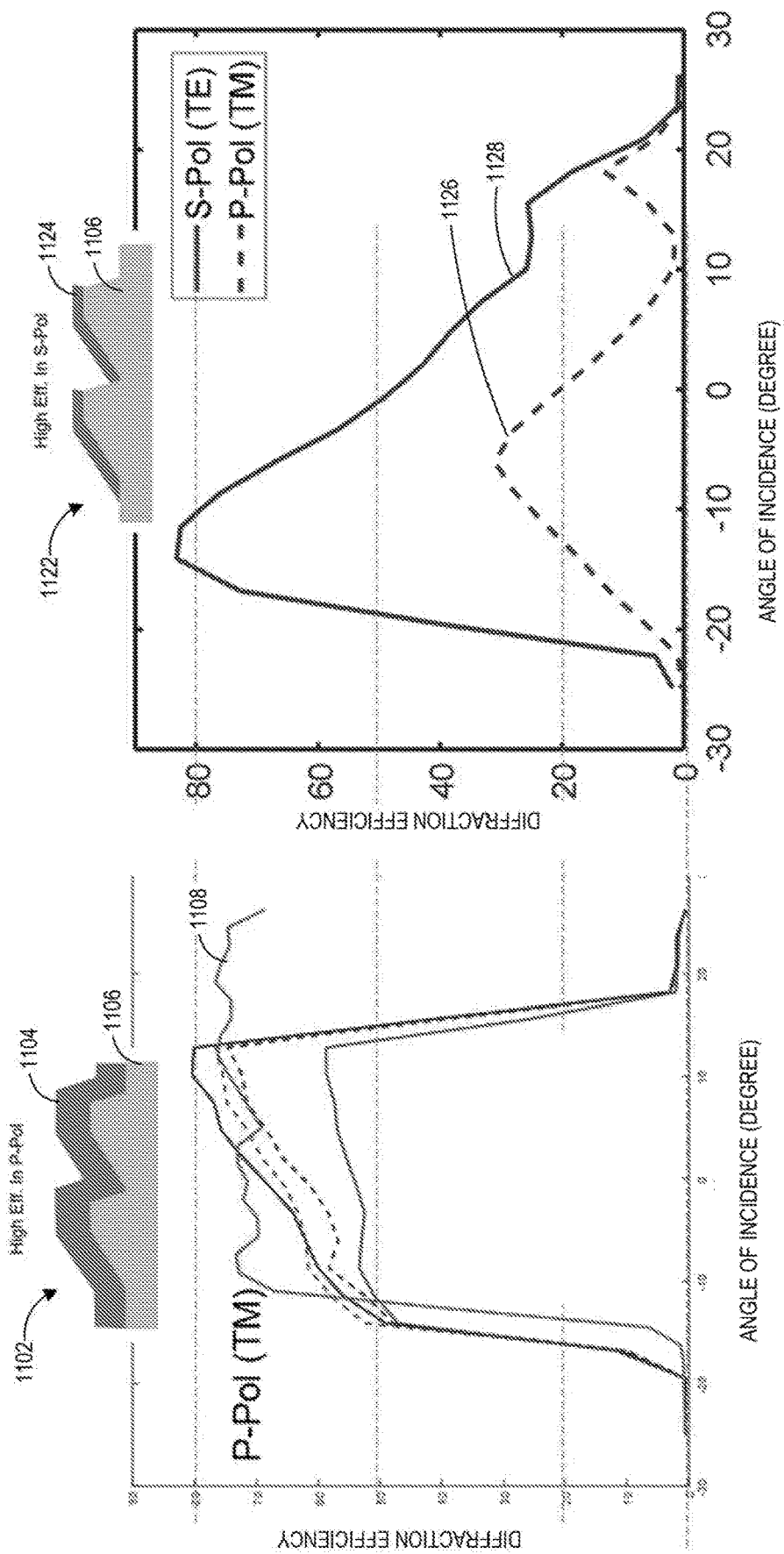
FIGS. 10A and 10B illustrate polarization dependence of two example diffraction gratings.

FIGS. 10A and 10B illustrates polarization dependence of two example diffraction gratings (1102, 1122). For example, FIG. 10A illustrates a diffraction efficiency as a function of the angle of incidence in degrees for a diffraction grating 1102. The diffraction grating 1102 can include a metal coating 1104 deposited onto an in-coupling grating (ICG) pattern 1106 comprising patterned photoresist. The diffraction grating 1102 may be a blazed grating or another grating having asymmetric diffractive features, including but not limited to an asymmetric form with at least one straight sidewall, sloped sidewall, re-entrant (for example, a sidewall with acute re-entrant angle, with respect a base surface) or concave sidewall, multi-step sidewall, other type of sidewall, or some combination thereof. The resulting diffraction efficiency 1108 may be high for P-Pol light (for example, approximately 70% on average over a range of angles of incidence of, for example −20 to 20 degrees). However, the diffraction grating 1102 may not be very efficient for S-Pol light (for example, approximately 20% or 30% on average over a range of angles of incidence of, for example −20 and 20 degrees). Thus, the diffraction grating 1102 may result in an overall lower efficiency for unpolarized light (for example, approximately 40% or 45% on average over a range of angles of incidence of, for example, −20 and 20 degrees). Other efficiency values within and outside the recited ranges of angles of incidence are also possible.

In another example, FIG. 10B illustrates a diffraction efficiency as a function of the angle of incidence in degrees for a different diffraction grating 1122. The diffraction grating 1122 may include a blazed grating or another grating having asymmetric diffractive features, including but not limited to an asymmetric form with at least one straight sidewall, sloped sidewall, re-entrant (for example, a sidewall with acute re-entrant angle, with respect a base surface) or concave sidewall, multi-step sidewall, other type of sidewall, or some combination thereof. The diffraction grating 1122 shown in FIG. 10B may have a non-metallic transmissive coating 1124, such as $ZrO_2$, $TiO_2$, or SiC, deposited onto an ICG pattern 1106 comprising for example, patterned photoresist. The resulting diffraction efficiency 1128 for S-Pol light may be higher than the diffraction efficiency 1126 for P-Pol light. For example, S-Pol light may have an average efficiency 1128 for S-Pol light of 80%, 60%, or 40% over a range of angles of incidence of approximately −20 to 20 degrees. In another example, P-Pol light may have an average efficiency 1126 for P-Pol light of 10%, 15%, or 20% over a range of angles of incidence of approximately −20 to 20 degrees. Other efficiency values within and outside the recited ranges of angles of incidence are also possible.

To provide diffraction gratings that have reduced polarization sensitivity (e.g., that couple light with an efficiency that is relatively independent of polarization), some displays for AR systems according to implementations described herein include a waveguide with diffraction gratings formed therein having multiple coatings. For example, the diffracting gratings can include patterned dielectric (e.g., patterned photoresist) having formed thereon a first transmissive layer possibly a non-metallic (e.g., dielectric or semiconductor) coating and a second layer comprising metal over the first transmissive layer. In some implementations, a coated diffraction grating may achieve enhanced grating diffraction efficiency for a given diffraction order, while the diffraction efficiency for the other orders is reduced or minimized. As a result, more light may be directed into the particular given diffractive order as opposed to any of the other orders in some implementations.

Figures 11A, 11B:
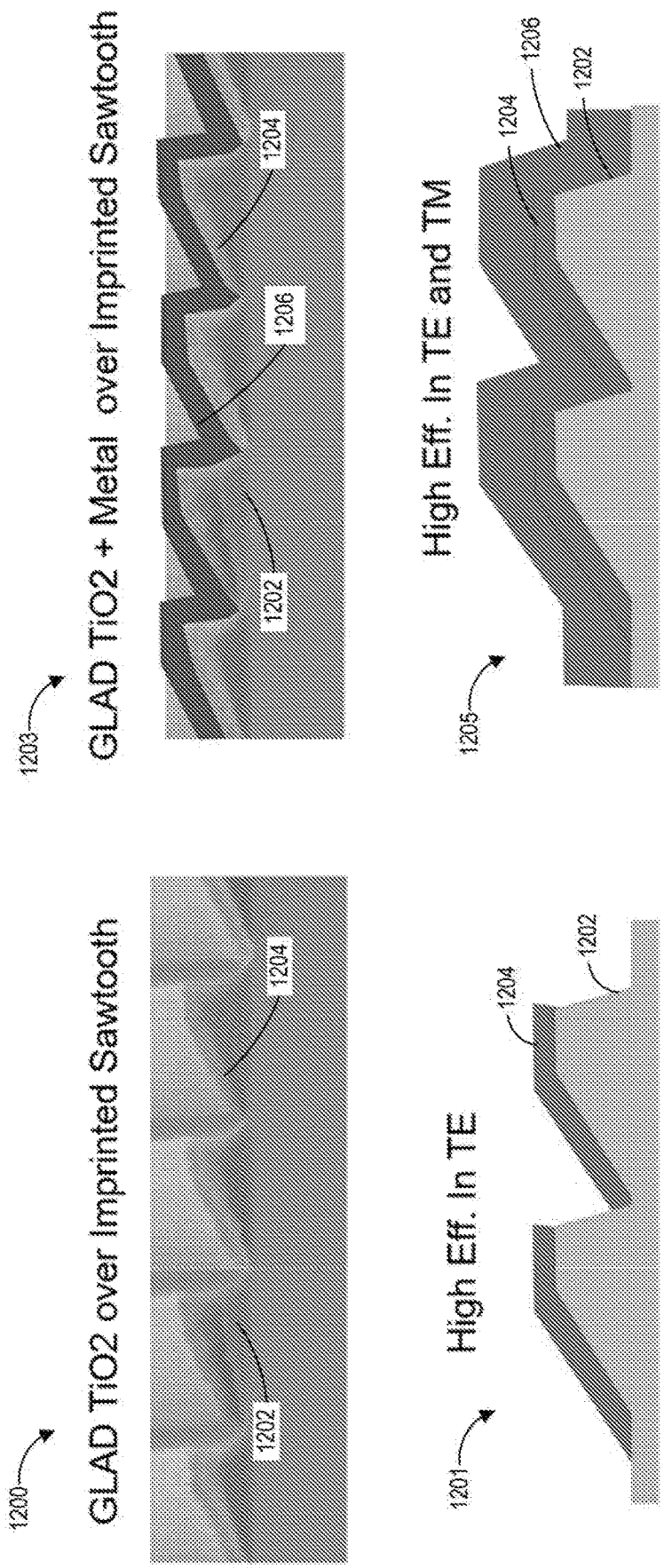
FIG. 11A illustrates views of an example grating with a single coating that may have high efficiency for a single polarization.
FIG. 11B illustrates views of an example grating with multiple coatings that may have high efficiency for more than one polarization.

FIGS. 11A and 11B illustrate views of an example grating with a single coating that may have high efficiency in a single polarization (for example, TE or S-Pol) and an example grating with multiple coatings, such as disclosed herein, with high efficiency in both TE and TM polarized light, respectively.

For example, as illustrated in FIG. 11A, a diffraction grating 1201 can include an ICG pattern 1202 and a transmissive layer 1204. The ICG pattern 1202 can be any suitable grating pattern, such as a sawtooth pattern. These diffractive features may comprises patterned polymer such as patterned resist (e.g., photoresist) and may be formed by imprinting such as nanoimprinting. The transmissive layer 1204 can include a non-metallic material such as a dielectric or semiconductor material, such as $ZrO_2$, $TiO_2$, or SiC. Image 1200 shows an example scanning electron micrograph of a diffraction grating, such as diffraction grating 1201, that may have a sawtooth pattern ICG 1202 having a $TiO_2$ coating 1204. The transmissive layer 1204 (e.g., $TiO_2$ coating) was deposited using glancing angle deposition (GLAD). Accordingly, as illustrated, more of the transmissive layer is on one side of the diffractive features than the other side of the diffractive features. Table 1 shows example efficiencies associated with different types of light, including TE polarized, TM polarized, and un-polarized light incident on the diffraction grating 1201. As shown in Table 1, the grating 1201 has increased efficiency in TE polarized light as compared to TM polarized light and un-polarized light. As discussed above, such polarization dependent efficiency may be undesirable.

TABLE 1

| Polarization | World (output) | User (input) |
| --- | --- | --- |
| TE polarized (S-Pol) | 2.25% | 2.39% |
| TM polarized (P-Pol) | 1.06% | 1.11% |
| Un-Polarized Light | 1.69% | 1.82% |

Example efficiencies for different types (e.g. polarization) of light incident on the diffraction grating 1201 illustrated in FIG. 11A.

As illustrated in FIG. 11B, a diffraction grating 1205 can include an ICG pattern 1202, a transmissive layer 1204 formed thereon, and a metal layer 1206 formed on the transmissive layer. The ICG pattern 1202 can be any suitable grating pattern, such as a blazed grating pattern like the sawtooth pattern shown. These diffractive features may comprise patterned polymer such as patterned resist (e.g., photoresist) and may be formed by imprinting such as nanoimprinting. The transmissive layer 1204 can include a non-metallic material such as dielectrics like $ZrO_2$, or $TiO_2$, or other high n, low k material, such as SiC. The transmissive layer 1204 (e.g., $TiO_2$ coating) was deposited using glancing angle deposition (GLAD). Accordingly, as illustrated, more of the transmissive layer is on one side of the diffractive features than the other side of the diffractive features. The metal layer 1206 can include any suitable metal, such as Al, Ag, or AlSi. This metal layer may be a conformal metal layer. Image 1203 shows an example of how a metal layer 1206 may be disposed over a transmissive layer that is formed over a diffraction grating. Table 2 shows example efficiencies associated with different types of light, including TE polarized, TM polarized, and un-polarized light incident on the diffraction grating 1205.

As shown in Table 2, the grating 1205 illustrated in FIG. 11B has improved efficiency in un-polarized light over the grating 1201 illustrated in FIG. 11A. The grating 1205 illustrated of FIG. 11B produces an efficiency for TE polarized light, TM polarized light, and un-polarized light are similar. Thus, advantageously, the grating 1205 has reduced polarization sensitivity. This polarization insensitivity is accomplished by using both a transmissive non-metallic layer 1204, which improves the TE diffraction efficiency, and a metal layer 1206, which improves the TM diffraction efficiency. By providing a first layer on the ICG pattern 1202 that improves the efficiency of TE polarized light and a second layer that improves the efficiency of TM polarized light, the effects of both layers can help reduce the polarization sensitivity of the grating 1205. In some implementations, increased uniformity as well as a brighter image may thereby be achieved.

TABLE 2

| Polarization | World (output) | User (input) |
| --- | --- | --- |
| TE polarized (S-Pol) | 2.62% | 3.03% |
| TM polarized (P-Pol) | 2.60% | 2.95% |
| Un-Polarized Light | 2.43% | 3.01% |

Example efficiencies for different types (e.g. polarization) of light incident on the diffraction grating 1205 illustrated in FIG. 11B.

1. Example Grating Patterns

Figure 12A:
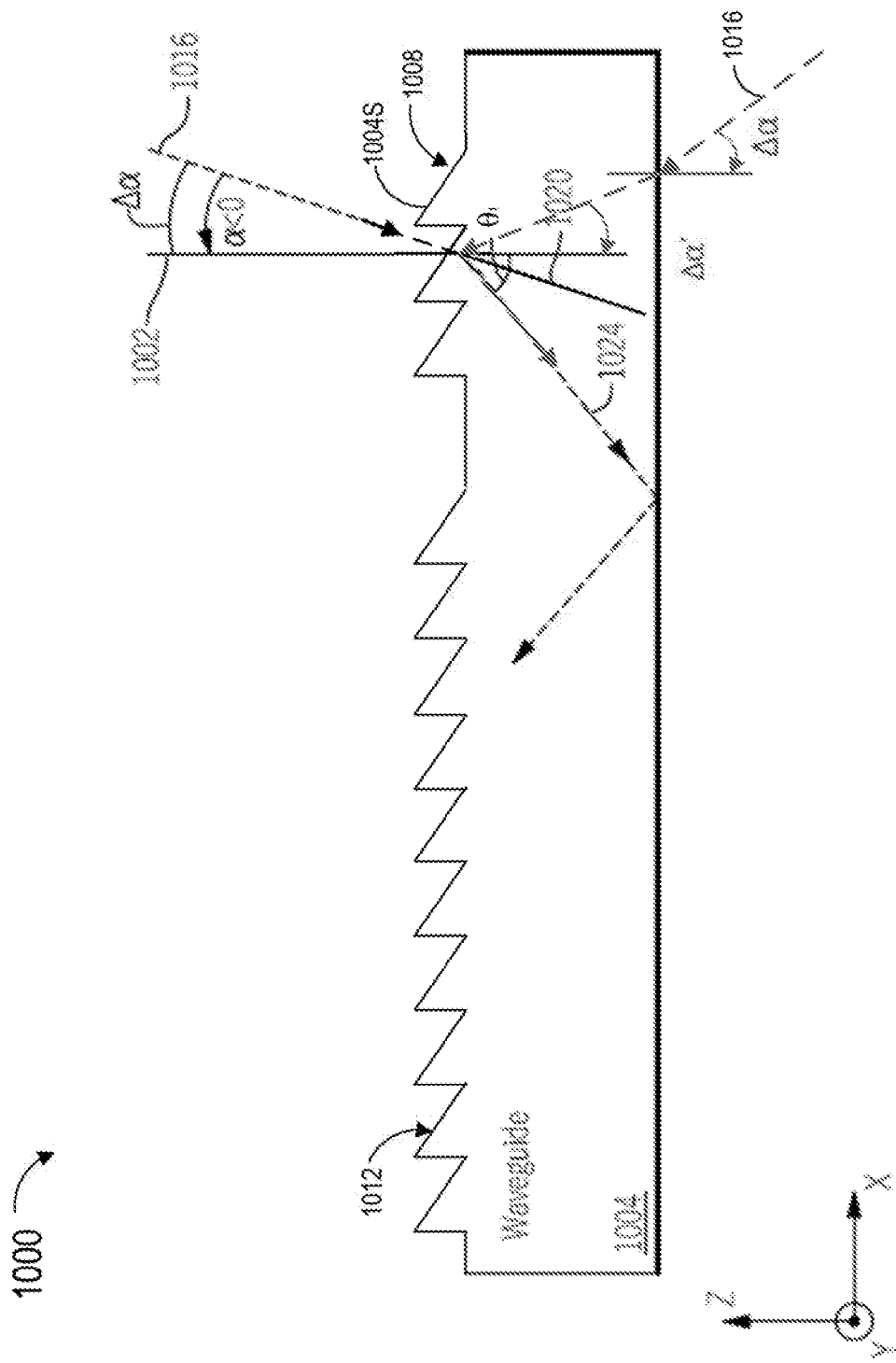
FIG. 12A schematically illustrates a cross-sectional view of a portion of a waveguide having disposed thereon a diffraction grating, for example, for in-coupling light into the waveguide.
Figure 12B:
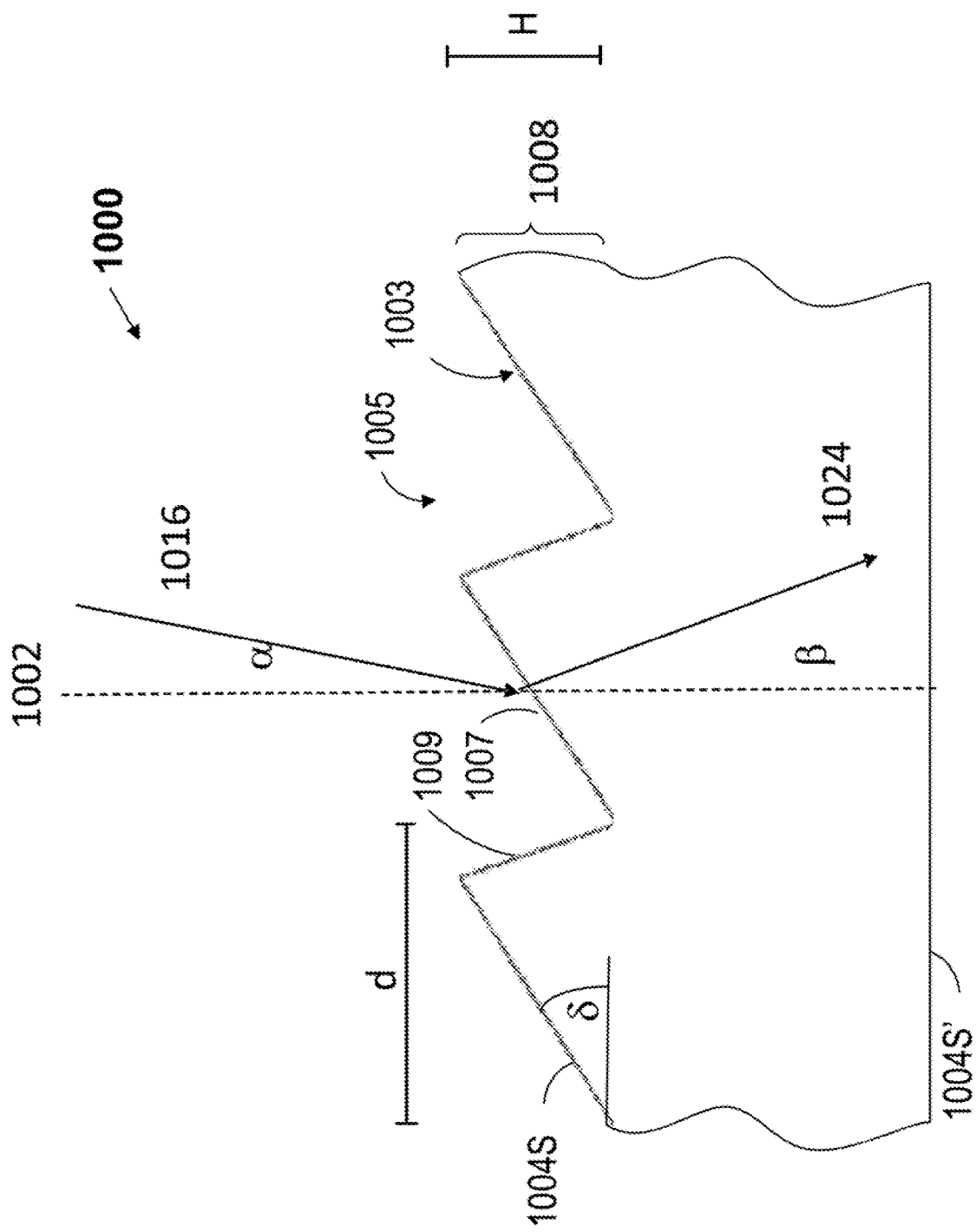
FIG. 12B illustrates a cross-sectional view of a waveguide having disposed thereon a blazed diffraction grating showing a field-of-view (FOV) of the waveguide, $\Delta\alpha$.

FIGS. 12A and 12B illustrate an example cross-sectional view of a portion of a diffraction grating 1008 formed on a substrate that is a waveguide 1004. In the implementation shown, the blazed diffraction grating 1008 is formed in the substrate/waveguide 1004 (which, in this example, is planar). The surface of the substrate or waveguide 1004 has a surface topography comprising diffractive features that together form the diffraction grating 1008. The blazed diffraction grating 1008 is configured to diffract light having a wavelength in the visible spectrum such that the light incident thereon is guided within the waveguide 1004 by TIR. The waveguide 1004 may be transparent and may form part of an eyepiece through which a user's can see. Such a waveguide 1004 and eyepiece may be included in a head mounted display such as an augmented reality display. The waveguide 1004 can correspond, for example, to one of waveguides 670, 680, 690 described above with respect to FIGS. 9A-9C, for example. The blazed diffraction grating 1008 can correspond to one of the in-coupling optical elements 700, 710, 720 described above with respect to FIGS. 9A-9C, for example. The blazed diffraction grating 1008 configured to in-couple light into the waveguide 1004 may be referred to herein as an in-coupling grating (ICG). The display device 1000 may additionally include an optical element 1012, that can correspond, for example, to a light distributing element (e.g., one of the light distributing elements 730, 740, 750 shown in FIGS. 9A-9C), or an out-coupling optical element (e.g., one of the out-coupling optical elements 800, 810, 820 shown in FIGS. 9A-9C).

In operation, when an incident light beam 1016, e.g., visible light, such as from a light projection system that provide image content is incident on the blazed diffraction grating 1008 at an angle of incidence, a, measured relative to a plane normal 1002 that is normal or orthogonal to the extended surface or plane of the blazed diffraction grating or the substrate/waveguide and/or the surface 1004S of the waveguide 1004, for example, major surface of the waveguide on which the grating is formed (shown in FIG. 12A as extending parallel to the y-x plane), the blazed diffraction grating at least partially diffracts the incident light beam 1016 as a diffracted light beam 1024 at a diffraction angle θ measured relative to the plane normal 1002. When the diffracted light beam 1024 is diffracted at a diffraction angle θ that exceeds a critical angle $\theta_{TIR}$ for occurrence of total internal reflection in the waveguide 1004, the diffracted light beam 1024 propagates and is guided within the waveguide 1004 via total internal reflection (TIR) generally along a direction parallel to the x-axis and along the length of the waveguide. A portion of this light guided within the waveguide 1004 may reach one of light distributing elements 730, 740, 750 or one of out-coupling optical elements (800, 810, 820, FIGS. 9A-9C), for example, and be diffracted again.

As described herein, a light beam that is incident at an angle in a clockwise direction relative to the plane normal 1002 (i.e., on the right side of the plane normal 1002) as in the illustrated implementation is referred to as having a negative α (α<0), whereas a light beam that is incident at an angle in a counter-clockwise direction relative to the plane normal 1012 (i.e., on the left side of the plane normal) is referred to as having a positive α (α>0).

A suitable combination of high index material and/or the structure of the diffraction grating 1008 may result in a particular range (Δα) of angle of incidence α, referred to herein as a range of angles of acceptance or a field-of-view (FOV). One range, Δα, may be described by a range of angles spanning negative and/or positive values of α, outside of which the diffraction efficiency falls off by more than 10%, 25%, more than 50%, or more than 75%, 80%, 90%, 95%, or any ranges between any of these values, relative to the diffraction efficiency at α=0 or some other direction. In some implementations, having Δα within the range in which the diffraction efficiency is relatively high and constant may be desirable, e.g., where a uniform intensity of diffracted light is desired within the Δα. Thus, in some implementations, Δα is associated with the angular bandwidth of the diffraction grating 1008, such that an incident light beam 1016 within the Δα is efficiently diffracted by the diffraction grating 1008 at a diffraction angle θ with respect to the surface normal 1002 (e.g., a direction parallel to the y-z plane) wherein θ exceeds $\theta_{TIR}$ such that the diffracted light is guided within the waveguide 1004 under total internal reflection (TIR). In some implementations, this angle Δα range may affect the field-of-view seen by the user. Note, that in various implementations, the light can be directed onto the in-coupling grating (ICG) from either side. For example, the light can be directed through the substrate or waveguide 1004 incident onto a reflective in-coupling grating (ICG) 1008 such as the one shown in FIG. 12A. The light may undergo the same effect, e.g., be coupled into the substrate or waveguide 1004 by the in-coupling grating 1008 such that the light is guided within substrate or waveguide by total internal reflection. The range (Δα) of angle of incidence α, referred to herein as a range of angles of acceptance or a field-of-view (FOV) may be affected by the index of refraction of the substrate or waveguide material. In FIG. 12A, for example, a reduced range of angles (Δα'), shows the effects of refraction of the high index material on the light incident on the in-coupling grating (ICG). The range of angles (Δα) or FOV, however, is larger.

FIG. 12B illustrates a cross-sectional view of an example blazed diffraction grating 1008. The grating 1008 comprised grating features having peaks 1003 and grooves 1005. The blazed transmission grating 1008 comprises a surface corresponding to the surface of the substrate or waveguide 1004S having a "sawtooth" shape pattern as viewed from the cross-section shown. The "sawtooth" patterned is formed by first sloping portions 1007 of the surface 1004S. In the example shown in FIG. 12B, the grating 1008 also includes second (steeper) sloping portions 1009. In the example shown, the first sloping portions 1007 have a shallower inclination than the second sloping portions 1009, which have a steeper inclination. The first sloping portions 1007 also are wider than the second sloping portions 1009 in this example.

The peaks 1003 have heights, H, corresponding to the distance from the bottom of the groove 1005 to the top of the peak 1003. Accordingly, this value may be referred to herein as the peak height and/or groove depth as well as grating height or grating depth or as the height of the diffractive features of the diffraction grating. In the example shown in FIG. 12B, the bottom of the groove 1005 is formed by an intersection of the first and second sloping portions 1007, 1009 of two adjacent peaks 1003. The first sloping portion 1007 is on one of the adjacent peaks 1003 and the second sloping portion 1009 is on the other adjacent peak. Similarly, the top of the peak 1003 is formed by an intersection of the first and second sloping portions 1007, 1009 at the top of the peak 1003. Other configurations, however, are possible. For example, the first and second sloping portions may not necessarily intersect, for example, if the bottom of the groove 1005 has a flat base or if the top of the peak 1003 includes a flat plateau as will be discussed below. The blazed diffraction grating 1008 has a line spacing or pitch, d, which may be constant in some implementations. This line spacing or pitch, d, may be a measure, for example, of the separation of the apex's of the peaks 1003 in grating 1008 having a similar shape as that shown in FIG. 12B. Similarly, the line spacing or pitch, d, may be a measure of the separation of the deepest location of adjacent grooves 1005. The line spacing or pitch, d, may be measured from other positions on the grating features.

The slopes can be tilted at an angle, δ, with respect to a plane parallel to the surface of the grating 1008 or waveguide (e.g., the surface 1004S of the waveguide, which may extend beyond the grating or the surface 1004S' of the waveguide opposite the grating of FIG. 12A). This angle, δ, of the first (shallower) sloping portion 1007 may be referred to herein as the blaze angle.

As illustrated in FIG. 12B, the blazed diffraction grating 1008 can include grating lines or features that have asymmetric shape, for example, that comprise asymmetrically shaped peaks 1003 and/or grooves 1005. For example, in the diffraction grating shown in FIG. 12B the diffraction features comprises peaks 1003 and/or grooves 1005 having an asymmetrical triangular cross-sectional shape. As discussed above, this asymmetric shape results in the different inclinations and/or widths of the first and second sloping portions 1007, 1009. Other shapes, however, are possible.

In designs where the diffraction features are asymmetric, for example, where the inclination of the first sloping portion is shallower while the slope of the second sloping portion is steeper, the diffraction features may be considered to be formed from repeating slopes and steps. Such structures may be referred to herein as a tilted step structure. In some implementations, the second portion may be so steep as to not slope; for example, the second portion may be parallel to the normal 1002.

In other implementations, the "sawtooth" pattern, for example, the peaks 1003 and/or grooves 1005 may be symmetric. For example, the first and second sloping portions 1007, 1009 may have the same inclination and be the same width.

The cross-section pattern shown in FIG. 12B may be referred to herein as a single-step geometry, in comparison to a multi-step structure, which is discussed below. A multi-step structure, for example, is shown in FIG. 11D.

Regardless of whether the diffraction features are asymmetric or symmetric, in some implementations, a plateau or flat portion may be located at the top of the peak 1003 as will be discussed below. Diffraction gratings 1008 comprising diffraction features having plateaus or flat portions on top of the peaks 1003 are shown, for example, in FIGS. 10B and 11D.

FIG. 12B shows an incident light beam 1016 incident on the grating 1008 at an angle α with respect to the normal direction 1002. (As discussed above with regard to FIG. 12A, the light can pass through the substrate or waveguide 1004 and be incident on the diffraction grating 1008 from the other side in other examples) As discussed above, the normal 1002 is normal or orthogonal to the extended surface of the blazed diffraction grating 1008 or the plane of the grating or waveguide and/or the surface 1004S of the waveguide 1004, for example, major surface of the waveguide on which the grating is formed or the opposite planar surface 1004S'. In FIG. 12B, the light 1016 incident on the diffraction grating 1008 is shown as diffracted at an angle β with respect to the normal direction 1002.

According to various embodiments, when configured as an in-coupling optical element or an in-coupling diffraction grating, the diffraction grating 1008 can diffractively couple light incident into the substrate 1004, which can be a waveguide as described above. The diffraction grating 1008 may, if desired, be configured as an out-coupling optical element and, in such embodiments, can diffractively couple light from the substrate 1004, which can be a waveguide also as described above.

Referring to FIGS. 12A and 12B, in some implementations, the substrate 1004 comprises polymer. For example, the polymer can include polymerizable compositions of one or more materials, such as high viscosity multifunctional component, a low viscosity mono or multifunctional component, a photoinitiator, a light stabilizer, an antioxidant, a surface active agent, an inorganic nanoparticle or molecular level cluster, any combination of these or may comprise other material. The substrate may comprise polymer and have low refractive index (e.g., 1.6 or less) or have high refractive index (e.g., greater than 1.6). The substrate 1004 may, for example, comprise an organic polymer composed of low index (for example, less than 1.6) or high index organic resins (for example, greater than 1.6). Low index organic polymers may have indices from 1.5~1.6 such as PC, PMMA, PVA, etc. or acrylate containing resin which can be cross-linked upon UV and/or Heat curing. Some high index organic polymers can have Sulphur and/or aromatic groups into the acrylate crosslinking molecule.

The polymer may be patterned, for example, etched, to fabricate the grating structures. Diffractive features of a diffraction grating 1008, 1010 such as lines are formed in the substrate 1004 such as in the surface of the substrate. The diffractive features, for example, may be etched into the substrate 1004 comprising polymer on one or both sides of the substrate. The substrate may, for example, comprise polymer and the diffractive grating may be formed in the polymer substrate by etching or patterning the surface of the substrate.

Accordingly, in some implementations, the substrate and/or the waveguide may comprise a material having an index of 1.4-2.7, depending, for example on the material. For example, the substrate may be an inorganic material, such as SiO2, LiNbO3, LiTaO3, SiC, or other inorganic material or a glass substrate with but not limited to the following materials: SiO2, TiO2, B2O3, Li2O, La2O3, ZrO2, ZnO, Si3N4, or other glass material. The substrate may thus have different refractive indices depending on the design. In some implementations, the substrate comprises polymer, which may have low refractive index (e.g., 1.6 or less) or have high refractive index (e.g., greater than 1.6). For example, the substrate and/or waveguide may comprise an organic polymer, such as a low index (such as less than 1.6 index) or high index organic resin (more than 1.6 index). Low index organic polymers may, for example, be used that have indices from 1.5~1.6 such as PC, PMMA, PVA, etc. or acrylate containing resin, which can be cross-linked upon UV and/or Heat curing may be employed. Some example high index organic polymers can have Sulphur and/or aromatic groups in the acrylate crosslinking molecule.

Accordingly, as described above, in various implementations described herein, the diffraction gratings 1008 and the substrate 1004 or waveguide both comprise the same material, e.g., polymer. In some implementations, the diffraction gratings 1008 are patterned directly into the substrate 1004, such that the diffraction gratings 1008 and the substrate 1004 form a single piece or a monolithic structure. For example, the substrate 1004 may comprise a waveguide having the diffraction grating 1008 formed directly in the surface of the waveguide or substrate. In these implementations, a bulk polymer material may be patterned at the surface 1004S to form the diffraction gratings 1008, while the polymer material below the diffraction gratings 1008 may form a waveguide. Other materials may be used as the substrate as discussed above and may be patterned to form diffractive features therein. First and second layers of material, such as a first layer that increases the diffraction efficiency for a first polarization and a second layer that increases the diffraction efficiency of a second polarization different than the first polarization may be deposited over the diffraction grating (e.g., over the diffractive features). As discussed above, the first layer may comprise an optically transmissive or transparent material and may comprise, in some implementations, a non-metallic material such as a dielectric or a semiconductor. The second layer may comprise metal. The combination of such layers may increase the diffraction efficiency for both the first and second polarizations and thus increase the diffraction efficiency for unpolarized light.

In some other implementations, however, diffractive features, such as lines, that form a diffraction grating 1008, 1010 may comprise a material different from that of the substrate. The bulk or substrate 1004 and the surface 1004S patterned to form the diffraction gratings 1008 may thus comprise different material. For example, a polymer may be patterned at the surface region to form the diffraction gratings 1008, while the higher index material may be below the diffraction gratings 1008 that form the substrate 1004. In some implementations, the patternable material from which the base pattern is formed comprises a polymer having a refractive index in the range from 1.4 to 1.95. In some implementations, the substrate comprises high index material having an index of refraction of at least 1.9. The index of refraction, for example, can be at least 2.0, at least 2.1, at least 2.2, or at least 2.3 and may be no more than 2.4, 2.5, 2.6, 2.7, 2.8, or may be in any range formed by any of these values or may be outside these ranges. In some implementations, for example, the substrate comprises Li-based oxide, such as lithium niobate. Other materials having high refractive index may also be used. The substrate may, for example, comprise silicon carbide (SiC) in some implementations. The substrate may, for example, comprise crystalline, cryptocrystalline, or amorphous substrates possibly containing, for example, Ti, Z, Hf, La, Ba, Ca, Si, or $O_2$. The substrate may, for example, comprise high index material such as Li-based oxide (e.g., lithium niobate, $LiNbO_3$), while the diffractive features may be formed from a different material such as polymer formed on the high index substrate. In some implementations, this other material formed on the substrate may have a lower index of refraction, e.g., than the substrate.

First and second layers of material, such as a first layer that increases the diffraction efficiency for a first polarization and a second layer that increases the diffraction efficiency of a second polarization different than the first polarization may be deposited over the diffraction grating. As discussed above, the first layer may comprise an optically transmissive or transparent material and may comprises a non-metallic material such as a dielectric or a semiconductor. The second layer may comprise metal. The combination of such layers may increase the diffraction efficiency for both the first and second polarizations and thus increase the diffraction efficiency for unpolarized light.

Referring to FIGS. 12A and 12B, according to various embodiments, the diffraction gratings 1008 may have various dimensions. For example, the diffractive features of the diffraction gratings 1008 may have a height (H) of 10 nm to 150 nm, 100 nm to 200 nm, 150 nm to 300 nm, or 300 nm to 500 nm or a height in a range defined by any of these values (e.g., from 100 nm to 600), according to the design. This height may correspond to the height of the peaks 1003 and/or the depth of the grooves 1005 or of the regions (e.g., gaps) between peaks in some implementations. Other heights, however, might be possible.

The diffraction gratings 1008 may have a pitch of 200 nm to 300 nm, or 300 nm to 400 nm, 400 nm to 550 nm, or a pitch in any range defined by any of these values, according to various embodiments. Other pitches are also possible.

The diffraction gratings 1008 may have blaze angles of about 20 to 70 degrees (shallow size) or 20 to 85 degrees and anti-blaze angles (steep side) of 70 to 150 degrees or any value in a range defined by these values, measured in the same angular direction.

Values outside these any of these ranges are also possible.

Figure 13A:
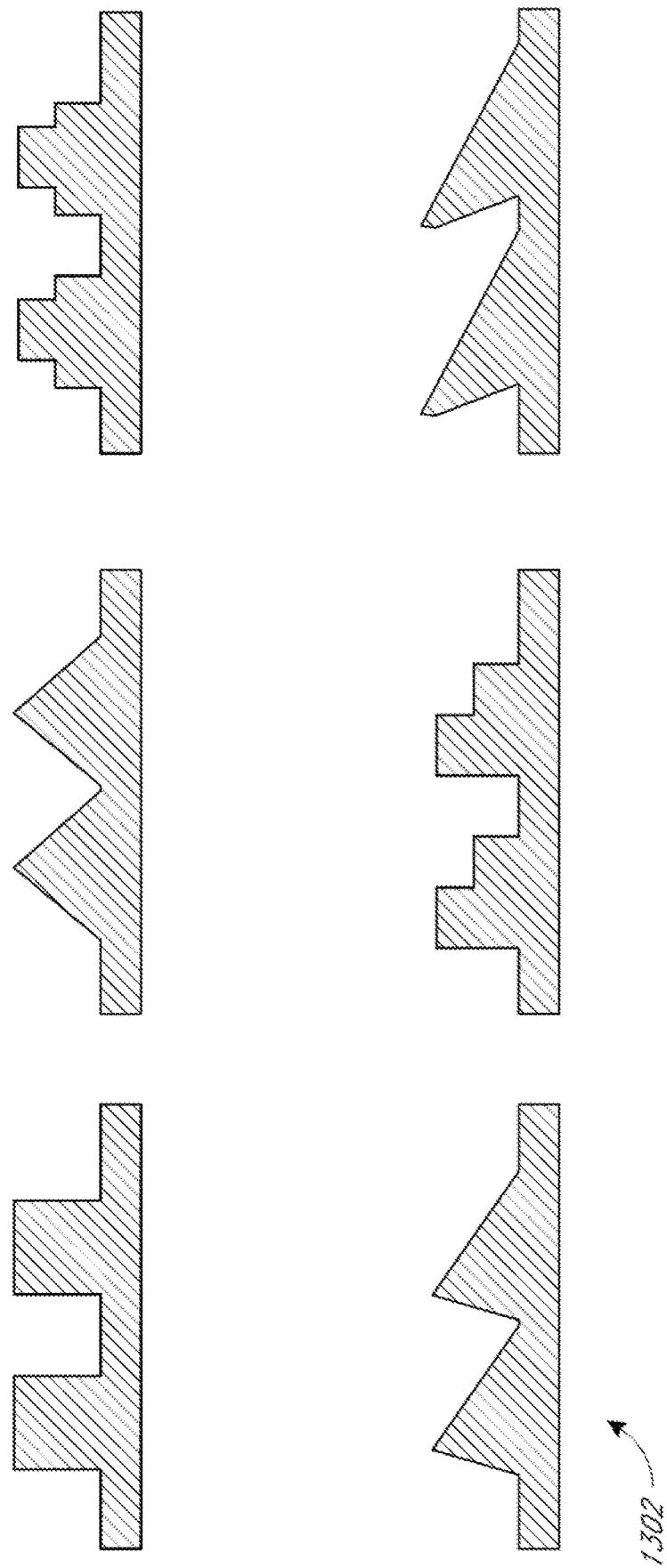
FIG. 13A illustrates different example geometries for diffractive features that may be used to form diffraction gratings.

FIG. 13A illustrates example geometric forms 1302 for diffractive features in diffraction gratings 1008 such as described above with reference to FIGS. 12A and 12B. For example, the geometric form can be symmetric with straight sidewalls (e.g., upper row, first column of FIG. 13A), sloped sidewalls (e.g., upper row, second column, an example of sawtooth), re-entrant or concave sidewalls, multi-step sidewalls (e.g., first row, third column), other type of sidewalls, or some combination thereof. In another example, the geometric form can be asymmetric with at least one straight sidewall, sloped sidewall (e.g., second row, first and third columns of FIG. 13A, re-entrant (for example, a sidewall with acute re-entrant angle, with respect a base surface such as shown in the second row, third column also referred to as shark fin) or concave sidewall, multi-step sidewall (e.g., second row, second column), other type of sidewall, or some combination thereof. Regardless of whether the diffraction features are asymmetric or symmetric, in some implementations, a plateau or flat portion may be located at the top of the features (e.g. at the peak).

Figure 14:
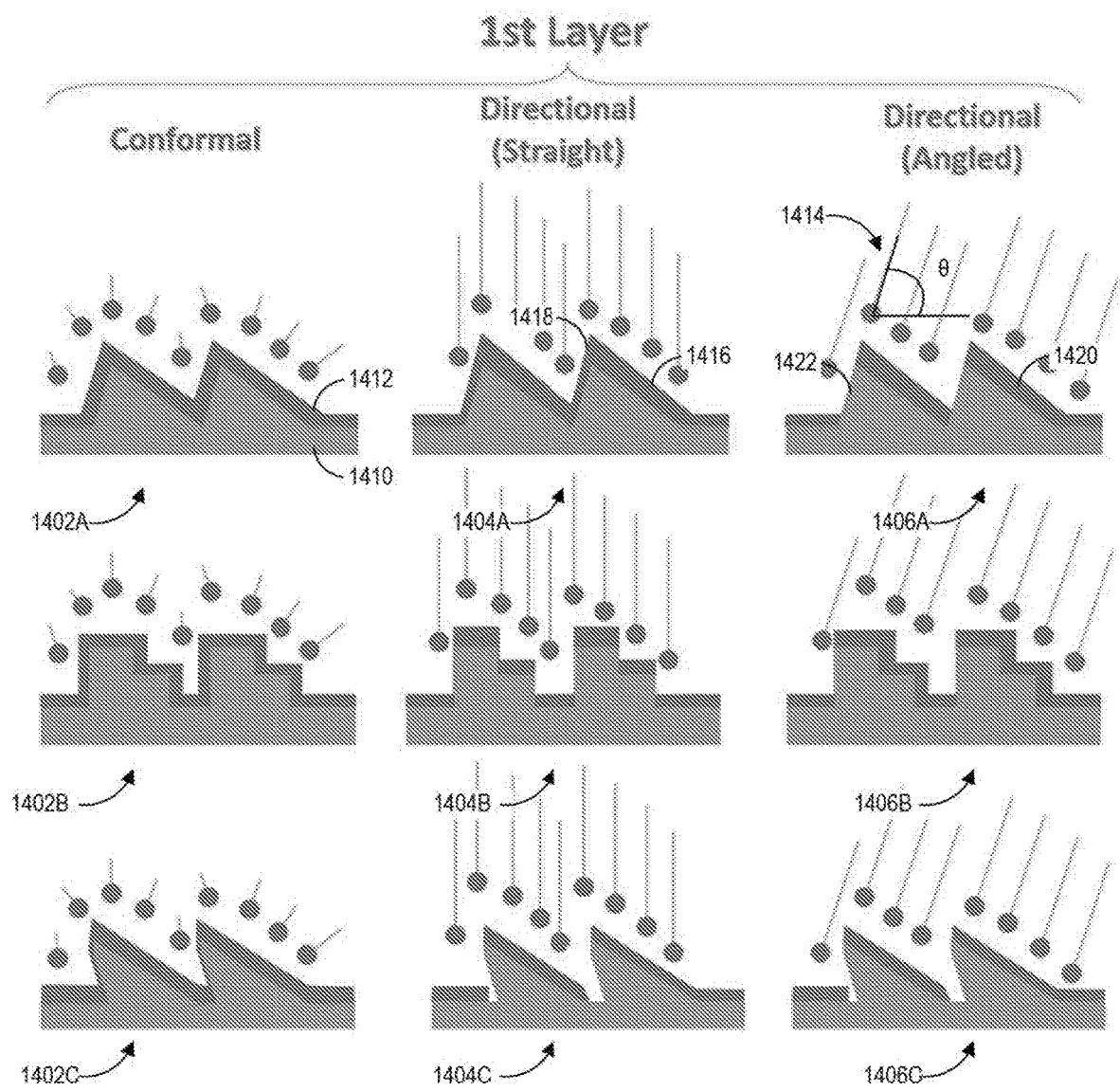
FIG. 14 illustrates example methods of depositing a layer of material on a diffractive features of a diffractive optical element. This layer may be an optically transmissive layer in various implementations.

In some examples, an asymmetric geometric form may include a profile, wherein a first sidewall forms an angle with the substrate between 20 and 85 degrees. In some examples, a second sidewall forms an angle different from the first sidewall. In some examples, it may be advantageous for a second sidewall to form an angle with the substrate of 90 degrees or greater, so that during approximately straight deposition (such as illustrated in FIG. 14) onto the grating provides a biased deposition, which may include a coating on the first sidewall and not the second sidewall or less on the second sidewall (e.g. less thick or less coverage on the second sidewall). In some examples, a height of the grating feature can be 100 nm to 600 nm. In some examples, the pitch of the grating feature can be 290 nm to 690 nm. Other values in outside these ranges are also possible.

The diffraction gratings may be one-dimensional (1D) gratings or two-dimensional (2D) gratings. For example, as illustrated in FIGS. 13B-1 and 13B-2, the diffraction grating can comprise a 1D array of grating features such as an array of lines or groove (e.g., straight lines or groove). Such a 1D grating may, for example, undulate, repeat, or be periodic or quasi-periodic in one direction. In some cases, the 1D array may comprise a plurality of parallel linear features such as linear raised portions and/or linear low portions. For example, FIG. 13B-1 shows a cross-sectional side-view of an example device 3300 having a series of diffractive features 3303 arranged laterally in one direction (e.g., the horizontal direction in FIG. 13B-2). The diffractive feature 3303 undulate in one direction (e.g., the horizontal direction in FIG. 13B-2) and are thus referred to as 1D. FIG. 13B-2 shows a top-view of the example device 3300. The diffractive features 3303 can form a series of elongate longitudinal features such as lines extending in one direction (e.g., the vertical direction in FIG. 13B-2). The elongate longitudinal features are arranged along one direction (e.g., the horizontal direction in FIG. 13B-2) and repeat in that direction.

Figure 13C:
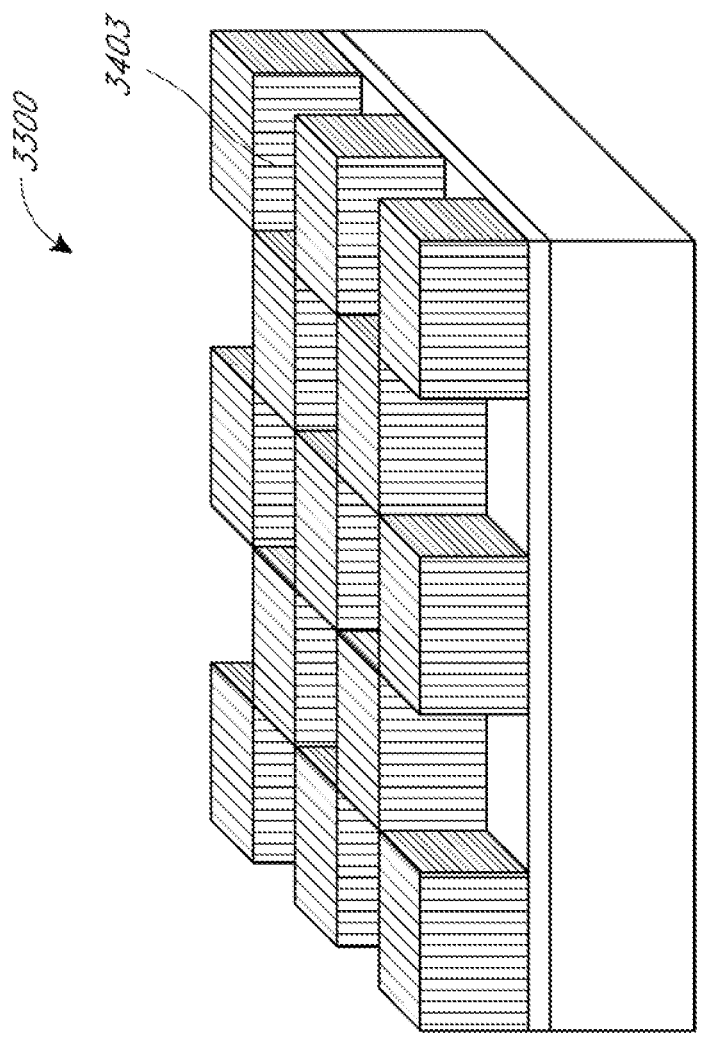
FIG. 13C illustrates an example device having a two dimensional (2D) array of diffractive features.
Figures 1, 13D:
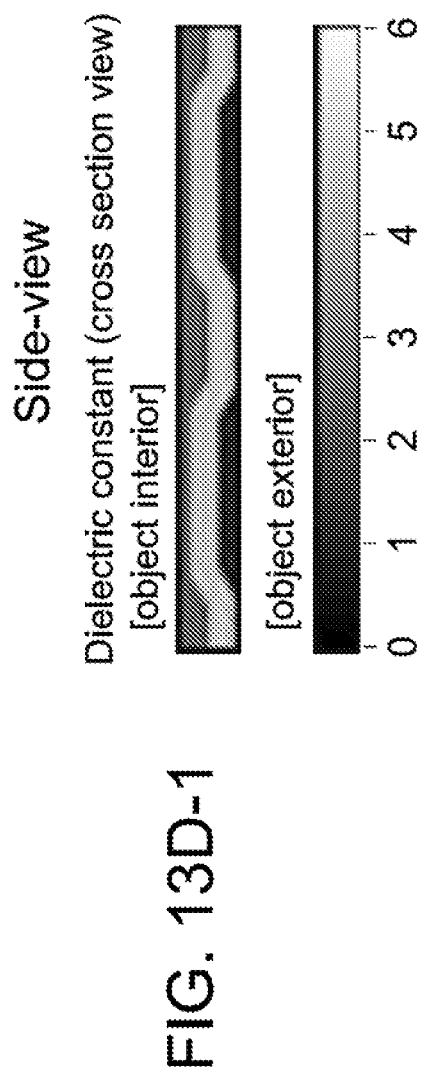
Figures 2, 13D:
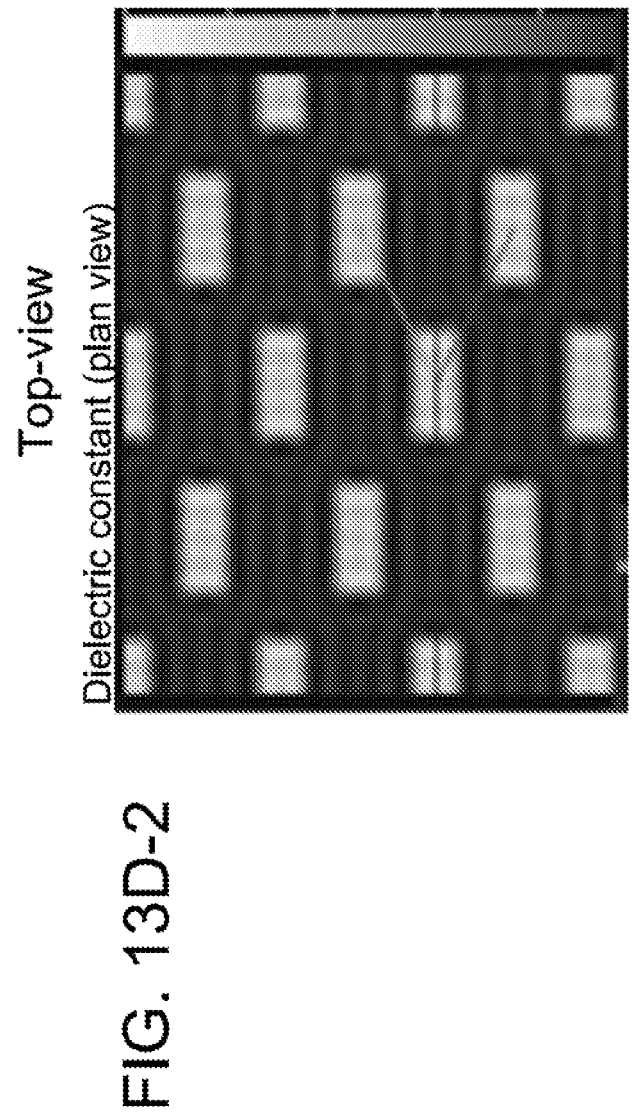

In another example, the diffraction grating can include a 2D array of grating features such as a 2D array of protrusions or high points or regions and pits, gaps or low areas between the high points, regions or protrusions. The 2D array, may for example look like a checker-board pattern in some cases. Any of the 1D array of structures described herein can also be arranged in two directions forming a 2D array of diffractive features. The 2D array of diffractive features can include a plurality of undulations in two directions. In some instances, the undulations can be periodic, while in other instances, the pitch of the undulations can vary. FIG. 13C shows an example device 3400 having a 2D array of diffractive features 3403 (e.g., diffractive features 3403 arranged laterally in two dimensions or directions). In this example, the array resembles a checkered board pattern. These features may be referred to as protrusions or in this case pillars. In this example, the diffractive features 3403 are symmetric with sidewalls that are substantially orthogonal to the horizontal axis. In other examples, the diffractive features, e.g., protrusions, can be symmetric with sidewalls that are angled or tilted. For example, FIGS. 13D-1 and 13D-2 show, respectively, a cross-sectional side-view and a top-view of an example array of symmetric diffractive features. Both left and right sidewalls tilt inward such that the diffractive feature tapers or the width gets smaller with increasing height. Accordingly, in this example the first sidewall is tilted in one direction and the second sidewall is tilted in a second opposite direction. In this example, the sidewall tilt angle is about 30 degrees relative to the horizontal axis and is symmetric on both sides. In some implementations, the 2D array can include grating features formed by an orthogonal overlay of two 1D grating structures. For example, the 2D array can include an orthogonal overlay of two blaze grating structures, such as described with reference to FIGS. 12A and 12B. Other configurations of 1D and 2D gratings are possible. The geometric forms 1302 shown in FIG. 13A may correspond to cross-section of diffractive features of either 1D or 2D gratings. Such diffractive features may be arranged, for example, in a 1D or 2D array.

Figure 13E:
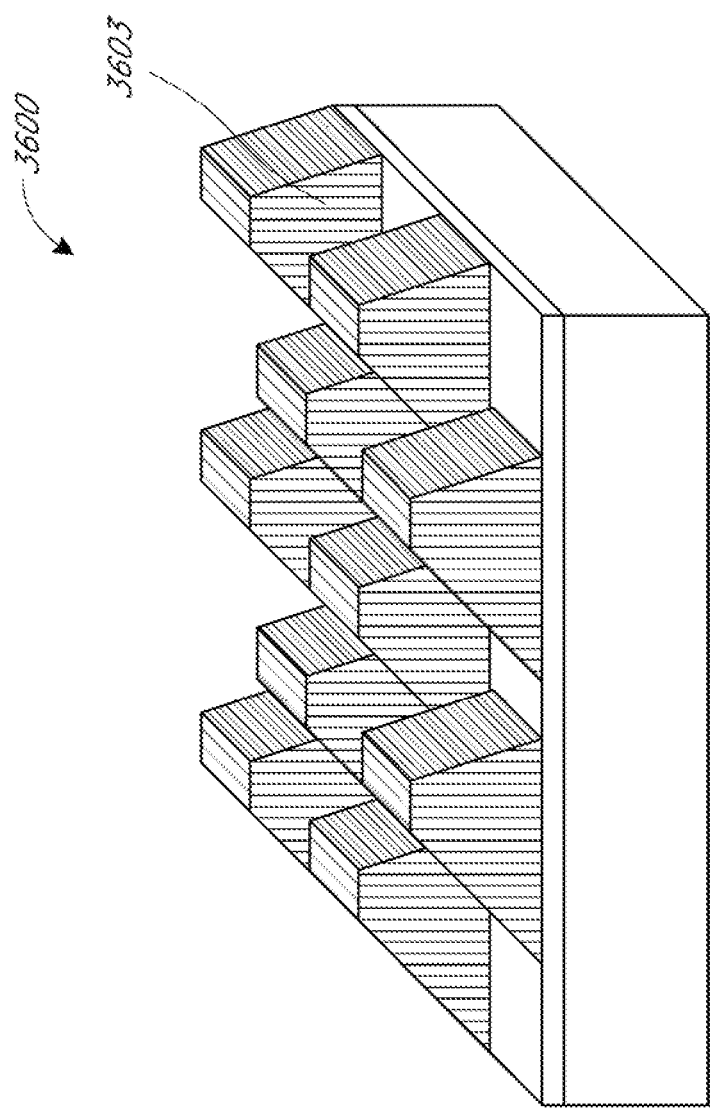
FIG. 13E shows another example device having a 2D array of diffractive features that are blazed.
Figures 1, 13F:
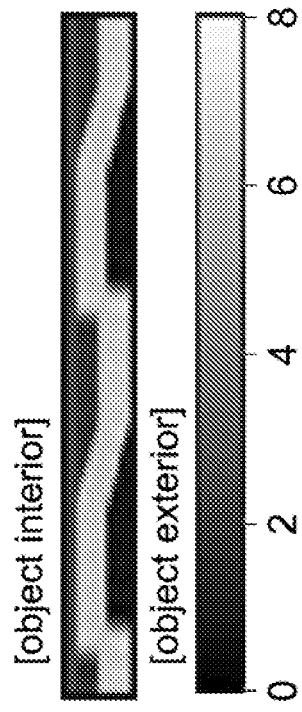
Figures 2, 13F:
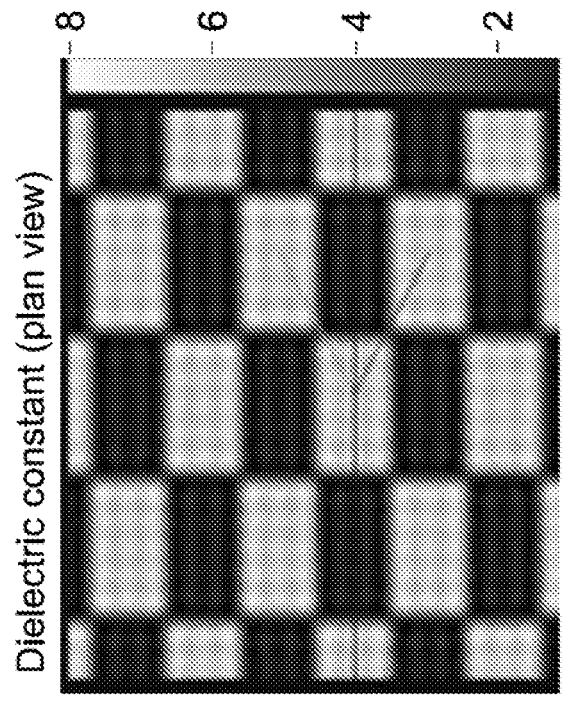

FIG. 13E shows another example device 3600 having a 2D array of diffractive features 3603. The diffractive features in this example are asymmetric. FIGS. 13F-1 and 13F-2 show respectively a cross-sectional side-view and a top-view of an example array of asymmetric diffractive features. This 2D diffraction grating comprises a blazed diffraction grating. The diffractive features may be tapered, e.g., in width or thickness, with height. In the example shown in FIG. 13E, the diffractive features have two sloping sidewalls or facets with one sloping more than the other while in the example shown FIGS. 13F-1 and 13F-2 one sidewall is sloped while the other opposite sidewall is not or any slope on the second sidewall is negligible. In both cases, the slope of one sidewall is more than that (if any) of the other such that the diffractive feature is asymmetric and blazed. As a result, the diffraction features preferentially diffract light in one direction over other directions. Such a diffraction grating may be useful, for example, as an incoupling optical element configured to diffract light received from a projector toward a light distribution element, an outcoupling optical element or a combination of a light distribution element and an outcoupling optical element, e.g., a CPE or combined pupil expander-extractor. Such a diffraction grating may also be useful for outcoupling light to the eye as opposed to the opposite direction to the environment or world in front of the user and head mounted display. The sidewall tilt angle is less than 30 degrees relative to the horizontal axis on one side and larger than 80 degrees (possibly 90 degrees) on the other side, in some implementations. However, other tilts and tilt angles are possible. In some instances, the diffractive features can form a 2D array of sawtooth structures such as sawtooth nanostructures.

Figures 1, 13G:
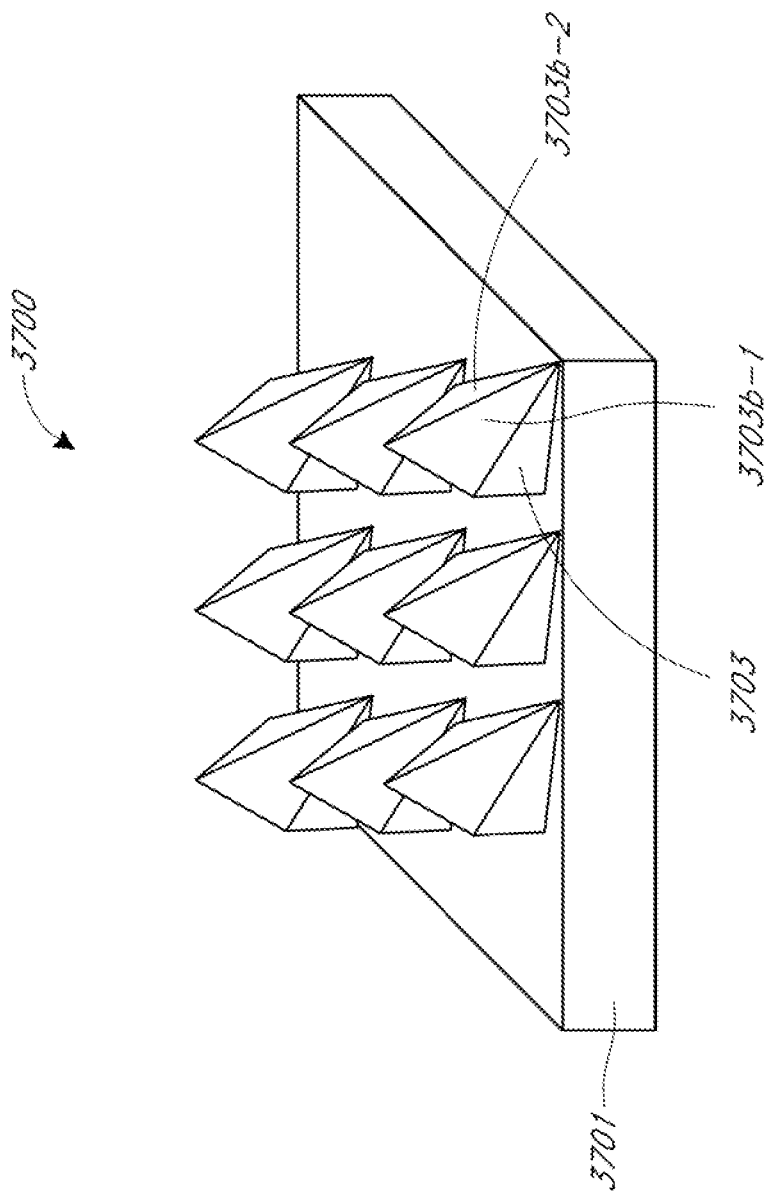
Figures 2, 13G:
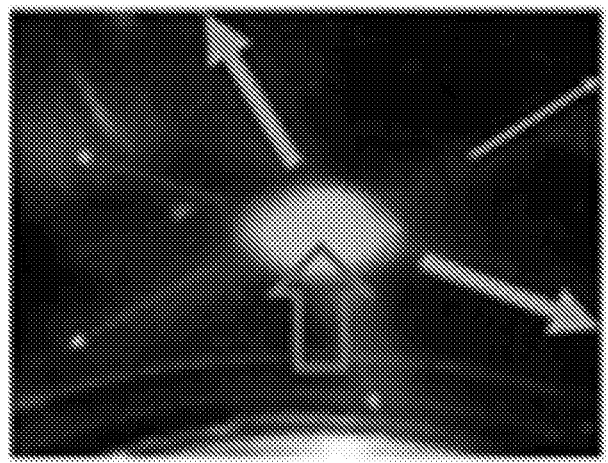

Accordingly, in various implementations, a 2D array of symmetric or asymmetric diffraction features can provide blazed diffraction gratings. As discussed above, the shape (e.g., tilt angles of sidewalls) of the diffraction features can determine the direction the grating directs the light or preferentially directs light. For example, the gratings may direct more light toward other gratings (e.g., EPEs, OPEs, or CPEs) and/or toward the viewer. In some instances, the diffraction features can be faceted to bias the propagation of light in two or more directions (e.g., blazed in multiple directions). For example, FIG. 13G-1 shows an example device 3700 having a 2D array of diffractive features 3703 formed in or on the substrate 3701. The diffractive feature 3703 has a first sidewall or facet 3703b-1 and a second sidewall or facet 3703b-2 that are tilted. Accordingly, the diffractive features are tapered, e.g., in thickness or width, with height. The diffractive feature 3703 can be configured to direct light preferentially in directions based on the tilt angles of the first and second sidewalls or facets 3703b-1, 3703b-2. FIG. 13G-2 shows an example diffractive feature directing more light in two particular directions (as illustrate by the two thick solid arrows directed upward to the right and downward to the left). Other examples are possible.

Accordingly, any of the structures or devices described herein such as grating structures may comprise a 1D grating. Similarly, any of the structures or devices described herein such as grating structures may comprise a 2D grating. Such 2D gratings may spread the light. These grating may also comprises blazed gratings. Such blazed gratings may preferentially direct light in certain directions. In some implementations, the 2D gratings (e.g., having one tilted facet on the diffractive features) preferentially direct light in one direction while in others the 2D grating (e.g., having two tilted facets on the diffractive features differently) preferentially directs light into a plurality of directions. Likewise, any of the methods or processes described herein can be used for 1D gratings. Similarly, any of the methods or processes described herein can be used for 2D gratings. These gratings, 1D or 2D, may be included on a substrate and/or waveguide and may be included in an eyepiece and possibly integrated into a head-mounted display as disclosed herein. These gratings may be employed for example as input gratings (e.g., ICGs), output gratings (EPEs), light distribution gratings (OPEs) or combined light distribution gratings/output gratings (e.g., CPEs).

A pattern of a diffraction grating may be formed in a substrate, which may include a waveguide. In some implementations, the patternable material comprises polymer. The pattern may, for example, be formed using photolithography where a patternable material, such as photoresist, may be deposited onto a substrate, which may comprise a waveguide. The patternable material/photoresist may be patterned so as to have a geometric form, such as illustrated in FIG. 13A. Imprinting such as nano-imprinting may be used to pattern the patternable material. Forming a pattern geometry in the patternable material may, in some implementations, involve imprinting a pattern such as a single-step "sawtooth" pattern in the photoresist (e.g., depositing photoresist on the substrate and then imprinting the blazed geometry). The patterned material, e.g., photoresist, after patterning, may comprise a mask, such as a hard mask.

The patternable material, e.g., polymer, photoresist, etc., can be an imprint with a residual interconnecting layer thickness (RLT) or without an RLT, or the polymer or resist pattern may be a photolithography pattern with or without RLT. A monolithic polymer substrate may have a surface relief pattern defined on one or either side of the waveguide. The pattern (e.g., plurality of diffractive features) can additionally or alternatively be etched into a substrate (e.g., having an index 1.45-2.0), for example, once a pattern is imprinted or otherwise formed onto the substrate.

In various implementations, the patterned material (e.g., polymer or photoresist) and the substrate may be etched to form a pattern, such as those described with reference to FIG. 13A, in the substrate. Etching the photoresist and the substrate may involve a dry plasma or chemical etch and/or a wet chemical etch, for example. In some implementations, the etching may etch away material at a relatively constant rate, such that portions where the patterned photoresist was thickest result in negligible or no removal of material from the substrate, while portions where the patterned photoresist was thinnest (or non-existent) result in the deepest etches into the substrate.

In some other implementations, a patternable material is etched to form diffraction features of patternable material. In such implementations, the diffractive feature comprising patternable material remains on the substrate, which need not be patterned.

Figure 13H:
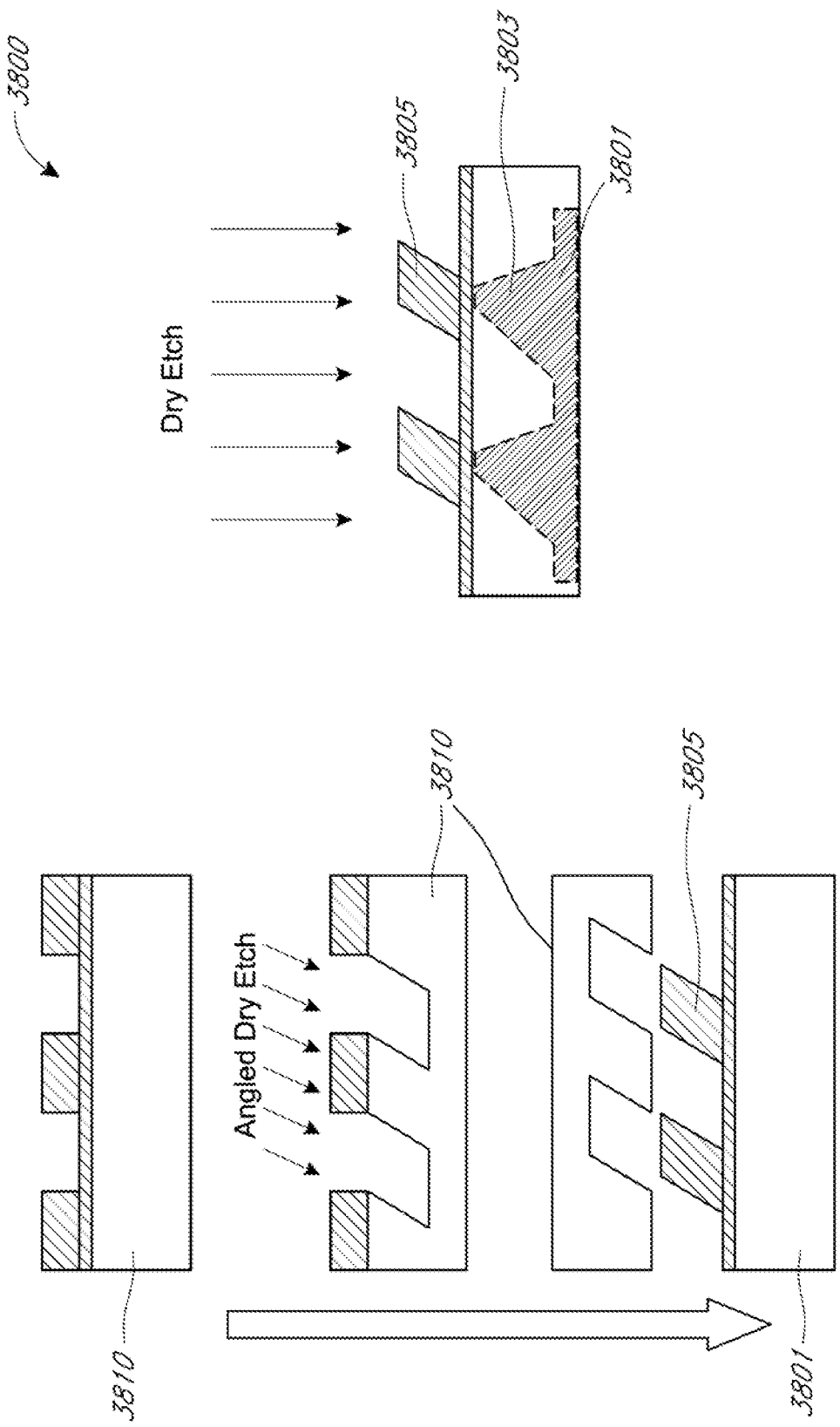
FIG. 13H shows an example method of forming a blazed grating.

FIG. 13H shows an example method 3800 of forming a blazed grating. The method 3800 provides a template or master 3810. If the diffractive features are to be angled, slanted, or tilted, the template 3810 can be patterned to form angled structures. Various processes, for example, etching processes, may be directional and angled to form such angled structures. Some examples of angled processes such as angled etching process include ion beam milling, angled dry etching, ion etching, GLAD etching, tilted etching, Faraday cage etching, etc. In some implementations, the selection of material employed for the template 3810 may assist in producing angled structures having angled sidewalls in the template. In this example, the angled structures comprise angled elongate protrusions (e.g., for 1D gratings) or angled pillars (e.g., for 2D gratings). These angled elongate protrusions or angled pillars may have sidewalls that are tilted in the same direction and in some cases may be substantially parallel. Once the template 3810 is fabricated, a layer of patternable material (e.g., polymer, resist, photoresist, etc.) can be deposited on a substrate 3801 and this layer can be imprinted with an imprint template 3810. The template 3810 can be imprinted into the patternable material (e.g., resist material) 3805 on a substrate 3801 to form a mask 3805 for the substrate. In other implementations, the patternable material can be deposited on the template and the substrate can be contacted to the template with the patternable material thereon. The template can be removed and the resist material 3805 and underlying substrate 3801 can be dry etched to form the diffractive features 3803 in the substrate 3801 (or in a layer of material disposed on the substrate 3801). In various implementations, dry etching is employed such as shown. The etching may be direction. In the example shown, the etching process is not angled. The resultant diffractive features 3803 formed in the substrate 3801 (or in a layer of material disposed on the substrate 3801) may have certain shapes, for example, may be blazed as a result of the angled feature in the mask 3805. In the example shown, the cross-section of the diffractive features has a trapezoidal or substantially triangular shape with two sloping sides. The sides slope in opposite directions. In the example shown, one side is sloped more than the other creating an asymmetric or blazed structure. This process may be used to form a 1D or 2D array of diffractive features.

Figure 13I:
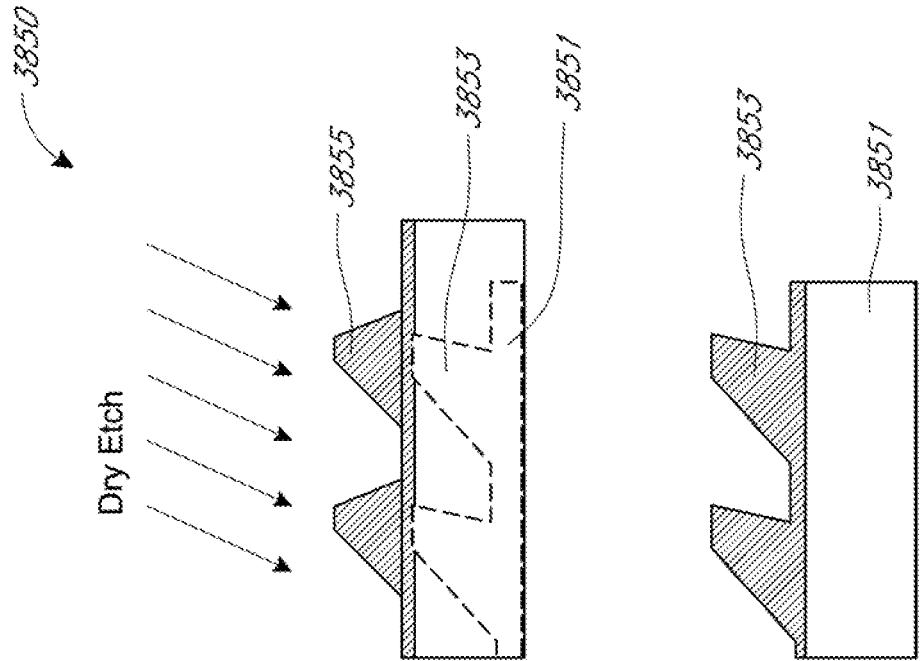
FIG. 13I shows another example method of forming a blazed grating.

FIG. 13I shows another example method 3850 of forming blazed diffractive features. The mask 3855 and underlying substrate 3851 (or layer of material disposed on the substrate 3851) can be etched (e.g., dry etched) at an angle to form the diffractive features 3853 in the substrate 3851 (or in a layer of material disposed on the substrate 3851). Some examples of angled directional etching processes (e.g., angled etching) include ion beam milling, angled dry etching, ion etching, GLAD etching, tilted etching, Faraday cage etching, etc. The template may comprise elongate protrusions (e.g. for 1D gratings) or tapered pillars (e.g. for 2D gratings) comprising trapezoidal or substantially triangular cross-sections. These elongate protrusions or tapered pillars may have sidewalls that are tilted in the opposite direction. One sidewall may be tilted more than the other. Applying an angled etching process to these elongate protrusions or tapered pillars may produce a blazed grating in a material, e.g., substrate or layer of material disposed on a substrate, underlying the elongate protrusions or tapered pillars. Blazed diffractive features having sides tilted in the same direction may be produced. In various implementations, one of the sides is tilted more than the other side. This process may be used to form a 1D or 2D array of diffractive features.

Figure 13J:
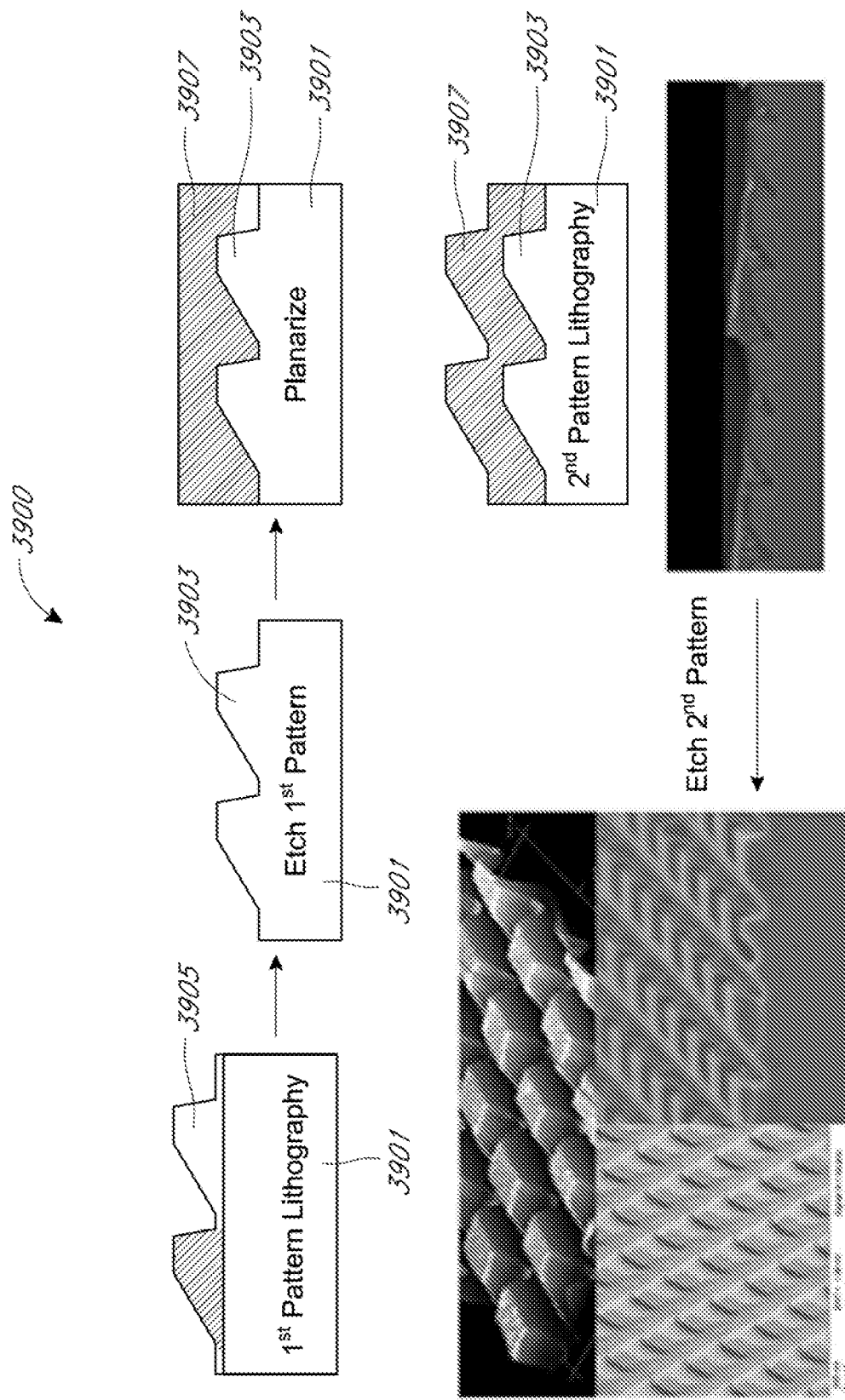
FIG. 13J shows another example method of forming a blazed grating.

In various implementations, the resultant diffractive features may be blazed in two or more directions (e.g., as shown in FIG. 13G-1) as a result of the angled features in the mask (e.g., as shown in FIG. 13H) and/or as a result of using an angled process (e.g., as shown in FIG. 13I). Diffractive features or gratings blazed in two or more directions may be produced by etching twice. In some implementations, for example, diffractive features or gratings blazed in two or more directions may be produced by etching with a first masked and etching again with a second different mask. In some instances, as shown in FIG. 13J, the mask 3905 and substrate 3901 may be etched to form the first sidewall of the diffractive feature 3903 in the substrate 3901. Additionally, patterning may be provided to form the second sidewalls. In various implementations, a second mask having a different orientation and/or shape may be used to form the second sidewalls. The second mask (e.g., at an angle and/or different orientation with respect to the first sidewall) may for example be etched to form the second sidewall. In some implementations, after the first sidewall of the diffractive features 3903 is formed, a planarization layer 3907 may be added to the intermediate diffractive feature 3903 and substrate 3901. The planarization layer 3907, intermediate diffractive feature 3903, and/or substrate 3901 may be patterned and etched (e.g., at an angle with respect to the first sidewall) to form the second sidewall. Although the above example is discussed in the context of patterning the substrate, in some implementations, the processes described above may be employed to pattern a layer formed on the substrate and not the substrate. Alternatively, in some implementations, the processes described above may be employed to pattern a layer formed on the substrate as well as the substrate.

Additionally, although the example methods 3800, 3850, 3900 are illustrated to form a 2D array of asymmetric diffractive features, the methods can also be used to form a 2D array of symmetric diffractive features (with or without angled sidewalls). The methods can also be used to form a 1D array of diffractive features. In some instances, the diffractive features in the 1D array can be symmetric with or without angled sidewalls. In some instances, the diffractive features in the 1D array can be asymmetric, e.g., with angled sidewalls. Accordingly, in some cases, blazed diffractive features may be formed.

2. Example Layers

One or more transmissive layers may be placed onto the base pattern. For example, as illustrated in FIG. 14, deposition of the one or more transmissive layers onto the base pattern can be done conformally (1402A, 1402B, 1402C) or directionally (1404A, 1404B, 1404C, 1406A, 1406B, 1406C).

Conformal deposition (1402A, 1402B, 1402C) can include a variety of deposition techniques for depositing a material 1412 that may result in a material layer covering the various surfaces of an underlying feature. The deposited layer may potentially be of substantially equal thickness over the base pattern geometry 1410. In some examples, directional deposition may include straight deposition (1404A, 1404B, 1404C) such that deposited material 1412 is incident on the base pattern 1410 at a substantially orthogonal angle to the plane or horizontal direction or planar major surface of the substrate. In another example, directional deposition may include angled deposition (1406A, 1406B, 1406C) such that deposited material 1412 is incident on the base pattern 1410 at an angle 1414 with respect to the plane or horizontal direction or planar major surface of the substrate. For example, the angle 1414 may be selected based on pattern geometry. For example, a diffraction grating may be a blazed diffraction grating having a sawtooth structure. The angle 1414 may be substantially orthogonal with respect to a surface of the sawtooth structure such that a deposited material 1412 more substantially deposits on a portion (or specific sidewall) of the sawtooth structure, as illustrated in 1406A, 1406B, 1406C.

The deposition type and the base pattern geometry may affect the thickness and placement of the layer of a deposited material 1412. Advantageously, controlling the thickness and placement of the layer of deposited material 1412 to generate a biased or angled deposition profile can allow for greater control for launching light in certain directions off of the ICG. As illustrated in FIGS. 13 and 14, a pattern geometry may be asymmetric having one or more straight sidewall, sloped sidewall, re-entrant or concave sidewall, multi-step sidewall, other sidewall, or some combination thereof. For example, a pattern geometry may be a sawtooth, with two asymmetric sloped sidewalls as shown in 1402A, 1404A, 1406A. In another example, a pattern geometry may have a straight sidewall and a multi-step sidewall as shown in 1402B, 1404B, 1406B. In another example, a pattern geometry may have a re-entrant sidewall and a sloped sidewall, as shown in 1402C, 1404C, 1406C. In the case of conformal deposition, the layer 1412 may cover the top and sides of the diffractive feature. In some cases, the thickness of the layer 1412 may be substantially equal across different types of pattern geometries (or the majority of a pattern geometry). In the case of a directional deposition, for some cases of straight or angled deposition, the amount deposited on the top and one or more sides may be different (see, e.g., 1404B, 1406B) or the amount deposited on two different (e.g., opposite sides) may be different (see, e.g., 1404A, 1404B, 1404C, 1406A, 1406B, 1406C). In some cases, one or more sides may be exposed and have negligible amounts of material deposited thereon such as in 1406A, 1406B, and 1406C as well as 1404B and 1404C. Additionally, in the case of a directional deposition, a thickness of a layer 1412 across different types of pattern geometries may be more strongly dependent on the pattern geometry. For example, in the case of a sawtooth geometry 1404A, a straight directional deposition may more substantially deposit on a portion 1416 of the sawtooth with a lower slope than a portion 1418 of the sawtooth with a higher slope. In another example, in the case of a sawtooth geometry 1406A, an angled deposition substantially perpendicular at angle 1414, $\theta$, of between 45° and 135° or 60° and 120° or 80°-100° degrees with respect to a surface 1420 of the substrate will likely deposit more material on such a surface 1420 that an angled deposition in which the surface 1422 is parallel to the direction of the deposition (e.g., has a small angle, $\theta$, of less than 20° or 10° with respect to the surface).

The optically transmissive or transparent layer(s) can include an optically transmissive material that may improve diffraction efficiency for a polarization, such as S-Pol or TE polarized light. In some implementations, the transmissive layer is not metal. In some implementations, for example, the transmissive layer is a dielectric or semiconductor. In some examples, the transmissive layer(s) can be a high index dielectric, such as titanium dioxide ($TiO_2$), zirconium dioxide ($ZrO_2$), Si3N4, ZnO, SiC, ZnTe, GaP, BP, or other material. In some examples, the high index material 1502 may have an index of between 1.9 and 3.5. The transmissive material may have an index of refraction greater than or equal to 2, such as 2.2, 3, 3.5, 4.0, or other high refractive index or be in any range formed by these values. In some examples, the material be a high index material (for example, where n is greater than 2) with a low a k (for example, where k is lower than 0.05), such as silicon carbide (SiC).

Figure 15:
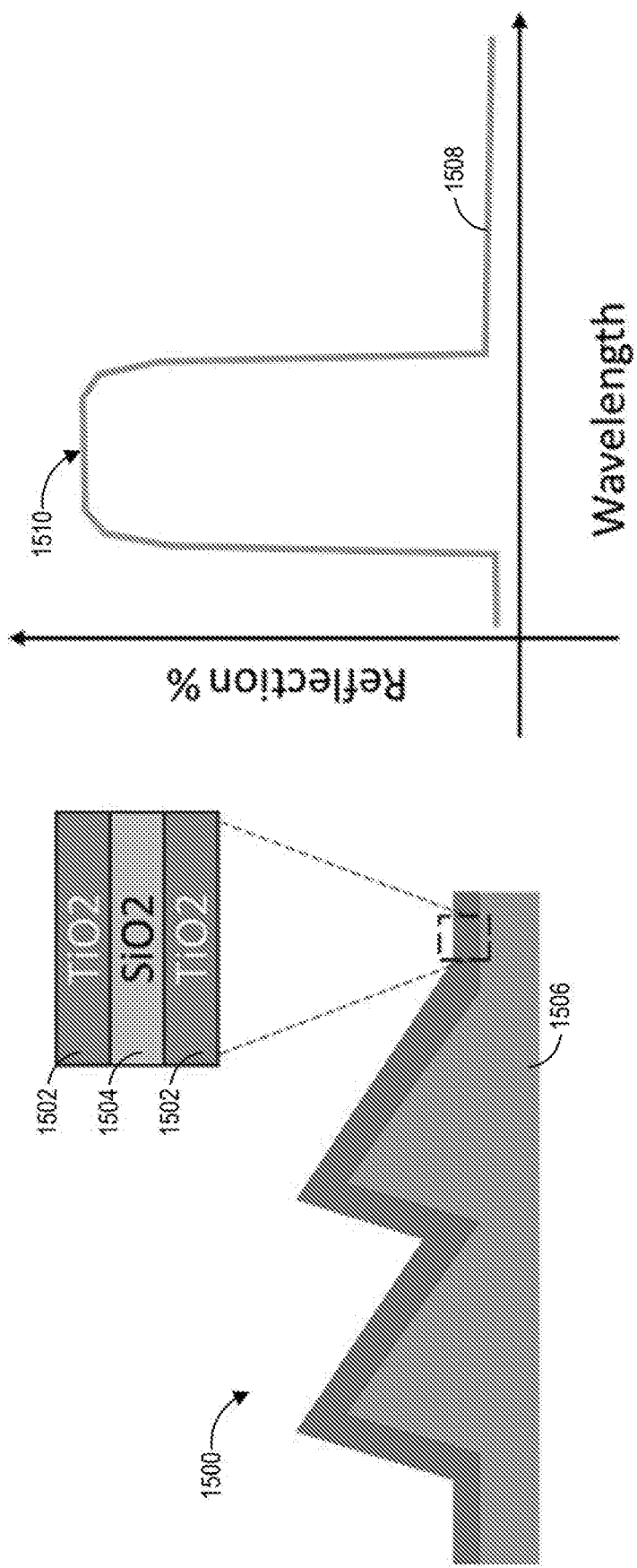
FIG. 15 illustrates example diffractive features in a transmissive layer comprising multiple sublayers and a corresponding graph of the reflection off of the surface of a diffraction optical element formed from such example diffractive features.

In some examples, the transmissive layer(s) can comprise multiple sublayers. For example, the sublayers can include two alternating materials. FIG. 15 illustrates a high an example diffraction grating 1500 having alternating layers deposited on a patterned surface 1506 of a substrate. In some implementations, the sublayers form an interference coating or bandpass filter coating. In some cases, the sublayers comprise a quarter-wave stack.

In examples where the sublayers include alternating materials, the transmissive layer(s) can include alternating sublayers of high index material 1502 and low index material 1504. For example, the high index material 1502 can include a material having a refractive index greater than or equal to 1.9 or 2, such as $TiO_2$, which has an index of 2.2 or Si3N4, ZnO, ZrO2. TiO2, SiC, ZnTe, GaP, or BP. In some examples, the high index material 1502 may have an index of between 1.9 and 3.5. Additionally, in some designs, the low index material 1504 can include a material having a refractive index lower than or equal to 1.9 or 2, such as less than 1.6, which may include SiO2, which has an index of 1.45. In some examples, the alternating layers can include a first layer of high index material 1502, a second layer of low index material 1504, and a third layer of high index material 1504.

In some implementations, a thickness of one or more of the sublayers in the composite layer may be varied to achieve desired reflectivity in certain wavelengths of light. For example, the transmissive layer(s) can include thin layer(s) of high index material and thicker layer(s) of low index material. The thickness of the one or more sublayers within the transmissive layer(s), such as a layer of low index material, can be tuned to increase the reflectivity of the transmissive layer(s) at certain wavelengths. For example, the thickness of one or both sublayers may be λ/4 times the index of refraction of the material, where λ, corresponds to a wavelength or range of wavelengths having increased reflectivity or other design wavelength. Graph 1501 of FIG. 15 illustrates reflection as a function of wavelength for the example diffraction grating 1500 where the thickness of the materials in the transmissive layer has been tuned to provide increased reflection 1508 in the shown range.

In the example shown in FIG. 15, a low index material 1504, such as $SiO_2$, is placed between layers of a high index material 1502, such as $TiO_2$ to create a highly reflective surface. By varying the thickness of one or more of the sublayers of materials 1502, 1504, the diffraction grating 1500 can be configured to allow maximum reflection in certain wavelengths and potentially serve as a color filter or provide some degree of color tuning. For example, the thickness of the layers may be configured to make an ICG diffractive for select wavelengths, such as blue at 450 nm, over other wavelengths, such as red at 650 nm.

Figure 16:
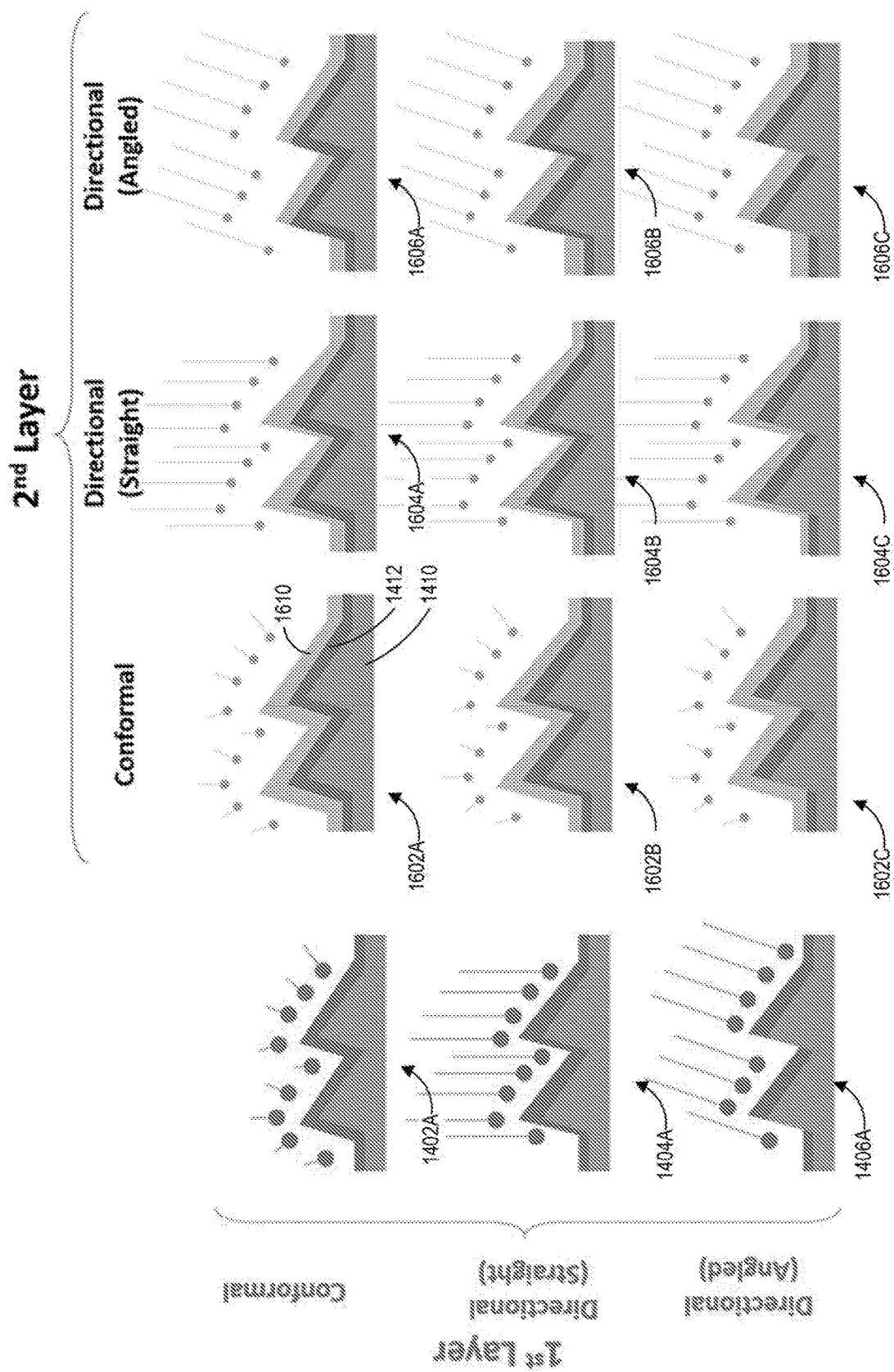
FIG. 16 illustrates example methods of depositing layers of material, such as dielectric and metal layers, on a plurality of diffractive features that form a diffractive optical element such as a diffraction grating.

As discussed above, one or more metal layers may be disposed over the transmissive layer(s). For example, as illustrated in FIG. 16, deposition of the one or more metal layers onto the transmissive layer(s) can be done conformally (1602A, 1602B, 1602C) or directionally (1604A, 1604B, 1604C, 1606A, 1606B, 1606C). The deposition type can be the same or different than the deposition type of the transmissive layer. FIG. 16 illustrated various combinations. For example, a transmissive layer may be conformally deposited (1402A) and the metal layer may be conformally (1602A) or deposited directionally straight (1604A) or deposited directionally angled (1606A). In another example, a transmissive layer may be deposited directionally straight (1404A) and the metal layer may be conformally (1602B) or deposited directionally straight (1604B) or deposited directionally angled (1606B). In another example, a transmissive layer may be deposited directionally angled (1404A) and the metal layer may be conformally (1602C) or deposited directionally straight (1604C) or deposited directionally angled (1606C).

Conformal deposition (1602A, 1602B, 1602C) can include a variety of deposition techniques for depositing a material 1612 that may result in a material layer covering the different sides and portions of the transmissive layer disposed onto the base pattern geometry 1410. In some examples, directional deposition may include straight deposition (1604A, 1604B, 1604C) such that deposited material 1610 is incident on the transmissive layer material 1412 at a substantially orthogonal angle to the plane or horizontal direction or major planar surface of the substrate. In another example, directional deposition may include angled deposition (1606A, 1606B, 1606C) such that deposited material 1610 is incident on the transmissive layer material 1412 at an angle 1616 with respect to the plane or horizontal direction or a major planar surface of the substrate. For example, the angle 1616 may be selected based on pattern geometry. For example, a diffraction grating may be a blazed diffraction grating having a sawtooth structure. The direction may be substantially orthogonal with respect to a surface of the sawtooth structure such that a deposited material 1610 more substantially deposits on a portion (or specific sidewall) of the sawtooth structure, as illustrated in 1605A, 1606B, 1606C.

The deposition type and the base pattern geometry may affect the thickness and placement of the layer of a deposited material 1612. As discussed above with reference to FIG. 14, advantageously, controlling the thickness and placement of the layer of deposited material 1612 to generate a biased or angled deposition profile can allow for greater control for launching light in certain directions off of the ICG. As illustrated in FIGS. 13-15, a pattern geometry may be asymmetric having a straight sidewall, sloped sidewall, re-entrant or concave sidewall, multi-step sidewall, other sidewall, or some combination thereof. In the case of conformal deposition, a thickness of a layer 1612 may be substantially equal across different types of pattern geometries (or the majority of a pattern geometry). In the case of a directional deposition, a thickness of the layer 1412, 1610 across different types of pattern geometries may be more strongly dependent on the pattern geometry. For example, in the case of a sawtooth geometry 1604A, a straight directional deposition may more substantially deposit on a portion of the sawtooth with a lower slope than a portion of the sawtooth with a higher slope. In another example, in the case of a sawtooth geometry 1606A, an angled deposition substantially orthogonal to a plane or horizontal surface or major planar surface of the substrate may deposit more material 1612 on a shallow sloping surface 1420 than on a steeply sloping surface 1422.

The metal layer can include a metal or conductive material, such as a material comprising aluminum, silver, gold, copper, or alloy of the same. In some designs, the metal used in the metal layer can be chosen to quench certain wavelengths of light. For example, gold or copper can be used to quench light under 600 nm.

While the transmissive layer is discussed as being the first layer on the base pattern and the metal layer is discussed as being the second layer, the layers may be placed in any suitable order. Additionally or alternatively, there may be one or more additional layers of material in between the base pattern, transmissive layer, or metal layer. In some examples, the one or more layers may repeat or alternate. In some examples, one or more layers may be partial layers such that material that may be part of a layer is deposited on a portion of a substrate or base pattern.

In some examples, there may be an interface layer between the metal layer and the transmissive layer. The interface layer may increase the adhesion strength of the metal layer and environmental reliability of the stack. For example, without an interface layer, the metal layer, such as Ag, Au, Cu, or Al metal, may flake off the grating during unfavorable environmental conditions, such as heat and humidity. In some examples, the interface layer can include $TiO_2$ or other layer that may help bond the metal layer to a polymer surface.

The deposition of the transmissive layer, metal layer, or any other layer can include physical vapor deposition (PVD). PVD can include sputtering, evaporation, or other forms of physical vapor deposition. In examples where conformal deposition is desired, sputtering may be used. In examples where directional deposition is desired, evaporation may be used. Additionally or alternatively, the deposition of the transmissive layer, metal layer, or any other layer can include chemical vapor deposition (CVD). CVD can include plasma enhanced low pressure deposition, atmospheric pressure, deposition, atomic layer deposition (ALD), or other form of chemical vapor deposition. Forms of CVD may be used where conformal deposition is desired. Aspects of PVD or CVD may be varied to affect the physical properties of the deposited layers. For example, deposition thickness bias may be lessened for very conformal processes, such as those done one on an atomic scale one monolayer at a time. In another example, coating quality (for example, in terms of grain size or density) can be affected by changes to processing temperature and pressure. The coating quality can in turn affect the n & k of the layer and shape adjacent layers being coated on top of the deposited layer.

Figure 17A:
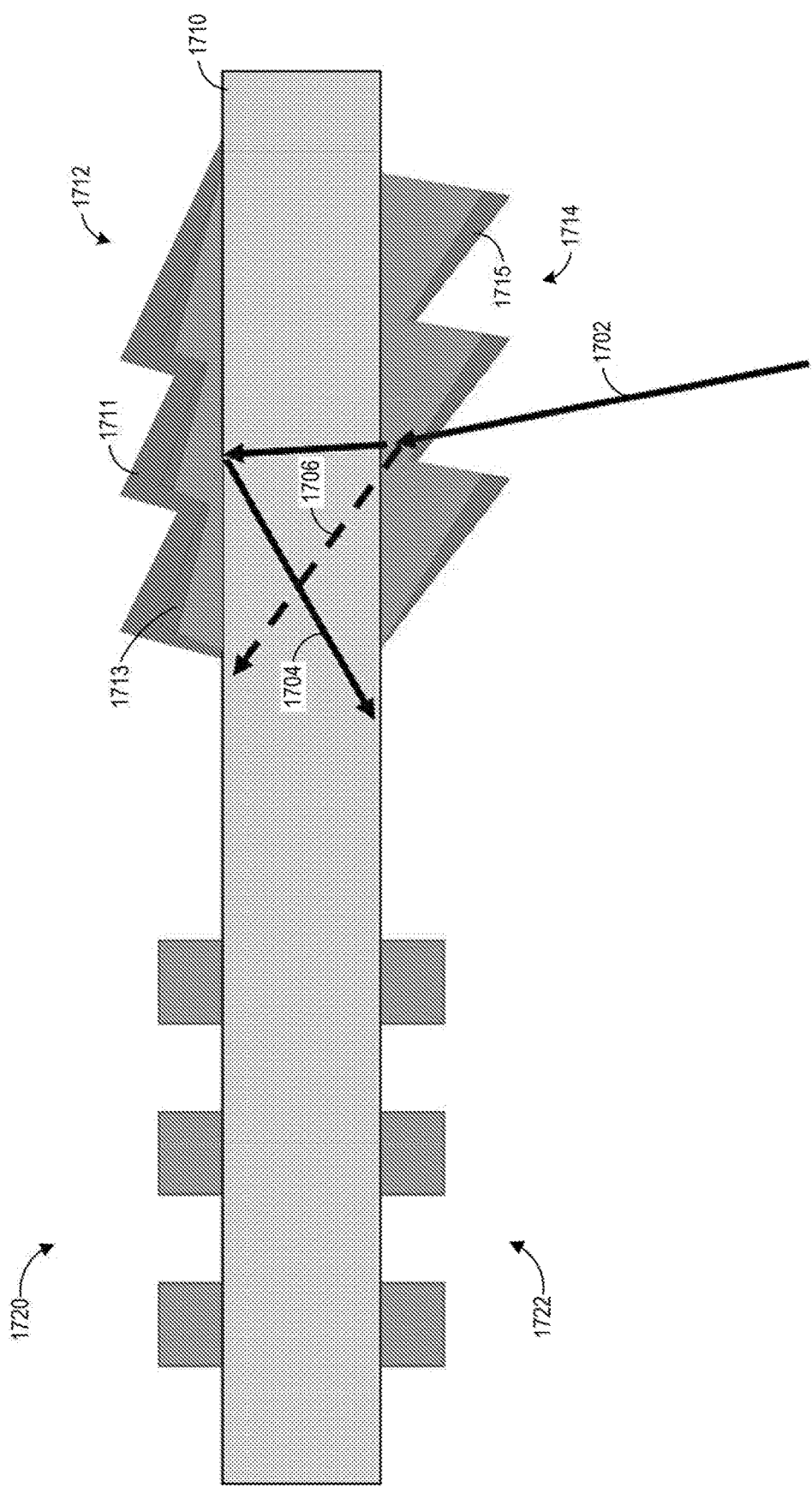
FIG. 17A illustrates an example waveguide including multiple diffractive optical elements, such as diffraction gratings that form incoupling optical elements and outcoupling optical elements. The diffractive optical element(s), e.g., at least one of the incoupling optical elements, may comprise reduced polarization sensitivity diffraction gratings.

3. Example Waveguide Including a Diffraction Grating with Reduced Polarization Sensitivity A diffraction grating having reduced polarization sensitivity, such as described above, can be used in the context of an AR display. For example, a waveguide that may be part of an AR display can include diffraction gratings that may serve as in-coupling optical elements and/or light distributing elements and/or out-coupling optical elements on one or more sides of a waveguide (such as those described with reference to FIGS. 6 and 7). FIG. 17A illustrates an example waveguide having multiple diffraction gratings, including a reduced polarization sensitivity diffraction grating that may act as in-coupling optical element. For example, as illustrated, a waveguide 1710 may include one or more in-coupling gratings (ICG) 1712, 1714 and one or more diffraction gratings that perform light distribution and/or out-coupling 1720, 1722. In this example, the gratings 1720, 1722 may comprises a pupil expander-extractor (CPE) regions, which operates both as a light distributing element and an out-coupling grating. Light 1702 may be injected into one side of the waveguide 1710 through a transmissive ICG 1714. The transmissive ICG 1714 may let the light 1702 pass through into the waveguide 1710 and diffract light 1706. The light 1706 may be propagated along the waveguide 1710 towards the one or more pupil expander-extractor gratings 1720, 1722. A second, reflective ICG 1712 that may be on an opposing side of the waveguide 1710 can also be configured to reflect light 1704 into the waveguide 1710. The reflected light 1704 may be propagated along the waveguide 1710 towards the one or more pupil expander-extractor gratings 1720, 1722. Advantageously, the inclusion of the one or more ICGs 1712, 1714 can help with image uniformity and/or eye box efficiency, depending on the source light (for example, LED, microLEDs, lasers, polarized light sources, or unpolarized light sources).

The reflective ICG 1712 or transmissive ICG 1714 may comprise a diffraction grating. The diffraction grating of both or either the reflective ICG 1712 or transmissive ICG 1714 may be formed in a layer on the waveguide or substrate or within the waveguide itself. The diffraction grating may have diffractive features, such as for example described above with reference to FIGS. 12A-12B and FIGS. 13A-13J. For example, the diffraction features of the diffraction grating may have various dimensions and a symmetric or asymmetric form.

In some examples, a geometric form of diffractive features of the reflective ICG 1712 and/or transmissive ICG 1714 can be symmetric with straight sidewalls, sloped sidewalls, re-entrant or concave sidewalls, multi-step sidewalls (see, e.g., FIG. 13A, first row, third column), other type of sidewalls, or some combination thereof. In another example, the geometric form can be asymmetric with at least one straight sidewall, sloped sidewall, re-entrant (see, e.g., FIG. 13A, second row, third column) or concave sidewall, multi-step sidewall (see, e.g., FIG. 13A, second row, second column), other type of sidewall, or some combination thereof. Regardless of whether the diffraction features are asymmetric or symmetric, in some implementations, a plateau or flat portion may be located at the top of the features (e.g. at the peak). A grating may have a height of 100 nm to 600 nm or greater or less height than defined by that range. For example, a grating may have a depth or height of measured from base to peak of 100-300 nm, 300-600 nm, 200-400 nm, 300-500 nm, etc. or any range defined by any of these values. A grating may have a pitch of 290 nm to 690 nm or greater or less pitch than defined by that range. If the grating is a blazed grating, the grating may have, for example, a blaze angle of from 20 to 85 degrees, 45 to 80 degrees, or another angle and an anti-blaze angle of, for example, about 70 to 150 degrees or any value in a range defined by these values, measured in the same angular direction. Values outside these any of these ranges are also possible.

The reflective ICG 1712 can include one or more transmissive layers 1713 and/or one or more metal layers 1711. The metal layer 1711 may be reflective. In some examples, the one or more transmissive layers 1713 may be efficient in diffracting TE polarized light in one or more wavelength ranges. For example, the one or more transmissive layers may be efficient in diffracting TE polarized light in a range of wavelengths associated with red (for example, around 620-780 nm), a range of wavelengths associated with green (for around 492-577 nm), or a range of wavelengths associated with blue (for example, 435-493 nm). In some examples, the one or more metal layers 1711 may be efficient in diffracting TM polarized light in one or more wavelength ranges. For example, the one or more metal layers may be efficient in diffracting TM polarized light in a range of wavelengths associated with red (for example, around 620-780 nm), a range of wavelengths associated with green (for around 492-577 nm), or a range of wavelengths associated with blue (for example, 435-493 nm). The transmissive ICG 1714 can include one or more transmissive layers 1715, such as described above with reference to FIGS. 14 and 15. In some examples, the one or more transmissive layers may be efficient in diffracting TE polarized light in one or more wavelength ranges. For example, the one or more transmissive layers may be efficient in diffracting TE polarized light in a range of wavelengths associated with red (for example, around 620-780 nm), a range of wavelengths associated with green (for around 492-577 nm), or a range of wavelengths associated with blue (for example, 435-493 nm). In some examples, the one or more transmissive layers 1715 can include a non-metallic material such as a dielectric or semiconductor material, including, but not limited to, $ZrO_2$, $TiO_2$, or SiC. In various implementations the diffracted light comprise the first diffractive order (e.g., +1 or −1). Most of the diffracted light may be in the first order.

Light received from a projector, such as an image projector, may be diffracted by the one or more gratings 1712, 1714 at an angle or range of angles such that this light or at least a portion thereof is guided within the waveguide by total internal reflection, for example, toward the pupil expander-extractor gratings. The geometry, for example, the asymmetry or blazed of the diffractive feature, may cause light to be preferentially directed, for example, toward pupil expander-extractor gratings. The pupil expander-extractor gratings may be configured to out-couple the light form the waveguide to the user or wearer's eye. The pupil expander-extractor gratings may additionally increase the area (in two dimensions) over which the light exits the waveguides. In this manner, the pupil expander-extractor gratings may potentially increase the eye box in some implementations. In various designs, the projector outputs unpolarized or circularly polarized light and directs this unpolarized or circularly light to the ICGs for input into the waveguide. Some examples of such projectors that output unpolarized or circularly light to form images may include for example micro-LED projectors, digital light projectors (DLP), and liquid crystal on silicon (LCOS) based projectors, although others are possible.

Figure 17B:
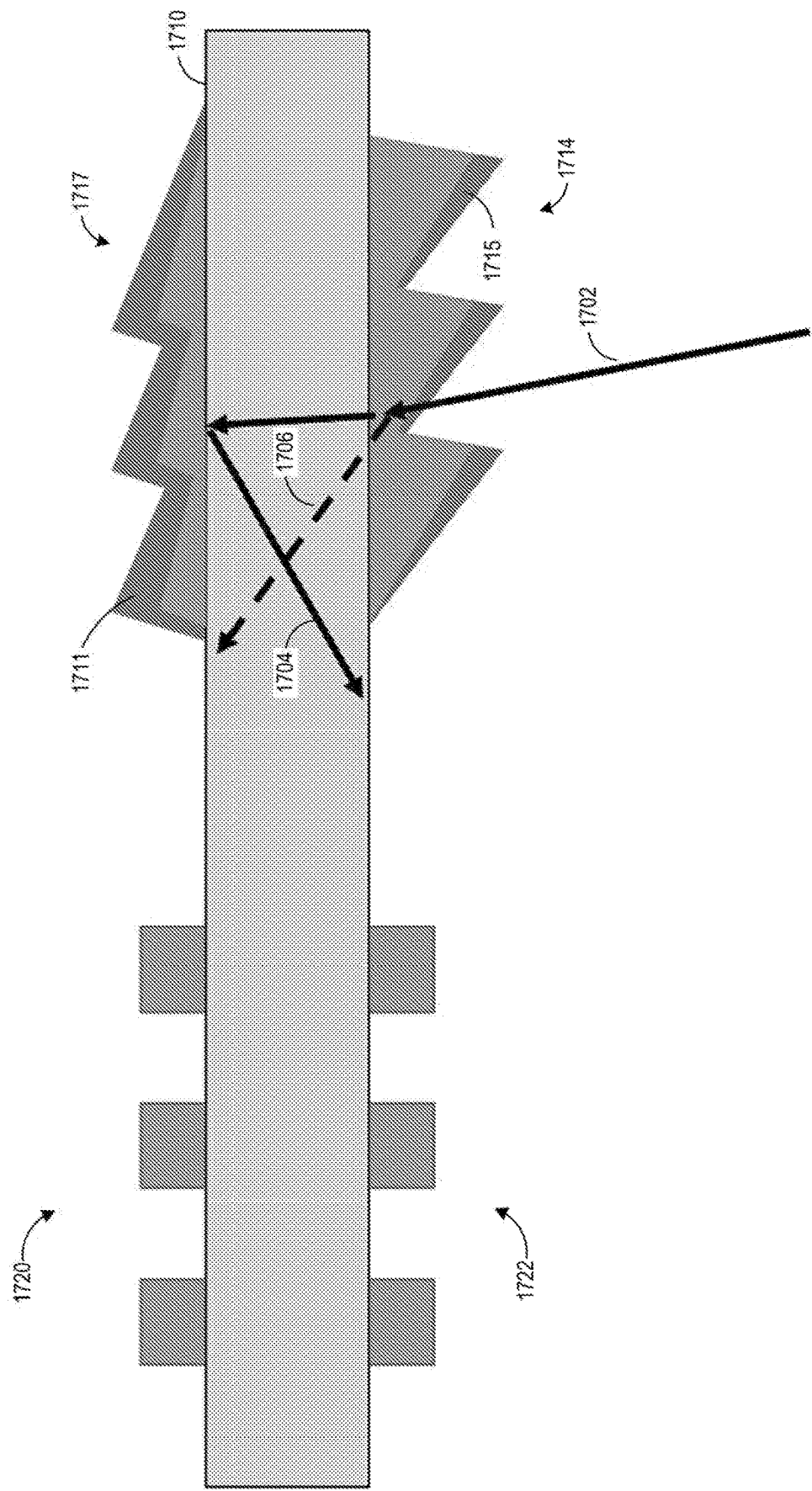
FIG. 17B illustrates another example waveguide including multiple diffractive optical elements, such as diffraction gratings that form incoupling optical elements and/or outcoupling optical elements. The diffractive optical element(s), e.g., the incoupling optical elements, may comprise a diffraction grating that couples more TE polarization light into the waveguide than TM polarization light as well as a diffraction grating that couples more TM polarization light into the waveguide than TE polarization light.

FIG. 17B illustrates an example waveguide having multiple diffraction gratings, that may act as an in-coupling optical element. For example, as illustrated, a waveguide 1710 may include one or more in-coupling gratings (ICG) 1717, 1714 and one or more grating that perform light distribution and out-coupling 1720, 1722. The gratings 1720, 1722 may comprise one or more pupil expander-extractor (CPE) regions, which operates both as a light distributing element and an out-coupling grating. Light 1702 may be injected into one side of the waveguide 1710 through a transmissive ICG 1714. The transmissive ICG 1714 (e.g., comprising a transmission grating) may let the light 1702 pass through into the waveguide 1710 and diffract light 1706. The transmissive ICG 1714 may have a higher TE diffraction efficiency than TM efficiency. The light 1706 may be propagated along the waveguide 1710 towards the one or more pupil expander-extractor gratings 1720, 1722. A second, reflective ICG 1713 (e.g., a reflective ICG comprising a reflective diffraction grating) that may be inline (e.g., aligned) with the transmissive ICG 1714 and on an opposite side of the waveguide 1710 can be configured to diffract and reflect light 1704 into the waveguide 1710. The second reflective ICG 1717 may operate in a reflection mode and may have higher TM diffraction efficiency than TE efficiency. The diffracted/reflected light 1704 may be propagated along the waveguide 1710 towards the one or more pupil expander-extractor gratings 1720, 1722. Advantageously, the inclusion of the one or more ICGs 1712, 1717 can help with image (e.g., brightness and/or color) uniformity and/or eye box efficiency, possibly depending somewhat on the source light (for example, LED, microLEDs, lasers, polarized, or unpolarized light sources).

A transmissive ICG 1714 and/or ICG 1717 may comprise a diffraction grating. The diffraction grating of both or either the reflective ICG 1717 or transmissive ICG 1714 may be formed in a layer on the waveguide or within the waveguide or substrate itself. The diffraction grating may have diffractive features, such as described above with reference to FIGS. 12A-12B and FIGS. 13A-13J. For example, the diffraction features of the diffraction grating may have various dimensions and different geometric forms. See, for example, FIG. 13A which shows saw tooth (e.g., row one, column two and row two, column one), multi-stepped (e.g., row one, column three and row two, column two), and reentrant (e.g., row two, column three of FIG. 13A). As described herein, the diffraction features may be blazed (see, e.g., row two of FIG. 13A) to direct light in a particular direction.

In some examples, a geometric form of diffractive features of a transmissive ICG 1714 and/or reflective ICG 1717 can be symmetric with straight sidewalls, sloped sidewalls, re-entrant or concave sidewalls, multi-step sidewalls, other type of sidewalls, or some combination thereof. In another example, the geometric form can be asymmetric with at least one straight sidewall, sloped sidewall, re-entrant or concave sidewall, multi-step sidewall, other type of sidewall, or some combination thereof. Regardless of whether the diffraction features are asymmetric or symmetric, in some implementations, a plateau or flat portion may be located at the top of the features (e.g. at the peak). A grating may have a height and/or depth of 100 nm to 600 nm or greater or less height than defined by that range (e.g., 200 to 400 nm, 205 to 350 nm, 210 to 400 nm, 350 to 500 nm, 300 to 600 nm, 400 to 600 nm, 200 to 600 nm, 200 to 500 nm or any range formed by any of these values). A grating may have a pitch of 290 nm to 690 nm or greater or less pitch than defined by that range. If the grating is a blazed grating, the grating may have, for example, a blaze angle of about 20 to 85 degrees and an anti-blaze angle of, for example, about 70 to 150 degrees or any value in a range defined by these values, measured in the same angular direction. These angles may represent interior angles measured from the base of the diffraction grating to the corresponding sidewall or surface. Values outside these any of these ranges are also possible.

The transmissive ICG 1714 can include one or more transmissive layers 1715, such as described above with reference to FIGS. 14, 15 and 17A. A reflective ICG 1717 can also include one or more metal layers 1711. In some examples, the one or more metal layers 1711 may effective in constructing a grating that is efficient in diffracting TM polarized light in one or more wavelength ranges. For example, the inclusion of one or more metal layers may provide increased diffraction efficiency of TM polarized light in a range of wavelengths associated with red (for example, around 620-780 nm), a range of wavelengths associated with green (for around 492-577 nm), or a range of wavelengths associated with blue (for example, 435-493 nm). Other designs of diffraction grating are efficient at diffractive TM polarization or preferentially diffract TM polarized light are also possible.

Advantageously, the combination of the transmissive ICG which preferentially diffracts TE light into the waveguide to be guided therein and the reflective ICG which preferentially diffract TM light into the waveguide to be guided therein provide for efficient diffraction and in-coupling of both TE and TM polarization. Accordingly, this combination of these gratings can more efficiently diffract light including both TE and TM polarizations, such as unpolarized light, and in the case of ICGs, couple this light into a waveguide. As described above, in various designs, the diffractive light is in the first order such as the +1 and/or −1 diffractive order.

Accordingly, light received from a projector, such as an image projector, may be diffracted by the one or more gratings 1717, 1714 such that an angle or range of angles of this light from the projector or at least a portion thereof is diffracted and coupled into and guided within the waveguide by total internal reflection, for example, toward the pupil expander-extractor gratings, light distributing element(s) and/or outcoupling optical element(s). The geometry, for example, the asymmetry or blazed of the diffractive feature may cause light to be preferentially directed, for example, in a particular direction such as toward pupil expander-extractor gratings. The pupil expander-extractor gratings may be configured to out-couple the light form the waveguide to the user or wearer's eye. The pupil expander-extractor gratings may in addition increase the area (in two dimensions) over which the light exits the waveguides. In this manner, the pupil expander-extractor gratings may potentially increase the eye box in some implementations. In various implementations, the projector outputs unpolarized or circularly polarized light and directs this unpolarized or circularly light to the ICGs for input into the waveguide. Some examples of such projectors or light sources that output unpolarized or circularly light to form images may include, for example, micro-LEDs and micro-LED projectors, digital light projectors (DLP), and liquid crystal on silicon (LCOS) based projectors, although others are possible.

Figure 17C:
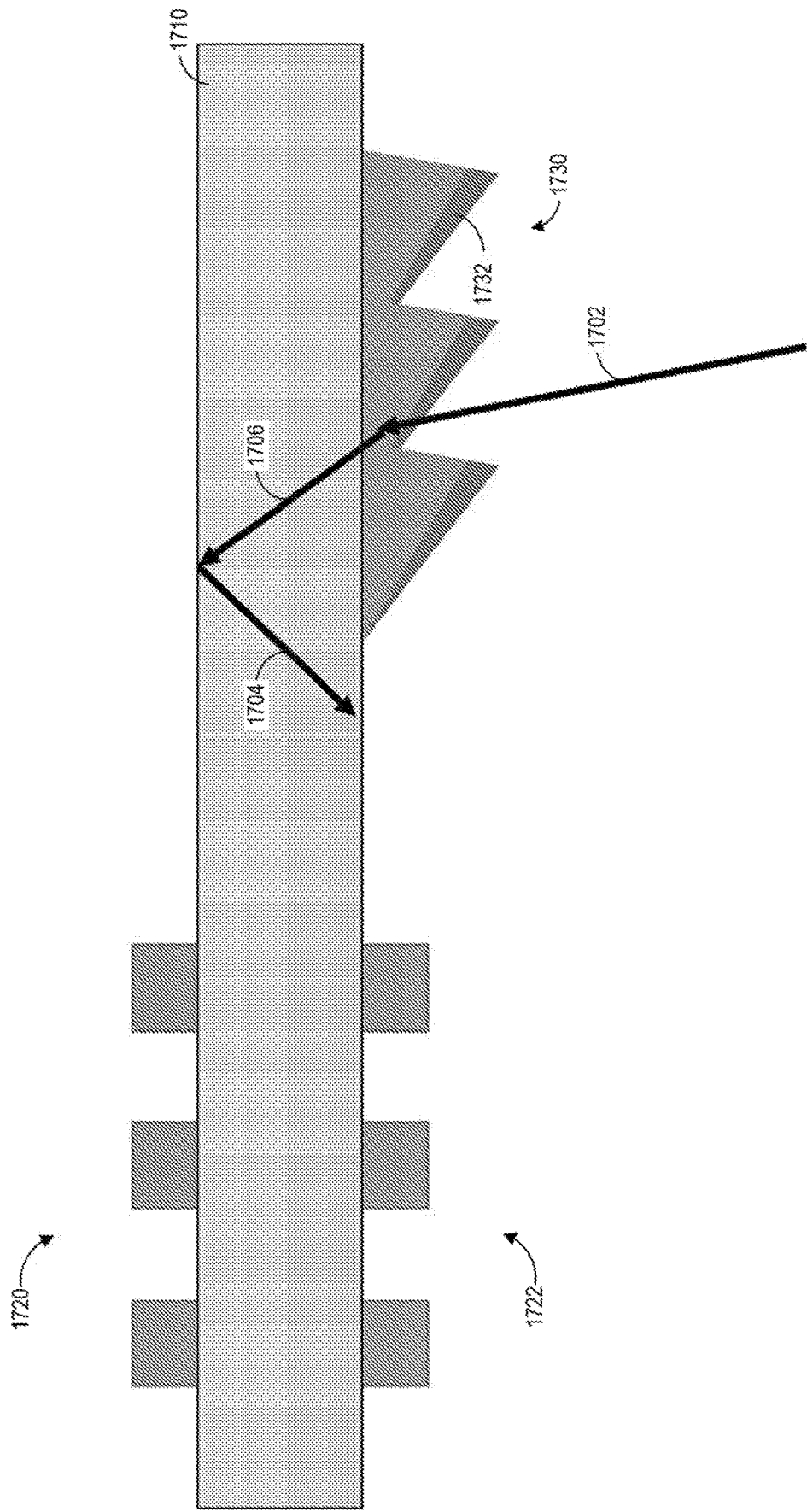
FIG. 17C illustrates another example waveguide including a diffractive optical element, such as a diffraction grating, that forms an in-coupling optical elements that couples both TE and TM in the waveguide with high efficiency.

FIG. 17C illustrates another example waveguide configured to increase efficiency of coupling light therein. The waveguide includes at least one reduced polarization sensitivity diffraction grating that may act as an in-coupling optical element. For example, as illustrated, a waveguide 1710 may include at least one in-coupling grating (ICG) 1730 and out-coupling gratings 1720, 1722. The gratings 1720, 1722 may comprises a pupil expander-extractor (CPE) regions, which operates both as a light distributing element and an out-coupling grating. Light 1702, for example, from a projector comprising one or more light sources (e.g., microLEDs, lasers, LEDs) may be injected into one side of the waveguide 1710 through a transmissive ICG 1730 comprising e.g., a transmissive diffractive grating that diffracts at least a portion of light transmitted therethrough. The transmissive ICG 1730 may let the light 1702 pass through that grating into the waveguide 1710 and diffract the light 1706 as is propagates through the grating. The transmissive ICG 1730 may be configured to have both a high TM and a high TE diffraction efficiency. The grating 1730 may be designed to diffract the light incident thereon within a range of angles into an direction or range of angles that is totally internally reflected within the waveguide Accordingly, the light 1706 may be guided or propagated along the waveguide 1710 towards the one or more pupil expander-extractor gratings 1720, 1722. Advantageously, the inclusion of the transmissive ICG 1730 can help with image uniformity and/or eye box efficiency, depending on the source light (for example, LED, lasers, polarized, or unpolarized light).

The transmissive ICG 1730 may comprise a diffraction grating. The diffraction grating of the transmissive ICG 1730 may be formed in a layer on the waveguide or substrate or in the waveguide or substrate itself, for example, on a surface thereof. The diffraction grating may have diffractive features, such as described above with reference to FIGS. 12A-12B and FIGS. 13A-13J. For example, the diffraction features of the diffraction grating may have various dimensions and geometric forms. For example, a geometric form of diffractive features can be symmetric with straight sidewalls, sloped sidewalls, re-entrant or concave sidewalls, multi-step sidewalls, other type of sidewalls, or some combination thereof. In another example, the geometric form can be asymmetric with at least one straight sidewall, sloped sidewall, re-entrant or concave sidewall, multi-step sidewall, other type of sidewall, or some combination thereof. Examples of re-entrant or shark fin shaped sidewall can be found in FIG. 13A (e.g., second row, third column) as well as in the third row of FIG. 14. Regardless of whether the diffraction features are asymmetric or symmetric, in some implementations, a plateau or flat portion may be located at the top of the features (e.g. at the peak). A grating may have a height of 100 nm to 600 nm or greater or less height than defined by that range. As described herein the height may be from 100 to 200 nm, 200-300 nm, 205-310 nm, 210-310 nm, 250-350 nm, 300-400 nm, 400-500 nm, 500-600 nm, or any range formed by any of these values as well as may be outside these ranges. A grating may have a pitch of 290 nm to 690 nm or greater or less pitch than defined by that range. If the grating is a blazed grating, the grating may have, for example, a blaze angle of about 20 to 85 degrees and an anti-blaze angle of, for example, about 70 to 150 degrees or any value in a range defined by these values, measured in the same angular direction. As described above, these angles may represent interior angles measured from the base of the diffraction grating to the corresponding sidewall or surface. Values outside these any of these ranges are also possible.

Light received from a projector (e.g., comprising micro-LEDs), such as an image projector, may be diffracted by the one or more gratings 1730 and directed at an angle or range of angles such that this light or at least a portion thereof is guided within the waveguide by total internal reflection toward the pupil expander-extractor gratings. The geometry, for example, the asymmetry or blaze of the diffractive feature may cause light to be preferentially directed, for example, toward pupil expander-extractor gratings. The pupil expander-extractor gratings may be configured to out-couple the light from the waveguide to the user or wearer's eye. The pupil expander-extractor gratings may additionally increase the area (in two dimensions) over which the light exits the waveguides. In this manner, the pupil expander-extractor gratings may potentially increase the eye box in some implementations. In various implementations, the projector outputs unpolarized or circularly polarized light and directs this unpolarized or circularly light to the ICGs for input into the waveguide. Some examples of such projects the output unpolarized or circularly light to form images may include for example micro-LED projectors, digital light projectors (DLP), and liquid crystal on silicon (LCOS) based projectors, although others are possible.

The transmissive ICG 1730 can include a high index grating configured to be efficient in both TM and TE. For example, the ICG 1730 can have an improved ICG profile and/or material composition to get polarization insensitive and efficient diffraction of light over a range of input angles of light. For example, an ICG 1730 may have a diffraction efficiency in the range of 40 to 90 percent (e.g. 50% to 60%, 60% to 70%, 70% to 80%, 80% to 90% or any range between any of these values) or more for the TE mode and 40 to 90 percent (e.g. 50 to 60%, 60 to 70%, 70 to 80%, 80 to 90% or any range between any of these values) or more for the TM mode. In some examples, the ICG 1730 may have a similar efficiency in TE mode and TM mode. For example, the ICG 1730 may have a TM mode efficiency within 5%, 10%, 20%, 25%, 30%, of TE mode efficiency (or in any range between any of these values). Or the ICG 1730 may have a TE mode diffraction efficiency within 5%, 10%, 20%, 25%, 30%, of TM mode efficiency (or in any range between any of these values). Accordingly, in various implementations, the different in diffraction efficiency of the diffraction efficiency for the TE and TM modes may be 5%, 10%, 20%, 25%, 30%, of TE mode efficiency (or in any range between any of these values). Other examples are also possible. These efficiencies may be average efficiencies over a range of angles (e.g., 5 degrees, 10 degrees, 20 degrees, 30 degrees, 40 degrees, 50 degrees or any range between any of these values). Similarly, these efficiencies may be an possibly averaged over wavelengths, e.g., of visible spectrum light or the wavelength or wavelengths for specific colors, e.g., red, blue or green. For example, the wavelength output by the light sources in the project which may include multiple colored light sources may be considered. As described above, the diffraction may be in a certain diffraction mode or modes such as the first order mode such as the +1 and/or −1 diffractive order.

FIGS. 17D-1 to 17D-4 illustrates example slanted ICG profiles and compositions and corresponding polarization efficiency graphs that may be used to achieve polarization insensitivity in an in-coupling grating, such as ICG 1730 illustrated in FIG. 17C. For example, grating 1742 may generate a TM and TE efficiency profile shown in graph 1741, grating 1744 may generate a TM and TE efficiency profile shown in graph 1743, grating 1746 may generate a TM and TE efficiency profile 1745, and grating 1748 may generate a TM and TE efficiency profile 1747.

Grating 1742 illustrated in FIG. 17D-1 may include a grating having slanted diffraction features with a slant angle of θ. The slant angle may include, an angle between 20 and 85 degrees or another angle. These angles may represent interior angles measured from the base of the diffraction grating to the corresponding sidewall or surface. In some examples, a duty cycle 1762A of the grating 1742 may be a percent of the pitch of the grating. For example, the duty cycle may be between 20 and 80 percent of the pitch, for example 50 percent of the pitch. A height 1764A of the grating may be, for example, a height of 100 to 600 nm (e.g., 100 to 200, 200 to 300, 300 to 400, 400 to 500, 500 to 600 nanometers or any range between any of these values). Accordingly, the height may be greater than 200 nm, 205 nm, 300 nm, 400 nm, 500 nm, 600 nm or larger, such as greater than 700 nm or 800 nm or in any range formed by any of these values. In some examples, a grating 1742 may be disposed on a layer on a waveguide or substrate or in part of a waveguide or substrate itself (e.g. etched in the surface of the substrate). In some examples, a substrate may be a material having an index of less than 1.9, such as an index in a range between 1.65 to 1.75. Likewise, the index of the substrate may be from 1.4 to 1.5, from 1.5 to 1.6, from 1.6 to 1.7, from 1.7 to 1.8, and/or from 1.8 to less than 1.9, or in any range formed by any of these values, in certain implementations. In some examples, grating features may comprise a material similar to or the same index as the substrate or waveguide. In the illustrated example, grating 1742 comprises diffractive features having an index of 1.75 on a substrate having an index of 1.75. The material used to form the diffraction features and comprising the substrate may be the same or different. The diffractive feature may be etched into the substrate or a layer of material having same or different (e.g., higher or lower) refractive index may be used for the diffractive features. For example, the substrate may have a lower refractive index than the material forming the diffractive features. In some cases, for example that substrate has an index of refraction less than 1.9 while the diffractive feature have an index of refraction larger than 1.9 or larger than 2.0 or 2.1, or 2.2 or 2.4 or 2.6 or 2.7, for example, or in any range formed by any of these values. Values outside these ranges are also possible. In some examples, the grating 1742 may be generated using a high index resist and a contact imprint or by depositing high index material and etching into the layer of material.

The TM and TE diffraction efficiency profiles (1750, 1752 respectively) associated with a grating 1742, may approximately match over a range of angles of incidence and/or may be more efficient in TE and more efficient in TM at points within a range of the angles of incidence, such as illustrated in graph 1743. In some examples, the average diffraction efficiency may be from 40% to 60% or 0.4 to 0.6 or may be at least 0.45, or 0.5, or 0.6 or 0.7 or 0.8 or 0.9 or 0.95 or 0.99 (e.g., have an average efficiency of at least 45%, 50%, 55%, 60%, 65%, 70% 80%, 90%, 95% or 99% or in any range formed by any of these values) over a range of angles of incidence such as between −10 degrees and 10 degrees or over wider or smaller ranges (e.g., at least 6 degrees, at least 10 degrees, 20 degrees, 25 degree, 30 degree, 35 degrees, 40 degrees or any range between any of these values). In some examples, the diffraction efficiencies are on average at least 0.4 (or at least 0.45 or at least 0.50, or at least 0.55, or at least 0.6 or at least 0.65 or at least 0.7 or at least 0.8 or at least 0.9) for a range of angles of incident light of at least 30 degrees or other angular ranges (e.g., at least 3 degrees, at least 6 degrees, at least 10 degrees, at least 12 degrees, at least 18 degrees, at least 20 degrees, 25 degree, 30 degree, 35 degrees, 40 degrees or any range between any of these values). In some examples, the diffraction efficiencies are on average at least 0.4 or 0.5 or 0.6 or 0.7 or 0.8 or 0.9 for a range of angles of incident light of at least 20 degrees. In some examples, the diffraction efficiencies are on average at least 0.4 or 0.5 or 0.6 or 0.7 or 0.8 or 0.9 for a range of angles of incident light of at least 10 degrees. In some examples, the diffraction efficiencies are at least 0.4 or 0.5 or 0.6 or 0.7 or 0.8 for a range of angles of incident light of at least 30 degrees. In some examples, the diffraction efficiencies are at least 0.4 or 0.5 or 0.6 or 0.7 or 0.8 for a range of angles of incident light of at least 20 degrees. In some examples, the diffraction efficiencies are at least 0.4 or 0.5 or 0.6 or 0.7 or 0.8 for a range of angles of incident light of at least 10 degrees. The diffraction efficiencies may be in any range between any of these values for any of these angular ranges or possibly for other larger angular ranges as well. Similarly, as described above, the average diffraction efficiencies over the range of wavelengths may be within 30%, 25%, 20%, 15%, 10%, 5%, 2.5%, 1% or in any range formed by any of these values for a range of angles such as 3°, 6°, 12°, 18°, 20°, 25°, 30°, 35°, 40° or any range formed by any of these values. The diffraction efficiency may be higher for the TE mode in some designs or may be higher for the TM mode in some designs. In some designs, the diffraction efficiency may be higher at some angles for the TE mode and at other angles for the TM mode.

Average diffraction efficiency may be increased using a higher index material (for example, a material having an index greater than 2), such as illustrated in grating 1744 of FIG. 17D-2. Grating 1744 includes a slanted grating with geometry and features similar to those described with reference to FIG. 17D-1, but with diffractive features comprising a higher index material 1766, such as a 2.2 index material, such as TiO2, or 2.6 index material, such as SiC. The resulting TM and TE efficiency profiles (1750, 1752 respectively), may approximately match (e.g., within 30%, 20%, 15%, 10%, 8%, 5% etc.) over a range of angles of incidence and/or may be more efficient in TE and more efficient in TM at points within a range of the angles of incidence, such as illustrated in graph 1745 (or vice versa). In some examples, an average diffraction efficiency may have a peak between approximately 80% and 100% or 0.8 and 0.1 over a range of angles of incidence between −10 degrees and 10 degrees. In some examples, the average diffraction efficiencies are on average at least 0.5 or 0.6, or 0.7 or 0.8 or 0.9 or 0.95 or any range formed by any of these values for a range of angles of incident light of at least 10, 20, 30, 40, 50, or 60 degrees or any range formed by any of these values. In some examples, the diffraction efficiencies are on average at least 0.5 or 0.6, or 0.7 or 0.8 or 0.9 or 0.95 or any range formed by any of these values for a range of angles of incident light of at least 40 degrees. In some examples, the diffraction efficiencies are on average at least 0.5 or 0.6, or 0.7 or 0.8 or 0.9 or 0.95 or any range formed by any of these values for a range of angles of incident light of at least 30 degrees. In some examples, the diffraction efficiencies are on average at least 0.5 or 0.6, or 0.7 or 0.8 or 0.9 or 0.95 or any range formed by any of these values for a range of angles of incident light of at least 20 degrees. In some examples, the diffraction efficiencies are on average at least 0.5 or 0.6, or 0.7 or 0.8 or 0.9 or 0.95 or any range formed by any of these values for a range of angles of incident light of at least 10 degrees. In some examples, the diffraction efficiencies are at least 0.5 or 0.6, or 0.7 or 0.8 or 0.9 or 0.95 or any range formed by any of these values for a range of angles of incident light of at least 30 degrees. In some examples, the diffraction efficiencies are at least 0.5 or 0.6, or 0.7 or 0.8 or 0.9 or 0.95 or any range formed by any of these values for a range of angles of incident light of at least 20 degrees. In some examples, the diffraction efficiencies are at least 0.5 or 0.6, or 0.7 or 0.8 or 0.9 or 0.95 or any range formed by any of these values for a range of angles of incident light of at least 10 degrees.

Similar to grating 1742, the grating 1744 as illustrated in FIG. 17D-2 may include a grating having slanted diffraction features with a slant angle of θ. The slant angle may include, an angle between 20 and 85 degrees or another angle. One side or side wall is a reentrant sidewall and the cross-section has a shark fin shaped. Although the cross section is in the shape of a tilled parallelogram, other shapes are possible. In some examples, the duty cycle 1762B of the grating 1744 may be a percent of the pitch of the grating. For example, the duty cycle may be between 20 and 80 percent of the pitch, for example 50 percent of the pitch. A height 1764B of the grating may be, for example, a height of 100 to 600 nm (e.g., 100 to 300, 200 to 400, 300 to 500, 400 to 600 nanometers or any range between any of these values). In various implementations the height or depth is larger than 200 nm, 205 nm, 210 nm, 250 nm, 300 nm, 400 nm, 500 nm, 600 nm, 700 nm or any range between any of these values or outside these ranges as well, In some examples, a grating 1744 may be disposed on a layer on a waveguide or substrate or be part of or embedded in a waveguide or substrate itself for example by etching into the substrate. In some examples, a substrate may comprise a material having an index of less than 2, or less than 1.9 such as an index of 1.75. In some examples, grating features may comprise a material with an index of refraction greater than the index of the substrate or waveguide. In the illustrated example, grating 1744 comprises diffractive features having an index of 2.2 on a substrate having an index of 1.75. Values outside these ranges are also possible. In some examples, the grating 1744 may be generated using a high index resist and a contact imprint. In some examples, the grating 1744 may be generated using slanted etching such as angled directional etching. Materials that preferentially etch in certain directions may also be employed. Some example methods of etching are described in connection with FIG. 13H-13J. Other methods may be employed. FIG. 13H, for example, shows a method of fabricating blazed (asymmetric) diffractive features (3803) having a sawtooth shaped pattern having first and second sloping sidewalls that slope in opposite directions. FIG. 13I, for example, shows a method of fabricating blazed (asymmetric) diffractive features (3853) having a "shark fin" shaped cross-section having first and second sloping sidewalls that slope in the same direction. The second sidewall in FIG. 13I is an example of a reentrant sidewall or surface. FIGS. 17D-1 through 17D-4 also show first and second sloping sidewalls that slope in the same direction and have a second sidewall that is a re-entrant sidewall or surface. Other types of gratings with other material compositions having other indices are also possible.

However, contact imprint as a mode of manufacture can be advantageous over etching due to improved efficiency and eased manufacturing. Thus, it may be desirable to use a material that is suitable for use with a contact imprint technique to generate the ICG. For example, gratings 1746 and 1748 include an ICG profile with an index of 1.65.

Grating 1746 includes a slanted grating with a material having an index of less than 2, or less than 1.9 or 1.8, for example 1.65, and a coating deposited on an edge of the grating with a material having an index greater than 1.9 or greater than 2, such as a material with an index of 2.2, such as TiO2, or a material with an index of 2.6, such as SiC. The resulting TM and TE efficiency profiles (1750, 1752 respectively), are close or approximately match over a range of angles of incidence and/or may be more efficient in TE and more efficient in TM at points or on average within a range of the angles of incidence, such as illustrated in graph 1745. In some examples, an average polarization efficiency may have a peak between approximately 80% and 100% or 0.8 and 0.1 over a range of angles of incidence between −10 degrees and 10 degrees. In some examples, the diffraction efficiencies are on average at least 0.8 for a range of angles of incident light of at least 30 degrees. In some examples, the diffraction efficiencies are on average at least 0.8 for a range of angles of incident light of at least 20 degrees. In some examples, the diffraction efficiencies are on average at least 0.8 for a range of angles of incident light of at least 10 degrees. In some examples, the diffraction efficiencies are at least 0.8 for a range of angles of incident light of at least 30 degrees. In some examples, the diffraction efficiencies are at least 0.8 for a range of angles of incident light of at least 20 degrees. In some examples, the diffraction efficiencies are at least 0.8 for a range of angles of incident light of at least 10 degrees.

In some examples, the average diffraction efficiencies are on average at least 0.5 or 0.6, or 0.7 or 0.8 or 0.9 or 0.95 or any range formed by any of these values for a range of angles of incident light of at least 3, 6, 10, 12, 18, 20, 30, 40, 50, or 60 degrees or any range formed by any of these values. In some examples, the diffraction efficiencies are on average at least 0.5 or 0.6, or 0.7 or 0.8 or 0.9 or 0.95 or any range formed by any of these values for a range of angles of incident light of at least 40 degrees. In some examples, the diffraction efficiencies are on average at least 0.5 or 0.6, or 0.7 or 0.8 or 0.9 or 0.95 or any range formed by any of these values for a range of angles of incident light of at least 30 degrees. In some examples, the diffraction efficiencies are on average at least 0.5 or 0.6, or 0.7 or 0.8 or 0.9 or 0.95 or any range formed by any of these values for a range of angles of incident light of at least 20 degrees. In some examples, the diffraction efficiencies are on average at least 0.5 or 0.6, or 0.7 or 0.8 or 0.9 or 0.95 or any range formed by any of these values for a range of angles of incident light of at least 10 degrees. In some examples, the diffraction efficiencies are at least 0.5 or 0.6, or 0.7 or 0.8 or 0.9 or 0.95 or any range formed by any of these values for a range of angles of incident light of at least 30 degrees. In some examples, the diffraction efficiencies are at least 0.5 or 0.6, or 0.7 or 0.8 or 0.9 or 0.95 or any range formed by any of these values for a range of angles of incident light of at least 20 degrees. In some examples, the diffraction efficiencies are at least 0.5 or 0.6, or 0.7 or 0.8 or 0.9 or 0.95 or any range formed by any of these values for a range of angles of incident light of at least 10 degrees.

Grating 1748 also includes a blazed grating having an index of less than 2 or less than 1.9 or 1.8, for example 1.65, and a coating deposited on an edge of the grating with a material having an index greater than 1.9 or 2, such as a material with an index of 2.2, such as TiO2, or a material with an index of 2.6, such as SiC. The resulting TM and TE efficiency profiles (1750, 1752 respectively), are close or approximately match over a range of angles of incidence and/or may be more efficient in TE and more efficient in TM at points within a range of the angles of incidence, such as illustrated in graph 1747. In some examples, an average polarization efficiency may have a peak between approximately 80% and 100% or 0.8 and 0.1 over a range of angles of incidence between −10 degrees and 10 degrees. In some examples, the diffraction efficiencies are on average at least 0.8 for a range of angles of incident light of at least 30 degrees. In some examples, the diffraction efficiencies are on average at least 0.8 for a range of angles of incident light of at least 20 degrees. In some examples, the diffraction efficiencies are on average at least 0.8 for a range of angles of incident light of at least 10 degrees. In some examples, the diffraction efficiencies are at least 0.8 for a range of angles of incident light of at least 30 degrees. In some examples, the diffraction efficiencies are at least 0.8 for a range of angles of incident light of at least 20 degrees. In some examples, the diffraction efficiencies are at least 0.8 for a range of angles of incident light of at least 10 degrees.

In some examples, the average diffraction efficiencies are on average at least 0.5 or 0.6, or 0.7 or 0.8 or 0.9 or 0.95 or any range formed by any of these values for a range of angles of incident light of at least 3, 6, 10, 12, 18, 20, 30, 40, 50, or 60 degrees or any range formed by any of these values. In some examples, the diffraction efficiencies are on average at least 0.5 or 0.6, or 0.7 or 0.8 or 0.9 or 0.95 or any range formed by any of these values for a range of angles of incident light of at least 40 degrees. In some examples, the diffraction efficiencies are on average at least 0.5 or 0.6, or 0.7 or 0.8 or 0.9 or 0.95 or any range formed by any of these values for a range of angles of incident light of at least 30 degrees. In some examples, the diffraction efficiencies are on average at least 0.5 or 0.6, or 0.7 or 0.8 or 0.9 or 0.95 or any range formed by any of these values for a range of angles of incident light of at least 20 degrees. In some examples, the diffraction efficiencies are on average at least 0.5 or 0.6, or 0.7 or 0.8 or 0.9 or 0.95 or any range formed by any of these values for a range of angles of incident light of at least 10 degrees. In some examples, the diffraction efficiencies are at least 0.5 or 0.6, or 0.7 or 0.8 or 0.9 or 0.95 or any range formed by any of these values for a range of angles of incident light of at least 30 degrees. In some examples, the diffraction efficiencies are at least 0.5 or 0.6, or 0.7 or 0.8 or 0.9 or 0.95 or any range formed by any of these values for a range of angles of incident light of at least 20 degrees. In some examples, the diffraction efficiencies are at least 0.5 or 0.6, or 0.7 or 0.8 or 0.9 or 0.95 or any range formed by any of these values for a range of angles of incident light of at least 10 degrees.

Additionally, as described above, the average diffraction efficiencies over the range of wavelengths may be within 30%, 25%, 20%, 15%, 10%, 5%, 2.5%, 1% or in any range formed by any of these values for a range of angles such as 3°, 6°, 12°, 18°, 20°, 25°, 30°, 35°, 40° or any range formed by any of these values. The diffraction efficiency may be higher for the TE mode in some designs or may be higher for the TM mode in some designs. In some designs, the diffraction efficiency may be higher at some angles for the TE mode and at other angles for the TM mode. An ICG, such as grating 1746 or grating 1748, as illustrated in FIGS. 17D-3 and 17D-4 may include a slanted or shark fin grating, blazed grating, or other geometry. Where a grating is a slanted grating, such as grating 1746, a grating may have a slant angle that may include, but is not limited to, an angle between 20 and 70 degrees or another angle. Where a grating is a blazed grating, such as grating 1748, a grating may have blaze angles of about 20 to 85 degrees (shallow size) and anti-blaze angles (steep side) of 70 to 150 degrees or any value in a range defined by these values, measured in the same angular direction. These angles may represent interior angles measured from the base of the diffraction grating to the corresponding sidewall or surface.

Also as described above a variety of methods may be employed to fabricate the diffractive feature. In some implementations, imprinting may be cost-effectively employed to form the diffractive features, possibly from a layer of polymer disposed on the substrate. An imprint template may contact the polymer layer, which in some cases may be cured with UV and/or thermal curing. Some example methods of etching are also described in connection with FIG. 13H-13J.

Additionally, high index material deposited on the diffractive grating features may be biased e.g., using glazing incidence deposition, to provide more of the material on one side of the diffractive grating features than the other side. Accordingly, the thickness and/or coverage may be larger on a first sidewall on one side of the diffractive feature than on a second sidewall on the opposite side of the diffractive features. In some implementations, there is possibly little coverage on one side wall. For example, 90% or 95% of the second sidewall may not be covered. In some cases deposition (e.g., directional deposition) on a tilted diffractive feature may result in such biasing as more coverage or thicker coverage is provided on a first sidewall or side of the diffractive feature while less is deposited on the second sidewall or side of the diffractive feature. In some cases, the topography of the underlying diffractive feature may facilitate passive biased deposition as illustrated in FIG. 14, e.g., third row, second and third columns. Directional etch, possibly straight or angled, when used to deposit material on a diffractive feature having a re-entrant surface or sidewall (left sidewall in diffractive features shown in row three of FIG. 14) may result in less coverage on the re-entrant sidewall or surface.

In reference to grating 1746, a duty cycle 1778 of the grating 1746 may be a percent of the pitch of the grating. For example, the duty cycle may be between 20 and 80 percent of the pitch, for example 50 percent of the pitch. A height 1774 of the grating may be, for example, a height of 10 to 600 nm. In some examples, a grating 1746 may be disposed on a substrate on a waveguide or part of a waveguide itself. In some examples, a substrate may be a material having an index of 1.75. In some examples, grating features may comprise a material with an index of refraction different than the index of the substrate or waveguide. In the illustrated example, grating 1746 comprises diffractive features 1770 having an index of 1.65 on a substrate having an index of 1.75. Values outside these ranges are also possible. In some examples, a material 1772 may be deposited onto the diffractive features 1770. The material 1772 may be of a higher index of refraction than the diffractive features 1770. For example, the material 1772 may have an index of refraction of 2.2. Other values are also possible. A thickness 1776 of the material 1772 may be about 10 to 600 nm or another value.

In reference to grating 1748, a width at the top (WT) of the blazed grating feature 1780 may be larger than the width at the base (WB) of the blazed grating 1784. In some examples, WT may be varied and may be zero. In some examples, WB may be varied. For examples, WB may be of sufficient width to allow for at least partial filling of the bottom width by a high index coating. For example, a WB may be of sufficient width to allow more than 50% of the width to be filled by the high index coating. In some examples, the high index coating may be applied with a biased deposition such that the coating is preferentially deposited on a first sidewall over a second sidewall (e.g., reentrant sidewall, vertical sidewall or even sloping sidewall). Advantageously, in some cases this biased deposition may improve overall average TM and TE efficiency.

A height 1782 of the grating may be, for example, a height of 100 to 600 nm. In some examples, a grating 1748 may be disposed on a substrate on a waveguide or part of a waveguide itself. In some examples, a substrate may be a material having an index of 1.75. In some examples, grating features may comprise a material with an index of refraction different than the index of the substrate or waveguide. In the illustrated example, grating 1746 comprises diffractive features 1770 having an index of 1.65 on a substrate having an index of 1.75. Values outside these ranges are also possible. In some examples, a material 1772 may be deposited onto the diffractive features 1770. The material 1772 may be of a higher index of refraction than the diffractive features 1770. For example, the material 1772 may have an index of refraction of 2.2. Other values are also possible. A thickness 1786 of the material 1772 may be about 100 to 600 nm or another value. Other values outside these ranges are also possible.

As discussed above, in some examples, the grating 1744 may be generated using a high index resist and a contact imprint. In some examples, the grating 1744 may be generated using slanted etching. Other types of gratings with other material compositions having other indices are also possible.

Advantageously, a grating, such as a blazed grating with an index coating of 2.2, such as discussed with reference to grating 1748, may have improved average diffraction efficiency, and polarization insensitivity, and possibly a higher manufacturability than other designs. Advantageously, an ICG, such as described with reference to FIGS. 17C and 17D-3 to 17D-4, can be used with a unpolarized light source (e.g., microLED source) in transmissive mode and in an in-line fashion in a waveguide stack, such as described above with reference to FIG. 6. This ability may allow an eyepiece utilizing the ICG to have an increased brightness and/or field of view. For example, more than one color of incoming light may interact with each ICG in each waveguide color in the stack, which may be advantageous over conventional ICGs with high TM efficiency, which are opaque and highly reflective and thus may be spatially offset to allow for incoming light to pass through to each waveguide.

Similar to the waveguide show in FIGS. 17A and 17B, a pair of in-line (aligned) ICGs or diffraction gratings having increased polarization insensitivity may be included on opposite sides of the waveguides. One of the ICGs may be a transmissive grating and the other ICG may be a reflective ICG. Accordingly, light from an image projector may be directed toward the transmissive ICG on a proximal surface of the waveguide. At least a portion of this light will be diffracted by the transmissive ICG and be turned into the waveguide at angles such that light is guided within the waveguide by total internal reflection. This light may be, for example, in the first diffractive order. Other light not diffracted, for example, in the zeroth order, may continue onward and be incident on the reflective ICG aligned with the transmissive ICG. At least some of this light incident on the reflective ICG may be diffracted and thereby coupled into the waveguide and guided therein by total internal reflection. Once again, in some implementations this diffracted light corresponds to the first diffractive order of the reflective diffraction grating. In some implementations a transmissive diffraction grating or ICG such as shown in FIG. 17D-1, 17D-2, 17D-3, 17D-4, for example, may be used. As discussed, such a grating may have reduced polarization sensitivity and increased diffraction efficiency for both the TE and TM modes. Similarly, light not diffracted by the transmissive grating may be incident on the reflective ICG and diffracted into the waveguide at angles such that a least a portion of this light is guided within the waveguide by total internal reflection. In some implementations, a reflection diffraction grating or ICG such as shown in FIG. 11B, for example, may be used. As discussed, such a grating may have reduced polarization sensitivity and increased diffraction efficiency for both the TE and TM modes. Such an arrangement of inline (or aligned) diffraction gratings or ICGs may increase efficiency of the coupling of light, such as unpolarized light, from the projector into the waveguide and eyepiece and thus possible provide increased brightness to the viewer. Additionally, the use of two ICGs may assist in reducing brightness and color non-uniformities.

Figure 18:
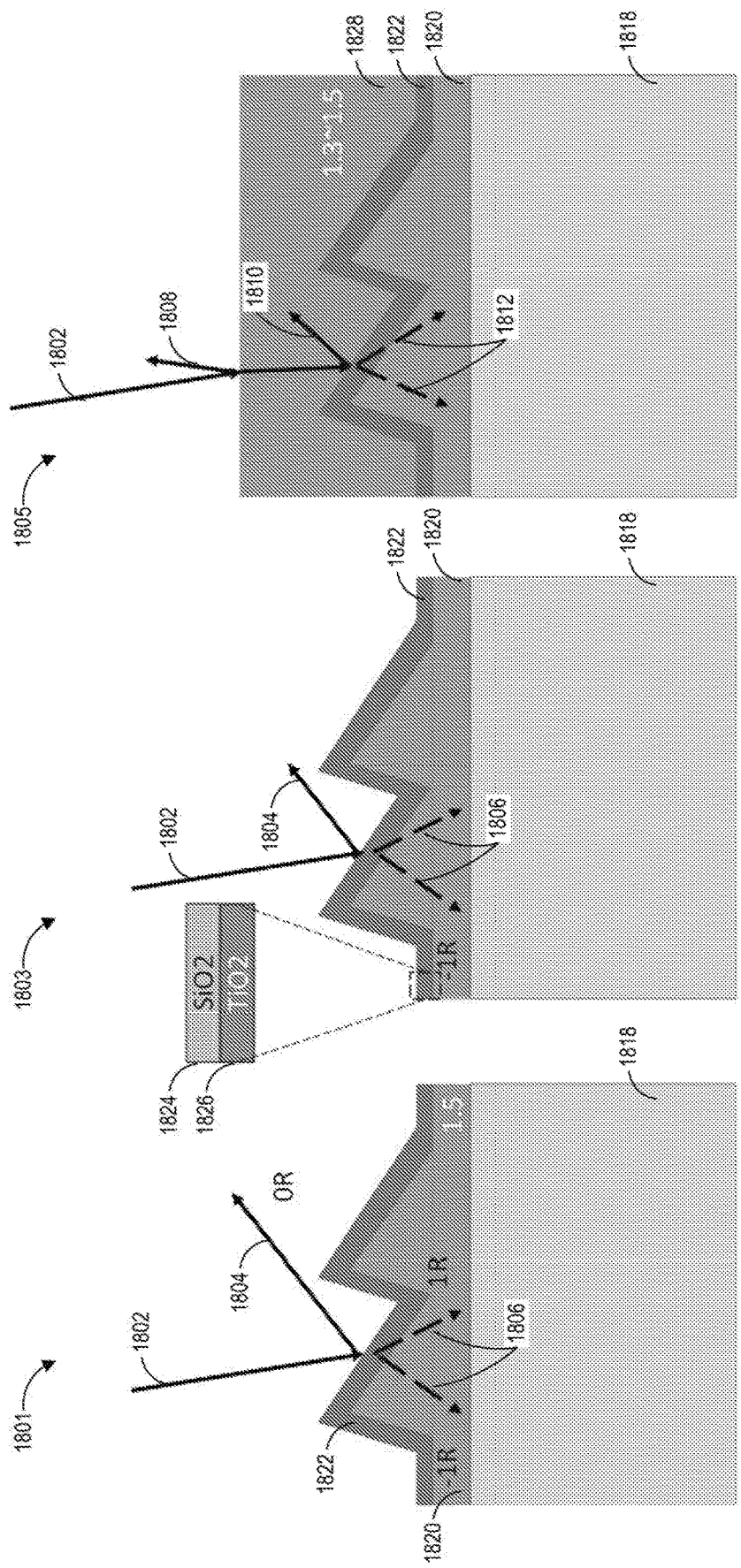
FIG. 18 illustrates example diffractive features that may reduce reflection loss.

FIG. 18 illustrates how a transmissive ICG, such as the transmissive ICG 1714 discussed with reference to FIGS. 17A and 17B, can be configured to reduce reflection thereby also possibly increasing the brightness of light output by the waveguide to the user/viewer. For example, as illustrated in FIG. 18, a transmissive ICG 1801 can receive light 1802 through a side of the ICG 1801 exposed to air. Zeroth order reflection of light 1804 may occur off of the grating 1801, resulting in unwanted reflection loss of light 1802 passing through the one or more transmissive layers 1822, diffracting into the ICG 1820, and entering into the waveguide 1818.

Reflection loss could be reduced in the first ICG 1714 if the transmissive layer 1822 comprises one or more sublayers 1824, 1826 such as discussed above. For example, as illustrated in FIG. 18, a transmissive ICG 1803 can include a transmissive layer 1822 with one or more sublayers. The one or more sublayers can include one or more high index sublayers 1826, such as $TiO_2$, and one or more low index sublayers 1824, such as $SiO_2$. In such a configuration, zeroth order reflected light 1804 may be reduced. As discussed above, in some implementations, the sublayers 1824, 1826 or additional sublayers may comprise an interference coating, such as a quarter wave stack. In some examples, the configuration may also reduce the first diffractive orders of light 1806 within the ICG 1803. However, the reduction of reflection loss going into the ICG through the substrate and toward the second ICG can improve image quality by, for example, increased eye box efficiency and a reduction in artifacts, such as ghosting in waveguide stacks or coherent artifacts.

Additionally or alternatively, reflection loss could be reduced by including a material 1828 that has an index of refraction between that of air and the one or more transmissive layers 1822 of the first ICG 1714. For example, as illustrated in FIG. 18, a transmissive ICG 1805 can include a material 1828 having an index similar to that of the base pattern 1820 of the ICG. For example, the material 1828 may have an index in the range of 1.3 to 1.5. The material 1828 can help reduce the zeroth order reflection 1808. In some examples, the configuration may also reduce the first diffractive orders of light 1806 within the ICG 1803. However, the overall reducing in reflection loss may improve image quality by, for example, increased eye box efficiency and a reduction in artifacts, such as ghosting in waveguide stacks or coherent artifacts.

B. ADDITIONAL EXAMPLES

Additional Examples—Part I

Example 1: A head-mounted display system comprising:
a head-mountable frame;
a light projection system configured to output light to provide image content;
a waveguide supported by the frame, the waveguide comprising a substrate configured to guide at least a portion of the light from said light projection system coupled into said waveguide;
a first diffraction grating comprising material different than said substrate over said substrate;
a first layer disposed over said first diffraction grating; and
a second layer comprising metal disposed over said first diffraction grating such that said diffraction grating has a first diffraction efficiency for a first polarization over a range of angles of light incident thereon and a second diffraction efficiency for a second polarization over the range of angles of light incident thereon, the first diffraction efficiency being from 1 to 2 times the second diffraction efficiency.

Example 2: The head-mounted display system of Example 1, wherein the substrate comprises a lithium-based oxide.

Example 3: The head-mounted display system of Example 1 or 2, wherein the substrate comprises lithium niobate.

Example 4: The head-mounted display system of Example 1, wherein the substrate comprises silicon carbide.

Example 5: The head-mounted display system of Example 1, wherein the substrate comprises material having an index of refraction of at least 1.9.

Example 6: The head-mounted display system of Example 1, wherein the substrate comprises material having an index of refraction of at least 2.0.

Example 7: The head-mounted display system of Example 1, wherein the substrate comprises material having an index of refraction of at least 2.1.

Example 8: The head-mounted display system of Example 1, wherein the substrate comprises material having an index of refraction of at least 2.2.

Example 9: The head-mounted display system of Example 1, wherein the substrate comprises material having an index of refraction of at least 2.3.

Example 10: The head-mounted display system of any of the Examples above, wherein the first diffraction grating material comprises polymer.

Example 11: The head-mounted display system of any of the Examples above, wherein the first diffraction grating material comprises imprintable material.

Example 12: The head-mounted display system of any of the Examples above, wherein the first diffraction grating material has a refractive index of 1.4 to 1.95.

Example 13: The head-mounted display system of any of the Examples above, wherein the first diffraction grating material has a refractive index that is lower than said substrate.

Example 14: The head-mounted display system of any of the Examples above, wherein said first diffraction grating comprises a blazed diffractive grating.

Example 15: The head-mounted display system of any of the Examples above, wherein said first diffraction grating comprises diffractive features comprising peaks spaced apart by grooves therebetween.

Example 16: The head-mounted display system of any of the Examples above, wherein the said first diffraction grating comprises diffractive features comprising a plurality of straight lines.

Example 17: The waveguide of any of the Examples above, wherein said diffractive grating comprises diffractive features that are asymmetric.

Example 18: The head-mounted display system of any of the Examples above, wherein the first layer comprises titanium dioxide ($TiO_2$), zirconium dioxide ($ZrO_2$) or silicon carbide (SiC).

Example 19: The head-mounted display system of any of the Examples above, wherein the first layer comprises titanium dioxide ($TiO_2$).

Example 20: The head-mounted display system of any of the Examples above, wherein the first layer comprises zirconium dioxide ($ZrO_2$).

Example 21: The head-mounted display system of any of the Examples above, wherein the first layer comprises silicon carbide (SiC).

Example 22: The head-mounted display system of any of the Examples above, wherein the first layer comprises a plurality of sublayers comprising a first higher index material and a second lower index material.

Example 23: The head-mounted display system of Example 22, wherein the first higher index material comprises titanium dioxide ($TiO_2$) and a second lower index material comprises silicon dioxide ($SiO_2$).

Example 24: The head-mounted display system of Example 22 or 23, wherein the plurality of sublayers comprising only two sublayers.

Example 25: The head-mounted display system of Example 22 or 23, wherein the plurality of sublayers comprising at least four sublayers.

Example 26: The head-mounted display system of any of Examples 22-25, wherein the plurality of sublayers alternate between the first material and the second material.

Example 27: The head-mounted display system of any of Examples 22-26, wherein the plurality of sublayers comprises an interference coating.

Example 28: The head-mounted display system of any of Examples 22-27, wherein the plurality of sublayers comprises a quarter wave stack.

Example 29: The head-mounted display system of any of the Examples above, wherein the metal comprises aluminum, silver, gold, or copper.

Example 30: The head-mounted display system of any of the Examples above, wherein the first and second polarizations comprise first and second linear polarizations having different polarization angles.

Example 31: The head-mounted display system of any of the Examples above, wherein the first and second polarizations comprise first and second linear polarizations oriented in orthogonal directions.

Example 32: The head-mounted display system of any of the Examples above, wherein the first and second polarizations comprise transverse magnetic and transverse electric polarizations, respectively.

Example 33: The head-mounted display system of any of the Examples above, wherein the first and second polarizations comprise transverse electric and transverse magnetic polarizations, respectively.

Example 34: The head-mounted display system of any of the Examples above, wherein the first diffraction efficiency comprises a diffraction efficiency for transverse-magnetic polarized light averaged across the visible light spectrum and wherein the second diffraction efficiency comprises a diffraction efficiency for transverse-electric polarized light averaged across the visible light spectrum.

Example 35: The head-mounted display system of any of the Examples above, wherein the first diffraction efficiency comprises a diffraction efficiency for transverse-electric polarized light averaged across the visible light spectrum and wherein the second diffraction efficiency comprises a diffraction efficiency for transverse-magnetic polarized light averaged across the visible light spectrum.

Example 36: The head-mounted display system of any of the Examples above, wherein the first diffraction efficiency is 1 to 1.5 times the second diffraction efficiency.

Example 37: The head-mounted display system of any of the Examples above, wherein the first diffraction efficiency is 1 to 1.4 times the second diffraction efficiency.

Example 38: The head-mounted display system of any of the Examples above, wherein the first diffraction efficiency is 1 to 1.3 times the second diffraction efficiency.

Example 39: The head-mounted display system of any of the Examples above, wherein the first diffraction efficiency is 1 to 1.2 times the second diffraction efficiency.

Example 40: The head-mounted display system of any of the Examples above, wherein the first diffraction efficiency is 1 to 1.1 times the second diffraction efficiency.

Example 41: The head-mounted display system of any of the Examples above, wherein the range of angles is at least 6 degrees.

Example 42: The head-mounted display system of any of the Examples above, wherein the range of angles is at least 12 degrees.

Example 43: The head-mounted display system of any of the Examples above, wherein the range of angles is at least 18 degrees.

Example 44: The head-mounted display system of any of the Examples above, wherein the range of angles is at least 22 degrees.

Example 45: The head-mounted display system of any of the Examples above, wherein the range of angles is between ±3 degrees with respect to the plane of the substrate.

Example 46: The head-mounted display system of any of the Examples above, wherein the range of angles is between ±6 degrees with respect to the plane of the substrate.

Example 47: The head-mounted display system of any of the Examples above, wherein the range of angles is between ±9 degrees with respect to the plane of the substrate.

Example 48: The head-mounted display system of any of the Examples above, wherein the range of angles is between ±11 degrees with respect to the plane of the substrate.

Example 49: The head-mounted display system of any of the Examples above, wherein said waveguide is included in an eyepiece configured to direct light to an eye of a user wearing said head mounted display.

Example 50: The head-mounted display system of Example 49, wherein said eyepiece is disposed on the frame and is configured to direct light from the light projection system into the eye of the user to display augmented reality image content to the vision field of the user, at least a portion of the eyepiece being transparent and disposed at a location in front of the eye of the user when the user wears the head-mounted display system, where the transparent portion transmits light from a portion of a physical environment in front of the user to the eye of the user to provide a view of the portion of the physical environment in front of the user.

Example 51: The head-mounted display system of Example 49 or 50, wherein said eyepiece comprises said at least one waveguide and said at least one waveguide is transparent to visible light such that the user can see through the waveguide.

Example 52: The head-mounted display system of any of the Examples above, wherein said waveguide comprises an in-coupling optical element for coupling light from said light projection system into the waveguide to be guided therein.

Example 53: The head-mounted display system of any of the Examples above, wherein said waveguide comprises an out-coupling optical element for coupling light from said light projection system out of the waveguide and directs said light to the user's eye to present said image content to the viewer.

Example 54: The head-mounted display system of any of the Examples above, wherein said first diffraction grating comprises an out-coupling grating (EPE) configured to out-couple light from said light projection system guided within said waveguide out of said waveguide.

Example 55: The head-mounted display system of any of the Examples above, wherein said first diffraction grating comprises an in-coupling grating (ICG) configured to in-couple light from said light projection system into said waveguide.

Example 56: The head-mounted display system of any of the Examples above, wherein the second layer is configured to be disposed over the first layer.

Example 57: The head-mounted display system of any of the Examples above further comprising a third layer disposed between said first layer and said second layer.

Example 58: The head-mounted display system of Example 57, wherein the third layer is configured to help bond said second layer to said first layer.

Example 59: The head-mounted display system of any of the Examples above comprising:
- a second diffraction grating comprising material different than said substrate disposed over said substrate; and
- a fourth layer disposed over said second diffraction grating such that the second diffraction grating has a third diffraction efficiency for a first polarization over a range of angles of light incident thereon,
- wherein the first diffraction grating is disposed over said substrate on a first side of said substrate and the second diffraction grating is disposed over said substrate on a second side of said substrate that opposes said first side of said substrate.

Example 60: The head-mounted display system of any of the Examples above, wherein the first layer is conformally deposited onto one or more diffractive features of the first diffraction grating.

Example 61: The head-mounted display system of any of the Examples above, wherein the first layer is directionally deposited onto the one or more diffractive features at an angle.

Example 62: The head-mounted display system of Example 61, wherein the angle comprises 75 to 105 degrees with respect to a planar major surface of the substrate.

Example 63: The head-mounted display system of Example 61, wherein the angle is 75 to 105 degrees with respect to a surface of one or more diffractive features of the first diffraction grating.

Example 64: The head-mounted display system of any of the Examples above, wherein the second layer is conformally deposited onto one or more diffractive features of the first diffraction grating.

Example 65: The head-mounted display system of any of the Examples above, wherein the second layer is directionally deposited onto one or more diffractive features of the first diffraction grating at an angle.

Example 66: The head-mounted display system of Example 65, wherein the angle comprises 75 to 105 degrees with respect to a planar major surface of the substrate.

Example 67: The head-mounted display system of Example 65, wherein the angle is 75 to 105 degrees with respect to a surface of one or more diffractive features of the first diffraction grating.

Example 68: The head-mounted display system of any of the Examples above, wherein the first diffraction grating comprises diffractive features formed in a 1D array.

Example 69: The head-mounted display system of any of Examples 1-68, wherein the first diffraction grating comprises diffractive features formed in a 2D array.

Example 70: The head-mounted display system of Example 69, wherein the 2D array comprises a square array.

Example 71: The head-mounted display of any of the Examples above, wherein the diffractive features are asymmetrical so as to provide a blazed grating.

Example 72: The head-mounted display of any of the Examples above, wherein the diffractive features have material asymmetrically deposited thereon so as to provide for a blazed grating.

Example 73: The head-mounted display of any of the Examples above, wherein said first diffraction grating is configured to direct light preferentially in at least two directions.

Example 74: The head-mounted display of any of the Examples above, wherein said first diffraction grating is blazed in two directions.

Example 75: The head-mounted display system of any of the Examples above, wherein the first diffraction grating comprises a one-dimensional grating.

Example 76: The head-mounted display system of any of Examples 1-75, wherein the first diffraction grating comprises a two-dimensional grating.

Example 77: The head-mounted display system of any of the Examples above comprising:
  a second diffraction grating comprising material different than said substrate disposed over said substrate; and
  a fourth layer disposed over said second diffraction grating such that the second diffraction grating has a third diffraction efficiency for a first polarization over a range of angles of light incident thereon and a fourth diffraction efficiency for a second polarization over the range of angles of light incident thereon,
  wherein the first diffraction grating is disposed over said substrate on a first side of said substrate and the second diffraction grating is disposed over said substrate on a second side of said substrate that opposes said first side of said substrate.

Example 78: The head-mounted display system of any of the Examples above comprising:
  a second diffraction grating formed in said substrate; and
  a fourth layer disposed over said second diffraction grating such that the second diffraction grating has a third diffraction efficiency for a first polarization over a range of angles of light incident thereon and a fourth diffraction efficiency for a second polarization over the range of angles of light incident thereon,
  wherein the first diffraction grating is disposed over said substrate on a first side of said substrate and the second diffraction grating is disposed over said substrate on a second side of said substrate that opposes said first side of said substrate.

Example 79: The head-mounted display system of any of the Examples above, wherein said substrate is configured to guide at least a portion of the light from said light projection system coupled into said waveguide via said second diffraction grating Example 80: The head-mounted display system of any of the Examples above, wherein the third diffraction efficiency for said first polarization over a range of angles of light incident thereon is greater than the fourth diffraction efficiency for said second polarization over a range of angles of light incident thereon.

Example 81: The head-mounted display system of any of the Examples above, wherein the third diffraction efficiency at least 6 times the fourth diffraction efficiency over said range of angles.

Example 82: The head-mounted display system of any of the Examples above, wherein the third diffraction efficiency for said first polarization over a range of angles of light incident thereon is less than the fourth diffraction efficiency for said second polarization over a range of angles of light incident thereon.

Example 83: The head-mounted display system of any of the Examples above, wherein the fourth diffraction efficiency is at least 6 times the third diffraction efficiency over said range of angles.

Example 84: The head-mounted display system of any of the Examples above, wherein the fourth layer comprise a dielectric.

Example 85: The head-mounted display system of any of the Examples above, wherein the substrate comprises material having an index of refraction of no more than 2.6.

Example 86: The head-mounted display system of any of the Examples above, wherein the substrate comprises material having an index of refraction of no more than 2.7.

Example 87: The head-mounted display system of any of the Examples above, wherein the substrate comprises material having an index of refraction of no more than 2.8.

Example 88: The head-mounted display system of any of the Examples above, wherein the first layer comprises a dielectric.

Example 89: The head-mounted display system of any of the Examples above, wherein the first layer comprise material having a refractive of 1.9 or more.

Example 90: The head-mounted display system of any of the Examples above, wherein the first layer comprise material having a refractive of 2.0 or more.

Example 91: The head-mounted display system of any of the Examples above, wherein the first layer comprises material having a refractive of 2.1 or more.

Example 92: The head-mounted display system of any of the Examples above, further comprising a plurality of sublayers over said first layer, said plurality of sublayers comprising a first higher index material and a second lower index material.

Example 93: The head-mounted display system of Example 92, wherein the first higher index material comprises titanium dioxide ($TiO_2$) and a second lower index material comprises silicon dioxide ($SiO_2$).

Example 94: The head-mounted display system of Example 92 or 93, wherein the plurality of sublayers comprising only two sublayers.

Example 95: The head-mounted display system of Example 92 or 93, wherein the plurality of sublayers comprising at least four sublayers.

Example 96: The head-mounted display system of any of Examples 92-95, wherein the plurality of sublayers alternate between the first material and the second material.

Example 97: The head-mounted display system of any of Examples 92-96, wherein the plurality of sublayers comprises an interference coating.

Example 98: The head-mounted display system of any of Examples 92-97, wherein the plurality of sublayers comprises a quarter wave stack.

Example 99: The head-mounted display system of any of Examples 92-98, wherein the plurality of sublayers over said first layer forms a bandpass filter.

Example 100: The head-mounted display system of any of Examples 92-98, wherein the plurality of sublayers over said first layer forms a notch filter.

Example 101: The head-mounted display system of any of Examples 92-98, wherein the plurality of sublayers over said first layer forms an anti-reflection (AR) coating.

Example 102: The head-mounted display system of any of Examples 92-101, wherein first the lower index material has a refractive index of 1.6 or less.

Example 103: The head-mounted display system of any of Examples 92-102, wherein the second higher index material has a refractive index of 1.9 or more.

Example 104: The head-mounted display system of any of the Examples 92-103, wherein the first lower index material comprises silicon dioxide.

Example 105: The head-mounted display system of any of the Examples 92-104, wherein the second higher index material comprises titanium dioxide.

Example 106: The head-mounted display system of any of Examples 92-104, wherein the second higher index material comprises zirconium dioxide.

Example 107: The head-mounted display system of any of Examples 92-104, wherein the second higher index material comprises zinc oxide.

Example 108: The head-mounted display system of any of the Examples above, wherein said first diffraction grating comprises an average diffraction efficiency for said first polarization over said range of angles and said second diffraction efficiency comprises an average diffraction efficiency for said second polarization over said range of angles.

Example 109: The head-mounted display system of any of the Examples above, wherein said first diffraction efficiency averaged over said range of angles and said second diffraction efficiency averaged over said range of angles have an efficiency of at least 40%.

Example 110: The head-mounted display system of any of the Examples above, wherein said first diffraction efficiency averaged over said range of angles and said second diffraction efficiency averaged over said range of angles have an efficiency of at least 50%.

Example 111: The head-mounted display system of any of the Examples above, wherein said first diffraction efficiency averaged over said range of angles and said second diffraction efficiency averaged over said range of angles have an efficiency of at least 60%.

Example 112: The head-mounted display system of any of the Examples above, wherein the range of angles is at least 25 degrees.

Example 113: The head-mounted display system of any of the Examples above, wherein the range of angles is at least 30 degrees.

Example 114: The head-mounted display system of any of the Examples above, wherein the range of angles is at least 35 degrees.

Example 115: The head-mounted display system of any of the Examples above, wherein the range of angles is at least 40 degrees.

Example 116: The head-mounted display system of any of the Examples above, wherein the range of angles is between ±15 degrees with respect to the plane of the substrate.

Example 117: The head-mounted display system of any of the Examples above, wherein the range of angles is between ±18 degrees with respect to the plane of the substrate.

Example 118: The head-mounted display system of any of the Examples above, wherein the range of angles is between ±20 degrees with respect to the plane of the substrate.

Example 119: The head-mounted display system of any of the Examples above, wherein the first diffraction grating comprises diffractive features comprising first and second sidewalls.

Example 120: The head-mounted display system of Example 119, wherein said first and second sidewalls are separated by a plateau.

Example 121: The head-mounted display system of Example 119, wherein said first and second sidewalls joint to form salient angle at the top of said diffractive feature.

Example 122: The head-mounted display system of any of Examples 119-121, wherein at least said first side wall is sloped at an angle such that said first sidewall is less steep than said second sidewall.

Example 123: The head-mounted display system of any of Examples 119-122, wherein said first sidewall is wider than said second sidewall.

Example 124: The head-mounted display system of any of the Examples 119-123, wherein said first sidewall forms an angle of from 45° to 85° at said base of said diffractive feature.

Example 125: The head-mounted display system of any of the Examples 119-124, wherein said second sidewall forms an acute re-entrant angle at the base of said diffractive feature.

Example 126: The head-mounted display system of any of the Examples 119-125, wherein said first diffraction grating comprises shark-fin shaped diffractive features.

Example 127: The head-mounted display system of any of the Examples 119-124, wherein said second sidewall forms an obtuse re-entrant angle at the base of said diffractive feature.

Example 128: The head-mounted display system of any of the Examples 119-124, wherein said second sidewall is vertical.

Example 129: The head-mounted display system of any of the Examples 119-124 or 127-128, wherein said first diffraction grating comprises sawtooth shaped diffractive features.

Example 130: The head-mounted display system of any of the Examples above, wherein said first layer comprises a biased deposition.

Example 131: The head-mounted display system of any of the Examples above, wherein said first layer comprises a glazing angle deposition.

Example 132: The head-mounted display system of any of Examples 119-131, wherein said first layer is biased to provide more coverage on said first sidewall than said second sidewall.

Example 133: The head-mounted display system of any of Examples 119-132, wherein said first layer covers a greater fraction of said first sidewall than said second sidewall.

Example 134: The head-mounted display system of any of Examples 119-133, wherein said first layer is biased to provide thicker coverage on said first sidewall than said second sidewall.

Example 135: The head-mounted display system of any of Examples 119-134, wherein said first layer provides on average thicker coverage on said first sidewall than said second sidewall.

Example 136: The head-mounted display system of any of Examples 119-135, wherein said first sidewall is completely covered by said second layer.

Example 137: The head-mounted display system of any of Examples 119-136, wherein at least a portion of said second sidewall is not covered by said first layer.

Example 138: The head-mounted display system of any of Examples 119-137, wherein said second sidewall includes more area not covered by said first layer than said first sidewall.

Example 139: The head-mounted display system of any of Examples 119-138, wherein said second layer comprises a conformal deposition.

Example 140: The head-mounted display system of any of Examples 119-139, wherein said first and second sidewalls are completely covered by said second layer.

Example 141: The head-mounted display system of any of Examples 119-140, wherein said second layer is not biased to cover more of said first sidewall than said second sidewall.

Example 142: The head-mounted display system of any of Examples 119-141, wherein said second layer does not provide thicker coverage on said first sidewall than second sidewall.

Example 143: The head-mounted display system of any of Examples 119-142, wherein said second layer does not provide on average thicker coverage on said first sidewall than said second sidewall.

Example 144: The head-mounted display system of any of Examples 119-143, wherein said second sidewall is entirely covered by said second layer.

Example 145: The head-mounted display system of any of Examples 119-144, wherein said second sidewall does not include more area not covered by said second layer than said first sidewall.

Example 146: The head-mounted display system of any of Examples above, wherein said first diffraction efficiency for said first polarization is within 20% of said second diffraction efficiency for said second polarization.

Example 147: The head-mounted display system of any of Examples above, wherein said first diffraction efficiency for said first polarization is within 30% of said second diffraction efficiency for said second polarization.

Example 148: The head-mounted display system of any of Examples above, wherein said first diffraction grating with said first and second layers formed thereon comprise a reflective diffraction grating.

Example 149: The head-mounted display system of any of Examples above, wherein said first diffraction grating with said first and second layers formed thereon comprise a reflective diffraction grating configured to diffract reflected light to couple light into said waveguide to be guided therein by total internal reflection.

Example 150: The head-mounted display system of any of Examples 1-148, wherein said first diffraction grating with said first and second layers formed thereon comprise a reflective diffraction grating configured to diffract reflected light to couple light be guided within said waveguide by total internal reflection out of said waveguide.

Example 151: The head-mounted display system of any of the Examples above, wherein said diffractive features have a height from 100 to 600 nanometers.

Example 152: The head-mounted display system of any of the Examples above, wherein said diffractive features have a height from 200 to 600 nanometers.

Example 153: The head-mounted display system of any of the Examples above, wherein said diffractive features have a height from 300 to 600 nanometers.

Example 154: The head-mounted display system of any of the Examples above, wherein said diffractive features have a pitch from 290 nm to 690 nm.

Example 155: The head-mounted display system of any of the Examples above, wherein said light projection system comprises micro-LEDs.

Example 156: The head-mounted display system of any of the Examples above, wherein said light projection system comprises a DLP or a LCOS display.

Example 157: The head-mounted display system of any of the Examples above, wherein said substrate includes nanoparticles.

Example 158: The head-mounted display system of any of the Examples above, wherein said substrate includes inorganic nanoparticles.

Example 159: The head-mounted display system of any of the Examples above, wherein said substrate comprises polymer.

Additional Examples—Part II

Example 1: A head-mounted display system comprising:
a head-mountable frame;
a light projection system configured to output light to provide image content;
a waveguide supported by the frame, the waveguide comprises a substrate comprising optically transparent material and a first diffraction grating formed in said substrate, said substrate configured to guide at least a portion of the light from said light projection system coupled into said waveguide via,
a first layer disposed over said first diffraction grating formed in said substrate;
a second layer comprising metal disposed over said first diffraction grating formed in said substrate such that the first diffraction grating has a first diffraction efficiency for a first polarization over a range of angles of light incident thereon and a second diffraction efficiency for a second polarization over the range of angles of light incident thereon, the first diffraction efficiency being from 1 to 2 times the second diffraction efficiency.

Example 2: The head-mounted display system of Example 1, wherein the optically transparent material comprising the substrate has an index of refraction from 1.45 to 2.0.

Example 3: The head-mounted display system of Example 1 or 2, wherein the transparent material comprising said substrate comprises polymer.

Example 4: The head-mounted display system of any of the Examples above, wherein the first layer comprises titanium dioxide ($TiO_2$), zirconium dioxide ($ZrO_2$) or silicon carbide (SiC).

Example 5: The head-mounted display system of any of the Examples above, wherein the first layer comprises a plurality of sublayers.

Example 6: The head-mounted display system of Example 5, wherein the first layer comprises a plurality of sublayers comprising a first higher index material and a second lower index material.

Example 7: The head-mounted display system of Example 5 or 6, wherein the first higher index material comprises titanium dioxide (TiO$_2$) and a second lower index material comprises silicon dioxide (SiO$_2$).

Example 8: The head-mounted display system of any of Example 5-7, wherein the plurality of sublayers comprising only two sublayers.

Example 9: The head-mounted display system of any of Example 5-7, wherein the plurality of sublayers comprising at least four sublayers.

Example 10: The head-mounted display system of any of Example 6-9, wherein the plurality of sublayers alternate between the first material and the second material.

Example 11: The head-mounted display system of any of Example 5-10, wherein the plurality of sublayers comprises an interference coating.

Example 12: The head-mounted display system of any of Example 5-11, wherein the plurality of sublayers comprises a quarter wave stack.

Example 13: The head-mounted display system of any of the Examples above, wherein the metal comprises aluminum, silver, gold, or copper.

Example 14: The head-mounted display system of any of the Examples above, wherein the said first diffraction grating comprises a blazed diffractive grating.

Example 15: The head-mounted display system of Example 14, wherein said first diffraction grating comprises diffractive features comprising peaks spaced apart by groove therebetween.

Example 16: The head-mounted display system of any of the Examples above, wherein the said first diffraction grating comprises diffractive features comprising a plurality of straight lines.

Example 17: The waveguide of any of the Examples above, wherein diffraction grating comprises diffractive features that are asymmetric.

Example 18: The head-mounted display system of any of the Examples above, wherein the first and second polarizations comprise first and second linear polarizations having different polarization angles.

Example 19: The head-mounted display system of any of the Examples above, wherein the first and second polarizations comprise first and second linear polarizations oriented in orthogonal directions.

Example 20: The head-mounted display system of any of the Examples above, wherein the first and second polarization direction comprise transverse magnetic and transverse electric polarizations, respectively.

Example 21: The head-mounted display system of any of Examples 1-19, wherein the first and second polarization direction comprise transverse electric and transverse magnetic polarizations, respectively.

Example 22: The head-mounted display system of any of Examples 1-19, wherein the first diffraction efficiency comprises a diffraction efficiency for transverse-magnetic polarized light averaged across the visible light spectrum and wherein the second diffraction efficiency comprises a diffraction efficiency for transverse-electric polarized light averaged across the visible light spectrum.

Example 23: The head-mounted display system of any of Examples 1-19, wherein the first diffraction efficiency comprises a diffraction efficiency for transverse-electric polarized light averaged across the visible light spectrum and wherein the second diffraction efficiency comprises a diffraction efficiency for transverse-magnetic polarized light averaged across the visible light spectrum.

Example 24: The head-mounted display system of any of the Examples above, wherein the first diffraction efficiency is 1 to 1.5 times the second diffraction efficiency.

Example 25: The head-mounted display system of any of the Examples above, wherein the first diffraction efficiency is 1 to 1.4 times the second diffraction efficiency.

Example 26: The head-mounted display system of any of the Examples above, wherein the first diffraction efficiency is 1 to 1.3 times the second diffraction efficiency.

Example 27: The head-mounted display system of any of the Examples above, wherein the first diffraction efficiency is 1 to 1.2 times the second diffraction efficiency.

Example 28: The head-mounted display system of any of the Examples above, wherein the first diffraction efficiency is 1 to 1.1 times the second diffraction efficiency.

Example 29: The head-mounted display system of any of the Examples above, wherein the range of angles is at least 6 degrees.

Example 30: The head-mounted display system of any of the Examples above, wherein the range of angles is at least 12 degrees.

Example 31: The head-mounted display system of any of the Examples above, wherein the range of angles is at least 18 degrees.

Example 32: The head-mounted display system of any of the Examples above, wherein the range of angles is at least 22 degrees.

Example 33: The head-mounted display system of any of the Examples above, wherein the range of angles is between ±3 degrees with respect to the plane of the substrate.

Example 34: The head-mounted display system of any of the Examples above, wherein the range of angles is between ±6 degrees with respect to the plane of the substrate.

Example 35: The head-mounted display system of any of the Examples above, wherein the range of angles is between ±9 degrees with respect to the plane of the substrate.

Example 36: The head-mounted display system of any of the Examples above, wherein the range of angles is between ±11 degrees with respect to the plane of the substrate.

Example 37: The head-mounted display system of any of the Examples above, wherein said waveguide is included in an eyepiece configured to direct light to an eye of a user wearing said head mounted display.

Example 38: The head-mounted display system of Example 37, wherein said eyepiece is disposed on the frame and is configured to direct light from the light projection system into the eye of the user to display augmented reality image content to the vision field of the user, at least a portion of the eyepiece being transparent and disposed at a location in front of the eye of the user when the user wears the head-mounted display system, where the transparent portion transmits light from a portion of a physical environment in front of the user to the eye of the user to provide a view of the portion of the physical environment in front of the user.

Example 39: The head-mounted display system of Examples 37 or 38, wherein said eyepiece comprises said at least one waveguide and said at least one waveguide is transparent to visible light such that the user can see through the waveguide.

Example 40: The head-mounted display system of any of the Examples above, wherein said waveguide comprises an in-coupling optical element for coupling light from said light projection system into the waveguide to be guided therein.

Example 41: The head-mounted display system of any of the Examples above, wherein said waveguide comprises an out-coupling optical element for coupling light from said light projection system out of the waveguide and directs said light to the user's eye to present said image content to the viewer.

Example 42: The head-mounted display system of any of the Examples above, wherein said first diffraction grating comprises an in-coupling grating (ICG) configured to in-couple light from said light projection system into said waveguide.

Example 43: The head-mounted display system of any of the Examples above, wherein said first diffraction gratings comprise an out-coupling grating (EPE) configured to out-couple light from said light projection system guided within said waveguide out of said waveguide.

Example 44: The head-mounted display system of any of the Examples above, wherein the second layer is configured to be disposed over the first layer.

Example 45: The head-mounted display system of any of the Examples above, further comprising a third layer disposed between said first layer and said second layer.

Example 46: The head-mounted display system of Example 45, wherein the third layer is configured to help bond said second layer to said first layer.

Example 47: The head-mounted display system of any of the Examples, wherein the waveguide comprises a second diffraction grating formed in said substrate, said substrate configured to guide at least a portion of the light from said light projection system coupled into said waveguide via said second diffraction grating and wherein the head-mounted display system further comprises:
 a fourth layer disposed over said second diffraction grating such that the second diffraction grating has a third diffraction efficiency for a first polarization over a range of angles of light incident thereon,
 wherein the first diffraction grating formed in said substrate on a first side of said substrate and the second diffraction grating is formed in said substrate on a second side of said substrate that opposes said first side of said substrate.

Example 48: The head-mounted display system of any of the Examples above, wherein the first layer is conformally deposited onto one or more diffractive features of the first diffraction grating.

Example 49: The head-mounted display system of the Examples above, wherein the first layer is directionally deposited onto the one or more diffractive features at an angle.

Example 50: The head-mounted display system of Example 49, wherein the angle comprises 75 to 105 degrees with respect to a planar major surface of the substrate.

Example 51: The head-mounted display system of Example 49, wherein the angle is 75 to 105 degrees with respect to a surface of one or more diffractive features of the first diffraction grating.

Example 52: The head-mounted display system of any of the Examples above, wherein the second layer is conformally deposited onto one or more diffractive features of the first diffraction grating.

Example 53: The head-mounted display system of any of the Examples above, wherein the second layer is directionally deposited onto one or more diffractive features of the first diffraction grating at an angle.

Example 54: The head-mounted display system of Example 53, wherein the angle comprises 75 to 105 degrees with respect to a planar major surface of the substrate.

Example 55: The head-mounted display system of Example 53, wherein the angle is 75 to 105 degrees with respect to a surface of one or more diffractive features of the first diffraction grating.

Example 56: The head-mounted display system of any of the Examples above, wherein the first diffraction grating comprises diffractive features formed in a 1D array.

Example 57: The head-mounted display system of any of Examples 1-55, wherein the first diffraction grating comprises diffractive features formed in a 2D array.

Example 58: The head-mounted display system of Example 57, wherein the 2D array comprises a square array.

Example 59: The head-mounted display of any of the Examples above, wherein the diffractive features are asymmetrical so as to provide a blazed grating.

Example 60: The head-mounted display of any of the Examples above, wherein the diffractive features have material asymmetrically deposited thereon so as to prove for a blazed grating.

Example 61: The head-mounted display of any of the Examples above, wherein said first diffraction grating is configured to direct light preferentially in at least two directions.

Example 62: The head-mounted display of any of the Examples above, wherein said first diffraction grating is blazed in two directions.

Example 63: The head-mounted display system of any of the Examples above, wherein the first diffraction grating comprises a one-dimensional grating.

Example 64: The head-mounted display system of any of Examples 1-62, wherein the first diffraction grating comprises a two-dimensional grating.

Example 65: The head-mounted display system of any of the Examples above comprising:
 a second diffraction grating formed in said substrate; and
 a fourth layer disposed over said second diffraction grating such that the second diffraction grating has a third diffraction efficiency for a first polarization over a range of angles of light incident thereon and a fourth diffraction efficiency for a second polarization over the range of angles of light incident thereon,
 wherein the first diffraction grating is disposed over said substrate on a first side of said substrate and the second diffraction grating is disposed over said substrate on a second side of said substrate that opposes said first side of said substrate.

Example 66: The head-mounted display system of any of the Examples above further comprising:
 a second diffraction grating comprising material different than said substrate disposed over said substrate; and
 a fourth layer disposed over said second diffraction grating such that the second diffraction grating has a third diffraction efficiency for a first polarization over a range of angles of light incident thereon and a fourth diffraction efficiency for a second polarization over the range of angles of light incident thereon,
 wherein the first diffraction grating is disposed over said substrate on a first side of said substrate and the second diffraction grating is disposed over said substrate on a second side of said substrate that opposes said first side of said substrate.

Example 67: The head-mounted display system of any of the Examples above, wherein said substrate is configured to guide at least a portion of the light from said light projection system coupled into said waveguide via said second diffraction grating Example 68: The head-mounted display system of any of the Examples above, wherein the third diffraction efficiency for said first polarization over a range of angles of light incident thereon is greater than the fourth diffraction efficiency for said second polarization over the range of angles of light incident thereon.

Example 69: The head-mounted display system of any of the Examples above, wherein the third diffraction efficiency at least 6 times the fourth diffraction efficiency over said range of angles.

Example 70: The head-mounted display system of any of the Examples above, wherein the third diffraction efficiency for said first polarization over a range of angles of light incident thereon is less than the fourth diffraction efficiency for said second polarization over a range of angles of light incident thereon.

Example 71: The head-mounted display system of any of the Examples above, wherein the fourth diffraction efficiency is at least 6 times the third diffraction efficiency over said range of angles.

Example 72: The head-mounted display system of any of the Examples above, wherein the fourth layer comprise a dielectric.

Example 73: The head-mounted display system of any of the Examples above, wherein the substrate comprises material having an index of refraction of no more than 2.6.

Example 74: The head-mounted display system of any of the Examples above, wherein the substrate comprises material having an index of refraction of no more than 2.7.

Example 75: The head-mounted display system of any of the Examples above, wherein the substrate comprises material having an index of refraction of no more than 2.8.

Example 76: The head-mounted display system of any of the Examples above, wherein the first layer comprises a dielectric.

Example 77: The head-mounted display system of any of the Examples above, wherein the first layer comprise material having a refractive of 1.9 or more.

Example 78: The head-mounted display system of any of the Examples above, wherein the first layer comprise material having a refractive of 2.0 or more.

Example 79: The head-mounted display system of any of the Examples above, wherein the first layer comprises material having a refractive of 2.1 or more.

Example 80: The head-mounted display system of any of the Examples above, further comprising a plurality of sublayers over said first layer, said plurality of sublayers comprising a first higher index material and a second lower index material.

Example 81: The head-mounted display system of Example 80, wherein the first higher index material comprises titanium dioxide ($TiO_2$) and a second lower index material comprises silicon dioxide ($SiO_2$).

Example 82: The head-mounted display system of Example 80 or 81, wherein the plurality of sublayers comprises only two sublayers.

Example 83: The head-mounted display system of Example 80 or 81, wherein the plurality of sublayers comprises at least four sublayers.

Example 84: The head-mounted display system of any of Examples 80-83, wherein the plurality of sublayers alternate between the first material and the second material.

Example 85: The head-mounted display system of any of Examples 80-84, wherein the plurality of sublayers comprises an interference coating.

Example 86: The head-mounted display system of any of Examples 80-85, wherein the plurality of sublayers comprises a quarter wave stack.

Example 87: The head-mounted display system of any of Examples 80-86, wherein the plurality of sublayers over said first layer forms a bandpass filter.

Example 88: The head-mounted display system of any of Examples 80-86, wherein the plurality of sublayers over said first layer forms a notch filter.

Example 89: The head-mounted display system of any of Examples 80-86, wherein the plurality of sublayers over said first layer forms an anti-reflection (AR) coating.

Example 90: The head-mounted display system of any of Examples 80-89, wherein first the lower index material has a refractive index of 1.6 or less.

Example 91: The head-mounted display system of any of Examples 80-90, wherein the second higher index material has a refractive index of 1.9 or more.

Example 92: The head-mounted display system of any of the Examples 80-91, wherein the first lower index material comprises silicon dioxide.

Example 93: The head-mounted display system of any of the Examples 80-92, wherein the second higher index material comprises titanium dioxide.

Example 94: The head-mounted display system of any of Examples 80-92, wherein the second higher index material comprises zirconium dioxide.

Example 95: The head-mounted display system of any of Examples 80-92, wherein the second higher index material comprises zinc oxide.

Example 96: The head-mounted display system of any of the Examples above, wherein said first diffraction grating comprises an average diffraction efficiency for said first polarization over said range of angles and said second diffraction efficiency comprises an average diffraction efficiency for said second polarization over said range of angles.

Example 97: The head-mounted display system of any of the Examples above, wherein said first diffraction efficiency averaged over said range of angles and said second diffraction efficiency averaged over said range of angles have an efficiency of at least 40%.

Example 98: The head-mounted display system of any of the Examples above, wherein said first diffraction efficiency averaged over said range of angles and said second diffraction efficiency averaged over said range of angles have an efficiency of at least 50%.

Example 99: The head-mounted display system of any of the Examples above, wherein said first diffraction efficiency averaged over said range of angles and said second diffraction efficiency averaged over said range of angles have an efficiency of at least 60%.

Example 100: The head-mounted display system of any of the Examples above, wherein the range of angles is at least 25 degrees.

Example 101: The head-mounted display system of any of the Examples above, wherein the range of angles is at least 30 degrees.

Example 102: The head-mounted display system of any of the Examples above, wherein the range of angles is at least 35 degrees.

Example 103: The head-mounted display system of any of the Examples above, wherein the range of angles is at least 40 degrees.

Example 104: The head-mounted display system of any of the Examples above, wherein the range of angles is between ±15 degrees with respect to the plane of the substrate.

Example 105: The head-mounted display system of any of the Examples above, wherein the range of angles is between ±18 degrees with respect to the plane of the substrate.

Example 106: The head-mounted display system of any of the Examples above, wherein the range of angles is between ±20 degrees with respect to the plane of the substrate.

Example 107: The head-mounted display system of any of the Examples above, wherein the first diffraction grating comprises diffractive features comprising first and second sidewalls.

Example 108: The head-mounted display system of Example 107, wherein said first and second sidewalls are separated by a plateau.

Example 109: The head-mounted display system of Example 107, wherein said first and second sidewalls joint to form salient angle at the top of said diffractive feature.

Example 110: The head-mounted display system of any of Examples 107-109, wherein at least said first side wall is sloped at an angle such that said first sidewall is less steep than said second sidewall.

Example 111: The head-mounted display system of any of Examples 107-110, wherein said first sidewall is wider than said second sidewall.

Example 112: The head-mounted display system of any of the Examples 107-111, wherein said first sidewall forms an angle of from 45° to 85° at the base of said diffractive feature.

Example 113: The head-mounted display system of any of the Examples 107-112, wherein said second sidewall forms an acute re-entrant angle at the base of said diffractive feature.

Example 114: The head-mounted display system of any of the Examples 107-113, wherein said first diffraction grating comprises shark-fin shaped diffractive features.

Example 115: The head-mounted display system of any of the Examples 107-112, wherein said second sidewall forms an obtuse re-entrant angle at the base of said diffractive feature.

Example 116: The head-mounted display system of any of the Examples 107-112, wherein said second sidewall is vertical.

Example 117: The head-mounted display system of any of the Examples 107-112 or 115-116, wherein said first diffraction grating comprises sawtooth shaped diffractive features.

Example 118: The head-mounted display system of any of the Examples above, wherein said first layer comprises a biased deposition.

Example 119: The head-mounted display system of any of the Examples above, wherein said first layer comprises a glazing angle deposition.

Example 120: The head-mounted display system of any of Examples 107-119, wherein said first layer is biased to provide more coverage on said first sidewall than said second sidewall.

Example 121: The head-mounted display system of any of Examples 107-120, wherein said first layer covers a greater fraction of said first sidewall than said second sidewall.

Example 122: The head-mounted display system of any of Examples 107-121, wherein said first layer is biased to provide thicker coverage on said first sidewall than said second sidewall.

Example 123: The head-mounted display system of any of Examples 107-122, wherein said first layer provides on average thicker coverage on said first sidewall than said second sidewall.

Example 124: The head-mounted display system of any of Examples 107-123, wherein said first sidewall is completely covered by said second layer.

Example 125: The head-mounted display system of any of Examples 107-124, wherein at least a portion of said second sidewall is not covered by said first layer.

Example 126: The head-mounted display system of any of Examples 107-125, wherein said second sidewall includes more area not covered by said first layer than said first sidewall.

Example 127: The head-mounted display system of any of Examples 107-126, wherein said second layer comprises a conformal deposition.

Example 128: The head-mounted display system of any of Examples 107-127, wherein said first and second sidewalls are completely covered by said second layer.

Example 129: The head-mounted display system of any of Examples 107-128, wherein said second layer is not biased to cover more of said first sidewall than said second sidewall.

Example 130: The head-mounted display system of any of Examples 107-129, wherein said second layer is not biased to provide thicker coverage on said first sidewall than said second sidewall.

Example 131: The head-mounted display system of any of Examples 107-130, wherein said second layer does not provide on average thicker coverage on said first sidewall than said second sidewall.

Example 132: The head-mounted display system of any of Examples 107-131, wherein said second sidewall is entirely covered by said second layer.

Example 133: The head-mounted display system of any of Examples 107-132, wherein said second sidewall does not include more area not covered by said second layer than said first sidewall.

Example 134: The head-mounted display system of any of Examples above, wherein said first diffraction efficiency for said first polarization is within 20% of said second diffraction efficiency for said second polarization.

Example 135: The head-mounted display system of any of Examples above, wherein said first diffraction efficiency for said first polarization is within 30% of said second diffraction efficiency for said second polarization.

Example 136: The head-mounted display system of any of Examples above, wherein said first diffraction grating with said first and second layers formed thereon comprise a reflective diffraction grating.

Example 137: The head-mounted display system of any of Examples above, wherein said first diffraction grating with said first and second layers formed thereon comprise a reflective diffraction grating configured to diffract reflected light to couple light into said waveguide to be guided therein by total internal reflection.

Example 138: The head-mounted display system of any of the Examples above, wherein said diffractive features have a height from 100 to 600 nanometers.

Example 139: The head-mounted display system of any of the Examples above, wherein said diffractive features have a height from 200 to 600 nanometers.

Example 140: The head-mounted display system of any of the Examples above, wherein said diffractive features have a height from 300 to 600 nanometers.

Example 141: The head-mounted display system of any of the Examples above, wherein said diffractive features have a pitch from 290 nm to 690 nm.

Example 142: The head-mounted display system of any of the Examples above, wherein said light projection system comprises micro-LEDs.

Example 143: The head-mounted display system of any of the Examples above, wherein said light projection system comprises a DLP or a LCOS display.

Example 144: The head-mounted display system of any of the Examples above, wherein said substrate includes nanoparticles.

Example 145: The head-mounted display system of any of the Examples above, wherein said substrate includes inorganic nanoparticles.

Example 146: The head-mounted display system of any of the Examples above, wherein said substrate comprises polymer.

Additional Examples—Part III

Example 1: A head-mounted display system comprising:
a head-mountable frame;
a light projection system configured to output light to provide image content;
a waveguide supported by the frame, the waveguide comprises a substrate configured to guide at least a portion of the light from said light projection system coupled into said waveguide;
a first diffraction grating comprising material different than said substrate;
 a first layer disposed over said first diffraction grating such that the first diffraction grating has a first diffraction efficiency for a first polarization over a range of angles of light incident thereon that is greater than a second diffraction efficiency for a second polarization over the range of angles of light incident thereon; and
 a second layer disposed over said first diffraction grating such that the first diffraction grating has a third diffraction efficiency for said second polarization over said range of angles of light incident thereon that is greater than a fourth diffraction efficiency for the first polarization over the range of angles of light incident thereon,
 wherein a diffraction efficiency of the combination of the first diffraction grating together with the first and second layers is configured to provide a fifth diffraction efficiency for the first polarization over the range of angles of light incident thereon and a sixth diffraction efficiency for the second polarization over the range of angles of light incident thereon, the fifth diffraction efficiency being from 1 to 2 times the sixth diffraction efficiency or the sixth diffraction efficiency being from 1 to 2 times the fifth diffraction efficiency.

Example 2: The head-mounted display system of Example 1, wherein the substrate comprises material a lithium-based oxide.

Example 3: The head-mounted display system of Example 1 or 2, wherein the substrate comprises material lithium niobate.

Example 4: The head-mounted display system of Example 1, wherein the substrate comprises material silicon carbide.

Example 5: The head-mounted display system of Example 1, wherein the substrate comprises material having an index of refraction of at least 1.9.

Example 6: The head-mounted display system of Example 1, wherein the substrate comprises material having an index of refraction of at least 2.0.

Example 7: The head-mounted display system of Example 1, wherein the substrate comprises material having an index of refraction of at least 2.1.

Example 8: The head-mounted display system of Example 1, wherein the substrate comprises material having an index of refraction of at least 2.2.

Example 9: The head-mounted display system of Example 1, wherein the substrate comprises material having an index of refraction of at least 2.3.

Example 10: The head-mounted display system of any of the Examples above, wherein the first diffraction grating material comprises polymer.

Example 11: The head-mounted display system of any of the Examples above, wherein the first diffraction grating material comprises imprintable material.

Example 12: The head-mounted display system of any of the Examples above, wherein the first diffraction grating material has a refractive index of 1.4 to 1.95.

Example 13: The head-mounted display system of any of between the Examples above, wherein the first diffraction grating material has a refractive index that is lower than said substrate.

Example 14: The head-mounted display system of any of the Examples above, wherein said first diffraction grating comprises a blazed diffractive grating.

Example 15: The head-mounted display system of any of the Examples above, wherein said first diffraction grating comprises diffractive features comprising peaks spaced apart by grooves therebetween.

Example 16: The head-mounted display system of any of the Examples above, wherein the said first diffraction grating comprises diffractive features comprising a plurality of straight lines.

Example 17: The waveguide of any of the Examples above, wherein said diffractive grating comprises diffractive features that are asymmetric.

Example 18: The head-mounted display system of any of the Examples above, wherein the first layer comprises titanium dioxide ($TiO_2$), zirconium dioxide ($ZrO_2$) or silicon carbide (SiC).

Example 19: The head-mounted display system of any of the Examples above, wherein the first layer comprises titanium dioxide ($TiO_2$).

Example 20: The head-mounted display system of any of the Examples above, wherein the first layer comprises zirconium dioxide ($ZrO_2$).

Example 21: The head-mounted display system of any of the Examples above, wherein the first layer comprises silicon carbide (SiC).

Example 22: The head-mounted display system of any of the Examples above, wherein the first layer comprises a plurality of sublayers comprising a first higher index material and a second lower index material.

Example 23: The head-mounted display system of Example 22, wherein the first higher index material comprises titanium dioxide ($TiO_2$) and a second lower index material comprises silicon dioxide ($SiO_2$).

Example 24: The head-mounted display system of Example 22 or 23, wherein the plurality of sublayers comprising only two sublayers.

Example 25: The head-mounted display system of Example 22 or 23, wherein the plurality of sublayers comprising at least four sublayers.

Example 26: The head-mounted display system of any of Examples 22-25, wherein the plurality of sublayers alternate between the first material and the second material.

Example 27: The head-mounted display system of any of Examples 22-26, wherein the plurality of sublayers comprises an interference coating.

Example 28: The head-mounted display system of any of Examples 22-27, wherein the plurality of sublayers comprises a quarter wave stack.

Example 29: The head-mounted display system of any of the Examples above, wherein the second layer comprises aluminum, silver, gold, or copper.

Example 30: The head-mounted display system of any of the Examples above, wherein the first and second polarizations comprise first and second linear polarization having different polarization angles.

Example 31: The head-mounted display system of any of the Examples above, wherein the first and second polarizations comprise first and second linear polarization oriented in orthogonal directions.

Example 32: The head-mounted display system of any of the Examples above, wherein the first and second polarization direction comprise transverse magnetic and transverse electric polarizations, respectively.

Example 33: The head-mounted display system of any of the Examples above, wherein the first and second polarization direction comprise transverse electric and transverse magnetic polarizations, respectively.

Example 34: The head-mounted display system of any of the Examples above, wherein the fifth diffraction efficiency comprises a diffraction efficiency for transverse-magnetic polarized light averaged across the visible light spectrum and wherein the sixth diffraction efficiency comprises a diffraction efficiency for transverse-electric polarized light averaged across the visible light spectrum.

Example 35: The head-mounted display system of any of the Examples above, wherein the fifth diffraction efficiency comprises a diffraction efficiency for transverse-electric polarized light averaged across the visible light spectrum and wherein the sixth diffraction efficiency comprises a diffraction efficiency for transverse-magnetic polarized light averaged across the visible light spectrum.

Example 36: The head-mounted display system of any of the Examples above, wherein the fifth diffraction efficiency is 1 to 1.5 times the sixth diffraction efficiency or the sixth diffraction efficiency is 1 to 1.5 times the fifth diffraction efficiency.

Example 37: The head-mounted display system of any of the Examples above, wherein the fifth diffraction efficiency is 1 to 1.4 times the sixth diffraction efficiency or the sixth diffraction efficiency is 1 to 1.4 times the fifth diffraction efficiency.

Example 38: The head-mounted display system of any of the Examples above, wherein the fifth diffraction efficiency is 1 to 1.3 times the sixth diffraction efficiency or the sixth diffraction efficiency is 1 to 1.3 times the fifth diffraction efficiency.

Example 39: The head-mounted display system of any of the Examples above, wherein the fifth diffraction efficiency is 1 to 1.2 times the sixth diffraction efficiency or the sixth diffraction efficiency is 1 to 1.2 times the fifth diffraction efficiency.

Example 40: The head-mounted display system of any of the Examples above, wherein the fifth diffraction efficiency is 1 to 1.1 times the sixth diffraction efficiency or the sixth diffraction efficiency is 1 to 1.1 times the fifth diffraction efficiency.

Example 41: The head-mounted display system of any of the Examples above, wherein the range of angles is at least 6 degrees.

Example 42: The head-mounted display system of any of the Examples above, wherein the range of angles is at least 12 degrees.

Example 43: The head-mounted display system of any of the Examples above, wherein the range of angles is at least 18 degrees.

Example 44: The head-mounted display system of any of the Examples above, wherein the range of angles is at least 22 degrees.

Example 45: The head-mounted display system of any of the Examples above, wherein the range of angles is between ±3 degrees with respect to the plane of the substrate.

Example 46: The head-mounted display system of any of the Examples above, wherein the range of angles is between ±6 degrees with respect to the plane of the substrate.

Example 47: The head-mounted display system of any of the Examples above, wherein the range of angles is between ±9 degrees with respect to the plane of the substrate.

Example 48: The head-mounted display system of any of the Examples above, wherein the range of angles is between ±11 degrees with respect to the plane of the substrate.

Example 49: The head-mounted display system of any of the Examples above, wherein said waveguide is included in an eyepiece configured to direct light to an eye of a user wearing said head mounted display.

Example 50: The head-mounted display system of Example 49, wherein said eyepiece is disposed on the frame and is configured to direct light from the light projection system into the eye of the user to display augmented reality image content to the vision field of the user, at least a portion of the eyepiece being transparent and disposed at a location in front of the eye of the user when the user wears the head-mounted display system, where the transparent portion transmits light from a portion of a physical environment in front of the user to the eye of the user to provide a view of the portion of the physical environment in front of the user, the eyepiece comprising.

Example 51: The head-mounted display system of Example 49 or 50, wherein said eyepiece comprises said at least one waveguide and said at least one waveguide is transparent to visible light such that the user can see through the waveguide.

Example 52: The head-mounted display system of any of the Examples above, wherein said waveguide comprises an in-coupling optical element for coupling light from said light projection system into the waveguide to be guided therein.

Example 53: The head-mounted display system of any of the Examples above, wherein said waveguide comprises an out-coupling optical element for coupling light from said light projection system out of the waveguide and directs said light to the user's eye to present said image content to the viewer.

Example 54: The head-mounted display system of any of the Examples above, wherein said first diffraction gratings comprises an out-coupling grating (EPE) configured to out-couple light from said light projection system guided within said waveguide out of said waveguide.

Example 55: The head-mounted display system of any of the Examples above, wherein said first diffraction gratings comprises an in-coupling grating (ICG) configured to in-couple light from said light projection system into said waveguide.

Example 56: The head-mounted display system of any of the Examples above, wherein the second layer is configured to be disposed over the first layer.

Example 57: The head-mounted display system of any of the Examples above comprising a third layer disposed between said first layer and said second layer.

Example 58: The head-mounted display system of Example 57, wherein the third layer is configured to help bond said second layer to said first layer.

Example 59: The head-mounted display system of any of the Examples above comprising:
- a second diffraction grating comprising material different than said substrate disposed over said substrate; and
- a fourth layer disposed over said second diffraction grating such that the second diffraction grating has a seventh diffraction efficiency for a first polarization over a range of angles of light incident thereon,
- wherein the first diffraction grating is disposed over said substrate on a first side of said substrate and the second diffraction grating is disposed over said substrate on a second side of said substrate that opposes said first side of said substrate.

Example 60: The head-mounted display system of Example 1, wherein the first layer is conformally deposited onto one or more diffractive features of the first diffraction grating.

Example 61: The head-mounted display system of Example 1, wherein the first layer is directionally deposited onto the one or more diffractive features at an angle.

Example 62: The head-mounted display system of Example 61, wherein the angle comprises 75 to 105 degrees with respect to a planar major surface of the substrate.

Example 63: The head-mounted display system of Example 61, wherein the angle is 75 to 105 degrees with respect to a surface of one or more diffractive features of the first diffraction grating.

Example 64: The head-mounted display system of Example 1, wherein the second layer is conformally deposited onto one or more diffractive features of the first diffraction grating.

Example 65: The head-mounted display system of Example 1, wherein the second layer is directionally deposited onto one or more diffractive features of the first diffraction grating at an angle.

Example 66: The head-mounted display system of Example 65, wherein the angle comprises 75 to 105 degrees with respect to a planar major surface of the substrate.

Example 67: The head-mounted display system of Example 65, wherein the angle is 75 to 105 degrees with respect to a surface of one or more diffractive features of the first diffraction grating.

Example 68: The head-mounted display system of any of the Examples above, wherein the first diffraction grating comprises diffractive features formed in a 1D array.

Example 69: The head-mounted display system of any of Examples 1-68, wherein the first diffraction grating comprises diffractive features formed in a 2D array.

Example 70: The head-mounted display system of Example 69, wherein the 2D array comprises a square array.

Example 71: The head-mounted display of any of the Examples above, wherein the diffractive features are asymmetrical so as to provide a blazed grating.

Example 72: The head-mounted display of any of the Examples above, wherein the diffractive features have material asymmetrically deposited thereon so as to prove for a blazed grating.

Example 73: The head-mounted display of any of the Examples above, wherein said first diffraction grating is configured to direct light preferentially in at least two directions.

Example 74: The head-mounted display of any of the Examples above, wherein said first diffraction grating is blazed in two directions.

Example 75: The head-mounted display system of any of the Examples above, wherein the first diffraction grating comprises a one-dimensional grating.

Example 76: The head-mounted display system of any of Examples 1-75, wherein the first diffraction grating comprises a two-dimensional grating.

Example 77: The head-mounted display system of any of the Examples above, wherein said light projection system comprises micro-LEDs.

Example 78: The head-mounted display system of any of the Examples above, wherein said light projection system comprises a DLP or a LCOS display.

Example 79: The head-mounted display system of any of the Examples above, wherein said substrate includes nanoparticles.

Example 80: The head-mounted display system of any of the Examples above, wherein said substrate includes inorganic nanoparticles.

Example 81: The head-mounted display system of any of the Examples above, wherein said substrate comprises polymer.

Additional Examples—Part IV

Example 1: A head-mounted display system comprising:
- a head-mountable frame;
- a light projection system configured to output light to provide image content; and
- a waveguide supported by the frame, the waveguide comprises a substrate comprising optically transparent material and a first diffraction grating formed in said substrate, said substrate configured to guide at least a portion of the light from said light projection system coupled into said waveguide,
- a first layer disposed over said first diffraction grating formed in said substrate, the first layer together with said first diffraction grating configured to provide a first diffraction efficiency for a first polarization over a range of angles of light incident thereon that is greater than a second diffraction efficiency for a second polarization over the range of angles of light incident thereon; and
- a second layer disposed over said first diffraction grating formed in said substrate, the second layer together with said first diffraction grating configured to provide a third diffraction efficiency for said second polarization over said range of angles of light incident thereon that is greater than a fourth diffraction efficiency for the first polarization over the range of angles of light incident thereon,
- wherein the first diffraction grating together with the first and second layers is configured to provide a fifth diffraction efficiency for a first polarization over the range of angles of light incident thereon and a sixth diffraction efficiency for a second polarization over the range of angles of light incident thereon, the fifth diffraction efficiency being from 1 to 2 times the sixth diffraction efficiency or the sixth diffraction efficiency is 1 to 2 times the fifth diffraction efficiency.

Example 2: The head-mounted display system of Example 1, wherein the optically transparent material comprising the substrate has an index of refraction from 1.45 to 2.0.

Example 3: The head-mounted display system of Example 1 or 2, wherein the transparent material comprising said substrate comprises polymer.

Example 4: The head-mounted display system of any of the Examples above, wherein the first layer comprises titanium dioxide ($TiO_2$), zirconium dioxide ($ZrO_2$) or silicon carbide (SiC).

Example 5: The head-mounted display system of any of the Examples above, wherein the first layer comprises a plurality of sublayers.

Example 6: The head-mounted display system of Example 5, wherein the first layer comprises a plurality of sublayers comprising a first higher index material and a second lower index material.

Example 7: The head-mounted display system of Example 5 or 6, wherein the first higher index material comprises titanium dioxide ($TiO_2$) and a second lower index material comprises silicon dioxide ($SiO_2$).

Example 8: The head-mounted display system of any of Example 5-7, wherein the plurality of sublayers comprising only two sublayers.

Example 9: The head-mounted display system of any of Example 5-7, wherein the plurality of sublayers comprising at least four sublayers.

Example 10: The head-mounted display system of any of Example 6-9, wherein the plurality of sublayers alternate between the first material and the second material.

Example 11: The head-mounted display system of any of Example 5-10, wherein the plurality of sublayers comprises an interference coating.

Example 12: The head-mounted display system of any of Example 5-11, wherein the plurality of sublayers comprises a quarter wave stack.

Example 13: The head-mounted display system of any of the Examples above, wherein the metal comprises aluminum, silver, gold, or copper.

Example 14: The head-mounted display system of any of the Examples above, wherein the said first diffraction grating comprises a blazed diffractive grating.

Example 15: The head-mounted display system of Example 14, wherein said first diffraction grating comprises diffractive features comprising peaks spaced apart by groove therebetween.

Example 16: The head-mounted display system of any of the Examples above, wherein the said first diffraction grating comprises diffractive features comprising a plurality of straight lines.

Example 17: The waveguide of any of the Examples above, wherein diffraction grating comprises diffractive features that are asymmetric.

Example 18: The head-mounted display system of any of the Examples above, wherein the first and second polarizations comprise first and second linear polarizations having different polarization angles.

Example 19: The head-mounted display system of any of the Examples above, wherein the first and second polarizations comprise first and second linear polarizations oriented in orthogonal directions.

Example 20: The head-mounted display system of any of the Examples above, wherein the first and second polarization direction comprise transverse magnetic and transverse electric polarizations, respectively.

Example 21: The head-mounted display system of any of Examples 1-19, wherein the first and second polarization direction comprise transverse electric and transverse magnetic polarizations, respectively.

Example 22: The head-mounted display system of any of Examples 1-19, wherein the fifth diffraction efficiency comprises a diffraction efficiency for transverse-magnetic polarized light averaged across the visible light spectrum and wherein the second diffraction efficiency comprises a diffraction efficiency for transverse-electric polarized light averaged across the visible light spectrum.

Example 23: The head-mounted display system of any of Examples 1-19, wherein the sixth diffraction efficiency comprises a diffraction efficiency for transverse-electric polarized light averaged across the visible light spectrum and wherein the second diffraction efficiency comprises a diffraction efficiency for transverse-magnetic polarized light averaged across the visible light spectrum.

Example 24: The head-mounted display system of any of the Examples above, wherein the fifth diffraction efficiency is 1 to 1.5 times the sixth diffraction efficiency or the sixth diffraction efficiency is 1 to 1.5 times the fifth diffraction efficiency.

Example 25: The head-mounted display system of any of the Examples above, wherein the fifth diffraction efficiency is 1 to 1.4 times the sixth diffraction efficiency or the sixth diffraction efficiency is 1 to 1.4 times the fifth diffraction efficiency.

Example 26: The head-mounted display system of any of the Examples above, wherein the fifth diffraction efficiency is 1 to 1.3 times the sixth diffraction efficiency or the sixth diffraction efficiency is 1 to 1.3 times the fifth diffraction efficiency.

Example 27: The head-mounted display system of any of the Examples above, wherein the fifth diffraction efficiency is 1 to 1.2 times the sixth diffraction efficiency or the sixth diffraction efficiency is 1 to 1.2 times the fifth diffraction efficiency.

Example 28: The head-mounted display system of any of the Examples above, wherein the fifth diffraction efficiency is 1 to 1.1 times the sixth diffraction efficiency or the sixth diffraction efficiency is 1 to 1.1 times the fifth diffraction efficiency.

Example 29: The head-mounted display system of any of the Examples above, wherein the range of angles is at least 6 degrees.

Example 30: The head-mounted display system of any of the Examples above, wherein the range of angles is at least 12 degrees.

Example 31: The head-mounted display system of any of the Examples above, wherein the range of angles is at least 18 degrees.

Example 32: The head-mounted display system of any of the Examples above, wherein the range of angles is at least 22 degrees.

Example 33: The head-mounted display system of any of the Examples above, wherein the range of angles is between ±3 degrees with respect to the plane of the substrate.

Example 34: The head-mounted display system of any of the Examples above, wherein the range of angles is between ±6 degrees with respect to the plane of the substrate.

Example 35: The head-mounted display system of any of the Examples above, wherein the range of angles is between ±9 degrees with respect to the plane of the substrate.

Example 36: The head-mounted display system of any of the Examples above, wherein the range of angles is between ±11 degrees with respect to the plane of the substrate.

Example 37: The head-mounted display system of any of the Examples above, wherein said waveguide is included in an eyepiece configured to direct light to an eye of a user wearing said head mounted display.

Example 38: The head-mounted display system of Example 37, wherein said eyepiece is disposed on the frame and is configured to direct light from the light projection system into the eye of the user to display augmented reality image content to the vision field of the user, at least a portion of the eyepiece being transparent and disposed at a location in front of the eye of the user when the user wears the head-mounted display system, where the transparent portion transmits light from a portion of a physical environment in front of the user to the eye of the user to provide a view of the portion of the physical environment in front of the user.

Example 39: The head-mounted display system of Examples 37 or 38, wherein said eyepiece comprises said at least one waveguide and said at least one waveguide is transparent to visible light such that the user can see through the waveguide.

Example 40: The head-mounted display system of any of the Examples above, wherein said waveguide comprises an in-coupling optical element for coupling light from said light projection system into the waveguide to be guided therein.

Example 41: The head-mounted display system of any of the Examples above, wherein said waveguide comprises an out-coupling optical element for coupling light from said light projection system out of the waveguide and directs said light to the user's eye to present said image content to the viewer.

Example 42: The head-mounted display system of any of the Examples above, wherein said first diffraction grating comprises an in-coupling grating (ICG) configured to in-couple light from said light projection system into said waveguide.

Example 43: The head-mounted display system of any of the Examples above, wherein said first diffraction gratings comprise an out-coupling grating (EPE) configured to out-couple light from said light projection system guided within said waveguide out of said waveguide.

Example 44: The head-mounted display system of any of the Examples above, wherein the second layer is configured to be disposed over the first layer.

Example 45: The head-mounted display system of any of the Examples above comprising a third layer disposed between said first layer and said second layer.

Example 46: The head-mounted display system of Example 45, wherein the third layer is configured to help bond said second layer to said first layer.

Example 47: The head-mounted display system of any of the Examples above wherein the waveguide comprises a second diffraction grating formed in said substrate, said substrate configured to guide at least a portion of the light from said light projection system coupled into said waveguide via said second diffraction grating and wherein the head-mounted display system comprises:
a fourth layer disposed over said second diffraction grating such that the second diffraction grating has a seventh diffraction efficiency for the first polarization over a range of angles of light incident thereon,
wherein the first diffraction grating formed in said substrate on a first side of said substrate and the second diffraction grating is formed in said substrate on a second side of said substrate that opposes said first side of said substrate.

Example 48: The head-mounted display system of Example 1, wherein the first layer is conformally deposited onto one or more diffractive features of the first diffraction grating.

Example 49: The head-mounted display system of Example 1, wherein the first layer is directionally deposited onto the one or more diffractive features at an angle.

Example 50: The head-mounted display system of Example 49, wherein the angle comprises 75 to 105 degrees with respect to a planar major surface of the substrate.

Example 51: The head-mounted display system of Example 49, wherein the angle is 75 to 105 degrees with respect to a surface of one or more diffractive features of the first diffraction grating.

Example 52: The head-mounted display system of Example 1, wherein the second layer is conformally deposited onto one or more diffractive features of the first diffraction grating.

Example 53: The head-mounted display system of Example 1, wherein the second layer is directionally deposited onto one or more diffractive features of the first diffraction grating at an angle.

Example 54: The head-mounted display system of Example 53, wherein the angle comprises 75 to 105 degrees with respect to a planar major surface of the substrate.

Example 55: The head-mounted display system of Example 53, wherein the angle is 75 to 105 degrees with respect to a surface of one or more diffractive features of the first diffraction grating.

Example 56: The head-mounted display system of any of the Examples above, wherein the first diffraction grating comprises diffractive features formed in a 1D array.

Example 57: The head-mounted display system of any of Examples 1-56, wherein the first diffraction grating comprises diffractive features formed in a 2D array.

Example 58: The head-mounted display system of Example 57, wherein the 2D array comprises a square array.

Example 59: The head-mounted display of any of the Examples above, wherein the diffractive features are asymmetrical so as to provide a blazed grating.

Example 60: The head-mounted display of any of the Examples above, wherein the diffractive features have material asymmetrically deposited thereon so as to prove for a blazed grating.

Example 61: The head-mounted display of any of the Examples above, wherein said first diffraction grating is configured to direct light preferentially in at least two directions.

Example 62: The head-mounted display of any of the Examples above, wherein said first diffraction grating is blazed in two directions.

Example 63: The head-mounted display system of any of the Examples above, wherein the first diffraction grating comprises a one-dimensional grating.

Example 64: The head-mounted display system of any of Examples 1-62, wherein the first diffraction grating comprises a two-dimensional grating.

Example 65: The head-mounted display system of any of the Examples above, wherein said light projection system comprises micro-LEDs.

Example 66: The head-mounted display system of any of the Examples above, wherein said light projection system comprises a DLP or a LCOS display.

Example 67: The head-mounted display system of any of the Examples above, wherein said substrate includes nanoparticles Example 68: The head-mounted display system of any of the Examples above, wherein said substrate includes inorganic nanoparticles.

Example 69: The head-mounted display system of any of the Examples above, wherein said substrate comprises polymer.

Additional Examples—Part V

Example 1: A head-mounted display system comprising:
a head-mountable frame;
a light projection system configured to output light to provide image content;
a waveguide supported by the frame, the waveguide comprises a substrate configured to guide at least a portion of the light from said light projection system coupled into said waveguide;
a first diffraction grating comprising material different than said substrate over said substrate; and
a first layer comprising multilayer coating disposed over said first diffraction grating, the first diffraction grating together with the first layer configured to have a first diffraction efficiency for a first polarization over a range of angles of light incident thereon that is greater than a second diffraction efficiency for a second polarization over the range of angles of light incident thereon.

Example 2: The head-mounted display system of Example 1, wherein the substrate comprises material a lithium-based oxide.

Example 3: The head-mounted display system of Example 1 or 2, wherein the substrate comprises material lithium niobate.

Example 4: The head-mounted display system of Example 1, wherein the substrate comprises material silicon carbide.

Example 5: The head-mounted display system of Example 1, wherein the substrate comprises material having an index of refraction of at least 1.9.

Example 6: The head-mounted display system of Example 1, wherein the substrate comprises material having an index of refraction of at least 2.0.

Example 7: The head-mounted display system of Example 1, wherein the substrate comprises material having an index of refraction of at least 2.1.

Example 8: The head-mounted display system of Example 1, wherein the substrate comprises material having an index of refraction of at least 2.2.

Example 9: The head-mounted display system of Example 1, wherein the substrate comprises material having an index of refraction of at least 2.3.

Example 10: The head-mounted display system of any of the Examples above, wherein the first diffraction grating material comprises polymer.

Example 11: The head-mounted display system of any of the Examples above, wherein the first diffraction grating material comprises imprintable material.

Example 12: The head-mounted display system of any of the Examples above, wherein the first diffraction grating material has a refractive index of 1.4 to 1.95.

Example 13: The head-mounted display system of any of between the Examples above, wherein the first diffraction grating material has a refractive index that is lower than said substrate.

Example 14: The head-mounted display system of any of the Examples above, wherein said first diffraction grating comprises a blazed diffractive grating.

Example 15: The head-mounted display system of any of the Examples above, wherein said first diffraction grating comprises diffractive features comprising peaks spaced apart by grooves therebetween.

Example 16: The head-mounted display system of any of the Examples above, wherein the said first diffraction grating comprises diffractive features comprising a plurality of straight lines.

Example 17: The waveguide of any of the Examples above, wherein said diffractive grating comprises diffractive features that are asymmetric.

Example 18: The head-mounted display system of any of the Examples above, wherein the first layer comprises titanium dioxide ($TiO_2$), zirconium dioxide ($ZrO_2$) or silicon carbide (SiC).

Example 19: The head-mounted display system of any of the Examples above, wherein the first layer comprises titanium dioxide ($TiO_2$).

Example 20: The head-mounted display system of any of the Examples above, wherein the first layer comprises zirconium dioxide ($ZrO_2$).

Example 21: The head-mounted display system of any of the Examples above, wherein the first layer comprises silicon carbide (SiC).

Example 22: The head-mounted display system of any of the Examples above, wherein the first layer comprises a plurality of sublayers comprising a first higher index material and a second lower index material.

Example 23: The head-mounted display system of Example 22, wherein the first higher index material comprises titanium dioxide ($TiO_2$) and a second lower index material comprises silicon dioxide ($SiO_2$).

Example 24: The head-mounted display system of Example 22 or 23, wherein the plurality of sublayers comprising only two sublayers.

Example 25: The head-mounted display system of Example 22 or 23, wherein the plurality of sublayers comprising at least four sublayers.

Example 26: The head-mounted display system of any of Examples 22-25, wherein the plurality of sublayers alternate between the first material and the second material.

Example 27: The head-mounted display system of any of Examples 22-26, wherein the plurality of sublayers comprises an interference coating.

Example 28: The head-mounted display system of any of Examples 22-27, wherein the plurality of sublayers comprises a quarter wave stack.

Example 29: The head-mounted display system of any of the Examples above, wherein the first and second polarizations comprise first and second linear polarization having different polarization angles.

Example 30: The head-mounted display system of any of the Examples above, wherein the first and second polarizations comprise first and second linear polarization oriented in orthogonal directions.

Example 31: The head-mounted display system of any of the Examples above, wherein the first and second polarization direction comprise transverse magnetic and transverse electric polarizations, respectively.

Example 32: The head-mounted display system of any of the Examples above, wherein the first and second polarization direction comprise transverse electric and transverse magnetic polarizations, respectively.

Example 33: The head-mounted display system of any of the Examples above, wherein the first diffraction efficiency comprises a diffraction efficiency for transverse-magnetic polarized light averaged across the visible light spectrum and wherein the second diffraction efficiency comprises a diffraction efficiency for transverse-electric polarized light averaged across the visible light spectrum.

Example 34: The head-mounted display system of any of the Examples above, wherein the first diffraction efficiency comprises a diffraction efficiency for transverse-electric polarized light averaged across the visible light spectrum and wherein the second diffraction efficiency comprises a diffraction efficiency for transverse-magnetic polarized light averaged across the visible light spectrum.

Example 35: The head-mounted display system of any of the Examples above, wherein the first diffraction efficiency is 1 to 1.5 times the second diffraction efficiency.

Example 36: The head-mounted display system of any of the Examples above, wherein the first diffraction efficiency is 1 to 1.4 times the second diffraction efficiency.

Example 37: The head-mounted display system of any of the Examples above, wherein the first diffraction efficiency is 1 to 1.3 times the second diffraction efficiency.

Example 38: The head-mounted display system of any of the Examples above, wherein the first diffraction efficiency is 1 to 1.2 times the second diffraction efficiency.

Example 39: The head-mounted display system of any of the Examples above, wherein the first diffraction efficiency is 1 to 1.1 times the second diffraction efficiency.

Example 40: The head-mounted display system of any of the Examples above, wherein the range of angles is at least 6 degrees.

Example 41: The head-mounted display system of any of the Examples above, wherein the range of angles is at least 12 degrees.

Example 42: The head-mounted display system of any of the Examples above, wherein the range of angles is at least 18 degrees.

Example 43: The head-mounted display system of any of the Examples above, wherein the range of angles is at least 22 degrees.

Example 44: The head-mounted display system of any of the Examples above, wherein the range of angles is between ±3 degrees with respect to the plane of the substrate.

Example 45: The head-mounted display system of any of the Examples above, wherein the range of angles is between ±6 degrees with respect to the plane of the substrate.

Example 46: The head-mounted display system of any of the Examples above, wherein the range of angles is between ±9 degrees with respect to the plane of the substrate.

Example 47: The head-mounted display system of any of the Examples above, wherein the range of angles is between ±11 degrees with respect to the plane of the substrate.

Example 48: The head-mounted display system of any of the Examples above, wherein said waveguide is included in an eyepiece configured to direct light to an eye of a user wearing said head mounted display.

Example 49: The head-mounted display system of Example 48, wherein said eyepiece is disposed on the frame and is configured to direct light from the light projection system into the eye of the user to display augmented reality image content to the vision field of the user, at least a portion of the eyepiece being transparent and disposed at a location in front of the eye of the user when the user wears the head-mounted display system, where the transparent portion transmits light from a portion of a physical environment in front of the user to the eye of the user to provide a view of the portion of the physical environment in front of the user, the eyepiece comprising.

Example 50: The head-mounted display system of Example 48 or 49, wherein said eyepiece comprises said at least one waveguide and said at least one waveguide is transparent to visible light such that the user can see through the waveguide.

Example 51: The head-mounted display system of any of the Examples above, wherein said waveguide comprises an in-coupling optical element for coupling light from said light projection system into the waveguide to be guided therein.

Example 52: The head-mounted display system of any of the Examples above, wherein said waveguide comprises an out-coupling optical element for coupling light from said light projection system out of the waveguide and directs said light to the user's eye to present said image content to the viewer.

Example 53: The head-mounted display system of any of the Examples above, wherein said first diffraction gratings comprises an in-coupling grating (ICG) configured to in-couple light from said light projection system into said waveguide.

Example 54: The head-mounted display system of Example 1, wherein the first layer is conformally deposited onto one or more diffractive features of the first diffraction grating.

Example 55: The head-mounted display system of Example 1, wherein the first layer is directionally deposited onto the one or more diffractive features at an angle.

Example 56: The head-mounted display system of Example 55, wherein the angle comprises 75 to 105 degrees with respect to a planar major surface of the substrate.

Example 57: The head-mounted display system of Example 55, wherein the angle is 75 to 105 degrees with respect to a surface of one or more diffractive features of the first diffraction grating.

Example 58: The head-mounted display system of any of the Examples above, wherein the first diffraction grating comprises diffractive features formed in a 1D array.

Example 59: The head-mounted display system of any of Examples 1-58, wherein the first diffraction grating comprises diffractive features formed in a 2D array.

Example 60: The head-mounted display system of Example 59, wherein the 2D array comprises a square array.

Example 61: The head-mounted display of any of the Examples above, wherein the diffractive features are asymmetrical so as to provide a blazed grating.

Example 62: The head-mounted display of any of the Examples above, wherein the diffractive features have material asymmetrically deposited thereon so as to prove for a blazed grating.

Example 63: The head-mounted display of any of the Examples above, wherein said first diffraction grating is configured to direct light preferentially in at least two directions.

Example 64: The head-mounted display of any of the Examples above, wherein said first diffraction grating is blazed in two directions.

Example 65: The head-mounted display system of any of the Examples above, wherein the first diffraction grating comprises a one-dimensional grating.

Example 66: The head-mounted display system of any of Examples 1-64, wherein the first diffraction grating comprises a two-dimensional grating.

Example 67: The head-mounted display system of any of the Examples above, wherein said light projection system comprises micro-LEDs.

Example 68: The head-mounted display system of any of the Examples above, wherein said light projection system comprises a DLP or a LCOS display.

Example 70: The head-mounted display system of any of the Examples above, wherein said substrate includes nanoparticles.

Example 71: The head-mounted display system of any of the Examples above, wherein said substrate includes inorganic nanoparticles.

Example 72: The head-mounted display system of any of the Examples above, wherein said substrate comprises polymer.

Additional Examples—Part VI

Example 1: A head-mounted display system comprising:
a head-mountable frame;
a light projection system configured to output light to provide image content;
a waveguide supported by the frame, the waveguide comprising a substrate configured to guide at least a portion of the light from said light projection system coupled into said waveguide;
a first diffraction grating configured to have a first diffraction efficiency for a first polarization over a range of angles of light incident thereon that is greater than a second diffraction efficiency for a second polarization over the range of angles of light incident thereon
a second diffraction grating, said substrate configured to guide at least a portion of the light from said light projection system coupled into said waveguide via said second diffraction grating, the second diffraction grating configured to have a third diffraction efficiency for the first polarization over a range of angles of light incident thereon that is less than a fourth diffraction efficiency for the second polarization over the range of angles of light incident thereon,
wherein the first diffraction grating is on a first side of said substrate and the second diffraction grating on a second side of said substrate opposite said first side of said substrate.

Example 3: The head-mounted display system of any of Examples above, wherein said first diffraction grating comprise a transmissive diffraction grating.

Example 4: The head-mounted display system of any of Examples above, wherein said first diffraction grating comprise a transmissive diffraction grating configured to diffract transmitted light to couple light into said waveguide to be guided therein by total internal reflection.

Example 5: The head-mounted display system of any of Examples above, wherein said second diffraction grating comprise a reflective diffraction grating.

Example 6: The head-mounted display system of any of Examples above, wherein said second diffraction grating comprise a reflective diffraction grating configured to diffract reflected light to couple light into said waveguide to be guided therein by total internal reflection.

Example 7: The head-mounted display system of any of Examples above, wherein said first and second diffraction gratings comprise in-line gratings.

Example 8: The head-mounted display system of any of Examples above, wherein said first and second diffraction gratings are aligned such that light transmitted through said first diffraction grating without being diffracted will be incident on said second diffraction grating.

Example 9: The head-mounted display system of any of Examples above, wherein said first diffraction grating comprises material different than said substrate over said substrate.

Example 10: The head-mounted display system of any of Examples above, wherein said first diffraction grating is formed in said substrate.

Example 11: The head-mounted display system of any of Examples above, further comprising a first layer disposed over said first diffraction grating.

Example 12: The head-mounted display system of any of Examples above, wherein said second diffraction grating comprises material different than said substrate over said substrate Example 13: The head-mounted display system of any of Examples above, wherein said second diffraction grating is formed in said substrate.

Example 14: The head-mounted display system of any of Examples above, further comprising a second layer disposed over said second diffraction grating.

Example 15: The head-mounted display system of any of the Examples above, wherein the substrate comprises material a lithium-based oxide.

Example 16: The head-mounted display system of any of the Examples above, wherein the substrate comprises material lithium niobate.

Example 17: The head-mounted display system of any of the Examples above, wherein the substrate comprises material silicon carbide.

Example 18: The head-mounted display system of any of the Examples above, wherein the substrate comprises material having an index of refraction of at least 1.9.

Example 19: The head-mounted display system of any of the Examples above, wherein the substrate comprises material having an index of refraction of at least 2.0.

Example 20: The head-mounted display system of any of the Examples above, wherein the substrate comprises material having an index of refraction of at least 2.1.

Example 21: The head-mounted display system of any of the Examples above, wherein the substrate comprises material having an index of refraction of at least 2.2.

Example 22: The head-mounted display system of any of the Examples above, wherein the substrate comprises material having an index of refraction of at least 2.3.

Example 23: The head-mounted display system of any of the Examples above, wherein the first diffraction grating material comprises polymer.

Example 24: The head-mounted display system of any of the Examples above, wherein the first diffraction grating material comprises imprintable material.

Example 25: The head-mounted display system of any of the Examples above, wherein the first diffraction grating material has a refractive index of 1.4 to 1.95.

Example 26: The head-mounted display system of any of between the Examples above, wherein the first diffraction grating material has a refractive index that is lower than said substrate.

Example 27: The head-mounted display system of any of the Examples above, wherein said first diffraction grating comprises a blazed diffractive grating.

Example 28: The head-mounted display system of any of the Examples above, wherein said first diffraction grating comprises diffractive features comprising peaks spaced apart by grooves therebetween.

Example 29: The head-mounted display system of any of the Examples above, wherein the said first diffraction grating comprises diffractive features comprising a plurality of straight lines.

Example 30: The waveguide of any of the Examples above, wherein said first diffractive grating comprises diffractive features that are asymmetric.

Example 31: The head-mounted display system of any of the Examples above, wherein the second diffraction grating material comprises polymer.

Example 32: The head-mounted display system of any of the Examples above, wherein the second diffraction grating material comprises imprintable material.

Example 33: The head-mounted display system of any of the Examples above, wherein the second diffraction grating material has a refractive index of 1.4 to 1.95.

Example 34: The head-mounted display system of any of between the Examples above, wherein the second diffraction grating material has a refractive index that is lower than said substrate.

Example 35: The head-mounted display system of any of the Examples above, wherein said second diffraction grating comprises a blazed diffractive grating.

Example 36: The head-mounted display system of any of the Examples above, wherein said second diffraction grating comprises diffractive features comprising peaks spaced apart by grooves therebetween.

Example 37: The head-mounted display system of any of the Examples above, wherein the said second diffraction grating comprises diffractive features comprising a plurality of straight lines.

Example 38: The waveguide of any of the Examples above, wherein said second diffractive grating comprises diffractive features that are asymmetric.

Example 39: The head-mounted display system of any of the Examples above, wherein the first layer has a refractive index of from 1.95 to 2.7.

Example 40: The head-mounted display system of any of the Examples above, wherein the first layer has a refractive index of from 2.1 to 2.7.

Example 41: The head-mounted display system of any of the Examples above, wherein the first layer has a refractive index of from 2.2 to 2.7.

Example 42: The head-mounted display system of any of the Examples above, wherein the first layer has a refractive index of from 2.3 to 2.7.

Example 43: The head-mounted display system of any of the Examples above, wherein the first layer comprises a dielectric.

Example 44: The head-mounted display system of any of the Examples above, wherein the first layer comprises titanium dioxide ($TiO_2$).

Example 45: The head-mounted display system of any of the Examples above, wherein the second layer comprises metal.

Example 46: The head-mounted display system of any of the Examples above, wherein the second layer comprises Al, Ag, or AlSi.

Example 47: The head-mounted display system of any of the Examples above, wherein the first and second polarizations comprise first and second linear polarization having different polarization angles.

Example 48: The head-mounted display system of any of the Examples above, wherein the first and second polarizations comprise first and second linear polarization oriented in orthogonal directions.

Example 49: The head-mounted display system of any of the Examples above, wherein the first and second polarizations comprise transverse magnetic and transverse electric polarizations, respectively.

Example 50: The head-mounted display system of any of the Examples above, wherein the first and second polarizations comprise transverse electric and transverse magnetic polarizations, respectively.

Example 51: The head-mounted display system of any of the Examples above, wherein the first diffraction efficiency comprises a diffraction efficiency for transverse-magnetic polarized light averaged across the visible light spectrum and wherein the second diffraction efficiency comprises a diffraction efficiency for transverse-electric polarized light averaged across the visible light spectrum.

Example 52: The head-mounted display system of any of the Examples above, wherein the first diffraction efficiency comprises a diffraction efficiency for transverse-electric polarized light averaged across the visible light spectrum and wherein the second diffraction efficiency comprises a diffraction efficiency for transverse-magnetic polarized light averaged across the visible light spectrum.

Example 53: The head-mounted display system of any of the Examples above, wherein the first diffraction efficiency is at least 2 times the second diffraction efficiency.

Example 54: The head-mounted display system of any of the Examples above, wherein the fourth diffraction efficiency is at least 2 times the third diffraction efficiency.

Example 55: The head-mounted display system of any of the Examples above, wherein the first diffraction efficiency is at least 4 times the second diffraction efficiency.

Example 56: The head-mounted display system of any of the Examples above, wherein the fourth diffraction efficiency is at least 4 times the third diffraction efficiency.

Example 57: The head-mounted display system of any of the Examples above, wherein the first diffraction efficiency is at least 6 times the second diffraction efficiency.

Example 58: The head-mounted display system of any of the Examples above, wherein the forth diffraction efficiency is at least 6 times the third diffraction efficiency.

Example 59: The head-mounted display system of any of the Examples above, wherein the first diffraction efficiency is a transmissive diffraction grating diffracting more light transmitted therethrough than reflected therefrom.

Example 60: The head-mounted display system of any of the Examples above, wherein the second diffraction efficiency is a reflective diffraction grating diffracting more light reflected therefrom than transmitted therethrough.

Example 61: The head-mounted display system of any of the Examples above, wherein the range of angles is at least 6 degrees.

Example 62: The head-mounted display system of any of the Examples above, wherein the range of angles is at least 12 degrees.

Example 63: The head-mounted display system of any of the Examples above, wherein the range of angles is at least 18 degrees.

Example 64: The head-mounted display system of any of the Examples above, wherein the range of angles is at least 22 degrees.

Example 65: The head-mounted display system of any of the Examples above, wherein the range of angles is between ±3 degrees with respect to the plane of the substrate.

Example 66: The head-mounted display system of any of the Examples above, wherein the range of angles is between ±6 degrees with respect to the plane of the substrate.

Example 67: The head-mounted display system of any of the Examples above, wherein the range of angles is between ±9 degrees with respect to the plane of the substrate.

Example 68: The head-mounted display system of any of the Examples above, wherein the range of angles is between ±11 degrees with respect to the plane of the substrate.

Example 69: The head-mounted display system of any of the Examples above, wherein said waveguide is included in an eyepiece configured to direct light to an eye of a user wearing said head mounted display.

Example 70: The head-mounted display system of Example 48, wherein said eyepiece is disposed on the frame and is configured to direct light from the light projection system into the eye of the user to display augmented reality image content to the vision field of the user, at least a portion of the eyepiece being transparent and disposed at a location in front of the eye of the user when the user wears the head-mounted display system, where the transparent portion transmits light from a portion of a physical environment in front of the user to the eye of the user to provide a view of the portion of the physical environment in front of the user, the eyepiece comprising.

Example 71: The head-mounted display system of Example 48 or 49, wherein said eyepiece comprises said at least one waveguide and said at least one waveguide is transparent to visible light such that the user can see through the waveguide.

Example 72: The head-mounted display system of any of the Examples above, wherein said first diffraction gratings comprises an in-coupling grating (ICG) configured to in-couple light from said light projection system into said waveguide.

Example 73: The head-mounted display system of any of the Examples above, wherein the first layer is conformally deposited onto one or more diffractive features of the first diffraction grating.

Example 74: The head-mounted display system of any of the Examples above, wherein the first layer is directionally deposited onto the one or more diffractive features at an angle.

Example 75: The head-mounted display system of Example 73, wherein the angle comprises 75 to 105 degrees with respect to a planar major surface of the substrate.

Example 76: The head-mounted display system of Example 73, wherein the angle is 75 to 105 degrees with respect to a surface of one or more diffractive features of the first diffraction grating.

Example 77: The head-mounted display system of any of the Examples above, wherein the first diffraction grating comprises diffractive features formed in a 1D array.

Example 78: The head-mounted display system of any of Examples 1-75, wherein the first diffraction grating comprises diffractive features formed in a 2D array.

Example 79: The head-mounted display system of Example 77, wherein the 2D array comprises a square array.

Example 80: The head-mounted display of any of the Examples above, wherein the diffractive features are asymmetrical so as to provide a blazed grating.

Example 81: The head-mounted display of any of the Examples above, wherein the diffractive features have material asymmetrically deposited thereon so as to prove for a blazed grating.

Example 82: The head-mounted display of any of the Examples above, wherein said first diffraction grating is configured to direct light preferentially in at least two directions.

Example 83: The head-mounted display of any of the Examples above, wherein said first diffraction grating is blazed in two directions.

Example 84: The head-mounted display system of any of the Examples above, wherein the first diffraction grating comprises a one-dimensional grating.

Example 85: The head-mounted display system of any of Examples 1-64, wherein the first diffraction grating comprises a two-dimensional grating.

Example 86: The head-mounted display system of any of the Examples above, wherein the substrate comprises material having an index of refraction of no more than 2.6.

Example 87: The head-mounted display system of any of the Examples above, wherein the substrate comprises material having an index of refraction of no more than 2.7.

Example 88: The head-mounted display system of any of the Examples above, wherein the substrate comprises material having an index of refraction of no more than 2.8.

Example 89: The head-mounted display system of any of the Examples above, wherein the first layer comprises a dielectric.

Example 90: The head-mounted display system of any of the Examples above, wherein the first layer comprise material having a refractive of 1.9 or more.

Example 91: The head-mounted display system of any of the Examples above, further comprising an anti-reflective coating to reduce reflection of said first diffractive grating.

Example 92: The head-mounted display system of any of the Examples above, further comprising a bandpass filter or a notch filter to alter the spectral reflectivity and/or spectral transmission said first diffractive grating.

Example 93: The head-mounted display system of any of the Examples above, further comprising a plurality of sublayers over said first layer, said plurality of sublayers comprising a first higher index material and a second lower index material.

Example 94: The head-mounted display system of Example 92, wherein the first higher index material comprises titanium dioxide ($TiO_2$) and a second lower index material comprises silicon dioxide ($SiO_2$).

Example 95: The head-mounted display system of Example 92 or 93, wherein the plurality of sublayers comprising only two sublayers.

Example 96: The head-mounted display system of Example 92 or 93, wherein the plurality of sublayers comprising at least four sublayers.

Example 97: The head-mounted display system of any of Examples 92-95, wherein the plurality of sublayers alternate between the first material and the second material.

Example 98: The head-mounted display system of any of Examples 92-96, wherein the plurality of sublayers comprises an interference coating.

Example 99: The head-mounted display system of any of Examples 92-97, wherein the plurality of sublayers comprises a quarter wave stack.

Example 100: The head-mounted display system of any of Examples 92-98, wherein the plurality of sublayers over said first layer forms a bandpass filter.

Example 101: The head-mounted display system of any of Examples 92-98, wherein the plurality of sublayers over said first layer forms a notch filter.

Example 102: The head-mounted display system of any of Examples 92-98, wherein the plurality of sublayers over said first layer forms an anti-reflection (AR) coating.

Example 103: The head-mounted display system of any of Examples 92-101, wherein first the lower index material has a refractive index of 1.6 or less.

Example 104: The head-mounted display system of any of Examples 92-102, wherein the second higher index material has a refractive index of 1.9 or more.

Example 105: The head-mounted display system of any of the Examples 92-103, wherein the first lower index material comprises silicon dioxide.

Example 106: The head-mounted display system of any of the Examples 92-104, wherein the second higher index material comprises titanium dioxide.

Example 107: The head-mounted display system of any of Examples 92-104, wherein the second higher index material comprises zirconium dioxide.

Example 108: The head-mounted display system of any of Examples 92-104, wherein the second higher index material comprises zinc oxide.

Example 109: The head-mounted display system of any of the Examples above, wherein said first diffraction grating comprises an average diffraction efficiency for said first polarization over said range of angles and said second diffraction efficiency comprises an average diffraction efficiency for said second polarization over said range of angles.

Example 110: The head-mounted display system of any of the Examples above, wherein the range of angles is at least 25 degrees.

Example 111: The head-mounted display system of any of the Examples above, wherein the range of angles is at least 30 degrees.

Example 112: The head-mounted display system of any of the Examples above, wherein the range of angles is at least 35 degrees.

Example 113: The head-mounted display system of any of the Examples above, wherein the range of angles is at least 40 degrees.

Example 114: The head-mounted display system of any of the Examples above, wherein the range of angles is between ±15 degrees with respect to the plane of the substrate.

Example 115: The head-mounted display system of any of the Examples above, wherein the range of angles is between ±18 degrees with respect to the plane of the substrate.

Example 116: The head-mounted display system of any of the Examples above, wherein the range of angles is between ±20 degrees with respect to the plane of the substrate.

Example 117: The head-mounted display system of any of the Examples above, wherein the first diffraction grating comprises diffractive features comprising first and second sidewalls.

Example 118: The head-mounted display system of Example 116, wherein at least said first sidewalls is sloped.

Example 119: The head-mounted display system of Examples 116 or 117, wherein said first and second sidewalls are separated by a plateau.

Example 120: The head-mounted display system of Examples 116 or 117, wherein said first and second sidewalls joint to form salient angle at the top of said diffractive feature.

Example 121: The head-mounted display system of any of Examples 116-119, wherein said first sidewall is sloped at an angle such that said first sidewall is less steep than said second sidewall.

Example 122: The head-mounted display system of any of Examples 116-120, wherein said first sidewall is wider than said second sidewall.

Example 123: The head-mounted display system of any of the Examples 116-121, wherein said first sidewall forms an angle of from 45° to 85° at said base of said diffractive feature.

Example 124: The head-mounted display system of any of the Examples 116-122, wherein said second sidewall forms an acute re-entrant angle at the base of said diffractive feature.

Example 125: The head-mounted display system of any of the Examples 116-123, wherein said first diffraction grating comprises shark-fin shaped diffractive features.

Example 126: The head-mounted display system of any of the Examples 116-122, wherein said second sidewall forms an obtuse re-entrant angle at the base of said diffractive feature.

Example 127: The head-mounted display system of any of the Examples 116-122, wherein said second sidewall is vertical.

Example 128: The head-mounted display system of any of the Examples 116-122 or 125-126, wherein said first diffraction grating comprises sawtooth shaped diffractive features.

Example 129: The head-mounted display system of any of the Examples above, wherein said first layer comprises a biased deposition.

Example 130: The head-mounted display system of any of the Examples above, wherein said first layer comprises a glazing angle deposition.

Example 131: The head-mounted display system of any of Examples 116-129, wherein said first layer is biased to provide more coverage on said first sidewall than said second sidewall.

Example 132: The head-mounted display system of any of Examples 116-130, wherein said first layer covers a greater fraction of said first sidewall than said second sidewall.

Example 133: The head-mounted display system of any of Examples 116-131, wherein said first layer is biased to provide thicker coverage on said first sidewall than said second sidewall.

Example 134: The head-mounted display system of any of Examples 116-132, wherein said first layer provides on average thicker coverage on said first sidewall than said second sidewall.

Example 135: The head-mounted display system of any of the Examples above, wherein the second diffraction grating comprises diffractive features comprising first and second sidewalls.

Example 136: The head-mounted display system of any of Examples 134, wherein said first sidewall slopes at a shallower angle and said second sidewall slopes at a steeper angle.

Example 137: The head-mounted display system of any of Examples 134 or 135, wherein said first sidewall is completely covered by said second layer.

Example 138: The head-mounted display system of any of Examples 134-136, wherein at least a portion of said second sidewall is not covered by said second layer.

Example 139: The head-mounted display system of any of Examples 134-137, wherein said second sidewall includes more area not covered by said second layer than said first sidewall.

Example 140: The head-mounted display system of any of Examples 134-138, wherein said second layer comprises a conformal deposition.

Example 141: The head-mounted display system of any of Examples 134-139, wherein said first and second sidewalls are completely covered by said second layer.

Example 142

Example 143: The head-mounted display system of any of Examples 134-140, wherein said second layer is not biased to cover more of said first sidewall than said second sidewall.

Example 144: The head-mounted display system of any of Examples 134-141, wherein said second layer does not provide thicker coverage on said first sidewall than said second sidewall.

Example 145: The head-mounted display system of any of Examples 134-142, wherein said second layer does not provide on average thicker coverage on said first sidewall than said second sidewall.

Example 146: The head-mounted display system of any of Examples 134-143, wherein said second sidewall is entirely covered by said second layer.

Example 147: The head-mounted display system of any of Examples 134-144, wherein said second sidewall does not include more area not covered by said second layer than said first sidewall.

Example 148: The head-mounted display system of any of Examples above, wherein said first diffraction efficiency for said first polarization is more than 40% higher than said second diffraction efficiency for said second polarization.

Example 149: The head-mounted display system of any of Examples above, wherein said first diffraction efficiency for said first polarization is more than 50% higher than said second diffraction efficiency for said second polarization.

Example 150: The head-mounted display system of any of Examples above, wherein said second diffraction efficiency for said second polarization is more than 40% higher than said first diffraction efficiency for said first polarization.

Example 151: The head-mounted display system of any of Examples above, wherein said second diffraction efficiency for said second polarization is more 50% higher than said first diffraction efficiency for said first polarization.

Example 152: The head-mounted display system of any of Examples above, wherein said second diffraction grating with said second layer formed thereon comprises a reflective diffraction grating.

Example 153: The head-mounted display system of any of Examples above, wherein said second diffraction grating with said second layer formed thereon comprises a reflective diffraction grating configured to diffract reflected light to couple light into said waveguide to be guided therein by total internal reflection.

Example 154: The head-mounted display system of any of the Examples above, wherein said diffractive features have a height from 100 to 600 nanometers.

Example 155: The head-mounted display system of any of the Examples above, wherein said diffractive features have a height from 200 to 600 nanometers.

Example 156: The head-mounted display system of any of the Examples above, wherein said diffractive features have a height from 300 to 600 nanometers.

Example 157: The head-mounted display system of any of the Examples above, wherein said diffractive features have a pitch from 290 nm to 690 nm.

Example 158: A head-mounted display system comprising:
a head-mountable frame;
a light projection system configured to output light to provide image content;
a waveguide supported by the frame, the waveguide comprising a substrate configured to guide at least a portion of the light from said light projection system coupled into said waveguide;
a first diffraction grating comprising material different than said substrate over said substrate; and
a first layer disposed over said first diffraction grating such that the first diffraction grating has a first diffraction efficiency for a first polarization over a range of angles of light incident thereon that is greater than a second diffraction efficiency for a second polarization over a range of angles of light incident thereon;
a second diffraction grating comprising material different than said substrate over said substrate, said substrate configured to guide at least a portion of the light from said light projection system coupled into said waveguide via said second diffraction grating
a second layer disposed over said second diffraction grating such that the second diffraction grating has a third diffraction efficiency for the first polarization over a range of angles of light incident thereon that is less than a fourth diffraction efficiency for the second polarization over a range of angles of light incident thereon,
wherein the first diffraction grating is on a first side of said substrate and the second diffraction grating on a second side of said substrate opposite said first side of said substrate.

Example 159: The head-mounted display system of any of the Examples above, wherein said light projection system comprises micro-LEDs.

Example 160: The head-mounted display system of any of the Examples above, wherein said light projection system comprises a DLP or a LCOS display.

Example 161: The head-mounted display system of any of the Examples above, wherein said substrate includes nanoparticles Example 162: The head-mounted display system of any of the Examples above, wherein said substrate includes inorganic nanoparticles.

Example 163: The head-mounted display system of any of the Examples above, wherein said substrate comprises polymer.

Additional Examples—Part VII

Example 1: A head-mounted display system comprising:
a head-mountable frame;
a light projection system configured to output light to provide image content; and
a waveguide supported by the frame, the waveguide comprises a substrate configured to guide at least a portion of the light from said light projection system coupled into said waveguide;
a first diffraction grating comprising material different than said substrate over said substrate, wherein the substrate comprises a material having a first index of refraction;
a first layer disposed over said first diffraction grating, wherein the first layer comprises a material having a second index of refraction;
a material disposed over said first layer having a third index of refraction between the second index of refraction and an index of refraction of air,
wherein said first diffraction grating together with the first layer and the material over the first layer is configured to have a first diffraction efficiency for a first polarization over a range of angles of light incident thereon that is greater than a second diffraction efficiency for a second polarization over said range of angles of light incident thereon.

Example 2: The head-mounted display system of Example 1, wherein the substrate comprises material a lithium-based oxide.

Example 3: The head-mounted display system of Example 1 or 2, wherein the substrate comprises material lithium niobate.

Example 4: The head-mounted display system of Example 1, wherein the substrate comprises material silicon carbide.

Example 5: The head-mounted display system of Example 1, wherein the substrate comprises material having an index of refraction of at least 1.9.

Example 6: The head-mounted display system of Example 1, wherein the substrate comprises material having an index of refraction of at least 2.0.

Example 7: The head-mounted display system of Example 1, wherein the substrate comprises material having an index of refraction of at least 2.1.

Example 8: The head-mounted display system of Example 1, wherein the substrate comprises material having an index of refraction of at least 2.2.

Example 9: The head-mounted display system of Example 1, wherein the substrate comprises material having an index of refraction of at least 2.3.

Example 10: The head-mounted display system of any of the Examples above, wherein the first diffraction grating material comprises polymer.

Example 11: The head-mounted display system of any of the Examples above, wherein the first diffraction grating material comprises imprintable material.

Example 12: The head-mounted display system of any of the Examples above, wherein the first diffraction grating material has a refractive index of 1.4 to 1.95.

Example 13: The head-mounted display system of any of between the Examples above, wherein the first diffraction grating material has a refractive index that is lower than said substrate.

Example 14: The head-mounted display system of any of the Examples above, wherein said first diffraction grating comprises a blazed diffractive grating.

Example 15: The head-mounted display system of any of the Examples above, wherein said first diffraction grating comprises diffractive features comprising peaks spaced apart by grooves therebetween.

Example 16: The head-mounted display system of any of the Examples above, wherein the said first diffraction grating comprises diffractive features comprising a plurality of straight lines.

Example 17: The waveguide of any of the Examples above, wherein said diffractive grating comprises diffractive features that are asymmetric.

Example 18: The head-mounted display system of any of the Examples above, wherein the first layer comprises titanium dioxide ($TiO_2$), zirconium dioxide ($ZrO_2$) or silicon carbide (SiC).

Example 19: The head-mounted display system of any of the Examples above, wherein the first layer comprises titanium dioxide ($TiO_2$).

Example 20: The head-mounted display system of any of the Examples above, wherein the first layer comprises zirconium dioxide ($ZrO_2$).

Example 21: The head-mounted display system of any of the Examples above, wherein the first layer comprises silicon carbide (SiC).

Example 22: The head-mounted display system of any of the Examples above, wherein the first layer comprises a plurality of sublayers comprising a first higher index material and a second lower index material.

Example 23: The head-mounted display system of Example 22, wherein the first higher index material comprises titanium dioxide ($TiO_2$) and a second lower index material comprises silicon dioxide ($SiO_2$).

Example 24: The head-mounted display system of Example 22 or 23, wherein the plurality of sublayers comprising only two sublayers.

Example 25: The head-mounted display system of Example 22 or 23, wherein the plurality of sublayers comprising at least four sublayers.

Example 26: The head-mounted display system of any of Examples 22-25, wherein the plurality of sublayers alternate between the first material and the second material.

Example 27: The head-mounted display system of any of Examples 22-26, wherein the plurality of sublayers comprises an interference coating.

Example 28: The head-mounted display system of any of Examples 22-27, wherein the plurality of sublayers comprises a quarter wave stack.

Example 29: The head-mounted display system of any of the Examples above, wherein the first and second polarizations comprise first and second linear polarization having different polarization angles.

Example 30: The head-mounted display system of any of the Examples above, wherein the first and second polarizations comprise first and second linear polarization oriented in orthogonal directions.

Example 31: The head-mounted display system of any of the Examples above, wherein the first and second polarization direction comprise transverse magnetic and transverse electric polarizations, respectively.

Example 32: The head-mounted display system of any of the Examples above, wherein the first and second polarization direction comprise transverse electric and transverse magnetic polarizations, respectively.

Example 33: The head-mounted display system of any of the Examples above, wherein the first diffraction efficiency comprises a diffraction efficiency for transverse-magnetic polarized light averaged across the visible light spectrum and wherein the second diffraction efficiency comprises a diffraction efficiency for transverse-electric polarized light averaged across the visible light spectrum.

Example 34: The head-mounted display system of any of the Examples above, wherein the first diffraction efficiency comprises a diffraction efficiency for transverse-electric polarized light averaged across the visible light spectrum and wherein the second diffraction efficiency comprises a diffraction efficiency for transverse-magnetic polarized light averaged across the visible light spectrum.

Example 35: The head-mounted display system of any of the Examples above, wherein the first diffraction efficiency is 1 to 1.5 times the second diffraction efficiency.

Example 36: The head-mounted display system of any of the Examples above, wherein the first diffraction efficiency is 1 to 1.4 times the second diffraction efficiency.

Example 37: The head-mounted display system of any of the Examples above, wherein the first diffraction efficiency is 1 to 1.3 times the second diffraction efficiency.

Example 38: The head-mounted display system of any of the Examples above, wherein the first diffraction efficiency is 1 to 1.2 times the second diffraction efficiency.

Example 39: The head-mounted display system of any of the Examples above, wherein the first diffraction efficiency is 1 to 1.1 times the second diffraction efficiency.

Example 40: The head-mounted display system of any of the Examples above, wherein the range of angles is at least 6 degrees.

Example 41: The head-mounted display system of any of the Examples above, wherein the range of angles is at least 12 degrees.

Example 42: The head-mounted display system of any of the Examples above, wherein the range of angles is at least 18 degrees.

Example 43: The head-mounted display system of any of the Examples above, wherein the range of angles is at least 22 degrees.

Example 44: The head-mounted display system of any of the Examples above, wherein the range of angles is between ±3 degrees with respect to the plane of the substrate.

Example 45: The head-mounted display system of any of the Examples above, wherein the range of angles is between ±6 degrees with respect to the plane of the substrate.

Example 46: The head-mounted display system of any of the Examples above, wherein the range of angles is between ±9 degrees with respect to the plane of the substrate.

Example 47: The head-mounted display system of any of the Examples above, wherein the range of angles is between ±11 degrees with respect to the plane of the substrate.

Example 48: The head-mounted display system of any of the Examples above, wherein said waveguide is included in an eyepiece configured to direct light to an eye of a user wearing said head mounted display.

Example 49: The head-mounted display system of Example 48, wherein said eyepiece is disposed on the frame and is configured to direct light from the light projection system into the eye of the user to display augmented reality image content to the vision field of the user, at least a portion of the eyepiece being transparent and disposed at a location in front of the eye of the user when the user wears the head-mounted display system, where the transparent portion transmits light from a portion of a physical environment in front of the user to the eye of the user to provide a view of the portion of the physical environment in front of the user, the eyepiece comprising.

Example 50: The head-mounted display system of Example 48 or 49, wherein said eyepiece comprises said at least one waveguide and said at least one waveguide is transparent to visible light such that the user can see through the waveguide.

Example 51: The head-mounted display system of any of the Examples above, wherein said waveguide comprises an in-coupling optical element for coupling light from said light projection system into the waveguide to be guided therein.

Example 52: The head-mounted display system of any of the Examples above, wherein said waveguide comprises an out-coupling optical element for coupling light from said light projection system out of the waveguide and directs said light to the user's eye to present said image content to the viewer.

Example 53: The head-mounted display system of any of the Examples above, wherein said first diffraction gratings comprises an in-coupling grating (ICG) configured to in-couple light from said light projection system into said waveguide.

Example 54: The head-mounted display system of any of the Examples above, wherein the first diffraction grating comprises a one-dimensional grating.

Example 55: The head-mounted display system of any of Examples 1-53, wherein the first diffraction grating comprises a two-dimensional grating.

Example 56: The head-mounted display system of Example 1, wherein the first layer is conformally deposited onto one or more diffractive features of the first diffraction grating.

Example 57: The head-mounted display system of Example 1, wherein the first layer is directionally deposited onto the one or more diffractive features at an angle.

Example 58: The head-mounted display system of Example 57, wherein the angle comprises 75 to 105 degrees with respect to a planar major surface of the substrate.

Example 59: The head-mounted display system of Example 57, wherein the angle is 75 to 105 degrees with respect to a surface of one or more diffractive features of the first diffraction grating.

Example 60: The head-mounted display system of any of the Examples above, wherein the first diffraction grating comprises diffractive features formed in a 1D array.

Example 61: The head-mounted display system of any of Examples 1-60, wherein the first diffraction grating comprises diffractive features formed in a 2D array.

Example 62: The head-mounted display system of Example 61, wherein the 2D array comprises a square array.

Example 63: The head-mounted display of any of the Examples above, wherein the diffractive features are asymmetrical so as to provide a blazed grating.

Example 64: The head-mounted display of any of the Examples above, wherein the diffractive features have material asymmetrically deposited thereon so as to prove for a blazed grating.

Example 65: The head-mounted display of any of the Examples above, wherein said first diffraction grating is configured to direct light preferentially in at least two directions.

Example 66: The head-mounted display of any of the Examples above, wherein said first diffraction grating is blazed in two directions.

Example 67: The head-mounted display system of any of the Examples above, wherein said light projection system comprises micro-LEDs.

Example 68: The head-mounted display system of any of the Examples above, wherein said light projection system comprises a DLP or a LCOS display.

Example 69: The head-mounted display system of any of the Examples above, wherein said substrate includes nanoparticles.

Example 70: The head-mounted display system of any of the Examples above, wherein said substrate includes inorganic nanoparticles.

Example 71: The head-mounted display system of any of the Examples above, wherein said substrate comprises polymer.

Additional Examples—Part VIII

Example 1: A method of fabricating a diffraction grating with reduced polarization sensitivity, the method comprising:
    forming one or more diffractive features in or on a substrate configured to guide at least a portion of light from a light projection system coupled into the substrate;
    depositing a first layer over said one or more diffractive features; and
    depositing a second layer over said one or more diffractive features such that the one or more diffractive features has a first diffraction efficiency for a first polarization over a range of angles of light incident thereon and a second diffraction efficiency for a second polarization over the range of angles of light incident thereon, the first diffraction efficiency being from 1 to 2 times the second diffraction efficiency.

Example 2: The method of Example 1, wherein the substrate comprises a lithium-based oxide.

Example 3: The method of Examples 1 or 2, wherein the substrate comprises lithium niobate.

Example 4: The method of Example 1, wherein the substrate comprises material silicon carbide.

Example 5: The method of Example 1, wherein the substrate comprises material having an index of refraction of at least 1.9.

Example 6: The method of Example 1, wherein the substrate comprises material having an index of refraction of at least 2.0.

Example 7: The method of Example 1, wherein the substrate comprises material having an index of refraction of at least 2.1.

Example 8: The method of Example 1, wherein the substrate comprises material having an index of refraction of at least 2.2.

Example 9: The method of Example 1, wherein the substrate comprises material having an index of refraction of at least 2.3.

Example 10: The method of any of the Examples above, wherein the substrate comprises polymer.

Example 11: The method of any of the Examples above, wherein forming the one or more diffractive features comprises imprinting the one or more diffractive features into the substrate.

Example 12: The method of any of the Examples above, wherein the one or more diffractive features comprises a blazed diffractive grating.

Example 13: The method of any of the Examples above, wherein the one or more diffractive features comprises peaks spaced apart by grooves therebetween.

Example 14: The method of any of the Examples above, wherein the one or more diffractive features comprise asymmetric diffractive features.

Example 15: The method of Example 1, wherein depositing the first layer comprises conformally depositing at least one material onto the one or more diffractive features.

Example 16: The method of Example 1, wherein depositing the first layer comprises directionally depositing at least one material onto the one or more diffractive features at an angle.

Example 17: The method of Example 10, wherein the angle comprises 75 to 105 degrees with respect to a planar major surface of the substrate.

Example 18: The method of Example 10, wherein the angle is 75 to 105 degrees with respect to a surface of the one or more diffractive features.

Example 19: The method of Example 1, wherein depositing the second layer comprises conformally depositing at least one material onto the one or more diffractive features.

Example 20: The method of Example 1, wherein depositing the second layer comprises directionally depositing at least one material onto the one or more diffractive features at an angle.

Example 21: The method of Example 14, wherein the angle comprises 75 to 105 degrees with respect to a planar major surface of the substrate.

Example 22: The method of Example 14, wherein the angle is 75 to 105 degrees with respect to a surface of the one or more diffractive features.

Example 23: The method of any of the Examples above, wherein the first layer comprises titanium dioxide ($TiO_2$), zirconium dioxide ($ZrO_2$) or silicon carbide (SiC).

Example 24: The method of any of the Examples above, wherein the first layer comprises titanium dioxide ($TiO_2$).

Example 25: The method of any of the Examples above, wherein the first layer comprises zirconium dioxide ($ZrO_2$).

Example 26: The method of any of the Examples above, wherein the first layer comprises silicon carbide (SiC).

Example 27: The method of any of the Examples above, wherein the first layer comprises a plurality of sublayers comprising a first higher index material and a second lower index material.

Example 28: The method of Example 27, wherein the first higher index material comprises titanium dioxide ($TiO_2$) and a second lower index material comprises silicon dioxide ($SiO_2$).

Example 29: The method of Example 27 or 28, wherein the plurality of sublayers comprising only two sublayers.

Example 30: The method of Example 27 or 28, wherein the plurality of sublayers comprising at least four sublayers.

Example 31: The method of any of Examples 27-30, wherein the plurality of sublayers alternate between the first material and the second material.

Example 32: The method of any of Examples 27-31, wherein the plurality of sublayers comprises an interference coating.

Example 33: The method of any of Examples 27-32, wherein the plurality of sublayers comprises a quarter wave stack.

Example 34: The method of any of the Examples above, wherein the metal comprises aluminum, silver, gold, or copper.

Example 35: The method of any of the Examples above, wherein the first and second polarizations comprise first and second linear polarizations having different polarization angles.

Example 36: The method of any of the Examples above, wherein the first and second polarizations comprise first and second linear polarizations oriented in orthogonal directions.

Example 37: The method of any of the Examples above, wherein the first and second polarization direction comprise transverse magnetic and transverse electric polarizations, respectively.

Example 38: The method of any of the Examples above, wherein the first and second polarization direction comprise transverse electric and transverse magnetic polarizations, respectively.

Example 39: The method of any of the Examples above, wherein the first diffraction efficiency comprises a diffraction efficiency for transverse-magnetic polarized light averaged across the visible light spectrum and wherein the second diffraction efficiency comprises a diffraction efficiency for transverse-electric polarized light averaged across the visible light spectrum.

Example 40: The method of any of the Examples above, wherein the first diffraction efficiency comprises a diffraction efficiency for transverse-electric polarized light averaged across the visible light spectrum and wherein the second diffraction efficiency comprises a diffraction efficiency for transverse-magnetic polarized light averaged across the visible light spectrum.

Example 41: The method of any of the Examples above, wherein the first diffraction efficiency is 1 to 1.5 times the second diffraction efficiency.

Example 42: The method of any of the Examples above, wherein the first diffraction efficiency is 1 to 1.4 times the second diffraction efficiency.

Example 43: The method of any of the Examples above, wherein the first diffraction efficiency is 1 to 1.3 times the second diffraction efficiency.

Example 44: The method of any of the Examples above, wherein the first diffraction efficiency is 1 to 1.2 times the second diffraction efficiency.

Example 45: The method of any of the Examples above, wherein the first diffraction efficiency is 1 to 1.1 times the second diffraction efficiency.

Example 46: The method of any of the Examples above, wherein the range of angles is at least 6 degrees.

Example 47: The method of any of the Examples above, wherein the range of angles is at least 12 degrees.

Example 48: The method of any of the Examples above, wherein the range of angles is at least 18 degrees.

Example 49: The method of any of the Examples above, wherein the range of angles is at least 22 degrees.

Example 50: The method of any of the Examples above, wherein the range of angles is between ±3 degrees with respect to the plane of the substrate.

Example 51: The method of any of the Examples above, wherein the range of angles is between ±6 degrees with respect to the plane of the substrate.

Example 52: The method of any of the Examples above, wherein the range of angles is between ±9 degrees with respect to the plane of the substrate.

Example 53: The method of any of the Examples above, wherein the range of angles is between ±11 degrees with respect to the plane of the substrate.

Example 54: The method of any of the Examples above, wherein the second layer is configured to be disposed over the first layer.

Example 55: The method of any of the Examples above further comprising a third layer disposed between said first layer and said second layer.

Example 56: The method of Example 55, wherein the third layer is configured to help bond said second layer to said first layer.

Example 57: The method of any of the Examples above, wherein the first diffraction grating comprises diffractive features formed in a 1D array.

Example 58: The method of any of Examples 1-56, wherein the first diffraction grating comprises diffractive features formed in a 2D array.

Example 59: The method of Example 58, wherein the 2D array comprises a square array.

Example 60: The method of any of the Examples above, wherein the diffractive features are asymmetrical so as to provide a blazed grating.

Example 61: The method of any of the Examples above, wherein the diffractive features have material asymmetrically deposited thereon so as to prove for a blazed grating.

Example 62: The method of any of the Examples above, wherein said first diffraction grating is configured to direct light preferentially in at least two directions.

Example 63: The method of any of the Examples above, wherein said first diffraction grating is blazed in two directions.

Example 64: The method of any of the Examples above, glazing angle deposition (GLAD) is used to deposit said second layer.

Example 65: The method of any of the Examples above, glazing angle deposition (GLAD) is used to deposit said second layer.

Example 66: The method of any of the Examples above, wherein said diffractive features of said diffraction grating have first and second sidewalls, said second sidewalls comprising reentrant side walls such that deposition passively provides for less coverage of said second layer on said second reentrant sidewalls than on said first.

Example 67: The method of any of the Examples above, wherein said diffractive features of said diffraction grating have first and second sidewalls, said second surface tilted such that deposition provides for less coverage of said second layer on said second sidewalls than on said first.

Example 68: The method of any of the Examples above, wherein said diffractive features of said diffraction grating have first and second sidewalls, said second sidewalls having an obtuse internal angle as measured from the base of the diffraction grating such that deposition provides for less coverage of said second layer on said second sidewalls than on said first.

Example 69: The head-mounted display system of any of the Examples above, wherein said light projection system comprises micro-LEDs.

Example 70: The head-mounted display system of any of the Examples above, wherein said light projection system comprises a DLP or a LCOS display.

Example 71: The head-mounted display system of any of the Examples above, wherein said substrate includes nanoparticles.

Example 72: The head-mounted display system of any of the Examples above, wherein said substrate includes inorganic nanoparticles.

Additional Examples—Part IX

Example 1: A head-mounted display system comprising:
a head-mountable frame;
a light projection system configured to output light to provide image content;
a waveguide supported by the frame, the waveguide comprising a substrate configured to guide at least a portion of the light from said light projection system coupled into said waveguide;
a first diffraction grating; and
a first layer disposed over said first diffraction grating such that said diffraction grating has a first diffraction efficiency for a first polarization over a range of angles of light incident thereon that is from 1 to 2 times a second diffraction efficiency for a second polarization over said range of angles of light incident thereon.

Example 2: The head-mounted display system of Example 1, wherein the first diffraction grating comprising material different than said substrate over said substrate.

Example 3: The head-mounted display system of Examples 1 or 2, wherein the first diffraction grating is formed in said substrate.

Example 4: The head-mounted display system of any of Examples 1-3, wherein the substrate comprises $SiO_2$, $B_2O_3$, $Li_2O$, or $La_2O_3$.

Example 5: The head-mounted display system of any of Examples 1-3, wherein the substrate comprises glass.

Example 6: The head-mounted display system of any of Examples 1-3, wherein the substrate comprises $LiNbO_3$, $LiTaO_3$, $TiO_2$, $ZrO_2$, $ZnO$, $Si_3N_4$, or $SiC$, Example 7: The head-mounted display system of any of Examples 1-3, wherein the substrate comprises polymer.

Example 8: The head-mounted display system of any of Examples 1-3, wherein the substrate comprises PC, PMMA, PVA. or acrylate containing resin.

Example 9: The head-mounted display system of any of Examples 1-3, wherein the substrate comprises material having an index of refraction of from 1.4 to 2.7.

Example 10: The head-mounted display system of any of Examples 1-3, wherein the substrate comprises material having an index of refraction of from 1.4 to 1.6.

Example 11: The head-mounted display system of any of Examples 1-3, wherein the substrate comprises material having an index of refraction of from 1.5 to 1.6.

Example 12: The head-mounted display system of any of Examples 1-3, wherein the substrate comprises material having an index of refraction of from 1.6 to 2.7.

Example 13: The head-mounted display system of any of Examples 1-3, wherein the substrate comprises material having an index of refraction of from 1.7 to 2.7.

Example 14: The head-mounted display system of any of Examples 1-3, wherein the substrate comprises material having an index of refraction of from 1.8 to 2.7.

Example 15: The head-mounted display system of any of Examples 1-3, wherein the substrate comprises material having an index of refraction of from 1.9 to 2.7.

Example 16: The head-mounted display system of any of Examples 1-3, wherein the substrate comprises material having an index of refraction of from 2.0 to 2.7.

Example 17: The head-mounted display system of any of Examples 1-3, wherein the substrate comprises material having an index of refraction of from 2.1 to 2.7.

Example 18: The head-mounted display system of any of Examples 1-3, wherein the substrate comprises material having an index of refraction of from 2.2 to 2.7.

Example 19: The head-mounted display system of any of Examples 1-3, wherein the substrate comprises material having an index of refraction of from 2.3 to 2.7.

Example 20: The head-mounted display system of any of Examples 1-3, wherein the substrate comprises material having an index of refraction of from 2.4 to 2.7.

Example 21: The head-mounted display system of any of Examples 1-3, wherein the substrate comprises material having an index of refraction of from 2.4 to 2.7.

Example 22: The head-mounted display system of any of Examples 1-3, wherein the substrate comprises material having an index of refraction of from 1.6 to 1.8.

Example 23: The head-mounted display system of any of the Examples above, wherein the first diffraction grating material comprises polymer.

Example 24: The head-mounted display system of any of the Examples above, wherein the first diffraction grating material comprises PC, PMMA, PVA, or acrylate containing resin.

Example 25: The head-mounted display system of any of the Examples above, wherein the first diffraction grating material comprises imprintable material.

Example 26: The head-mounted display system of any of the Examples above, wherein the first diffraction grating material comprises glass.

Example 27: The head-mounted display system of any of Examples 1-22, wherein the first diffraction grating material has a refractive index of 1.4 to 1.7.

Example 28: The head-mounted display system of any of Examples 1-22, wherein the first diffraction grating material has an index of refraction of from 1.4 to 1.6.

Example 29: The head-mounted display system of any of Examples 1-22, wherein the first diffraction grating material has an index of refraction of from 1.5 to 1.6.

Example 30: The head-mounted display system of any of Examples 1-22, wherein the first diffraction grating material has an index of refraction of from 1.6 to 1.8.

Example 31: The head-mounted display system of any of Examples 1-22, wherein the first diffraction grating material has an index of refraction of from 1.7 to 1.8.

Example 32: The head-mounted display system of any of Examples 1-22, wherein the first diffraction grating material has an index of refraction of from 1.8 to 2.2.

Example 33: The head-mounted display system of any of Examples 1-22, wherein the first diffraction grating material has an index of refraction of from 1.9 to 2.2.

Example 34: The head-mounted display system of any of Examples 1-22, wherein the first diffraction grating material has an index of refraction of from 2.0 to 2.4.

Example 35: The head-mounted display system of any of Examples 1-22, wherein the first diffraction grating material has an index of refraction of from 2.2 to 2.4.

Example 36: The head-mounted display system of any of Examples 1-22, wherein the first diffraction grating material has an index of refraction of from 2.2 to 2.6.

Example 37: The head-mounted display system of any of Examples 1-22, wherein the first diffraction grating material has a refractive index that is lower than said substrate.

Example 38: The head-mounted display system of any of the Examples above, wherein said first diffraction grating comprises a blazed diffractive grating.

Example 39: The head-mounted display system of any of the Examples above, wherein said first diffraction grating comprises diffractive features comprising peaks spaced apart by grooves therebetween.

Example 40: The head-mounted display system of any of the Examples above, wherein the said first diffraction grating comprises diffractive features comprising a plurality of straight lines.

Example 41: The waveguide of any of the Examples above, wherein said diffractive grating comprises diffractive features that are asymmetric.

Example 42: The head-mounted display system of any of the Examples above, wherein the first layer comprises: Si3N4, ZnO, ZrO2. TiO2, SiC, ZnTe, GaP, BP.

Example 43: The head-mounted display system of any of Examples 1-41, wherein the first layer has a refractive index from 1.9 to 3.5.

Example 44: The head-mounted display system of any of Examples 1-41, wherein the first layer has an index of refraction of from 1.9 to 2.2.

Example 45: The head-mounted display system of any of Examples 1-41, wherein the first layer has an index of refraction of from 2.0 to 2.4.

Example 46: The head-mounted display system of any of Examples 1-41, wherein the first layer has an index of refraction of from 2.2 to 2.6.

Example 47: The head-mounted display system of any of Examples 1-41, wherein the first layer has an index of refraction of from 2.0 to 2.6.

Example 48: The head-mounted display system of any of Examples 1-41, wherein the first layer has an index of refraction of from 2.0 to 2.7.

Example 49: The head-mounted display system of any of Examples 1-41, wherein the first layer has an index of refraction of from 2.0 to 3.5.

Example 50: The head-mounted display system of any of Examples 1-41, wherein the first layer has an index of refraction of from 2.1 to 2.7.

Example 51: The head-mounted display system of any of Examples 1-41, wherein the first layer has an index of refraction of from 2.1 to 3.5.

Example 52: The head-mounted display system of any of Examples 1-41, wherein the first layer has an index of refraction of from 2.2 to 2.7.

Example 53: The head-mounted display system of any of Examples 1-41, wherein the first layer has an index of refraction of from 2.2 to 3.5.

Example 54: The head-mounted display system of any of the Examples above, wherein the first layer has a refractive index greater than said first diffraction grating.

Example 55: The head-mounted display system of any of the Examples above, wherein the first layer has a refractive index greater than said substrate.

Example 56: The head-mounted display system of any of the Examples above, wherein the first and second polarizations comprise first and second linear polarization having different polarization angles.

Example 57: The head-mounted display system of any of the Examples above, wherein the first and second polarizations comprise first and second linear polarizations oriented in orthogonal directions.

Example 58: The head-mounted display system of any of the Examples above, wherein the first and second polarizations comprise transverse magnetic and transverse electric polarizations, respectively.

Example 59: The head-mounted display system of any of the Examples above, wherein the first and second polarizations comprise transverse electric and transverse magnetic polarizations, respectively.

Example 60: The head-mounted display system of any of the Examples above, wherein the first diffraction efficiency comprises a diffraction efficiency for transverse-magnetic polarized light averaged across the visible light spectrum and wherein the second diffraction efficiency comprises a diffraction efficiency for transverse-electric polarized light averaged across the visible light spectrum.

Example 61: The head-mounted display system of any of the Examples above, wherein the first diffraction efficiency comprises a diffraction efficiency for transverse-electric polarized light averaged across the visible light spectrum and wherein the second diffraction efficiency comprises a diffraction efficiency for transverse-magnetic polarized light averaged across the visible light spectrum.

Example 62: The head-mounted display system of any of the Examples above, wherein the first diffraction efficiency is 1 to 1.8 times the second diffraction efficiency.

Example 63: The head-mounted display system of any of the Examples above, wherein the first diffraction efficiency is 1 to 1.7 times the second diffraction efficiency.

Example 64: The head-mounted display system of any of the Examples above, wherein the first diffraction efficiency is 1 to 1.6 times the second diffraction efficiency.

Example 65: The head-mounted display system of any of the Examples above, wherein the first diffraction efficiency is 1 to 1.5 times the second diffraction efficiency.

Example 66: The head-mounted display system of any of the Examples above, wherein the first diffraction efficiency is 1 to 1.4 times the second diffraction efficiency.

Example 67: The head-mounted display system of any of the Examples above, wherein the first diffraction efficiency is 1 to 1.3 times the second diffraction efficiency.

Example 68: The head-mounted display system of any of the Examples above, wherein the first diffraction efficiency is 1 to 1.2 times the second diffraction efficiency.

Example 69: The head-mounted display system of any of the Examples above, wherein the first diffraction efficiency is 1 to 1.1 times the second diffraction efficiency.

Example 70: The head-mounted display system of any of the Examples above, wherein the range of angles is at least 6 degrees.

Example 71: The head-mounted display system of any of the Examples above, wherein the range of angles is at least 12 degrees.

Example 72: The head-mounted display system of any of the Examples above, wherein the range of angles is at least 18 degrees.

Example 73: The head-mounted display system of any of the Examples above, wherein the range of angles is at least 22 degrees.

Example 74: The head-mounted display system of any of the Examples above, wherein the range of angles is between ±3 degrees with respect to the plane of the substrate.

Example 75: The head-mounted display system of any of the Examples above, wherein the range of angles is between ±6 degrees with respect to the plane of the substrate.

Example 76: The head-mounted display system of any of the Examples above, wherein the range of angles is between ±9 degrees with respect to the plane of the substrate.

Example 77: The head-mounted display system of any of the Examples above, wherein the range of angles is between ±11 degrees with respect to the plane of the substrate.

Example 78: The head-mounted display system of any of the Examples above, wherein said waveguide is included in an eyepiece configured to direct light to an eye of a user wearing said head mounted display.

Example 79: The head-mounted display system of Example 78, wherein said eyepiece is disposed on the frame and is configured to direct light from the light projection system into the eye of the user to display augmented reality image content to the vision field of the user, at least a portion of the eyepiece being transparent and disposed at a location in front of the eye of the user when the user wears the head-mounted display system, where the transparent portion transmits light from a portion of a physical environment in front of the user to the eye of the user to provide a view of the portion of the physical environment in front of the user, the eyepiece comprising.

Example 80: The head-mounted display system of Example 78 or 79, wherein said eyepiece comprises said at least one waveguide and said at least one waveguide is transparent to visible light such that the user can see through the waveguide.

Example 81: The head-mounted display system of any of the Examples above, wherein said waveguide comprises an in-coupling optical element for coupling light from said light projection system into the waveguide to be guided therein.

Example 82: The head-mounted display system of any of the Examples above, wherein said waveguide comprises an out-coupling optical element for coupling light from said light projection system out of the waveguide and directs said light to the user's eye to present said image content to the viewer.

Example 83: The head-mounted display system of any of the Examples above, wherein said first diffraction gratings comprises an in-coupling grating (ICG) configured to in-couple light from said light projection system into said waveguide.

Example 84: The head-mounted display system of any of the Examples above, wherein the first layer is directionally deposited onto the one or more diffractive features at an angle.

Example 85: The head-mounted display system of Example 84, wherein the angle comprises 75 to 105 degrees with respect to a planar major surface of the substrate.

Example 86: The head-mounted display system of Example 84, wherein the angle is 75 to 105 degrees with respect to a surface of one or more diffractive features of the first diffraction grating.

Example 87: The head-mounted display system of any of the Examples above, wherein the first diffraction grating comprises diffractive features formed in a 1D array.

Example 88: The head-mounted display system of any of Examples 1-86, wherein the first diffraction grating comprises diffractive features formed in a 2D array.

Example 89: The head-mounted display system of Example 88, wherein the 2D array comprises a square array.

Example 90: The head-mounted display of any of the Examples above, wherein the diffractive features are asymmetrical so as to provide a blazed grating.

Example 91: The head-mounted display of any of the Examples above, wherein the diffractive features have material asymmetrically deposited thereon so as to prove for a blazed grating.

Example 92: The head-mounted display of any of the Examples above, wherein said first diffraction grating is configured to direct light preferentially in at least two directions.

Example 93: The head-mounted display of any of the Examples above, wherein said first diffraction grating is blazed in two directions.

Example 94: The head-mounted display system of any of the Examples above, wherein the first diffraction grating comprises a one-dimensional grating.

Example 95: The head-mounted display system of any of Examples 1-93, wherein the first diffraction grating comprises a two-dimensional grating.

Example 96: The head-mounted display system of any of the Examples above, wherein the first diffraction grating comprises diffractive features disposed on said substrate having at least first and second surface portions on opposite sides of the diffractive feature and at least a portion of said first surface portion of the diffractive feature does not include said first layer while at least a portion of said second surface portion includes said first layer thereon.

Example 97: The head-mounted display system of any of the Examples above, wherein the first diffraction grating comprises diffractive features having top and at least first and second opposite sidewalls and at least a portion of said first sidewall of the diffractive features does not include said first layer while at least a portion of said second sidewall includes said first layer thereon.

Example 98: The head-mounted display system of any of the Examples above, wherein said first layer covers more of said first side than said second side.

Example 99: The head-mounted display system of any of the Examples above, wherein the first diffraction grating comprises diffractive features disposed on said substrate having at least first and second opposite sides and said first layer covers more of said first side than said second side.

Example 100: The head-mounted display system of any of the Examples above, wherein the first diffraction grating comprises diffractive features having a top and at least first and second opposite sides and said first layer covers more of said first side than said second side.

Example 101: The head-mounted display system of any of the Examples above, wherein said first layer comprise a glancing angle of incidence deposition layer.

Example 102: The head-mounted display system of any of the Examples above, wherein most of said diffractive features have a first diffractive feature of said first diffraction grating on said first side and a second diffractive feature of said first diffraction grating on a second side of said diffractive feature.

Example 103: The head-mounted display system of any of the Examples above, wherein said diffractive features comprises tilted protrusions.

Example 104: The head-mounted display system of any of the Examples above, wherein said diffractive features have a cross-section in the shape of a parallelogram having sloping sidewalls.

Example 105: The head-mounted display system of any of the Examples above, wherein said diffractive features have a cross-section comprising a top surface and at least one sloping sidewall.

Example 106: The head-mounted display system of any of the Examples above, wherein said diffractive features have a cross-section comprising a top surface and two sloping sidewalls.

Example 107: The head-mounted display system of any of the Examples above, wherein said diffractive features have a cross-section comprising a top surface and two sloping sidewalls that slope in the same direction.

Example 108: The head-mounted display system of any of the Examples above, wherein said first and second diffraction efficiencies are on average at least 0.4 for a range of angles of incident light of at least 10 degrees.

Example 109: The head-mounted display system of any of the Examples above, wherein said first and second diffraction efficiencies are on average at least 0.4 for a range of angles of incident light of at least 20 degrees.

Example 110: The head-mounted display system of any of the Examples above, wherein said first and second diffraction efficiencies are on average at least 0.4 for a range of angles of incident light of at least 30 degrees.

Example 111: The head-mounted display system of any of the Examples above, wherein said first and second diffraction efficiencies are at least 0.4 for a range of angles of incident light of at least 10 degrees.

Example 112: The head-mounted display system of any of the Examples above, wherein said first and second diffraction efficiencies are at least 0.4 for a range of angles of incident light of at least 20 degrees.

Example 113: The head-mounted display system of any of the Examples above, wherein said first and second diffraction efficiencies are at least 0.4 for a range of angles of incident light of at least 30 degrees.

Example 114: The head-mounted display system of any of the Examples above, wherein the substrate comprises material having an index of refraction of no more than 2.6.

Example 115: The head-mounted display system of any of the Examples above, wherein the substrate comprises material having an index of refraction of no more than 2.7.

Example 116: The head-mounted display system of any of the Examples above, wherein the substrate comprises material having an index of refraction of no more than 2.8.

Example 117: The head-mounted display system of any of the Examples above, wherein the first layer comprises a dielectric.

Example 118: The head-mounted display system of any of the Examples above, wherein the first layer comprise material having a refractive of 1.9 or more.

Example 119: The head-mounted display system of any of the Examples above, wherein the first layer comprise material having a refractive of 2.0 or more.

Example 120: The head-mounted display system of any of the Examples above, wherein the first layer comprises material having a refractive of 2.1 or more.

Example 121: The head-mounted display system of any of the Examples above, further comprising a plurality of sublayers over said first layer, said plurality of sublayers comprising a first higher index material and a second lower index material.

Example 122: The head-mounted display system of Example 121, wherein the first higher index material comprises titanium dioxide ($TiO_2$) and a second lower index material comprises silicon dioxide ($SiO_2$).

Example 123: The head-mounted display system of Example 121 or 122, wherein the plurality of sublayers comprising only two sublayers.

Example 124: The head-mounted display system of Example 121 or 122, wherein the plurality of sublayers comprising at least four sublayers.

Example 125: The head-mounted display system of any of Examples 121-124, wherein the plurality of sublayers alternate between the first material and the second material.

Example 126: The head-mounted display system of any of Examples 121-125, wherein the plurality of sublayers comprises an interference coating.

Example 127: The head-mounted display system of any of Examples 121-126, wherein the plurality of sublayers comprises a quarter wave stack.

Example 128: The head-mounted display system of any of Examples 121-127, wherein the plurality of sublayers over said first layer forms a bandpass filter.

Example 129: The head-mounted display system of any of Examples 121-127, wherein the plurality of sublayers over said first layer forms a notch filter.

Example 130: The head-mounted display system of any of Examples 121-128, wherein the plurality of sublayers over said first layer forms an anti-reflection (AR) coating.

Example 131: The head-mounted display system of any of Examples 121-130, wherein first the lower index material has a refractive index of 1.6 or less.

Example 132: The head-mounted display system of any of Examples 121-131, wherein the second higher index material has a refractive index of 1.9 or more.

Example 133: The head-mounted display system of any of the Examples 121-132, wherein the first lower index material comprises silicon dioxide.

Example 134: The head-mounted display system of any of the Examples 121-133, wherein the second higher index material comprises titanium dioxide.

Example 135: The head-mounted display system of any of Examples 121-133, wherein the second higher index material comprises zirconium dioxide.

Example 136: The head-mounted display system of any of Examples 121-133, wherein the second higher index material comprises zinc oxide.

Example 137: The head-mounted display system of any of the Examples above, wherein said first diffraction grating comprises an average diffraction efficiency for said first polarization over said range of angles and said second diffraction efficiency comprises an average diffraction efficiency for said second polarization over said range of angles.

Example 138: The head-mounted display system of any of the Examples above, wherein said first diffraction efficiency averaged over said range of angles and said second diffraction efficiency averaged over said range of angles have an efficiency of at least 40%.

Example 139: The head-mounted display system of any of the Examples above, wherein said first diffraction efficiency averaged over said range of angles and said second diffraction efficiency averaged over said range of angles have an efficiency of at least 50%.

Example 140: The head-mounted display system of any of the Examples above, wherein said first diffraction efficiency averaged over said range of angles and said second diffraction efficiency averaged over said range of angles have an efficiency of at least 60%.

Example 141: The head-mounted display system of any of the Examples above, wherein the range of angles is at least 25 degrees.

Example 142: The head-mounted display system of any of the Examples above, wherein the range of angles is at least 30 degrees.

Example 143: The head-mounted display system of any of the Examples above, wherein the range of angles is at least 35 degrees.

Example 144: The head-mounted display system of any of the Examples above, wherein the range of angles is at least 40 degrees.

Example 145: The head-mounted display system of any of the Examples above, wherein the range of angles is between ±15 degrees with respect to the plane of the substrate.

Example 146: The head-mounted display system of any of the Examples above, wherein the range of angles is between ±18 degrees with respect to the plane of the substrate.

Example 147: The head-mounted display system of any of the Examples above, wherein the range of angles is between ±20 degrees with respect to the plane of the substrate.

Example 148: The head-mounted display system of any of the Examples above, wherein the first diffraction grating comprises diffractive features comprising first and second sidewalls.

Example 149: The head-mounted display system of Example 148, wherein said first and second sidewalls are separated by a plateau.

Example 150: The head-mounted display system of Example 148, wherein said first and second sidewalls joint to form salient angle at the top of said diffractive feature.

Example 151: The head-mounted display system of any of Examples 148-150, wherein at least said first side wall is sloped at an angle such that said first sidewall is less steep than said second sidewall.

Example 152: The head-mounted display system of any of Examples 148-151, wherein said first sidewall is wider than said second sidewall.

Example 153: The head-mounted display system of any of the Examples 148-152, wherein said first sidewall forms an angle of from 45° to 85° at said base of said diffractive feature.

Example 154: The head-mounted display system of any of the Examples 148-153, wherein said second sidewall forms an acute re-entrant angle at the base of said diffractive feature.

Example 155: The head-mounted display system of any of the Examples 148-154, wherein said first diffraction grating comprises shark-fin shaped diffractive features.

Example 156: The head-mounted display system of any of the Examples 148-153, wherein said second sidewall forms an obtuse re-entrant angle at the base of said diffractive feature.

Example 157: The head-mounted display system of any of the Examples 148-153, wherein said second sidewall is vertical.

Example 158: The head-mounted display system of any of the Examples 148-153 or 156-157, wherein said first diffraction grating comprises sawtooth shaped diffractive features.

Example 159: The head-mounted display system of any of the Examples above, wherein said first layer comprises a biased deposition.

Example 160: The head-mounted display system of any of the Examples above, wherein said first layer comprises a glazing angle deposition.

Example 161: The head-mounted display system of any of Examples 148-160, wherein said first layer is biased to provide more coverage on said first sidewall than said second sidewall.

Example 162: The head-mounted display system of any of Examples 148-161, wherein said first layer covers a greater fraction of said first sidewall than said second sidewall.

Example 163: The head-mounted display system of any of Examples 148-162, wherein said first layer is biased to provide thicker coverage on said first sidewall than said second sidewall.

Example 164: The head-mounted display system of any of Examples 148-163, wherein said first layer provides on average thicker coverage on said first sidewall than said second sidewall.

Example 165: The head-mounted display system of any of Examples 148-164, wherein said first sidewall is completely covered by said second layer.

Example 166: The head-mounted display system of any of Examples 148-165, wherein at least a portion of said second sidewall is not covered by said first layer.

Example 167: The head-mounted display system of any of Examples 148-166, wherein said second sidewall includes more area not covered by said first layer than said first sidewall.

Example 168: The head-mounted display system of any of Examples 148-165, wherein on average at least a 80% of said second sidewall is not covered by said first layer.

Example 169: The head-mounted display system of any of Examples 148-165, wherein on average at least a 90% of said second sidewall is not covered by said first layer.

Example 170: The head-mounted display system of any of Examples 148-165, wherein on average at least a 95% of said second sidewall is not covered by said first layer.

Example 171: The head-mounted display system of any of Examples 148-165, wherein on average at least a 98% of said second sidewall is not covered by said first layer.

Example 172: The head-mounted display system of any of Examples above, wherein said first diffraction efficiency for said first polarization is within 20% of said second diffraction efficiency for said second polarization.

Example 173: The head-mounted display system of any of Examples above, wherein said first diffraction efficiency for said first polarization is within 30% of said second diffraction efficiency for said second polarization.

Example 174: The head-mounted display system of any of Examples above, wherein said first diffraction grating with said first layer formed thereon comprise a transmissive diffraction grating.

Example 175: The head-mounted display system of any of Examples above, wherein said first diffraction grating with said first layer formed thereon comprise a transmissive diffraction grating configured to diffract transmitted light to couple light into said waveguide to be guided therein by total internal reflection.

Example 176: The head-mounted display system of any of Examples 1-173, wherein said first diffraction grating with said first layer formed thereon comprise a transmissive diffraction grating configured to diffract reflected light to couple light be guided within said waveguide by total internal reflection out of said waveguide.

Example 177: The head-mounted display system of any of the Examples above, wherein said diffractive features have a height from 100 to 600 nanometers.

Example 178: The head-mounted display system of any of the Examples above, wherein said diffractive features have a height from 200 to 600 nanometers.

Example 179: The head-mounted display system of any of the Examples above, wherein said diffractive features have a height from 300 to 600 nanometers.

Example 180: The head-mounted display system of any of the Examples above, wherein said diffractive features have a pitch from 290 nm to 690 nm.

Example 181: The head-mounted display system of any of the Examples above, wherein said light projection system comprises micro-LEDs.

Example 182: The head-mounted display system of any of the Examples above, wherein said light projection system comprises a DLP or a LCOS display.

Example 183: The head-mounted display system of any of the Examples above, wherein said substrate includes nanoparticles.

Example 184: The head-mounted display system of any of the Examples above, wherein said substrate includes inorganic nanoparticles.

Example 185: The head-mounted display system of any of the Examples above, wherein said substrate comprises polymer.

Additional Examples—Part X

Example 1: A head-mounted display system comprising:
a head-mountable frame;
a light projection system configured to output light to provide image content;
a waveguide supported by the frame, the waveguide comprising a substrate configured to guide at least a portion of the light from said light projection system coupled into said waveguide;
a first diffraction grating configured such that said diffraction grating has a first diffraction efficiency for a first polarization over a range of angles of light incident thereon that is from 1 to 2 times a second diffraction efficiency for a second polarization over said range of angles of light incident thereon.

Example 2: The head-mounted display system of Example 1, wherein the first diffraction grating comprising material different than said substrate over said substrate.

Example 3: The head-mounted display system of Examples 1 or 2, wherein the first diffraction grating is formed in said substrate.

Example 4: The head-mounted display system of any of Examples 1-3, wherein the substrate comprises $SiO_2$ or glass.

Example 5: The head-mounted display system of any of Examples 1-3, wherein the substrate comprises $B_2O_3$, $Li_2O$, or $La_2O_3$.

Example 6: The head-mounted display system of any of Examples 1-3, wherein the substrate comprises $TiO_2$, $ZrO_2$, ZnO, or $Si_3N_4$.

Example 7: The head-mounted display system of any of Examples 1-3, wherein the substrate comprises $LiNbO_3$, $LiTaO_3$, or SiC, Example 8: The head-mounted display system of any of Examples 1-3, wherein the substrate comprises polymer.

Example 9: The head-mounted display system of any of Examples 1-3, wherein the substrate comprises PC, PMMA, PVA. or acrylate containing resin.

Example 10: The head-mounted display system of any of Examples 1-3, wherein the substrate comprises material having an index of refraction of from 1.4 to 2.7.

Example 11: The head-mounted display system of any of Examples 1-3, wherein the substrate comprises material having an index of refraction of from 1.4 to 1.6.

Example 12: The head-mounted display system of any of Examples 1-3, wherein the substrate comprises material having an index of refraction of from 1.5 to 1.6.

Example 13: The head-mounted display system of any of Examples 1-3, wherein the substrate comprises material having an index of refraction of from 1.4 to 1.7.

Example 14: The head-mounted display system of any of Examples 1-3, wherein the substrate comprises material having an index of refraction of from 1.5 to 1.7.

Example 15: The head-mounted display system of any of Examples 1-3, wherein the substrate comprises material having an index of refraction of from 1.4 to 1.8.

Example 16: The head-mounted display system of any of Examples 1-3, wherein the substrate comprises material having an index of refraction of from 1.5 to 1.8.

Example 17: The head-mounted display system of any of Examples 1-3, wherein the substrate comprises material having an index of refraction of at least 1.4 and less than 1.9.

Example 18: The head-mounted display system of any of Examples 1-3, wherein the substrate comprises material having an index of refraction of at least 1.5 and less than 1.9.

Example 19: The head-mounted display system of any of Examples 1-3, wherein the substrate comprises material having an index of refraction of from 1.6 to 2.7.

Example 20: The head-mounted display system of any of Examples 1-3, wherein the substrate comprises material having an index of refraction of from 1.7 to 2.7.

Example 21: The head-mounted display system of any of Examples 1-3, wherein the substrate comprises material having an index of refraction of from 1.8 to 2.7.

Example 22: The head-mounted display system of any of Examples 1-3, wherein the substrate comprises material having an index of refraction of from 1.9 to 2.7.

Example 23: The head-mounted display system of any of Examples 1-3, wherein the substrate comprises material having an index of refraction of from 2.0 to 2.7.

Example 24: The head-mounted display system of any of Examples 1-3, wherein the substrate comprises material having an index of refraction of from 2.1 to 2.7.

Example 25: The head-mounted display system of any of Examples 1-3, wherein the substrate comprises material having an index of refraction of from 2.2 to 2.7.

Example 26: The head-mounted display system of any of Examples 1-3, wherein the substrate comprises material having an index of refraction of from 2.3 t 2.7.

Example 27: The head-mounted display system of any of Examples 1-3, wherein the substrate comprises material having an index of refraction of from 2.4 to 2.7.

Example 28: The head-mounted display system of any of Examples 1-3, wherein the substrate comprises material having an index of refraction of from 2.4 to 2.7.

Example 29: The head-mounted display system of any of Examples 1-3, wherein the substrate comprises material having an index of refraction of from 1.6 to 1.8.

Example 30: The head-mounted display system of any of the Examples above, wherein the first diffraction grating material comprises polymer.

Example 31: The head-mounted display system of any of the Examples above, wherein the first diffraction grating material comprises PC, PMMA, PVA, or acrylate containing resin.

Example 32: The head-mounted display system of any of the Examples above, wherein the first diffraction grating material comprises imprintable material.

Example 33: The head-mounted display system of any of the Examples above, wherein the first diffraction grating material comprises glass.

Example 34: The head-mounted display system of any of Examples 1-29, wherein the first diffraction grating material has a refractive index of 1.4 to 1.7.

Example 35: The head-mounted display system of any of Examples 1-29, wherein the first diffraction grating material has an index of refraction of from 1.4 to 1.6.

Example 36: The head-mounted display system of any of Examples 1-29, wherein the first diffraction grating material has an index of refraction of from 1.5 to 1.6.

Example 37: The head-mounted display system of any of Examples 1-29, wherein the first diffraction grating material has an index of refraction of from 1.6 to 1.8.

Example 38: The head-mounted display system of any of Examples 1-29, wherein the first diffraction grating material has an index of refraction of from 1.7 to 1.8.

Example 39: The head-mounted display system of any of Examples 1-29, wherein the first diffraction grating material has an index of refraction of from 1.8 to 2.2.

Example 40: The head-mounted display system of any of Examples 1-29, wherein the first diffraction grating material has an index of refraction of from 1.9 to 2.2.

Example 41: The head-mounted display system of any of Examples 1-29, wherein the first diffraction grating material has an index of refraction of from 2.0 to 2.4.

Example 42: The head-mounted display system of any of Examples 1-29, wherein the first diffraction grating material has an index of refraction of from 2.2 to 2.4.

Example 43: The head-mounted display system of any of Examples 1-29, wherein the first diffraction grating material has an index of refraction of from 2.2 to 2.6.

Example 44: The head-mounted display system of any of Examples 1-29, wherein the first diffraction grating material has a refractive index that is higher than said substrate.

Example 45: The head-mounted display system of any of Examples 1-29, wherein the first diffraction grating material has a refractive index that is the same as said substrate.

Example 46: The head-mounted display system of any of Examples 1-29, wherein the first diffraction grating material has a refractive index that is lower than said substrate.

Example 47: The head-mounted display system of any of the Examples above, wherein said first diffraction grating comprises a blazed diffractive grating.

Example 48: The head-mounted display system of any of the Examples above, wherein said first diffraction grating comprises diffractive features comprising peaks spaced apart by grooves therebetween.

Example 49: The head-mounted display system of any of the Examples above, wherein the said first diffraction grating comprises diffractive features comprising a plurality of straight lines.

Example 50: The waveguide of any of the Examples above, wherein said diffractive grating comprises diffractive features that are asymmetric.

Example 51: The head-mounted display system of any of the Examples above, wherein the first and second polarizations comprise first and second linear polarization having different polarization angles.

Example 52: The head-mounted display system of any of the Examples above, wherein the first and second polarizations comprise first and second linear polarizations oriented in orthogonal directions.

Example 53: The head-mounted display system of any of the Examples above, wherein the first and second polarizations comprise transverse magnetic and transverse electric polarizations, respectively.

Example 54: The head-mounted display system of any of the Examples above, wherein the first and second polarizations comprise transverse electric and transverse magnetic polarizations, respectively.

Example 55: The head-mounted display system of any of the Examples above, wherein the first diffraction efficiency comprises a diffraction efficiency for transverse-magnetic polarized light averaged across the visible light spectrum and wherein the second diffraction efficiency comprises a diffraction efficiency for transverse-electric polarized light averaged across the visible light spectrum.

Example 56: The head-mounted display system of any of the Examples above, wherein the first diffraction efficiency comprises a diffraction efficiency for transverse-electric polarized light averaged across the visible light spectrum and wherein the second diffraction efficiency comprises a diffraction efficiency for transverse-magnetic polarized light averaged across the visible light spectrum.

Example 57: The head-mounted display system of any of the Examples above, wherein the first diffraction efficiency is 1 to 1.8 times the second diffraction efficiency.

Example 58: The head-mounted display system of any of the Examples above, wherein the first diffraction efficiency is 1 to 1.7 times the second diffraction efficiency.

Example 59: The head-mounted display system of any of the Examples above, wherein the first diffraction efficiency is 1 to 1.6 times the second diffraction efficiency.

Example 60: The head-mounted display system of any of the Examples above, wherein the first diffraction efficiency is 1 to 1.5 times the second diffraction efficiency.

Example 61: The head-mounted display system of any of the Examples above, wherein the first diffraction efficiency is 1 to 1.4 times the second diffraction efficiency.

Example 62: The head-mounted display system of any of the Examples above, wherein the first diffraction efficiency is 1 to 1.3 times the second diffraction efficiency.

Example 63: The head-mounted display system of any of the Examples above, wherein the first diffraction efficiency is 1 to 1.2 times the second diffraction efficiency.

Example 64: The head-mounted display system of any of the Examples above, wherein the first diffraction efficiency is 1 to 1.1 times the second diffraction efficiency.

Example 65: The head-mounted display system of any of the Examples above, wherein the range of angles is at least 6 degrees.

Example 66: The head-mounted display system of any of the Examples above, wherein the range of angles is at least 12 degrees.

Example 67: The head-mounted display system of any of the Examples above, wherein the range of angles is at least 18 degrees.

Example 68: The head-mounted display system of any of the Examples above, wherein the range of angles is at least 22 degrees.

Example 69: The head-mounted display system of any of the Examples above, wherein the range of angles is between ±3 degrees with respect to the plane of the substrate.

Example 70: The head-mounted display system of any of the Examples above, wherein the range of angles is between ±6 degrees with respect to the plane of the substrate.

Example 71: The head-mounted display system of any of the Examples above, wherein the range of angles is between ±9 degrees with respect to the plane of the substrate.

Example 72: The head-mounted display system of any of the Examples above, wherein the range of angles is between ±11 degrees with respect to the plane of the substrate.

Example 73: The head-mounted display system of any of the Examples above, wherein said waveguide is included in an eyepiece configured to direct light to an eye of a user wearing said head mounted display.

Example 74: The head-mounted display system of Example 73, wherein said eyepiece is disposed on the frame and is configured to direct light from the light projection system into the eye of the user to display augmented reality image content to the vision field of the user, at least a portion of the eyepiece being transparent and disposed at a location in front of the eye of the user when the user wears the head-mounted display system, where the transparent portion transmits light from a portion of a physical environment in front of the user to the eye of the user to provide a view of the portion of the physical environment in front of the user, the eyepiece comprising.

Example 75: The head-mounted display system of Example 73 or 74, wherein said eyepiece comprises said at least one waveguide and said at least one waveguide is transparent to visible light such that the user can see through the waveguide.

Example 76: The head-mounted display system of any of the Examples above, wherein said waveguide comprises an in-coupling optical element for coupling light from said light projection system into the waveguide to be guided therein.

Example 77: The head-mounted display system of any of the Examples above, wherein said waveguide comprises an out-coupling optical element for coupling light from said light projection system out of the waveguide and directs said light to the user's eye to present said image content to the viewer.

Example 78: The head-mounted display system of any of the Examples above, wherein said first diffraction gratings comprises an in-coupling grating (ICG) configured to in-couple light from said light projection system into said waveguide.

Example 79: The head-mounted display system of any of the Examples above, wherein the first diffraction grating comprises diffractive features formed in a 1D array.

Example 80: The head-mounted display system of any of Examples 1-78, wherein the first diffraction grating comprises diffractive features formed in a 2D array.

Example 81: The head-mounted display system of Example 80, wherein the 2D array comprises a square array.

Example 82: The head-mounted display of any of the Examples above, wherein the diffractive features are asymmetrical so as to provide a blazed grating.

Example 83: The head-mounted display of any of the Examples above, wherein the diffractive features have material asymmetrically deposited thereon so as to prove for a blazed grating.

Example 84: The head-mounted display of any of the Examples above, wherein said first diffraction grating is configured to direct light preferentially in at least two directions.

Example 85: The head-mounted display of any of the Examples above, wherein said first diffraction grating is blazed in two directions.

Example 86: The head-mounted display system of any of the Examples above, wherein the first diffraction grating comprises a one-dimensional grating.

Example 87: The head-mounted display system of any of Examples 1-93, wherein the first diffraction grating comprises a two-dimensional grating.

Example 88: The head-mounted display system of any of the Examples above, wherein most of said diffractive features have a first diffractive feature of said first diffraction grating on said first side and a second diffractive feature of said first diffraction grating on a second side of said diffractive feature.

Example 89: The head-mounted display system of any of the Examples above, wherein said diffractive features comprises tilted protrusions.

Example 90: The head-mounted display system of any of the Examples above, wherein said diffractive features have a cross-section in the shape of a parallelogram having sloping sidewalls.

Example 91: The head-mounted display system of any of the Examples above, wherein said diffractive features have a cross-section comprising a top surface and at least one sloping sidewall.

Example 92: The head-mounted display system of any of the Examples above, wherein said diffractive features have a cross-section comprising a top surface and two sloping sidewalls.

Example 93: The head-mounted display system of any of the Examples above, wherein said diffractive features have a cross-section comprising a top surface and two sloping sidewalls that slope in the same direction.

Example 94: The head-mounted display system of any of the Examples above, wherein said first and second diffraction efficiencies are on average at least 0.4 for a range of angles of incident light of at least 10 degrees.

Example 95: The head-mounted display system of any of the Examples above, wherein said first and second diffraction efficiencies are on average at least 0.4 for a range of angles of incident light of at least 20 degrees.

Example 96: The head-mounted display system of any of the Examples above, wherein said first and second diffraction efficiencies are on average at least 0.4 for a range of angles of incident light of at least 30 degrees.

Example 97: The head-mounted display system of any of the Examples above, wherein said first and second diffraction efficiencies are at least 0.4 for a range of angles of incident light of at least 10 degrees.

Example 98: The head-mounted display system of any of the Examples above, wherein said first and second diffraction efficiencies are at least 0.4 for a range of angles of incident light of at least 20 degrees.

Example 99: The head-mounted display system of any of the Examples above, wherein said first and second diffraction efficiencies are at least 0.4 for a range of angles of incident light of at least 30 degrees.

Example 100: The head-mounted display system of any of the Examples above, wherein said first and second diffraction efficiencies are on average at least 0.2 for a range of angles of incident light of at least 10 degrees.

Example 101: The head-mounted display system of any of the Examples above, wherein said first and second diffraction efficiencies are on average at least 0.2 for a range of angles of incident light of at least 20 degrees.

Example 102: The head-mounted display system of any of the Examples above, wherein said first and second diffraction efficiencies are on average at least 0.2 for a range of angles of incident light of at least 30 degrees.

Example 103: The head-mounted display system of any of the Examples above, wherein said first and second diffraction efficiencies are at least 0.2 for a range of angles of incident light of at least 10 degrees.

Example 104: The head-mounted display system of any of the Examples above, wherein said first and second diffraction efficiencies are at least 0.2 for a range of angles of incident light of at least 20 degrees.

Example 105: The head-mounted display system of any of the Examples above, wherein said first and second diffraction efficiencies are at least 0.2 for a range of angles of incident light of at least 30 degrees.

Example 106: The head-mounted display system of any of the Examples above, wherein the substrate comprises material having an index of refraction of no more than 2.6.

Example 107: The head-mounted display system of any of the Examples above, wherein the substrate comprises material having an index of refraction of no more than 2.7.

Example 108: The head-mounted display system of any of the Examples above, wherein the substrate comprises material having an index of refraction of no more than 2.8.

Example 109: The head-mounted display system of any of the Examples above, wherein the substrate comprises material having an index of refraction of less than 1.9.

Example 110: The head-mounted display system of any of the Examples above, wherein the substrate comprises material having an index of refraction of no more than 1.8.

Example 111: The head-mounted display system of any of the Examples above, wherein the substrate comprises material having an index of refraction of no more than 1.75.

Example 112: The head-mounted display system of any of the Examples above, wherein the substrate comprises material having an index of refraction of no more than 1.7.

Example 113: The head-mounted display system of any of the Examples above, wherein the substrate comprises material having an index of refraction of no more than 1.6.

Example 114: The head-mounted display system of any of the Examples above, wherein the substrate comprises material having an index of refraction of no more than 1.5.

Example 115: The head-mounted display system of any of the Examples above, further comprising a plurality of sublayers over said first diffraction grating, said plurality of sublayers comprising a first higher index material and a second lower index material.

Example 116: The head-mounted display system of Example 115, wherein the first higher index material comprises titanium dioxide ($TiO_2$) and a second lower index material comprises silicon dioxide ($SiO_2$).

Example 117: The head-mounted display system of Example 115 or 116, wherein the plurality of sublayers comprising only two sublayers.

Example 118: The head-mounted display system of Example 115 or 116, wherein the plurality of sublayers comprising at least four sublayers.

Example 119: The head-mounted display system of any of Examples 115-118, wherein the plurality of sublayers alternate between the first material and the second material.

Example 120: The head-mounted display system of any of Examples 115-119, wherein the plurality of sublayers comprises an interference coating.

Example 121: The head-mounted display system of any of Examples 115-120, wherein the plurality of sublayers comprises a quarter wave stack.

Example 122: The head-mounted display system of any of Examples 115-121, wherein the plurality of sublayers over said first layer forms a bandpass filter.

Example 123: The head-mounted display system of any of Examples 115-121, wherein the plurality of sublayers over said first layer forms a notch filter.

Example 124: The head-mounted display system of any of Examples 115-121, wherein the plurality of sublayers over said first layer forms an anti-reflection (AR) coating.

Example 125: The head-mounted display system of any of Examples 115-124, wherein first the lower index material has a refractive index of 1.6 or less.

Example 126: The head-mounted display system of any of Examples 115-125, wherein the second higher index material has a refractive index of 1.9 or more.

Example 127: The head-mounted display system of any of the Examples 115-126, wherein the first lower index material comprises silicon dioxide.

Example 128: The head-mounted display system of any of the Examples 115-127, wherein the second higher index material comprises titanium dioxide.

Example 129: The head-mounted display system of any of Examples 115-127, wherein the second higher index material comprises zirconium dioxide.

Example 130: The head-mounted display system of any of Examples 115-127, wherein the second higher index material comprises zinc oxide.

Example 131: The head-mounted display system of any of the Examples above, wherein said first diffraction grating comprises an average diffraction efficiency for said first polarization over said range of angles and said second diffraction efficiency comprises an average diffraction efficiency for said second polarization over said range of angles.

Example 132: The head-mounted display system of any of the Examples above, wherein said first diffraction efficiency averaged over said range of angles and said second diffraction efficiency averaged over said range of angles have an efficiency of at least 10%.

Example 133: The head-mounted display system of any of the Examples above, wherein said first diffraction efficiency averaged over said range of angles and said second diffraction efficiency averaged over said range of angles have an efficiency of at least 20%.

Example 134: The head-mounted display system of any of the Examples above, wherein said first diffraction efficiency averaged over said range of angles and said second diffraction efficiency averaged over said range of angles have an efficiency of at least 30%.

Example 135: The head-mounted display system of any of the Examples above, wherein said first diffraction efficiency averaged over said range of angles and said second diffraction efficiency averaged over said range of angles have an efficiency of at least 40%.

Example 136: The head-mounted display system of any of the Examples above, wherein said first diffraction efficiency averaged over said range of angles and said second diffraction efficiency averaged over said range of angles have an efficiency of at least 50%.

Example 137: The head-mounted display system of any of the Examples above, wherein said first diffraction efficiency averaged over said range of angles and said second diffraction efficiency averaged over said range of angles have an efficiency of at least 60%.

Example 138: The head-mounted display system of any of the Examples above, wherein the range of angles is at least 25 degrees.

Example 139: The head-mounted display system of any of the Examples above, wherein the range of angles is at least 30 degrees.

Example 140: The head-mounted display system of any of the Examples above, wherein the range of angles is at least 35 degrees.

Example 141: The head-mounted display system of any of the Examples above, wherein the range of angles is at least 40 degrees.

Example 142: The head-mounted display system of any of the Examples above, wherein the range of angles is between ±15 degrees with respect to the plane of the substrate.

Example 143: The head-mounted display system of any of the Examples above, wherein the range of angles is between ±18 degrees with respect to the plane of the substrate.

Example 144: The head-mounted display system of any of the Examples above, wherein the range of angles is between ±20 degrees with respect to the plane of the substrate.

Example 145: The head-mounted display system of any of the Examples above, wherein the first diffraction grating comprises diffractive features comprising first and second sidewalls.

Example 146: The head-mounted display system of Example 145, wherein said first and second sidewalls are separated by a plateau.

Example 147: The head-mounted display system of Example 145, wherein said first and second sidewalls joint to form salient angle at the top of said diffractive feature.

Example 148: The head-mounted display system of any of Examples 145-147, wherein at least said first side wall is sloped at an angle such that said first sidewall is less steep than said second sidewall.

Example 149: The head-mounted display system of any of Examples 145-148, wherein said first sidewall is wider than said second sidewall.

Example 150: The head-mounted display system of any of the Examples 145-149, wherein said first sidewall forms an angle of from 45° to 85° at said base of said diffractive feature.

Example 151: The head-mounted display system of any of the Examples 145-150, wherein said second sidewall forms an acute re-entrant angle at the base of said diffractive feature.

Example 152: The head-mounted display system of any of the Examples 145-151, wherein said first diffraction grating comprises shark-fin shaped diffractive features.

Example 153: The head-mounted display system of any of the Examples 145-150, wherein said second sidewall forms an obtuse re-entrant angle at the base of said diffractive feature.

Example 154: The head-mounted display system of any of the Examples 145-150, wherein said second sidewall is vertical.

Example 155: The head-mounted display system of any of the Examples 145-150 or 153-154, wherein said first diffraction grating comprises sawtooth shaped diffractive features.

Example 156: The head-mounted display system of any of the Examples 148-152 or 154-155, wherein said first and second sidewalls are substantially parallel.

Example 157: The head-mounted display system of any of Examples above, wherein said first diffraction efficiency for said first polarization is within 20% of said second diffraction efficiency for said second polarization.

Example 158: The head-mounted display system of any of Examples above, wherein said first diffraction efficiency for said first polarization is within 30% of said second diffraction efficiency for said second polarization.

Example 159: The head-mounted display system of any of Examples above, wherein said first diffraction grating comprises a transmissive diffraction grating.

Example 160: The head-mounted display system of any of Examples above, wherein said first diffraction grating comprises a transmissive diffraction grating configured to diffract transmitted light to couple light into said waveguide to be guided therein by total internal reflection.

Example 161: The head-mounted display system of any of the Examples above, wherein said diffractive features have a height from 100 to 600 nanometers.

Example 162: The head-mounted display system of any of the Examples above, wherein said diffractive features have a height from 200 to 600 nanometers.

Example 163: The head-mounted display system of any of the Examples above, wherein said diffractive features have a height greater than 200 and no more than 600 nanometers.

Example 164: The head-mounted display system of any of the Examples above, wherein said diffractive features have a height from 205 to 600 nanometers.

Example 165: The head-mounted display system of any of the Examples above, wherein said diffractive features have a height from 210 to 600 nanometers.

Example 166: The head-mounted display system of any of the Examples above, wherein said diffractive features have a height from 220 to 600 nanometers.

Example 167: The head-mounted display system of any of the Examples above, wherein said diffractive features have a height from 250 to 600 nanometers.

Example 168: The head-mounted display system of any of the Examples above, wherein said diffractive features have a height from 280 to 600 nanometers.

Example 169: The head-mounted display system of any of the Examples above, wherein said diffractive features have a height from 300 to 600 nanometers.

Example 170: The head-mounted display system of any of the Examples above, wherein said diffractive features have a height from 400 to 600 nanometers.

Example 171: The head-mounted display system of any of the Examples above, wherein said diffractive features have a pitch from 290 nm to 690 nm.

Example 172: The head-mounted display system of any of the Examples above, wherein said first diffraction efficiency averaged over said range of angles and said second diffraction efficiency averaged over said range of angles have an efficiency of at least 65%.

Example 173: The head-mounted display system of any of the Examples above, wherein said first diffraction efficiency averaged over said range of angles and said second diffraction efficiency averaged over said range of angles have an efficiency of at least 70%.

Example 174: The head-mounted display system of any of the Examples above, wherein said first diffraction efficiency averaged over said range of angles and said second diffraction efficiency averaged over said range of angles have an efficiency of at least 75%.

Example 175: The head-mounted display system of any of the Examples above, wherein said first diffraction efficiency averaged over said range of angles and said second diffraction efficiency averaged over said range of angles have an efficiency of at least 80%.

Example 176: The head-mounted display system of any of the Examples above, wherein said first diffraction efficiency averaged over said range of angles and said second diffraction efficiency averaged over said range of angles have an efficiency of at least 85%.

Example 177: The head-mounted display system of any of the Examples above, wherein said first and second diffraction efficiencies are on average at least 0.6 for a range of angles of incident light of at least 10 degrees.

Example 178: The head-mounted display system of any of the Examples above, wherein said first and second diffraction efficiencies are on average at least 0.6 for a range of angles of incident light of at least 20 degrees.

Example 179: The head-mounted display system of any of the Examples above, wherein said first and second diffraction efficiencies are on average at least 0.6 for a range of angles of incident light of at least 30 degrees.

Example 180: The head-mounted display system of any of the Examples above, wherein said first and second diffraction efficiencies are at least 0.6 for a range of angles of incident light of at least 10 degrees.

Example 181: The head-mounted display system of any of the Examples above, wherein said first and second diffraction efficiencies are at least 0.6 for a range of angles of incident light of at least 20 degrees.

Example 182: The head-mounted display system of any of the Examples above, wherein said first and second diffraction efficiencies are at least 0.6 for a range of angles of incident light of at least 30 degrees.

Example 183: The head-mounted display system of any of the Examples above, wherein said first and second diffraction efficiencies are on average at least 0.65 for a range of angles of incident light of at least 10 degrees.

Example 184: The head-mounted display system of any of the Examples above, wherein said first and second diffraction efficiencies are on average at least 0.65 for a range of angles of incident light of at least 20 degrees.

Example 185: The head-mounted display system of any of the Examples above, wherein said first and second diffraction efficiencies are on average at least 0.65 for a range of angles of incident light of at least 30 degrees.

Example 186: The head-mounted display system of any of the Examples above, wherein said first and second diffraction efficiencies are at least 0.65 for a range of angles of incident light of at least 10 degrees.

Example 187: The head-mounted display system of any of the Examples above, wherein said first and second diffraction efficiencies are at least 0.65 for a range of angles of incident light of at least 20 degrees.

Example 188: The head-mounted display system of any of the Examples above, wherein said first and second diffraction efficiencies are at least 0.65 for a range of angles of incident light of at least 30 degrees.

Example 189: The head-mounted display system of any of the Examples above, wherein said first and second diffraction efficiencies are on average at least 0.7 for a range of angles of incident light of at least 10 degrees.

Example 190: The head-mounted display system of any of the Examples above, wherein said first and second diffraction efficiencies are on average at least 0.7 for a range of angles of incident light of at least 20 degrees.

Example 191: The head-mounted display system of any of the Examples above, wherein said first and second diffraction efficiencies are on average at least 0.7 for a range of angles of incident light of at least 30 degrees.

Example 192: The head-mounted display system of any of the Examples above, wherein said first and second diffraction efficiencies are at least 0.7 for a range of angles of incident light of at least 10 degrees.

Example 193: The head-mounted display system of any of the Examples above, wherein said first and second diffraction efficiencies are at least 0.7 for a range of angles of incident light of at least 20 degrees.

Example 194: The head-mounted display system of any of the Examples above, wherein said first and second diffraction efficiencies are at least 0.7 for a range of angles of incident light of at least 30 degrees.

Example 195: The head-mounted display system of any of the Examples above, wherein said light projection system comprises micro-LEDs.

Example 196: The head-mounted display system of any of the Examples above, wherein said light projection system comprises a DLP or a LCOS display.

Example 197: The head-mounted display system of any of the Examples above, wherein said substrate includes nanoparticles.

Example 198: The head-mounted display system of any of the Examples above, wherein said substrate includes inorganic nanoparticle Additional Examples—Part XI Example 1: A head-mounted display system comprising:
a head-mountable frame;
a light projection system configured to output light to provide image content;
a waveguide supported by the frame, the waveguide comprising a substrate configured to guide at least a portion of the light from said light projection system coupled into said waveguide, said substrate having a refractive index of less than 1.9;
a first diffraction grating configured such that said diffraction grating has a first diffraction efficiency for a first polarization over a range of angles of light incident thereon that is from 1 to 2 times a second diffraction efficiency for a second polarization over said range of angles of light incident thereon.

Example 2: The head-mounted display system of Example 1, wherein the first diffraction grating comprising material different than said substrate over said substrate.

Example 3: The head-mounted display system of Examples 1 or 2, wherein the first diffraction grating is formed in said substrate.

Example 4: The head-mounted display system of any of Examples 1-3, wherein the substrate comprises SiO2 or glass.

Example 5: The head-mounted display system of any of Examples 1-3, wherein the substrate comprises B2O3, Li2O, or La2O3.

Example 6: The head-mounted display system of any of Examples 1-3, wherein the substrate comprises polymer.

Example 7: The head-mounted display system of any of Examples 1-3, wherein the substrate comprises PC, PMMA, PVA. or acrylate containing resin.

Example 8: The head-mounted display system of any of Examples 1-3, wherein the substrate comprises material having an index of refraction of from 1.4 to less than 1.9.

Example 9: The head-mounted display system of any of Examples 1-3, wherein the substrate comprises material having an index of refraction of from 1.4 to 1.6.

Example 10: The head-mounted display system of any of Examples 1-3, wherein the substrate comprises material having an index of refraction of from 1.5 to 1.6.

Example 11: The head-mounted display system of any of Examples 1-3, wherein the substrate comprises material having an index of refraction of from 1.4 to 1.7.

Example 12: The head-mounted display system of any of Examples 1-3, wherein the substrate comprises material having an index of refraction of from 1.5 to 1.7.

Example 13: The head-mounted display system of any of Examples 1-3, wherein the substrate comprises material having an index of refraction of from 1.4 to 1.8.

Example 14: The head-mounted display system of any of Examples 1-3, wherein the substrate comprises material having an index of refraction of from 1.5 to 1.8.

Example 15: The head-mounted display system of any of Examples 1-3, wherein the substrate comprises material having an index of refraction of at least 1.4 and less than 1.9.

Example 16: The head-mounted display system of any of Examples 1-3, wherein the substrate comprises material having an index of refraction of at least 1.5 and less than 1.9.

Example 17: The head-mounted display system of any of Examples 1-3, wherein the substrate comprises material having an index of refraction of from 1.6 to less than 1.9.

Example 18: The head-mounted display system of any of Examples 1-3, wherein the substrate comprises material having an index of refraction of from 1.7 to less than 1.9.

Example 19: The head-mounted display system of any of Examples 1-3, wherein the substrate comprises material having an index of refraction of from 1.8 to less than 1.9.

Example 20: The head-mounted display system of any of Examples 1-3, wherein the substrate comprises material having an index of refraction of from 1.6 to 1.8.

Example 21: The head-mounted display system of any of the Examples above, wherein the first diffraction grating material comprises polymer.

Example 22: The head-mounted display system of any of the Examples above, wherein the first diffraction grating material comprises PC, PMMA, PVA, or acrylate containing resin.

Example 23: The head-mounted display system of any of the Examples above, wherein the first diffraction grating material comprises imprintable material.

Example 24: The head-mounted display system of any of the Examples above, wherein the first diffraction grating material comprises glass.

Example 25: The head-mounted display system of any of Examples 1-20, wherein the first diffraction grating material has a refractive index of 1.4 to 1.7.

Example 26: The head-mounted display system of any of Examples 1-20, wherein the first diffraction grating material has an index of refraction of from 1.4 to 1.6.

Example 27: The head-mounted display system of any of Examples 1-20, wherein the first diffraction grating material has an index of refraction of from 1.5 to 1.6.

Example 28: The head-mounted display system of any of Examples 1-20, wherein the first diffraction grating material has an index of refraction of from 1.6 to 1.8.

Example 29: The head-mounted display system of any of Examples 1-20, wherein the first diffraction grating material has an index of refraction of from 1.7 to 1.8.

Example 30: The head-mounted display system of any of Examples 1-20, wherein the first diffraction grating material has an index of refraction of from 1.8 to 2.2.

Example 31: The head-mounted display system of any of Examples 1-20, wherein the first diffraction grating material has an index of refraction of from 1.9 to 2.2.

Example 32: The head-mounted display system of any of Examples 1-20, wherein the first diffraction grating material has an index of refraction of from 2.0 to 2.4.

Example 33: The head-mounted display system of any of Examples 1-20, wherein the first diffraction grating material has an index of refraction of from 2.2 to 2.4.

Example 34: The head-mounted display system of any of Examples 1-20, wherein the first diffraction grating material has an index of refraction of from 2.2 to 2.6.

Example 35: The head-mounted display system of any of Examples 1-20, wherein the first diffraction grating material has a refractive index that is higher than said substrate.

Example 36: The head-mounted display system of any of Examples 1-20, wherein the first diffraction grating material has a refractive index that is the same as said substrate.

Example 37: The head-mounted display system of any of Examples 1-20, wherein the first diffraction grating material has a refractive index that is lower than said substrate.

Example 38: The head-mounted display system of any of the Examples above, wherein said first diffraction grating comprises a blazed diffractive grating.

Example 39: The head-mounted display system of any of the Examples above, wherein said first diffraction grating comprises diffractive features comprising peaks spaced apart by grooves therebetween.

Example 40: The head-mounted display system of any of the Examples above, wherein the said first diffraction grating comprises diffractive features comprising a plurality of straight lines.

Example 41: The waveguide of any of the Examples above, wherein said diffractive grating comprises diffractive features that are asymmetric.

Example 42: The head-mounted display system of any of the Examples above, wherein the first and second polarizations comprise first and second linear polarization having different polarization angles.

Example 43: The head-mounted display system of any of the Examples above, wherein the first and second polarizations comprise first and second linear polarizations oriented in orthogonal directions.

Example 44: The head-mounted display system of any of the Examples above, wherein the first and second polarizations comprise transverse magnetic and transverse electric polarizations, respectively.

Example 45: The head-mounted display system of any of the Examples above, wherein the first and second polarizations comprise transverse electric and transverse magnetic polarizations, respectively.

Example 46: The head-mounted display system of any of the Examples above, wherein the first diffraction efficiency comprises a diffraction efficiency for transverse-magnetic polarized light averaged across the visible light spectrum and wherein the second diffraction efficiency comprises a diffraction efficiency for transverse-electric polarized light averaged across the visible light spectrum.

Example 47: The head-mounted display system of any of the Examples above, wherein the first diffraction efficiency comprises a diffraction efficiency for transverse-electric polarized light averaged across the visible light spectrum and wherein the second diffraction efficiency comprises a diffraction efficiency for transverse-magnetic polarized light averaged across the visible light spectrum.

Example 48: The head-mounted display system of any of the Examples above, wherein the first diffraction efficiency is 1 to 1.8 times the second diffraction efficiency.

Example 49: The head-mounted display system of any of the Examples above, wherein the first diffraction efficiency is 1 to 1.7 times the second diffraction efficiency.

Example 50: The head-mounted display system of any of the Examples above, wherein the first diffraction efficiency is 1 to 1.6 times the second diffraction efficiency.

Example 51: The head-mounted display system of any of the Examples above, wherein the first diffraction efficiency is 1 to 1.5 times the second diffraction efficiency.

Example 52: The head-mounted display system of any of the Examples above, wherein the first diffraction efficiency is 1 to 1.4 times the second diffraction efficiency.

Example 53: The head-mounted display system of any of the Examples above, wherein the first diffraction efficiency is 1 to 1.3 times the second diffraction efficiency.

Example 54: The head-mounted display system of any of the Examples above, wherein the first diffraction efficiency is 1 to 1.2 times the second diffraction efficiency.

Example 55: The head-mounted display system of any of the Examples above, wherein the first diffraction efficiency is 1 to 1.1 times the second diffraction efficiency.

Example 56: The head-mounted display system of any of the Examples above, wherein the range of angles is at least 6 degrees.

Example 57: The head-mounted display system of any of the Examples above, wherein the range of angles is at least 12 degrees.

Example 58: The head-mounted display system of any of the Examples above, wherein the range of angles is at least 18 degrees.

Example 59: The head-mounted display system of any of the Examples above, wherein the range of angles is at least 22 degrees.

Example 60: The head-mounted display system of any of the Examples above, wherein the range of angles is between ±3 degrees with respect to the plane of the substrate.

Example 61: The head-mounted display system of any of the Examples above, wherein the range of angles is between ±6 degrees with respect to the plane of the substrate.

Example 62: The head-mounted display system of any of the Examples above, wherein the range of angles is between ±9 degrees with respect to the plane of the substrate.

Example 63: The head-mounted display system of any of the Examples above, wherein the range of angles is between ±11 degrees with respect to the plane of the substrate.

Example 64: The head-mounted display system of any of the Examples above, wherein said waveguide is included in an eyepiece configured to direct light to an eye of a user wearing said head mounted display.

Example 65: The head-mounted display system of Example 64, wherein said eyepiece is disposed on the frame and is configured to direct light from the light projection system into the eye of the user to display augmented reality image content to the vision field of the user, at least a portion of the eyepiece being transparent and disposed at a location in front of the eye of the user when the user wears the head-mounted display system, where the transparent portion transmits light from a portion of a physical environment in front of the user to the eye of the user to provide a view of the portion of the physical environment in front of the user, the eyepiece comprising.

Example 66: The head-mounted display system of Example 64 or 65, wherein said eyepiece comprises said at least one waveguide and said at least one waveguide is transparent to visible light such that the user can see through the waveguide.

Example 67: The head-mounted display system of any of the Examples above, wherein said waveguide comprises an in-coupling optical element for coupling light from said light projection system into the waveguide to be guided therein.

Example 68: The head-mounted display system of any of the Examples above, wherein said waveguide comprises an out-coupling optical element for coupling light from said light projection system out of the waveguide and directs said light to the user's eye to present said image content to the viewer.

Example 69: The head-mounted display system of any of the Examples above, wherein said first diffraction gratings comprises an in-coupling grating (ICG) configured to in-couple light from said light projection system into said waveguide.

Example 70: The head-mounted display system of any of the Examples above, wherein the first diffraction grating comprises diffractive features formed in a 1D array.

Example 71: The head-mounted display system of any of Examples 1-69, wherein the first diffraction grating comprises diffractive features formed in a 2D array.

Example 72: The head-mounted display system of Example 71, wherein the 2D array comprises a square array.

Example 73: The head-mounted display of any of the Examples above, wherein the diffractive features are asymmetrical so as to provide a blazed grating.

Example 74: The head-mounted display of any of the Examples above, wherein the diffractive features have material asymmetrically deposited thereon so as to prove for a blazed grating.

Example 75: The head-mounted display of any of the Examples above, wherein said first diffraction grating is configured to direct light preferentially in at least two directions.

Example 76: The head-mounted display of any of the Examples above, wherein said first diffraction grating is blazed in two directions.

Example 77: The head-mounted display system of any of the Examples above, wherein the first diffraction grating comprises a one-dimensional grating.

Example 78: The head-mounted display system of any of Examples 1-76, wherein the first diffraction grating comprises a two-dimensional grating.

Example 79: The head-mounted display system of any of the Examples above, wherein most of said diffractive features have a first diffractive feature of said first diffraction grating on said first side and a second diffractive feature of said first diffraction grating on a second side of said diffractive feature.

Example 80: The head-mounted display system of any of the Examples above, wherein said diffractive features comprises tilted protrusions.

Example 81: The head-mounted display system of any of the Examples above, wherein said diffractive features have a cross-section in the shape of a parallelogram having sloping sidewalls.

Example 82: The head-mounted display system of any of the Examples above, wherein said diffractive features have a cross-section comprising a top surface and at least one sloping sidewall.

Example 83: The head-mounted display system of any of the Examples above, wherein said diffractive features have a cross-section comprising a top surface and two sloping sidewalls.

Example 84: The head-mounted display system of any of the Examples above, wherein said diffractive features have a cross-section comprising a top surface and two sloping sidewalls that slope in the same direction.

Example 85: The head-mounted display system of any of the Examples above, wherein said first and second diffraction efficiencies are on average at least 0.4 for a range of angles of incident light of at least 10 degrees.

Example 86: The head-mounted display system of any of the Examples above, wherein said first and second diffraction efficiencies are on average at least 0.4 for a range of angles of incident light of at least 20 degrees.

Example 87: The head-mounted display system of any of the Examples above, wherein said first and second diffraction efficiencies are on average at least 0.4 for a range of angles of incident light of at least 30 degrees.

Example 88: The head-mounted display system of any of the Examples above, wherein said first and second diffraction efficiencies are at least 0.4 for a range of angles of incident light of at least 10 degrees.

Example 89: The head-mounted display system of any of the Examples above, wherein said first and second diffraction efficiencies are at least 0.4 for a range of angles of incident light of at least 20 degrees.

Example 90: The head-mounted display system of any of the Examples above, wherein said first and second diffraction efficiencies are at least 0.4 for a range of angles of incident light of at least 30 degrees.

Example 91: The head-mounted display system of any of the Examples above, wherein said first and second diffraction efficiencies are on average at least 0.2 for a range of angles of incident light of at least 10 degrees.

Example 92: The head-mounted display system of any of the Examples above, wherein said first and second diffraction efficiencies are on average at least 0.2 for a range of angles of incident light of at least 20 degrees.

Example 93: The head-mounted display system of any of the Examples above, wherein said first and second diffraction efficiencies are on average at least 0.2 for a range of angles of incident light of at least 30 degrees.

Example 94: The head-mounted display system of any of the Examples above, wherein said first and second diffraction efficiencies are at least 0.2 for a range of angles of incident light of at least 10 degrees.

Example 95: The head-mounted display system of any of the Examples above, wherein said first and second diffraction efficiencies are at least 0.2 for a range of angles of incident light of at least 20 degrees.

Example 96: The head-mounted display system of any of the Examples above, wherein said first and second diffraction efficiencies are at least 0.2 for a range of angles of incident light of at least 30 degrees.

Example 97: The head-mounted display system of any of the Examples above, wherein the substrate comprises material having an index of refraction of no more than 1.89.

Example 98: The head-mounted display system of any of the Examples above, wherein the substrate comprises material having an index of refraction of no more than 1.88.

Example 99: The head-mounted display system of any of the Examples above, wherein the substrate comprises material having an index of refraction of no more than 1.85.

Example 100: The head-mounted display system of any of the Examples above, wherein the substrate comprises material having an index of refraction of no more than 1.8.

Example 101: The head-mounted display system of any of the Examples above, wherein the substrate comprises material having an index of refraction of no more than 1.75.

Example 102: The head-mounted display system of any of the Examples above, wherein the substrate comprises material having an index of refraction of no more than 1.7.

Example 103: The head-mounted display system of any of the Examples above, wherein the substrate comprises material having an index of refraction of no more than 1.6.

Example 104: The head-mounted display system of any of the Examples above, wherein the substrate comprises material having an index of refraction of no more than 1.5.

Example 105: The head-mounted display system of any of the Examples above, further comprising a plurality of sublayers over said first diffraction grating, said plurality of sublayers comprising a first higher index material and a second lower index material.

Example 106: The head-mounted display system of Example 105, wherein the first higher index material comprises titanium dioxide ($TiO_2$) and a second lower index material comprises silicon dioxide ($SiO_2$).

Example 107: The head-mounted display system of Example 105 or 106, wherein the plurality of sublayers comprising only two sublayers.

Example 108: The head-mounted display system of Example 105 or 106, wherein the plurality of sublayers comprising at least four sublayers.

Example 109: The head-mounted display system of any of Examples 105-108, wherein the plurality of sublayers alternate between the first material and the second material.

Example 110: The head-mounted display system of any of Examples 105-109, wherein the plurality of sublayers comprises an interference coating.

Example 111: The head-mounted display system of any of Examples 105-110, wherein the plurality of sublayers comprises a quarter wave stack.

Example 112: The head-mounted display system of any of Examples 105-111, wherein the plurality of sublayers over said first layer forms a bandpass filter.

Example 113: The head-mounted display system of any of Examples 105-111, wherein the plurality of sublayers over said first layer forms a notch filter.

Example 114: The head-mounted display system of any of Examples 105-111, wherein the plurality of sublayers over said first layer forms an anti-reflection (AR) coating.

Example 115: The head-mounted display system of any of Examples 105-114, wherein first the lower index material has a refractive index of 1.6 or less.

Example 116: The head-mounted display system of any of Examples 105-115, wherein the second higher index material has a refractive index of 1.9 or more.

Example 117: The head-mounted display system of any of the Examples 105-116, wherein the first lower index material comprises silicon dioxide.

Example 118: The head-mounted display system of any of the Examples 105-117, wherein the second higher index material comprises titanium dioxide.

Example 119: The head-mounted display system of any of Examples 105-117, wherein the second higher index material comprises zirconium dioxide.

Example 120: The head-mounted display system of any of Examples 105-117, wherein the second higher index material comprises zinc oxide.

Example 121: The head-mounted display system of any of the Examples above, wherein said first diffraction grating comprises an average diffraction efficiency for said first polarization over said range of angles and said second diffraction efficiency comprises an average diffraction efficiency for said second polarization over said range of angles.

Example 122: The head-mounted display system of any of the Examples above, wherein said first diffraction efficiency averaged over said range of angles and said second diffraction efficiency averaged over said range of angles have an efficiency of at least 10%.

Example 123: The head-mounted display system of any of the Examples above, wherein said first diffraction efficiency averaged over said range of angles and said second diffraction efficiency averaged over said range of angles have an efficiency of at least 20%.

Example 124: The head-mounted display system of any of the Examples above, wherein said first diffraction efficiency averaged over said range of angles and said second diffraction efficiency averaged over said range of angles have an efficiency of at least 30%.

Example 125: The head-mounted display system of any of the Examples above, wherein said first diffraction efficiency averaged over said range of angles and said second diffraction efficiency averaged over said range of angles have an efficiency of at least 40%.

Example 126: The head-mounted display system of any of the Examples above, wherein said first diffraction efficiency averaged over said range of angles and said second diffraction efficiency averaged over said range of angles have an efficiency of at least 50%.

Example 127: The head-mounted display system of any of the Examples above, wherein said first diffraction efficiency averaged over said range of angles and said second diffraction efficiency averaged over said range of angles have an efficiency of at least 60%.

Example 128: The head-mounted display system of any of the Examples above, wherein the range of angles is at least 25 degrees.

Example 129: The head-mounted display system of any of the Examples above, wherein the range of angles is at least 30 degrees.

Example 130: The head-mounted display system of any of the Examples above, wherein the range of angles is at least 35 degrees.

Example 131: The head-mounted display system of any of the Examples above, wherein the range of angles is at least 40 degrees.

Example 132: The head-mounted display system of any of the Examples above, wherein the range of angles is between ±15 degrees with respect to the plane of the substrate.

Example 133: The head-mounted display system of any of the Examples above, wherein the range of angles is between ±18 degrees with respect to the plane of the substrate.

Example 134: The head-mounted display system of any of the Examples above, wherein the range of angles is between ±20 degrees with respect to the plane of the substrate.

Example 135: The head-mounted display system of any of the Examples above, wherein the first diffraction grating comprises diffractive features comprising first and second sidewalls.

Example 136: The head-mounted display system of Example 135, wherein said first and second sidewalls are separated by a plateau.

Example 137: The head-mounted display system of Example 135, wherein said first and second sidewalls joint to form salient angle at the top of said diffractive feature.

Example 138: The head-mounted display system of any of Examples 135-137, wherein at least said first side wall is sloped at an angle such that said first sidewall is less steep than said second sidewall.

Example 139: The head-mounted display system of any of Examples 135-138, wherein said first sidewall is wider than said second sidewall.

Example 140: The head-mounted display system of any of the Examples 135-139, wherein said first sidewall forms an angle of from 45° to 85° at said base of said diffractive feature.

Example 141: The head-mounted display system of any of the Examples 135-140, wherein said second sidewall forms an acute re-entrant angle at the base of said diffractive feature.

Example 142: The head-mounted display system of any of the Examples 135-141, wherein said first diffraction grating comprises shark-fin shaped diffractive features.

Example 143: The head-mounted display system of any of the Examples 135-140, wherein said second sidewall forms an obtuse re-entrant angle at the base of said diffractive feature.

Example 144: The head-mounted display system of any of the Examples 135-140, wherein said second sidewall is vertical.

Example 145: The head-mounted display system of any of the Examples 135-140 or 143-144, wherein said first diffraction grating comprises sawtooth shaped diffractive features.

Example 146: The head-mounted display system of any of the Examples 138-142 or 144-145, wherein said first and second sidewalls are substantially parallel.

Example 147: The head-mounted display system of any of Examples above, wherein said first diffraction efficiency for said first polarization is within 20% of said second diffraction efficiency for said second polarization.

Example 148: The head-mounted display system of any of Examples above, wherein said first diffraction efficiency for said first polarization is within 30% of said second diffraction efficiency for said second polarization.

Example 149: The head-mounted display system of any of Examples above, wherein said first diffraction grating comprises a transmissive diffraction grating.

Example 150: The head-mounted display system of any of Examples above, wherein said first diffraction grating comprises a transmissive diffraction grating configured to diffract transmitted light to couple light into said waveguide to be guided therein by total internal reflection.

Example 151: The head-mounted display system of any of the Examples above, wherein said diffractive features have a height from 100 to 600 nanometers.

Example 152: The head-mounted display system of any of the Examples above, wherein said diffractive features have a height from 200 to 600 nanometers.

Example 153: The head-mounted display system of any of the Examples above, wherein said diffractive features have a height from 300 to 600 nanometers.

Example 154: The head-mounted display system of any of the Examples above, wherein said diffractive features have a height greater than 200 and no more than 600 nanometers.

Example 155: The head-mounted display system of any of the Examples above, wherein said diffractive features have a height from 205 to 600 nanometers.

Example 156: The head-mounted display system of any of the Examples above, wherein said diffractive features have a height from 210 to 600 nanometers.

Example 157: The head-mounted display system of any of the Examples above, wherein said diffractive features have a height from 220 to 600 nanometers.

Example 158: The head-mounted display system of any of the Examples above, wherein said diffractive features have a height from 250 to 600 nanometers.

Example 159: The head-mounted display system of any of the Examples above, wherein said diffractive features have a height from 280 to 600 nanometers.

Example 160: The head-mounted display system of any of the Examples above, wherein said diffractive features have a height from 300 to 600 nanometers.

Example 161: The head-mounted display system of any of the Examples above, wherein said diffractive features have a height from 400 to 600 nanometers.

Example 162: The head-mounted display system of any of the Examples above, wherein said diffractive features have a pitch from 290 nm to 690 nm.

Example 163: The head-mounted display system of any of the Examples above, wherein said first diffraction efficiency averaged over said range of angles and said second diffraction efficiency averaged over said range of angles have an efficiency of at least 65%.

Example 164: The head-mounted display system of any of the Examples above, wherein said first diffraction efficiency averaged over said range of angles and said second diffraction efficiency averaged over said range of angles have an efficiency of at least 70%.

Example 165: The head-mounted display system of any of the Examples above, wherein said first diffraction efficiency averaged over said range of angles and said second diffraction efficiency averaged over said range of angles have an efficiency of at least 75%.

Example 166: The head-mounted display system of any of the Examples above, wherein said first diffraction efficiency averaged over said range of angles and said second diffraction efficiency averaged over said range of angles have an efficiency of at least 80%.

Example 167: The head-mounted display system of any of the Examples above, wherein said first diffraction efficiency averaged over said range of angles and said second diffraction efficiency averaged over said range of angles have an efficiency of at least 85%.

Example 168: The head-mounted display system of any of the Examples above, wherein said first and second diffraction efficiencies are on average at least 0.6 for a range of angles of incident light of at least 10 degrees.

Example 169: The head-mounted display system of any of the Examples above, wherein said first and second diffraction efficiencies are on average at least 0.6 for a range of angles of incident light of at least 20 degrees.

Example 170: The head-mounted display system of any of the Examples above, wherein said first and second diffraction efficiencies are on average at least 0.6 for a range of angles of incident light of at least 30 degrees.

Example 171: The head-mounted display system of any of the Examples above, wherein said first and second diffraction efficiencies are at least 0.6 for a range of angles of incident light of at least 10 degrees.

Example 172: The head-mounted display system of any of the Examples above, wherein said first and second diffraction efficiencies are at least 0.6 for a range of angles of incident light of at least 20 degrees.

Example 173: The head-mounted display system of any of the Examples above, wherein said first and second diffraction efficiencies are at least 0.6 for a range of angles of incident light of at least 30 degrees.

Example 174: The head-mounted display system of any of the Examples above, wherein said first and second diffraction efficiencies are on average at least 0.65 for a range of angles of incident light of at least 10 degrees.

Example 175: The head-mounted display system of any of the Examples above, wherein said first and second diffraction efficiencies are on average at least 0.65 for a range of angles of incident light of at least 20 degrees.

Example 176: The head-mounted display system of any of the Examples above, wherein said first and second diffraction efficiencies are on average at least 0.65 for a range of angles of incident light of at least 30 degrees.

Example 177: The head-mounted display system of any of the Examples above, wherein said first and second diffraction efficiencies are at least 0.65 for a range of angles of incident light of at least 10 degrees.

Example 178: The head-mounted display system of any of the Examples above, wherein said first and second diffraction efficiencies are at least 0.65 for a range of angles of incident light of at least 20 degrees.

Example 179: The head-mounted display system of any of the Examples above, wherein said first and second diffraction efficiencies are at least 0.65 for a range of angles of incident light of at least 30 degrees.

Example 180: The head-mounted display system of any of the Examples above, wherein said first and second diffraction efficiencies are on average at least 0.7 for a range of angles of incident light of at least 10 degrees.

Example 181: The head-mounted display system of any of the Examples above, wherein said first and second diffraction efficiencies are on average at least 0.7 for a range of angles of incident light of at least 20 degrees.

Example 182: The head-mounted display system of any of the Examples above, wherein said first and second diffraction efficiencies are on average at least 0.7 for a range of angles of incident light of at least 30 degrees.

Example 183: The head-mounted display system of any of the Examples above, wherein said first and second diffraction efficiencies are at least 0.7 for a range of angles of incident light of at least 10 degrees.

Example 184: The head-mounted display system of any of the Examples above, wherein said first and second diffraction efficiencies are at least 0.7 for a range of angles of incident light of at least 20 degrees.

Example 185: The head-mounted display system of any of the Examples above, wherein said first and second diffraction efficiencies are at least 0.7 for a range of angles of incident light of at least 30 degrees.

Example 186: The head-mounted display system of any of the Examples above, wherein said light projection system comprises micro-LEDs.

Example 187: The head-mounted display system of any of the Examples above, wherein said light projection system comprises a DLP or a LCOS display.

Example 188: The head-mounted display system of any of the Examples above, wherein said substrate includes nanoparticles.

Example 189: The head-mounted display system of any of the Examples above, wherein said substrate includes inorganic nanoparticles.

Example 170: The head-mounted display system of any of the Examples above, wherein said substrate comprises polymer.

Additional Examples—Part XII

Example 1: A head-mounted display system comprising:
a head-mountable frame;
a light projection system configured to output light to provide image content;
a waveguide supported by the frame, the waveguide comprising a substrate configured to guide at least a portion of the light from said light projection system coupled into said waveguide;
a first diffraction grating configured to have a first diffraction efficiency for a first polarization over a range of angles of light incident thereon and a second diffraction efficiency for a second polarization over the range of angles of light incident thereon, the first diffraction efficiency being from 1 to 2 times the second diffraction efficiency;
a second diffraction grating, said substrate configured to guide at least a portion of the light from said light projection system coupled into said waveguide via said second diffraction grating, the second diffraction grating
configured to have a third diffraction efficiency for the first polarization over a range of angles of light incident thereon and a fourth diffraction efficiency for the second polarization over the range of angles of light incident thereon, the fourth diffraction efficiency being from 1 to 2 times the third diffraction efficiency or the third diffraction efficiency being from 1 to 2 times the fourth diffraction efficiency over the range of angles of light incident thereon;
wherein the first diffraction grating is on a first side of said substrate and the second diffraction grating on a second side of said substrate opposite said first side of said substrate.

Example 3: The head-mounted display system of any of Examples above, wherein said first diffraction grating comprise a transmissive diffraction grating.

Example 4: The head-mounted display system of any of Examples above, wherein said first diffraction grating comprise a transmissive diffraction grating configured to diffract transmitted light to couple light into said waveguide to be guided therein by total internal reflection.

Example 5: The head-mounted display system of any of Examples above, wherein said second diffraction grating comprise a reflective diffraction grating.

Example 6: The head-mounted display system of any of Examples above, wherein said second diffraction grating comprise a reflective diffraction grating configured to diffract reflected light to couple light into said waveguide to be guided therein by total internal reflection.

Example 7: The head-mounted display system of any of Examples above, wherein said first and second diffraction gratings comprise in-line gratings.

Example 8: The head-mounted display system of any of Examples above, wherein said first and second diffraction gratings are aligned such that light transmitted through said first diffraction grating without being diffracted will be incident on said second diffraction grating.

Example 9: The head-mounted display system of any of Examples above, wherein said first diffraction grating comprises material different than said substrate over said substrate.

Example 10: The head-mounted display system of any of Examples above, wherein said first diffraction grating is formed in said substrate.

Example 11: The head-mounted display system of any of Examples above, further comprising a first layer disposed over said first diffraction grating.

Example 12: The head-mounted display system of any of Examples above, wherein said second diffraction grating comprises material different than said substrate over said substrate Example 13: The head-mounted display system of any of Examples above, wherein said second diffraction grating is formed in said substrate.

Example 14: The head-mounted display system of any of Examples above, further comprising a second layer disposed over said second diffraction grating.

Example 14: The head-mounted display system of any of Examples above, further comprising a third layer disposed over said second layer.

Example 15: The head-mounted display system of any of the Examples above, wherein the substrate comprises a lithium-based oxide.

Example 16: The head-mounted display system of any of the Examples above, wherein the substrate comprises lithium niobate.

Example 17: The head-mounted display system of any of the Examples above, wherein the substrate comprises silicon carbide.

Example 18: The head-mounted display system of any of the Examples above, wherein the substrate comprises material having an index of refraction of at least 1.9.

Example 19: The head-mounted display system of any of the Examples above, wherein the substrate comprises material having an index of refraction of at least 2.0.

Example 20: The head-mounted display system of any of the Examples above, wherein the substrate comprises material having an index of refraction of at least 2.1.

Example 21: The head-mounted display system of any of the Examples above, wherein the substrate comprises material having an index of refraction of at least 2.2.

Example 22: The head-mounted display system of any of the Examples above, wherein the substrate comprises material having an index of refraction of at least 2.3.

Example 23: The head-mounted display system of any of the Examples above, wherein the first diffraction grating material comprises polymer.

Example 24: The head-mounted display system of any of the Examples above, wherein the first diffraction grating material comprises imprintable material.

Example 25: The head-mounted display system of any of the Examples above, wherein the first diffraction grating material has a refractive index of 1.4 to 1.95.

Example 26: The head-mounted display system of any of the Examples above, wherein the first diffraction grating material has a refractive index that is lower than said substrate.

Example 27: The head-mounted display system of any of the Examples above, wherein said first diffraction grating comprises a blazed diffractive grating.

Example 28: The head-mounted display system of any of the Examples above, wherein said first diffraction grating comprises diffractive features comprising peaks spaced apart by grooves therebetween.

Example 29: The head-mounted display system of any of the Examples above, wherein said first diffraction grating comprises diffractive features comprising a plurality of straight lines.

Example 30: The waveguide of any of the Examples above, wherein said first diffractive grating comprises diffractive features that are asymmetric.

Example 31: The head-mounted display system of any of the Examples above, wherein the second diffraction grating material comprises polymer.

Example 32: The head-mounted display system of any of the Examples above, wherein the second diffraction grating material comprises imprintable material.

Example 33: The head-mounted display system of any of the Examples above, wherein the second diffraction grating material has a refractive index of 1.4 to 1.95.

Example 34: The head-mounted display system of any of between the Examples above, wherein the second diffraction grating material has a refractive index that is lower than said substrate.

Example 35: The head-mounted display system of any of the Examples above, wherein said second diffraction grating comprises a blazed diffractive grating.

Example 36: The head-mounted display system of any of the Examples above, wherein said second diffraction grating comprises diffractive features comprising peaks spaced apart by grooves therebetween.

Example 37: The head-mounted display system of any of the Examples above, wherein the said second diffraction grating comprises diffractive features comprising a plurality of straight lines.

Example 38: The waveguide of any of the Examples above, wherein said second diffractive grating comprises diffractive features that are asymmetric.

Example 39: The head-mounted display system of any of the Examples above, wherein the first layer has a refractive index of from 1.95 to 2.7.

Example 40: The head-mounted display system of any of the Examples above, wherein the first layer has a refractive index of from 2.1 to 2.7.

Example 41: The head-mounted display system of any of the Examples above, wherein the first layer has a refractive index of from 2.2 to 2.7.

Example 42: The head-mounted display system of any of the Examples above, wherein the first layer has a refractive index of from 2.3 to 2.7.

Example 43: The head-mounted display system of any of the Examples above, wherein the first layer comprises a dielectric.

Example 44: The head-mounted display system of any of the Examples above, wherein the first layer comprises titanium dioxide ($TiO_2$).

Example 39: The head-mounted display system of any of the Examples above, wherein the second layer has a refractive index of from 1.95 to 2.7.

Example 40: The head-mounted display system of any of the Examples above, wherein the second layer has a refractive index of from 2.1 to 2.7.

Example 41: The head-mounted display system of any of the Examples above, wherein the second layer has a refractive index of from 2.2 to 2.7.

Example 42: The head-mounted display system of any of the Examples above, wherein the second layer has a refractive index of from 2.3 to 2.7.

Example 43: The head-mounted display system of any of the Examples above, wherein the second layer comprises a dielectric.

Example 44: The head-mounted display system of any of the Examples above, wherein the second layer comprises titanium dioxide ($TiO_2$).

Example 45: The head-mounted display system of any of the Examples above, wherein the third layer comprises metal.

Example 46: The head-mounted display system of any of the Examples above, wherein the third layer comprises Al, Ag, or AlSi.

Example 47: The head-mounted display system of any of the Examples above, wherein the first and second polarizations comprise first and second linear polarization having different polarization angles.

Example 48: The head-mounted display system of any of the Examples above, wherein the first and second polarizations comprise first and second linear polarization oriented in orthogonal directions.

Example 49: The head-mounted display system of any of the Examples above, wherein the first and second polarizations comprise transverse magnetic and transverse electric polarizations, respectively.

Example 50: The head-mounted display system of any of the Examples above, wherein the first and second polarizations comprise transverse electric and transverse magnetic polarizations, respectively.

Example 51: The head-mounted display system of any of the Examples above, wherein the first diffraction efficiency comprises a diffraction efficiency for transverse-magnetic polarized light averaged across the visible light spectrum and wherein the second diffraction efficiency comprises a diffraction efficiency for transverse-electric polarized light averaged across the visible light spectrum.

Example 52: The head-mounted display system of any of the Examples above, wherein the first diffraction efficiency comprises a diffraction efficiency for transverse-electric polarized light averaged across the visible light spectrum and wherein the second diffraction efficiency comprises a diffraction efficiency for transverse-magnetic polarized light averaged across the visible light spectrum.

Example 53: The head-mounted display system of any of the Examples above, wherein the first diffraction efficiency is 1 to 1.5 times the second diffraction efficiency.

Example 54: The head-mounted display system of any of the Examples above, wherein the first diffraction efficiency is 1 to 1.4 times the second diffraction efficiency.

Example 55: The head-mounted display system of any of the Examples above, wherein the first diffraction efficiency is 1 to 1.3 times the second diffraction efficiency.

Example 56: The head-mounted display system of any of the Examples above, wherein the first diffraction efficiency is 1 to 1.2 times the second diffraction efficiency.

Example 57: The head-mounted display system of any of the Examples above, wherein the first diffraction efficiency is 1 to 1.1 times the second diffraction efficiency.

Example 58: The head-mounted display system of any of the Examples above, wherein the third diffraction efficiency is 1 to 1.5 times the fourth diffraction efficiency or the fourth diffraction efficiency is 1 to 1.5 times the third diffraction efficiency.

Example 59: The head-mounted display system of any of the Examples above, wherein the third diffraction efficiency is 1 to 1.4 times the fourth diffraction efficiency or the fourth diffraction efficiency is 1 to 1.4 times the third diffraction efficiency.

Example 60: The head-mounted display system of any of the Examples above, wherein the third diffraction efficiency is 1 to 1.3 times the fourth diffraction efficiency or the fourth diffraction efficiency is 1 to 1.3 times the third diffraction efficiency.

Example 61: The head-mounted display system of any of the Examples above, wherein the third diffraction efficiency is 1 to 1.2 times the fourth diffraction efficiency or the fourth diffraction efficiency is 1 to 1.2 times the third diffraction efficiency.

Example 62: The head-mounted display system of any of the Examples above, wherein the third diffraction efficiency is 1 to 1.1 times the fourth diffraction efficiency or the fourth diffraction efficiency is 1 to 1.1 times the third diffraction efficiency.

Example 63: The head-mounted display system of any of the Examples above, wherein the first diffraction grating is a transmissive diffraction grating diffracting more light transmitted therethrough than reflected therefrom.

Example 64: The head-mounted display system of any of the Examples above, wherein the second diffraction grating is a reflective diffraction grating diffracting more light reflected therefrom than transmitted therethrough.

Example 65: The head-mounted display system of any of the Examples above, wherein the range of angles is at least 6 degrees.

Example 66: The head-mounted display system of any of the Examples above, wherein the range of angles is at least 12 degrees.

Example 67: The head-mounted display system of any of the Examples above, wherein the range of angles is at least 18 degrees.

Example 68: The head-mounted display system of any of the Examples above, wherein the range of angles is at least 22 degrees.

Example 69: The head-mounted display system of any of the Examples above, wherein the range of angles is between ±3 degrees with respect to the plane of the substrate.

Example 70: The head-mounted display system of any of the Examples above, wherein the range of angles is between ±6 degrees with respect to the plane of the substrate.

Example 71: The head-mounted display system of any of the Examples above, wherein the range of angles is between ±9 degrees with respect to the plane of the substrate.

Example 72: The head-mounted display system of any of the Examples above, wherein the range of angles is between ±11 degrees with respect to the plane of the substrate.

Example 73: The head-mounted display system of any of the Examples above, wherein said waveguide is included in an eyepiece configured to direct light to an eye of a user wearing said head mounted display.

Example 74: The head-mounted display system of Example 73, wherein said eyepiece is disposed on the frame and is configured to direct light from the light projection system into the eye of the user to display augmented reality image content to the vision field of the user, at least a portion of the eyepiece being transparent and disposed at a location in front of the eye of the user when the user wears the head-mounted display system, where the transparent portion transmits light from a portion of a physical environment in front of the user to the eye of the user to provide a view of the portion of the physical environment in front of the user, the eyepiece comprising.

Example 75: The head-mounted display system of Example 73 or 74, wherein said eyepiece comprises said at least one waveguide and said at least one waveguide is transparent to visible light such that the user can see through the waveguide.

Example 76: The head-mounted display system of any of the Examples above, wherein said first diffraction gratings comprises an in-coupling grating (ICG) configured to in-couple light from said light projection system into said waveguide.

Example 77: The head-mounted display system of any of the Examples above, wherein the first layer is conformally deposited onto one or more diffractive features of the first diffraction grating.

Example 78: The head-mounted display system of any of the Examples above, wherein the first layer is directionally deposited onto the one or more diffractive features at an angle.

Example 79: The head-mounted display system of Example 78, wherein the angle comprises 75 to 105 degrees with respect to a planar major surface of the substrate.

Example 80: The head-mounted display system of Example 78, wherein the angle is 75 to 105 degrees with respect to a surface of one or more diffractive features of the first diffraction grating.

Example 81: The head-mounted display system of any of the Examples above, wherein the first diffraction grating comprises diffractive features formed in a 1D array.

Example 82: The head-mounted display system of any of Examples 1-75, wherein the first diffraction grating comprises diffractive features formed in a 2D array.

Example 83: The head-mounted display system of Example 82, wherein the 2D array comprises a square array.

Example 84: The head-mounted display of any of the Examples above, wherein the diffractive features are asymmetrical so as to provide a blazed grating.

Example 85: The head-mounted display of any of the Examples above, wherein the diffractive features have material asymmetrically deposited thereon so as to prove for a blazed grating.

Example 86: The head-mounted display of any of the Examples above, wherein said first diffraction grating is configured to direct light preferentially in at least two directions.

Example 87: The head-mounted display of any of the Examples above, wherein said first diffraction grating is blazed in two directions.

Example 88: The head-mounted display system of any of the Examples above, wherein the first diffraction grating comprises a one-dimensional grating.

Example 89: The head-mounted display system of any of Examples 1-87, wherein the first diffraction grating comprises a two-dimensional grating.

Example 90: The head-mounted display system of any of the Examples above, wherein the substrate comprises material having an index of refraction of no more than 2.6.

Example 91: The head-mounted display system of any of the Examples above, wherein the substrate comprises material having an index of refraction of no more than 2.7.

Example 92: The head-mounted display system of any of the Examples above, wherein the substrate comprises material having an index of refraction of no more than 2.8.

Example 93: The head-mounted display system of any of the Examples above, wherein the first layer comprises a dielectric.

Example 94: The head-mounted display system of any of the Examples above, wherein the first layer comprise material having a refractive of 1.9 or more.

Example 95: The head-mounted display system of any of the Examples above, further comprising an anti-reflective coating to reduce reflection of said first diffractive grating.

Example 96: The head-mounted display system of any of the Examples above, further comprising a bandpass filter or a notch filter to alter the spectral reflectivity and/or spectral transmission said first diffractive grating.

Example 97: The head-mounted display system of any of the Examples above, further comprising a plurality of sublayers over said first layer, said plurality of sublayers comprising a first higher index material and a second lower index material.

Example 98: The head-mounted display system of Example 97, wherein the first higher index material comprises titanium dioxide ($TiO_2$) and a second lower index material comprises silicon dioxide ($SiO_2$).

Example 99: The head-mounted display system of Example 97 or 98, wherein the plurality of sublayers comprising only two sublayers.

Example 100: The head-mounted display system of Example 97 or 98, wherein the plurality of sublayers comprising at least four sublayers.

Example 101: The head-mounted display system of any of Examples 97-100, wherein the plurality of sublayers alternate between the first material and the second material.

Example 102: The head-mounted display system of any of Examples 97-101, wherein the plurality of sublayers comprises an interference coating.

Example 103: The head-mounted display system of any of Examples 97-102, wherein the plurality of sublayers comprises a quarter wave stack.

Example 104: The head-mounted display system of any of Examples 97-103, wherein the plurality of sublayers over said first layer forms a bandpass filter.

Example 105: The head-mounted display system of any of Examples 97-104, wherein the plurality of sublayers over said first layer forms a notch filter.

Example 106: The head-mounted display system of any of Examples 97-105, wherein the plurality of sublayers over said first layer forms an anti-reflection (AR) coating.

Example 107: The head-mounted display system of any of Examples 97-106, wherein first the lower index material has a refractive index of 1.6 or less.

Example 108: The head-mounted display system of any of Examples 97-107, wherein the second higher index material has a refractive index of 1.9 or more.

Example 109: The head-mounted display system of any of the Examples 97-108, wherein the first lower index material comprises silicon dioxide.

Example 110: The head-mounted display system of any of the Examples 97-109, wherein the second higher index material comprises titanium dioxide.

Example 111: The head-mounted display system of any of Examples 97-109, wherein the second higher index material comprises zirconium dioxide.

Example 112: The head-mounted display system of any of Examples 97-109, wherein the second higher index material comprises zinc oxide.

Example 113: The head-mounted display system of any of the Examples above, wherein said first diffraction grating comprises an average diffraction efficiency for said first polarization over said range of angles and said second diffraction efficiency comprises an average diffraction efficiency for said second polarization over said range of angles.

Example 114: The head-mounted display system of any of the Examples above, wherein the range of angles is at least 25 degrees.

Example 115: The head-mounted display system of any of the Examples above, wherein the range of angles is at least 30 degrees.

Example 116: The head-mounted display system of any of the Examples above, wherein the range of angles is at least 35 degrees.

Example 117: The head-mounted display system of any of the Examples above, wherein the range of angles is at least 40 degrees.

Example 118: The head-mounted display system of any of the Examples above, wherein the range of angles is between ±15 degrees with respect to the plane of the substrate.

Example 119: The head-mounted display system of any of the Examples above, wherein the range of angles is between ±18 degrees with respect to the plane of the substrate.

Example 120: The head-mounted display system of any of the Examples above, wherein the range of angles is between ±20 degrees with respect to the plane of the substrate.

Example 121: The head-mounted display system of any of the Examples above, wherein the first diffraction grating comprises diffractive features comprising first and second sidewalls.

Example 122: The head-mounted display system of Example 121, wherein at least said first sidewalls is sloped.

Example 123: The head-mounted display system of Examples 121 or 122, wherein said first and second sidewalls are separated by a plateau.

Example 124: The head-mounted display system of Examples 121 or 122, wherein said first and second sidewalls joint to form salient angle at the top of said diffractive feature.

Example 125: The head-mounted display system of any of Examples 116-119, wherein said first sidewall is sloped at an angle such that said first sidewall is less steep than said second sidewall.

Example 126: The head-mounted display system of any of Examples 116-120, wherein said first sidewall is wider than said second sidewall.

Example 127: The head-mounted display system of any of the Examples 116-121, wherein said first sidewall forms an angle of from 45° to 85° at said base of said diffractive feature.

Example 128: The head-mounted display system of any of the Examples 116-122, wherein said second sidewall forms an acute re-entrant angle at the base of said diffractive feature.

Example 129: The head-mounted display system of any of the Examples 116-123, wherein said first diffraction grating comprises shark-fin shaped diffractive features.

Example 130: The head-mounted display system of any of the Examples 116-122, wherein said second sidewall forms an obtuse re-entrant angle at the base of said diffractive feature.

Example 131: The head-mounted display system of any of the Examples 116-122, wherein said second sidewall is vertical.

Example 132: The head-mounted display system of any of the Examples 116-122 or 125-126, wherein said first diffraction grating comprises sawtooth shaped diffractive features.

Example 133: The head-mounted display system of any of the Examples above, wherein said first layer comprises a biased deposition.

Example 134: The head-mounted display system of any of the Examples above, wherein said first layer comprises a glazing angle deposition.

Example 135: The head-mounted display system of any of Examples 121-134, wherein said first layer is biased to provide more coverage on said first sidewall than said second sidewall.

Example 136: The head-mounted display system of any of Examples 121-135, wherein said first layer covers a greater fraction of said first sidewall than said second sidewall.

Example 137: The head-mounted display system of any of Examples 121-136, wherein said first layer is biased to provide thicker coverage on said first sidewall than said second sidewall.

Example 138: The head-mounted display system of any of Examples 121-137, wherein said first layer provides on average thicker coverage on said first sidewall than said second sidewall.

Example 139: The head-mounted display system of any of the Examples above, wherein the second diffraction grating comprises diffractive features comprising first and second sidewalls.

Example 140: The head-mounted display system of Example 139, wherein said first sidewall slopes at a shallower angle and said second sidewall slopes at a steeper angle.

Example 141: The head-mounted display system of any of Examples 139 or 140, wherein said first sidewall is completely covered by said second layer.

Example 142: The head-mounted display system of any of Examples 139-141, wherein at least a portion of said second sidewall is not covered by said second layer.

Example 143: The head-mounted display system of any of Examples 139-142, wherein said second sidewall includes more area not covered by said second layer than said first sidewall.

Example 144: The head-mounted display system of any of Examples 139-143, wherein said third layer comprises a conformal deposition.

Example 145: The head-mounted display system of any of Examples 139-144, wherein said first and second sidewalls are completely covered by said third layer.

Example 146: The head-mounted display system of any of Examples 139-145, wherein said third layer is not biased to cover more of said first sidewall than said second sidewall.

Example 147: The head-mounted display system of any of Examples 139-146, wherein said third layer does not provide thicker coverage on said first sidewall than said second sidewall.

Example 148: The head-mounted display system of any of Examples 139-147, wherein said third layer does not provide on average thicker coverage on said first sidewall than said second sidewall.

Example 149: The head-mounted display system of any of Examples 139-148, wherein said second sidewall is entirely covered by said third layer.

Example 150: The head-mounted display system of any of Examples 139-149, wherein said second sidewall does not include more area not covered by said third layer than said first sidewall.

Example 151: The head-mounted display system of any of Examples above, wherein said first diffraction efficiency for said first polarization is not more than 20% higher than said second diffraction efficiency for said second polarization over said range of angles.

Example 152: The head-mounted display system of any of Examples above, wherein said first diffraction efficiency for said first polarization is not more than 30% higher than said second diffraction efficiency for said second polarization over said range of angles.

Example 153: The head-mounted display system of any of Examples above, wherein said first diffraction efficiency for said first polarization is not more than 40% higher than said second diffraction efficiency for said second polarization over said range of angles.

Example 154: The head-mounted display system of any of Examples above, wherein said first diffraction efficiency for said first polarization is not more than 50% higher than said second diffraction efficiency for said second polarization over said range of angles.

Example 155: The head-mounted display system of any of Examples above, wherein said second diffraction efficiency for said second polarization is not more than 20% higher than said first diffraction efficiency for said first polarization over said range of angles.

Example 156: The head-mounted display system of any of Examples above, wherein said second diffraction efficiency for said second polarization is not more than 30% higher than said first diffraction efficiency for said first polarization over said range of angles.

Example 157: The head-mounted display system of any of Examples above, wherein said second diffraction efficiency for said second polarization is not more than 40% higher than said first diffraction efficiency for said first polarization over said range of angles.

Example 158: The head-mounted display system of any of Examples above, wherein said second diffraction efficiency for said second polarization is not more than 50% higher than said first diffraction efficiency for said first polarization over said range of angles.

Example 159: The head-mounted display system of any of Examples above, wherein said third diffraction efficiency for said first polarization is not more than 20% higher than said fourth diffraction efficiency for said second polarization over said range of angles.

Example 160: The head-mounted display system of any of Examples above, wherein said third diffraction efficiency for said first polarization is not more than 30% higher than said fourth diffraction efficiency for said second polarization over said range of angles.

Example 161: The head-mounted display system of any of Examples above, wherein said third diffraction efficiency for said first polarization is not more than 40% higher than said fourth diffraction efficiency for said second polarization over said range of angles.

Example 162: The head-mounted display system of any of Examples above, wherein said third diffraction efficiency for said first polarization is not more than 50% higher than said fourth diffraction efficiency for said second polarization over said range of angles.

Example 163: The head-mounted display system of any of Examples above, wherein said fourth diffraction efficiency for said second polarization is not more than 20% higher than said third diffraction efficiency for said first polarization over said range of angles.

Example 164: The head-mounted display system of any of Examples above, wherein said fourth diffraction efficiency for said second polarization is not more than 30% higher than said third diffraction efficiency for said first polarization over said range of angles.

Example 165: The head-mounted display system of any of Examples above, wherein said fourth diffraction efficiency for said second polarization is not more than 40% higher than said third diffraction efficiency for said first polarization over said range of angles.

Example 166: The head-mounted display system of any of Examples above, wherein said fourth diffraction efficiency for said second polarization is not more than 50% higher than said third diffraction efficiency for said first polarization over said range of angles.

Example 167: The head-mounted display system of any of Examples above, wherein said second diffraction grating with said second and third layers formed thereon comprises a reflective diffraction grating.

Example 168: The head-mounted display system of any of Examples above, wherein said second diffraction grating with said second and third layers formed thereon comprises a reflective diffraction grating configured to diffract reflected light to couple light into said waveguide to be guided therein by total internal reflection.

Example 169: The head-mounted display system of any of the Examples above, wherein said diffractive features have a height from 100 to 600 nanometers.

Example 170: The head-mounted display system of any of the Examples above, wherein said diffractive features have a height from 200 to 600 nanometers.

Example 171: The head-mounted display system of any of the Examples above, wherein said diffractive features have a height from 300 to 600 nanometers.

Example 172: The head-mounted display system of any of the Examples above, wherein said diffractive features have a pitch from 290 nm to 690 nm.

Example 173: The head-mounted display system of any of the Examples above, wherein said light projection system comprises micro-LEDs.

Example 174: The head-mounted display system of any of the Examples above, wherein said light projection system comprises a DLP or a LCOS display.

Example 175: The head-mounted display system of any of the Examples above, wherein said substrate includes nanoparticles.

Example 176: The head-mounted display system of any of the Examples above, wherein said substrate includes inorganic nanoparticles.

Example 177: The head-mounted display system of any of the Examples above, wherein said substrate comprises polymer.

Additional Examples—Part XIII

Example 1: A head-mounted display system comprising:
a head-mountable frame;
a light projection system configured to output light to provide image content;
a waveguide supported by the frame, the waveguide comprising a substrate configured to guide at least a portion of the light from said light projection system coupled into said waveguide;
a first diffraction grating configured to have a first diffraction efficiency for a first polarization over a range of angles of light incident thereon that is greater than a second diffraction efficiency for a second polarization over said range of angles of light incident thereon;
a second diffraction grating, said substrate configured to guide at least a portion of the light from said light projection system coupled into said waveguide via said second diffraction grating, the second diffraction grating
configured to have a third diffraction efficiency for the first polarization over a range of angles of light incident thereon and a fourth diffraction efficiency for the second polarization over the range of angles of light incident thereon, the fourth diffraction efficiency being from 1 to 2 times the third diffraction efficiency or the third diffraction efficiency being from 1 to 2 times the fourth diffraction efficiency over the range of angles of light incident thereon;
wherein the first diffraction grating is on a first side of said substrate and the second diffraction grating on a second side of said substrate opposite said first side of said substrate.

Additional Examples—Part XIV

Example 1: A head-mounted display system comprising:
a head-mountable frame;
a light projection system configured to output light to provide image content;
a waveguide supported by the frame, the waveguide comprising a substrate configured to guide at least a portion of the light from said light projection system coupled into said waveguide and to the user's eye;
at least one diffraction grating formed in or on the substrate,
wherein the substrate includes nanoparticles.

Example 2: The head-mounted display system of Examples 1, wherein said nanoparticles comprise inorganic nanoparticles.

Example 3: The head-mounted display system of any of the Examples above, wherein said diffraction grating comprises an in-coupling grating.

Example 4: The head-mounted display system of any of the Examples above, wherein said diffraction grating comprises an out-coupling grating.

Example 5: The head-mounted display system of any of the Examples above, wherein said waveguide is included in an eyepiece configured to direct light to an eye of a user wearing said head mounted display.

Example 6: The head-mounted display system of Example 7, wherein said eyepiece is disposed on the frame and is configured to direct light from the light projection system into the eye of the user to display augmented reality image content to the vision field of the user, at least a portion of the eyepiece being transparent and disposed at a location in front of the eye of the user when the user wears the head-mounted display system, where the transparent portion transmits light from a portion of a physical environment in front of the user to the eye of the user to provide a view of the portion of the physical environment in front of the user.

Example 7: The head-mounted display system of any of the Examples above, wherein said waveguide comprises an in-coupling optical element for coupling light from said light projection system into the waveguide to be guided therein.

Example 8: The head-mounted display system of any of the Examples above, wherein said substrate comprises polymer.

Any of the above examples in any of the parts may be combined.

C. ADDITIONAL CONSIDERATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A waveguide comprising:
   a substrate configured to propagate light within the waveguide by total internal reflection; and
   at least one diffraction grating on the substrate, each diffraction grating comprising:
      a grating pattern on a side of the substrate, the grating pattern comprising material different than the substrate;
      a first layer disposed over at least a portion of the grating pattern on the side of the substrate, the first layer comprising an optically transmissive material; and
      a second layer comprising metal disposed on the side of the substrate over both the grating pattern and the first layer, such that the first layer is between the grating pattern and the second layer, and such that the diffraction grating has a first diffraction efficiency for light having a first state over a range of angles of light incident thereon and a second diffraction efficiency for light having a second state over the range of angles of light incident thereon,
   wherein the grating pattern, the first layer, and the second layer are on the side of the substrate configured as an incident side,
   wherein at least one of the first state or the second state is a polarization state, and
   wherein the first diffraction efficiency is 1 to 2 times the second diffraction efficiency.

2. The waveguide of claim 1, wherein the substrate has an index of refraction of at least 1.9.

3. The waveguide of claim 1, wherein the grating pattern comprises polymer.

4. The waveguide of claim 1, wherein the grating pattern comprises imprintable material.

5. The waveguide of claim 1, wherein the grating pattern comprises material having a refractive index of 1.4 to 1.95.

6. The waveguide of claim 1, wherein the grating pattern comprises material having a refractive index that is lower than a refractive index of the substrate.

7. The waveguide of claim 1, wherein the grating pattern comprises a blazed grating pattern.

8. The waveguide of claim 7, wherein the first layer is disposed on one side of the diffractive features of the blazed grating pattern and not on another side of the diffractive features.

9. The waveguide of claim 1, wherein the first layer comprises one or more of titanium dioxide ($TiO_2$), zirconium dioxide ($ZrO_2$), or silicon carbide (SiC).

10. The waveguide of claim 1, wherein the second layer comprises one or more of aluminum, silver, gold, copper, aluminum silicate (AlSi), or an alloy of at least two of these.

11. The waveguide of claim 1, wherein the first and second states comprise transverse electric and transverse magnetic polarizations, respectively.

12. The waveguide of claim 1, wherein one of the first and second states is unpolarized.

13. The waveguide of claim 1, wherein the first layer comprises at least one of a dielectric material or a semiconductor material.

14. The waveguide of claim 1, wherein the first layer comprises a high refractive index material having a refractive index from 1.9 to 3.5.

15. The waveguide of claim 1, wherein the range of angles spans at least 12 degrees.

16. The waveguide of claim 1, wherein the range of angles spans at least 22 degrees.

17. The waveguide of claim 1, wherein the second layer is conformally disposed to at least partly conform to a shape of the grating pattern.

18. The waveguide of claim 1, wherein the first layer includes at least two sublayers of different materials having different refractive indices.

19. The waveguide of claim 18, wherein at least one of the sublayers comprises titanium dioxide ($TiO_2$), and at least a different one of the sublayers comprises silicon dioxide ($SiO_2$).

20. The waveguide of claim 1, wherein the first diffraction efficiency is within 10% of the second diffraction efficiency.

* * * * *